Dec. 7, 1965  J. P. LAZARUS  3,222,650
INTERPRETATION MACHINE
Filed Dec. 30, 1960  80 Sheets-Sheet 1

INVENTOR
JOHN P LAZARUS
BY *Alvin J. Riddles*
ATTORNEY

Dec. 7, 1965  J. P. LAZARUS  3,222,650
INTERPRETATION MACHINE
Filed Dec. 30, 1960  80 Sheets-Sheet 2
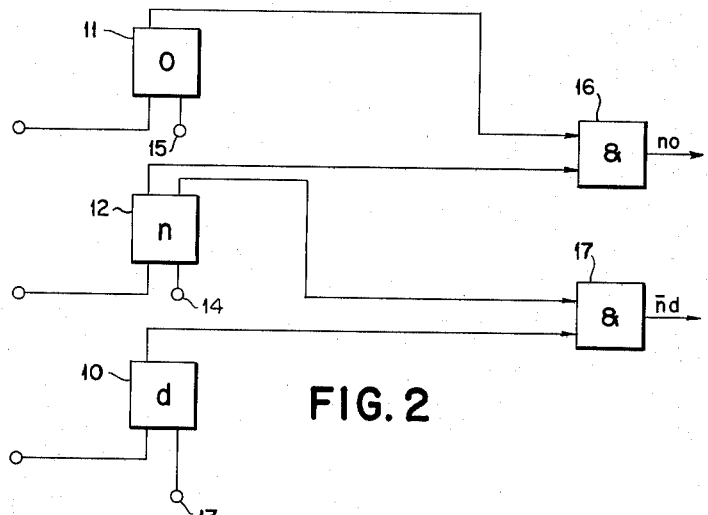
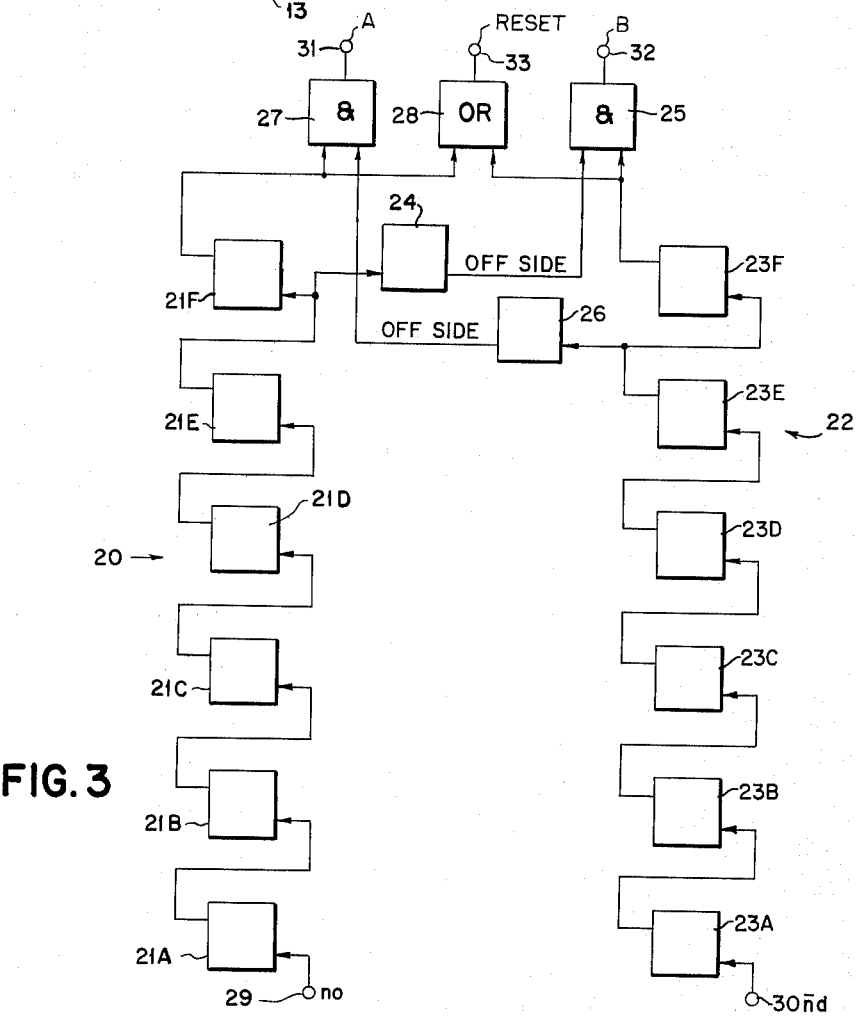

Dec. 7, 1965   J. P. LAZARUS   3,222,650
INTERPRETATION MACHINE
Filed Dec. 30, 1960   80 Sheets-Sheet 4

Dec. 7, 1965  J. P. LAZARUS  3,222,650
INTERPRETATION MACHINE
Filed Dec. 30, 1960  80 Sheets-Sheet 5
FIG. 7
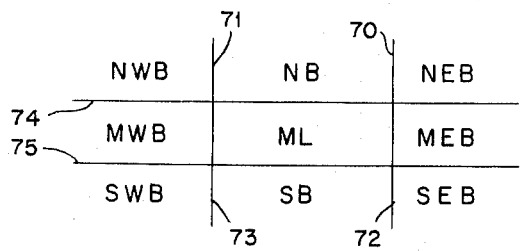
FIG. 8
FIG. 9
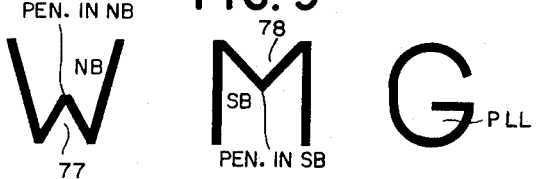
FIG. 10
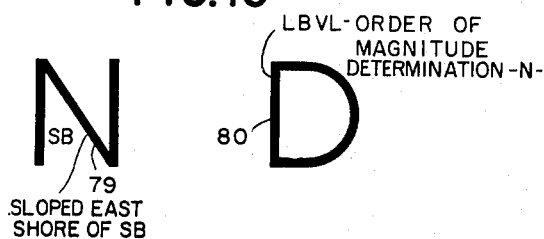
FIG. 11
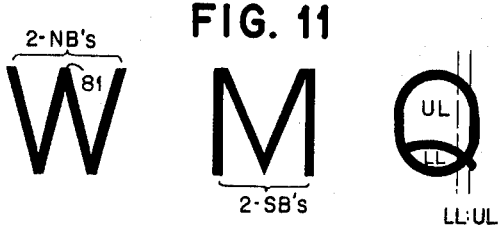
FIG. 12

Dec. 7, 1965     J. P. LAZARUS     3,222,650
INTERPRETATION MACHINE
Filed Dec. 30, 1960     80 Sheets-Sheet 8

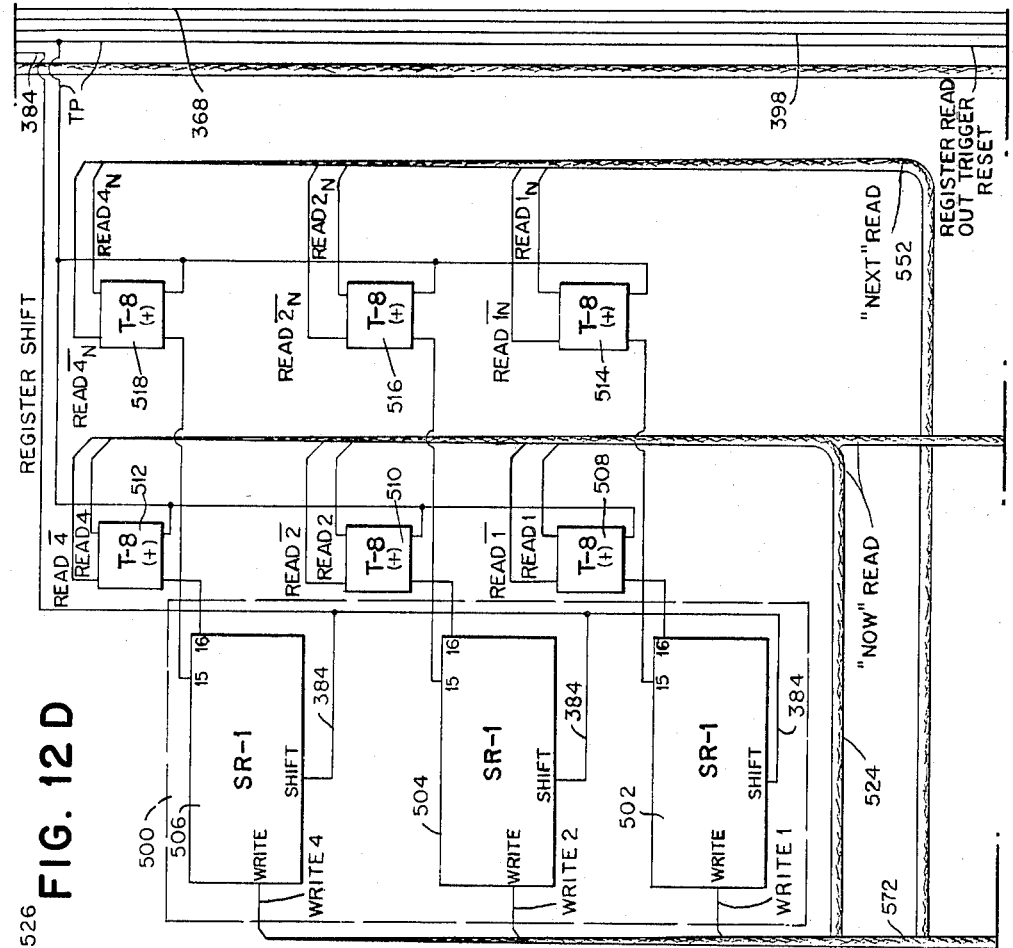
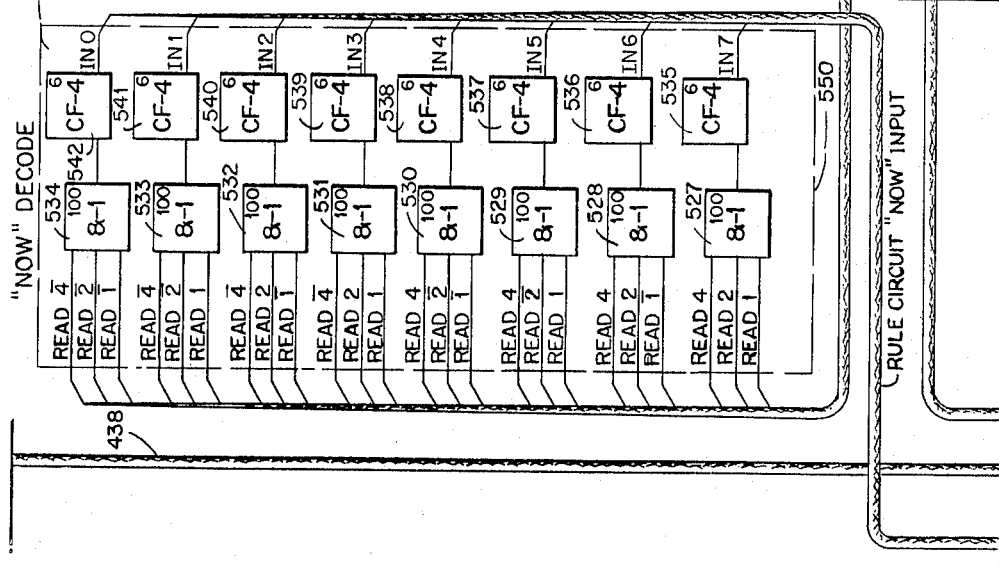
FIG. 12D

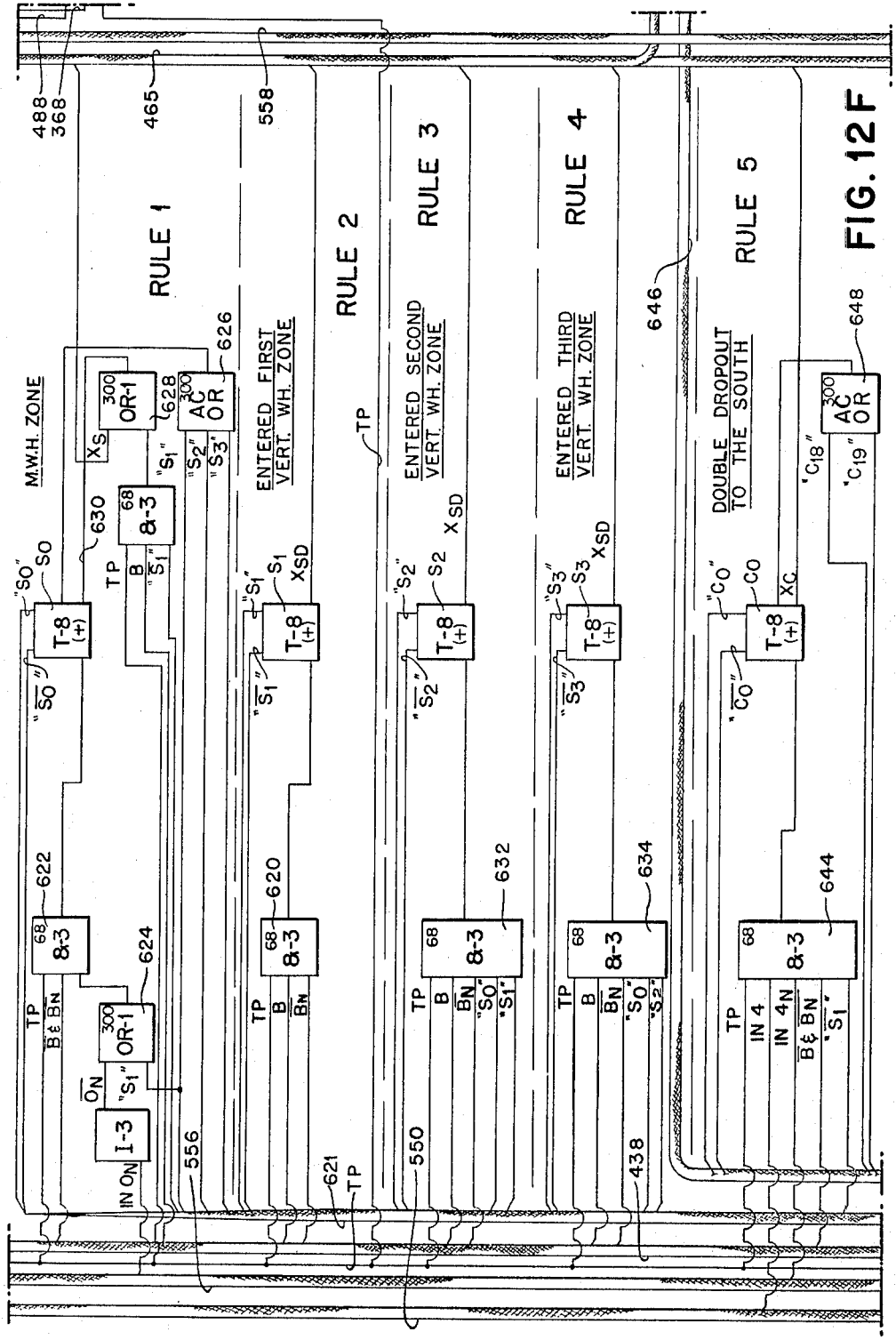

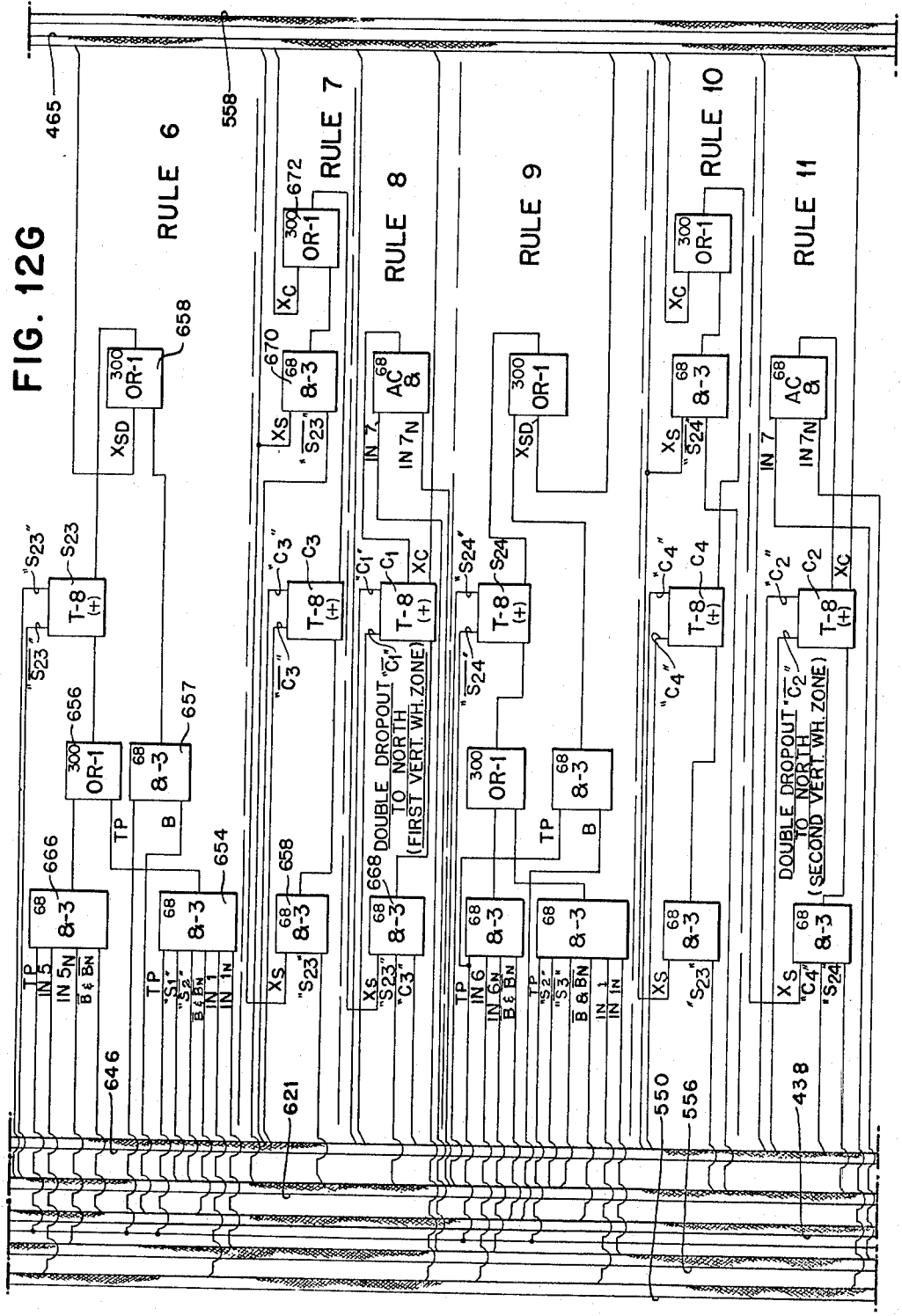

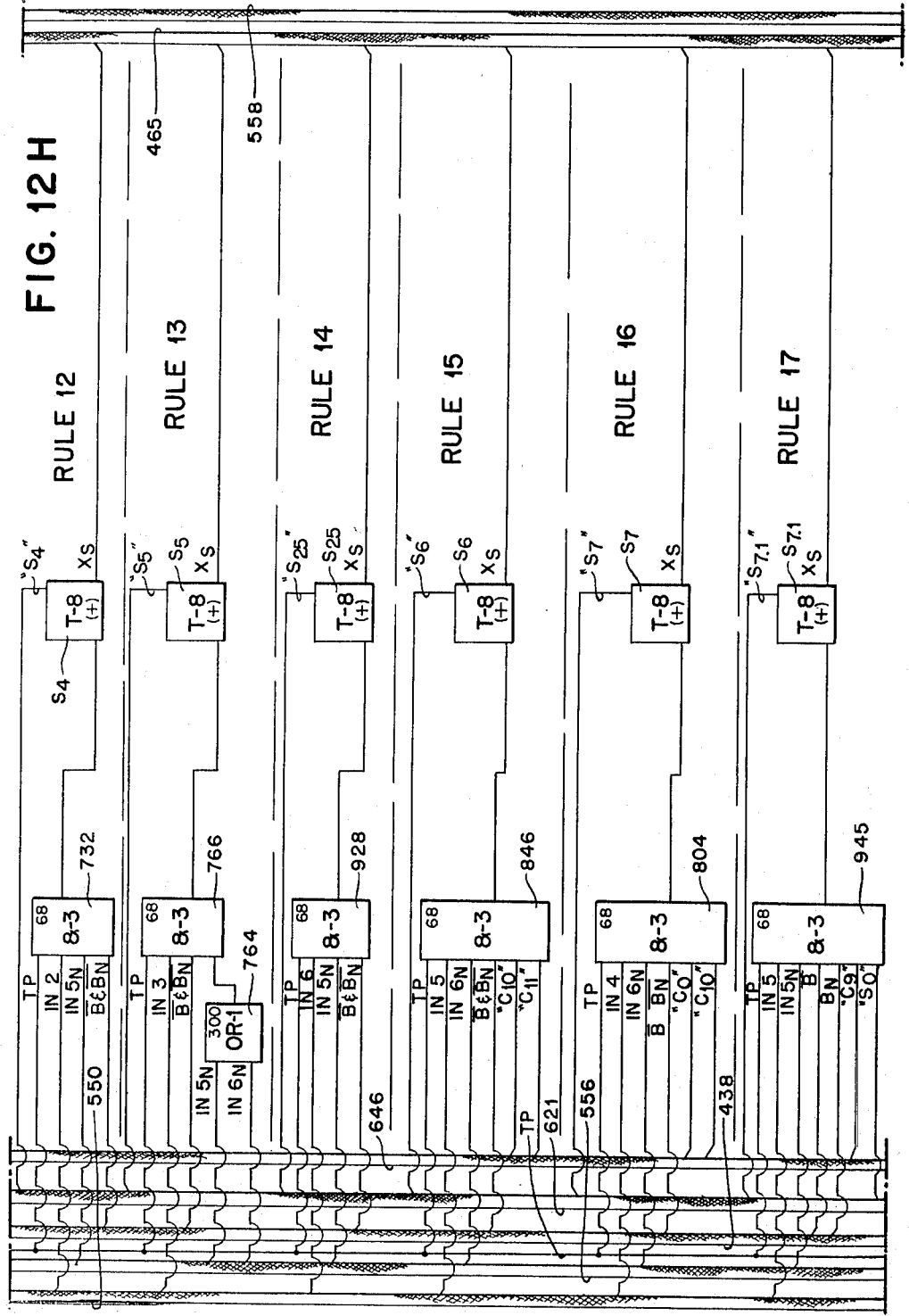

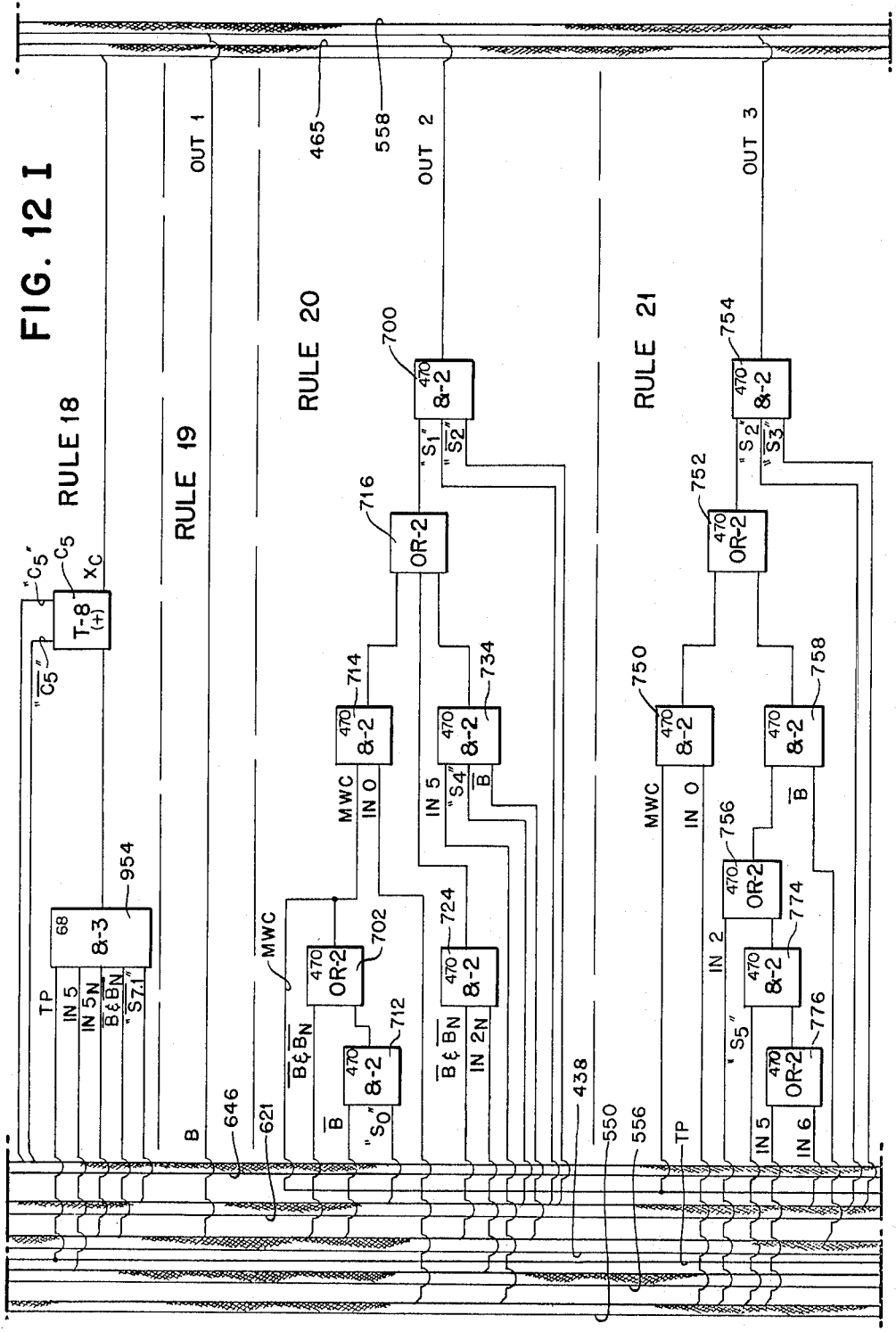

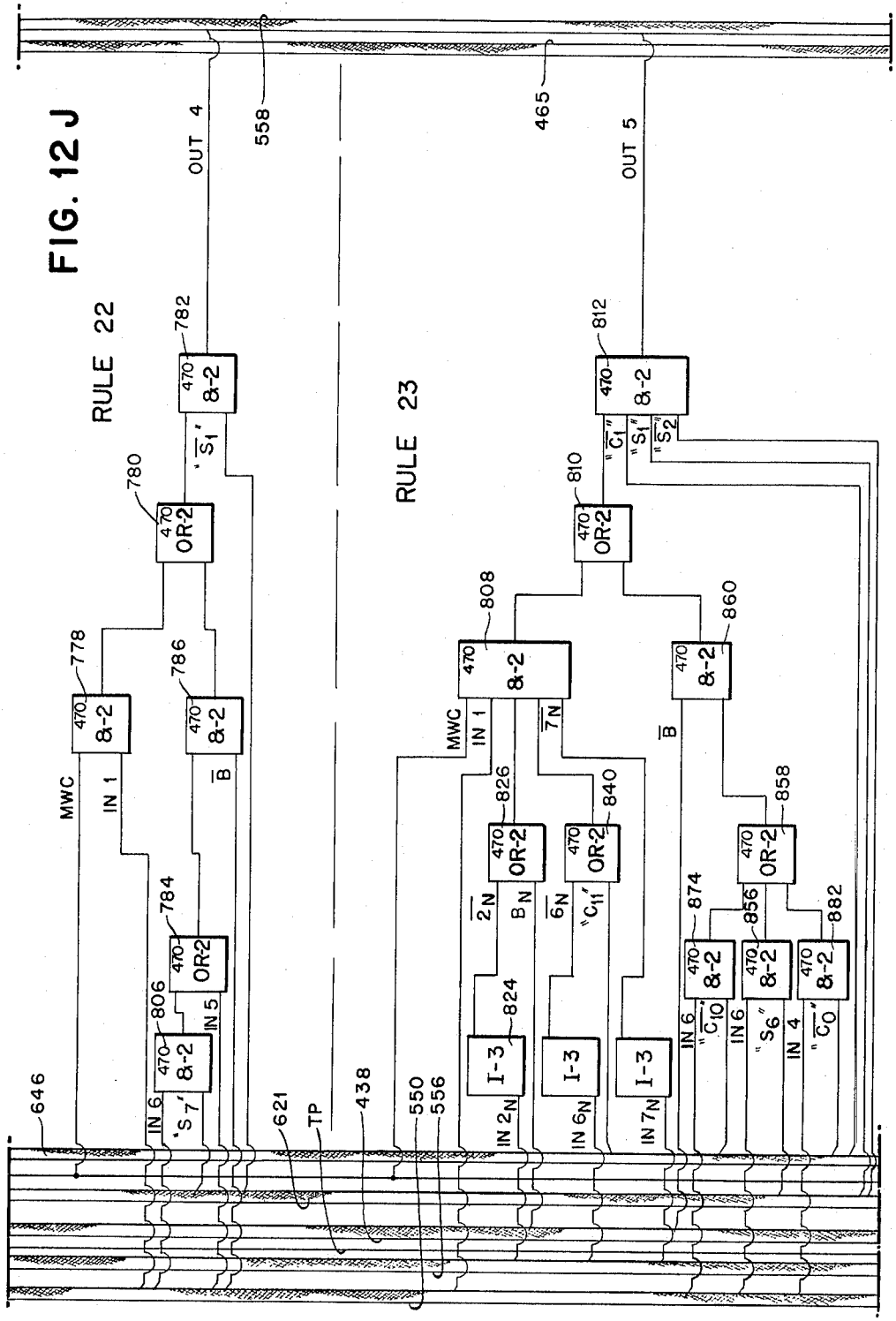

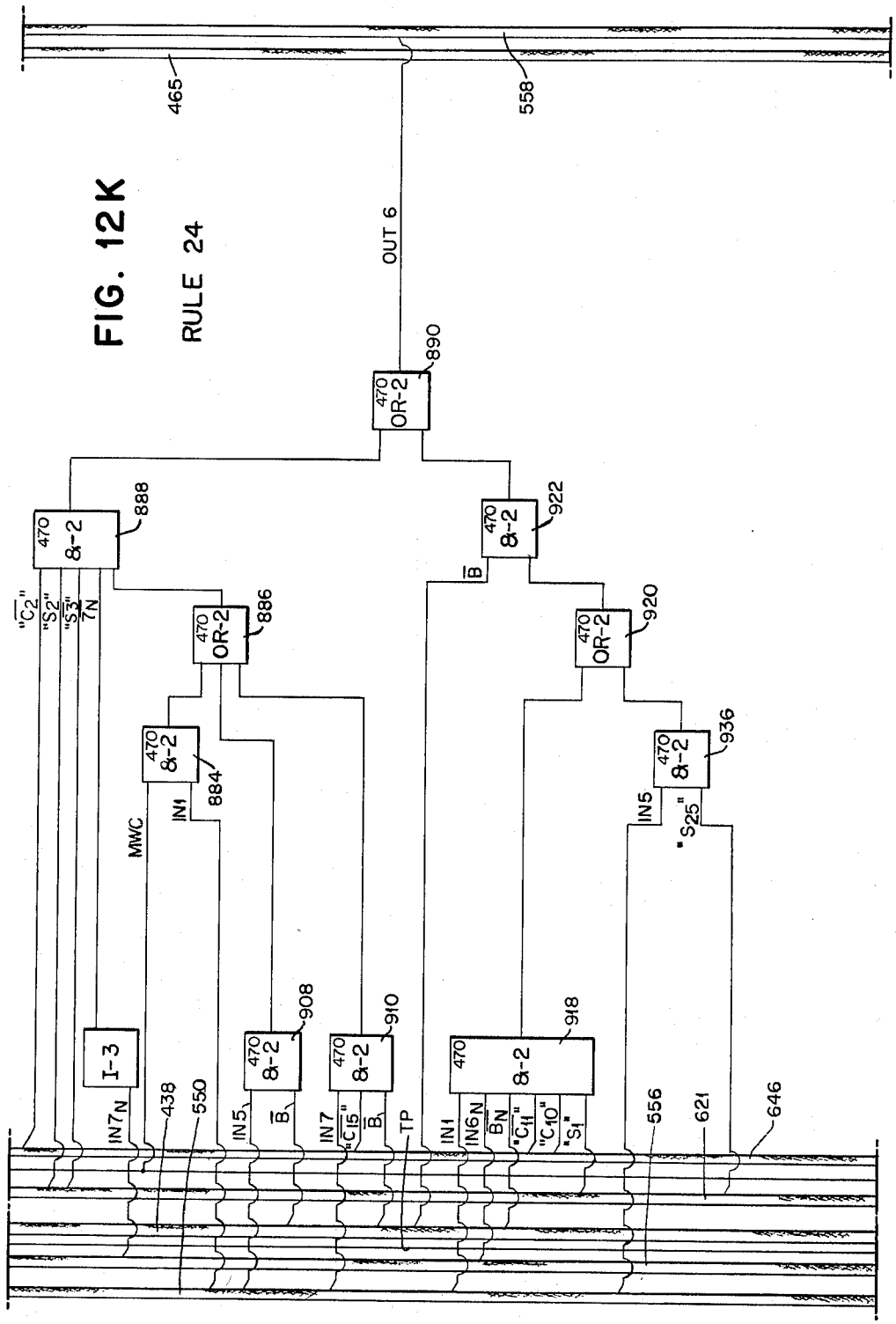

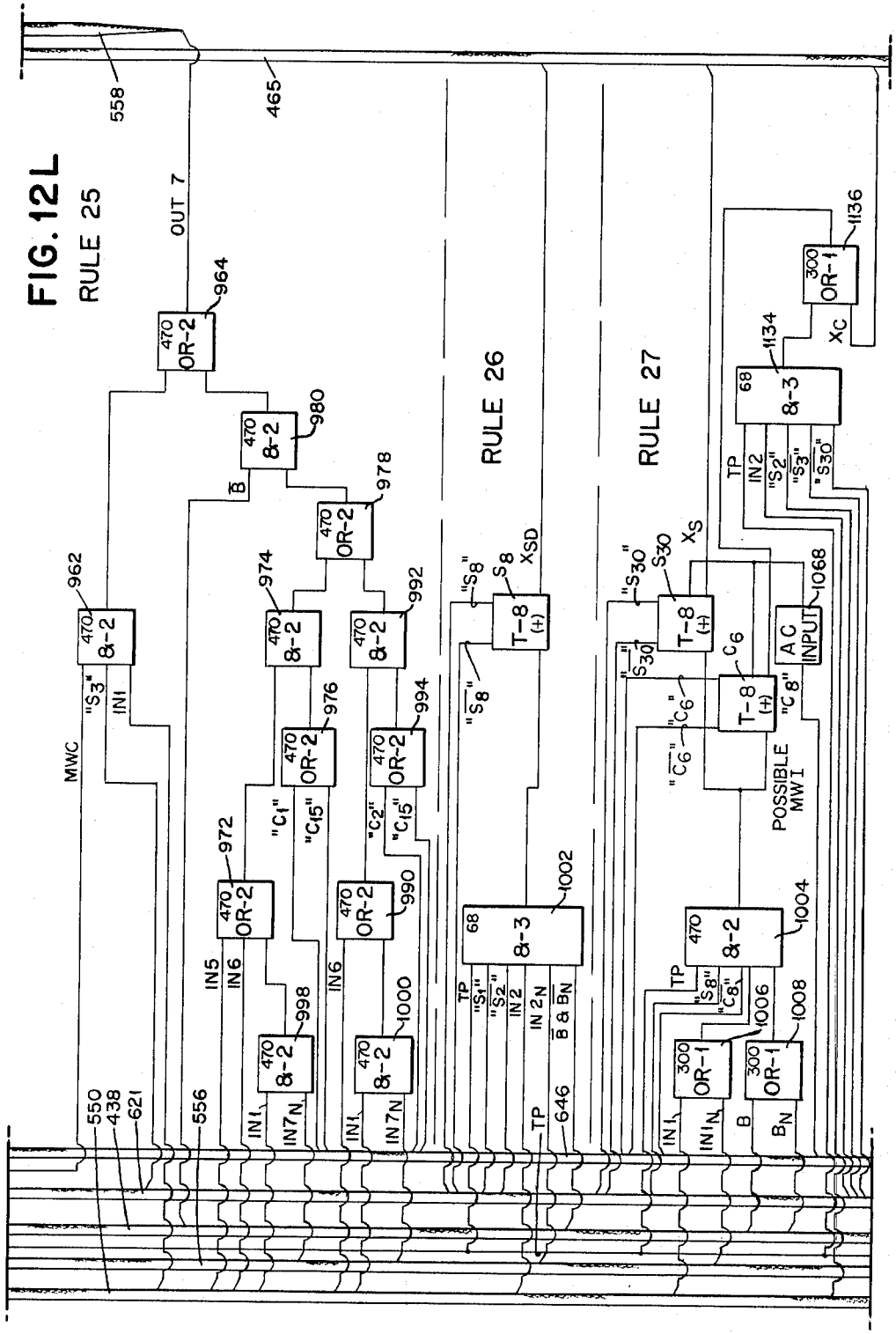

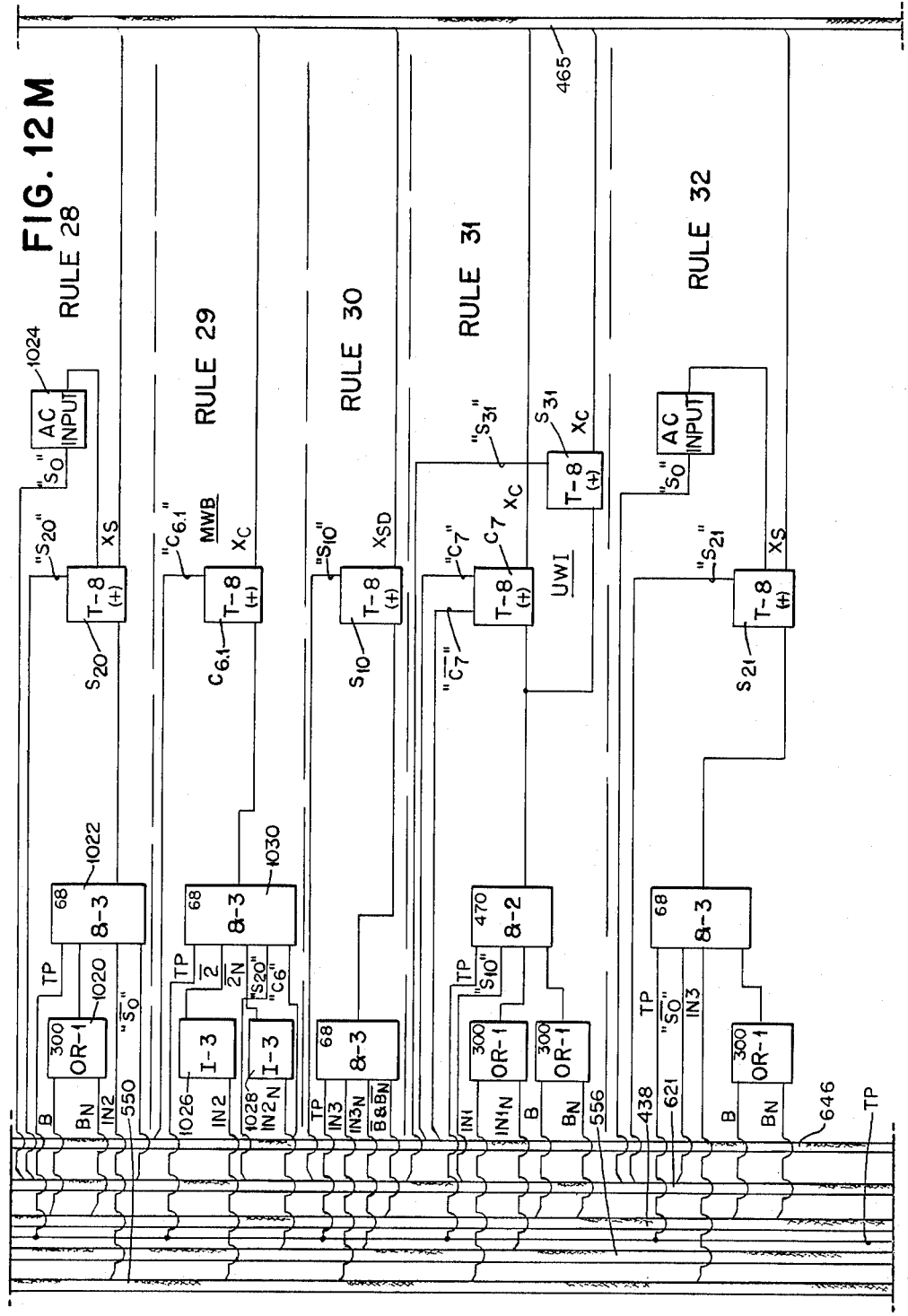

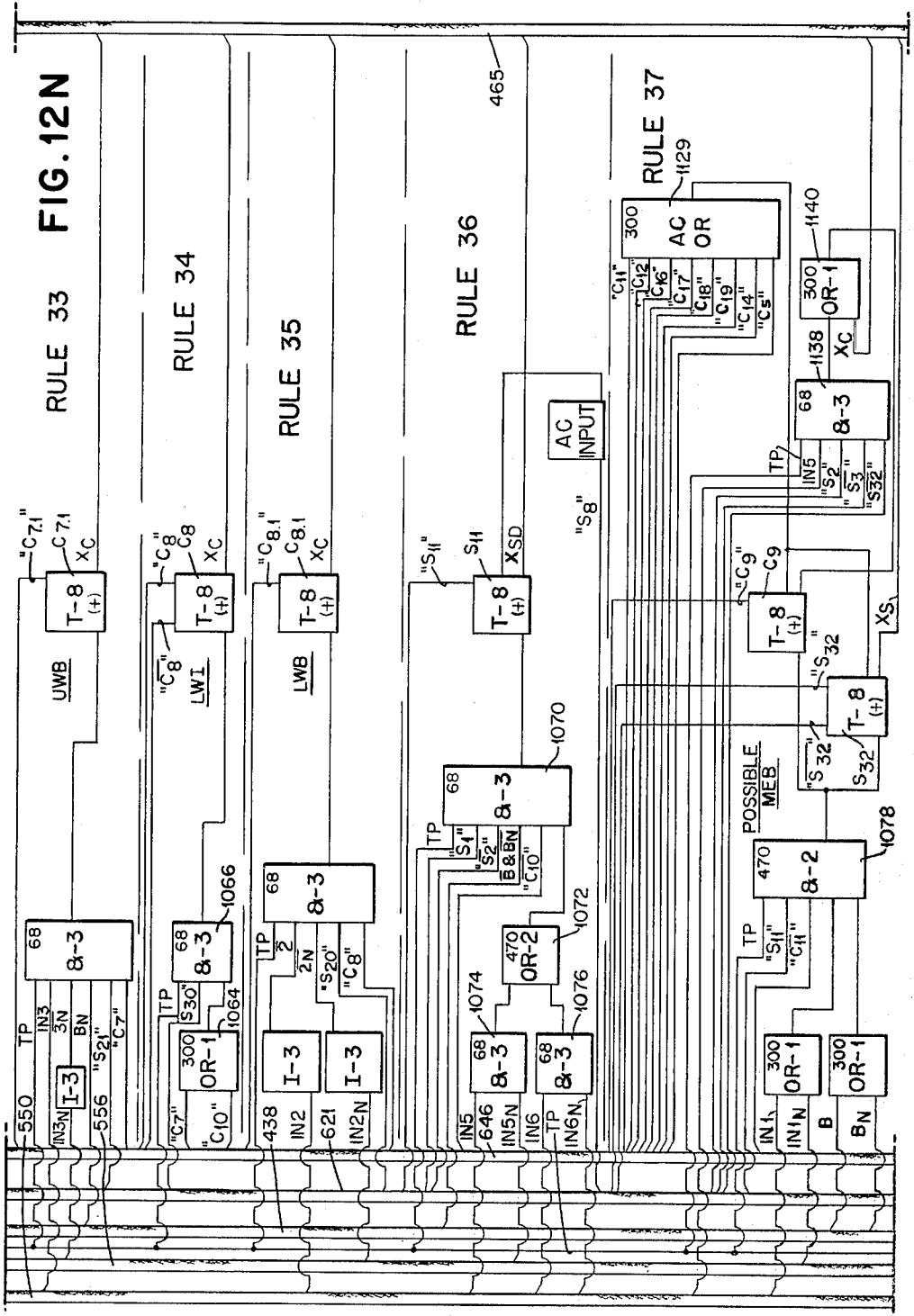

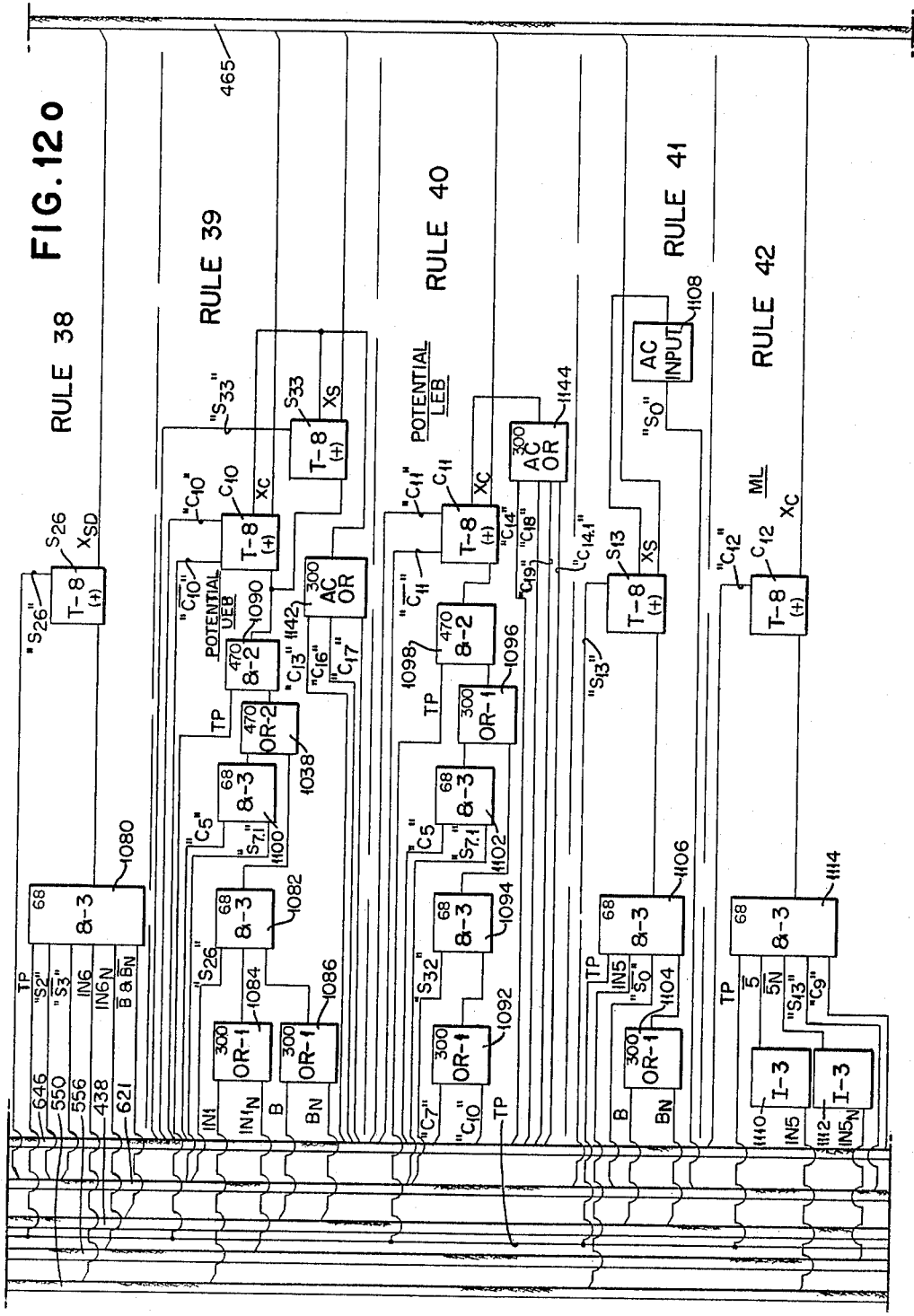

Dec. 7, 1965    J. P. LAZARUS    3,222,650
INTERPRETATION MACHINE
Filed Dec. 30, 1960    80 Sheets-Sheet 21
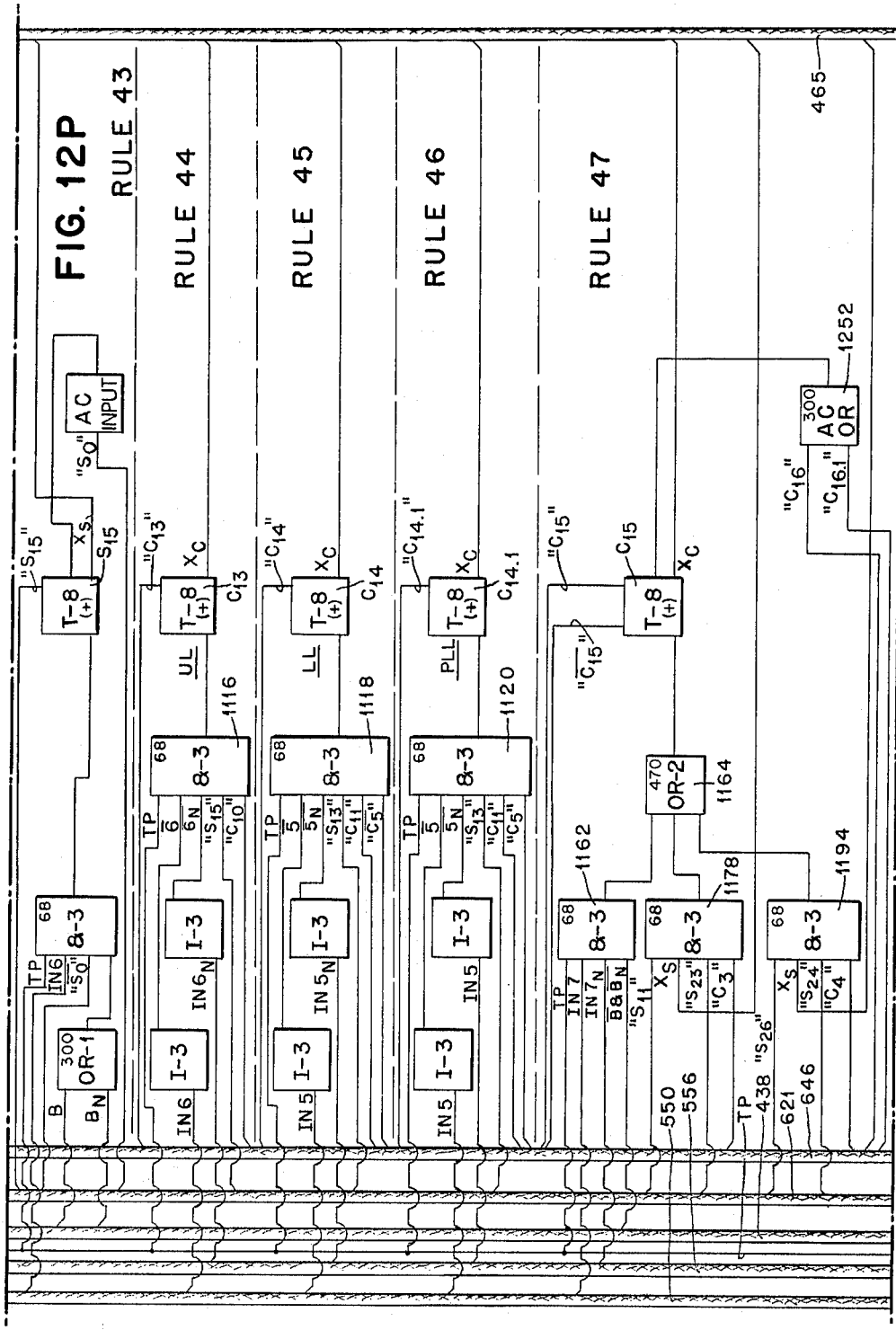

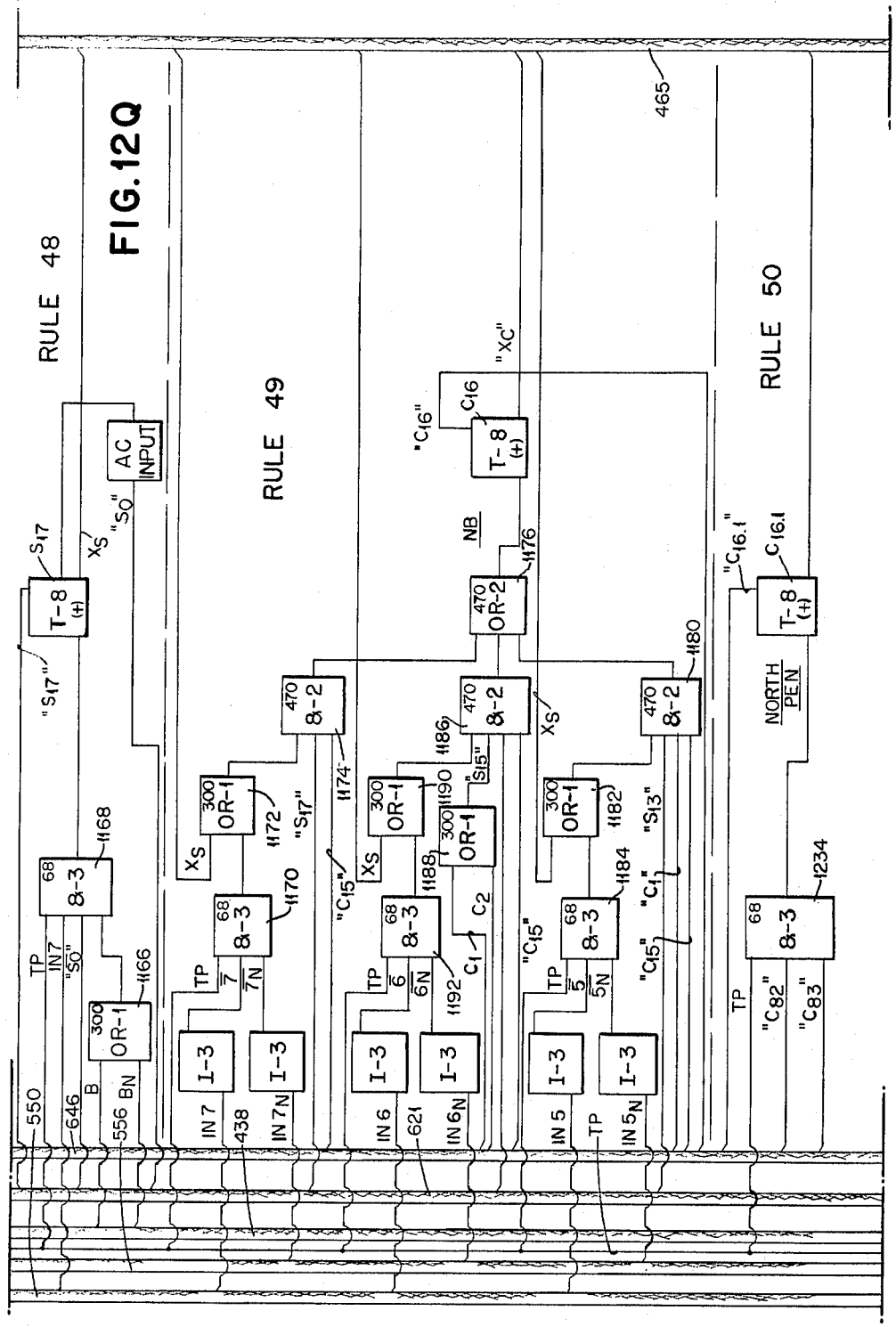

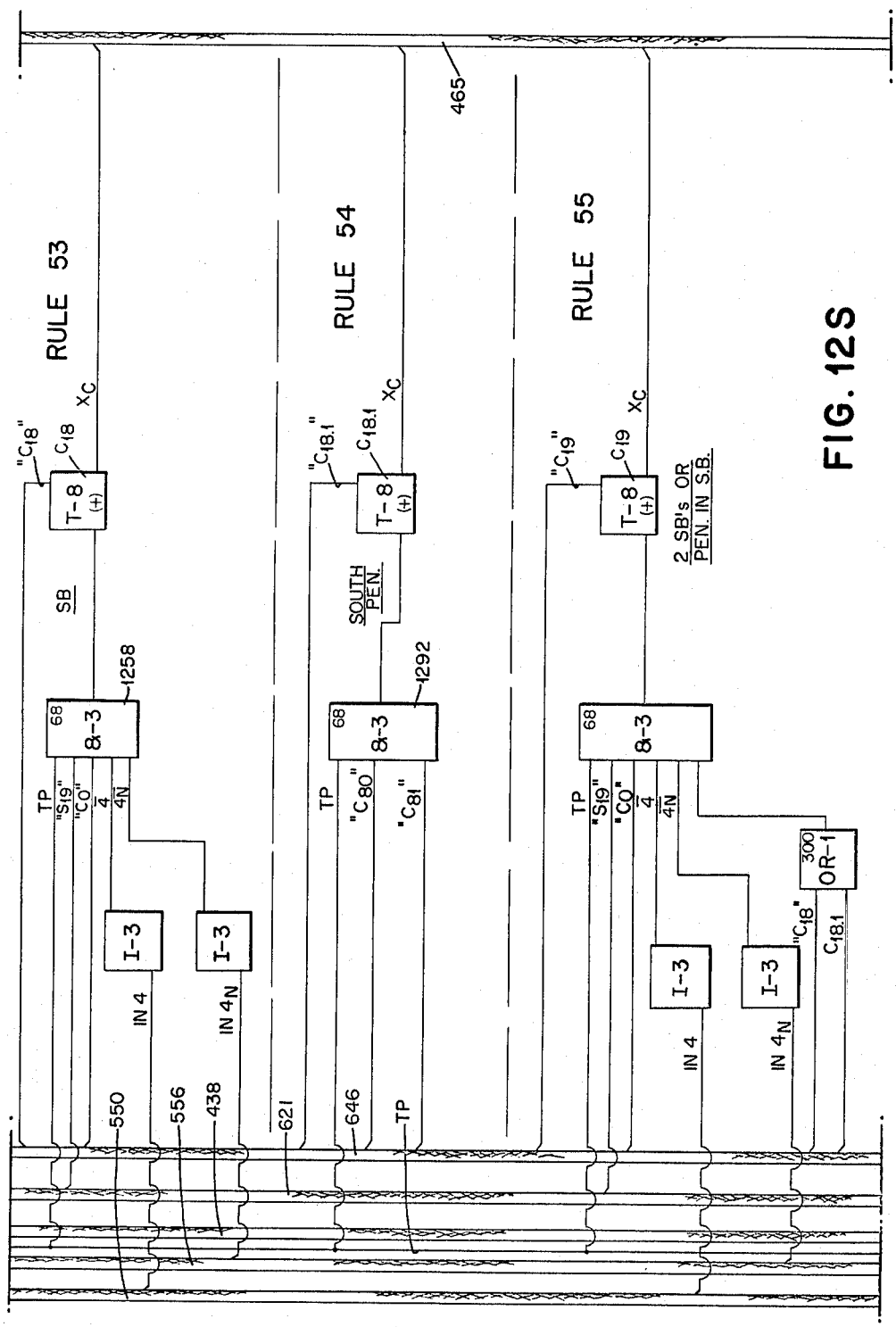

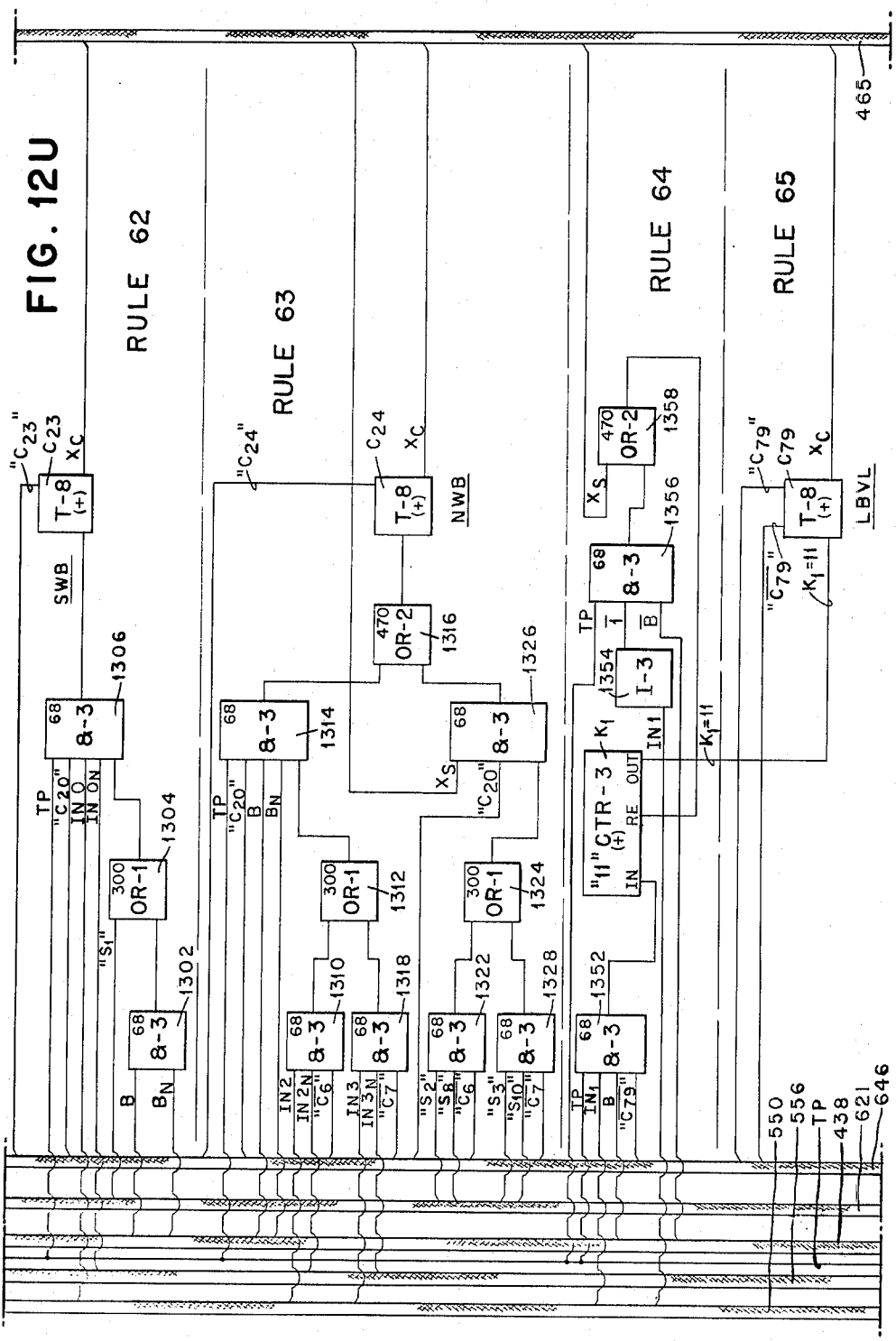

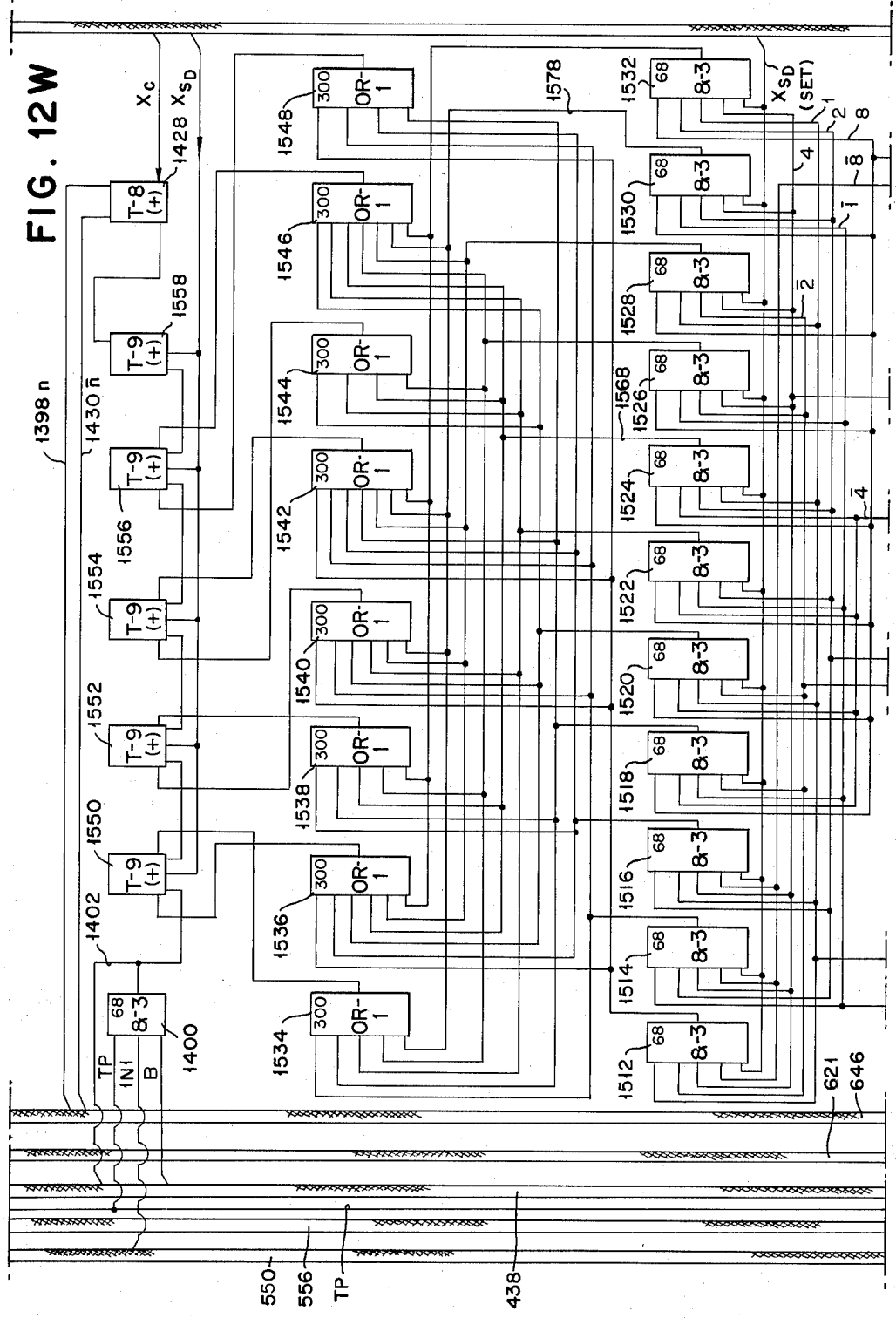

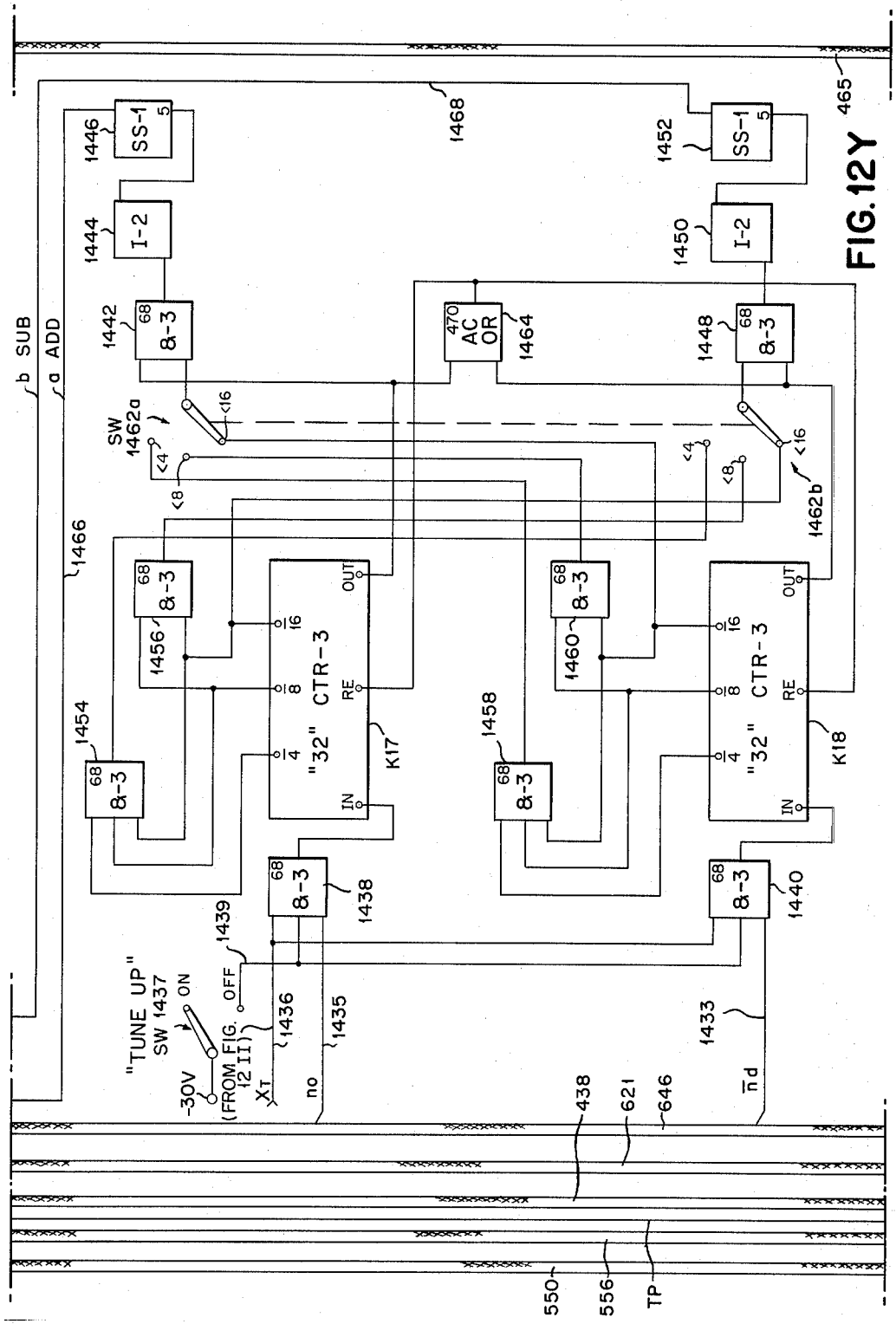

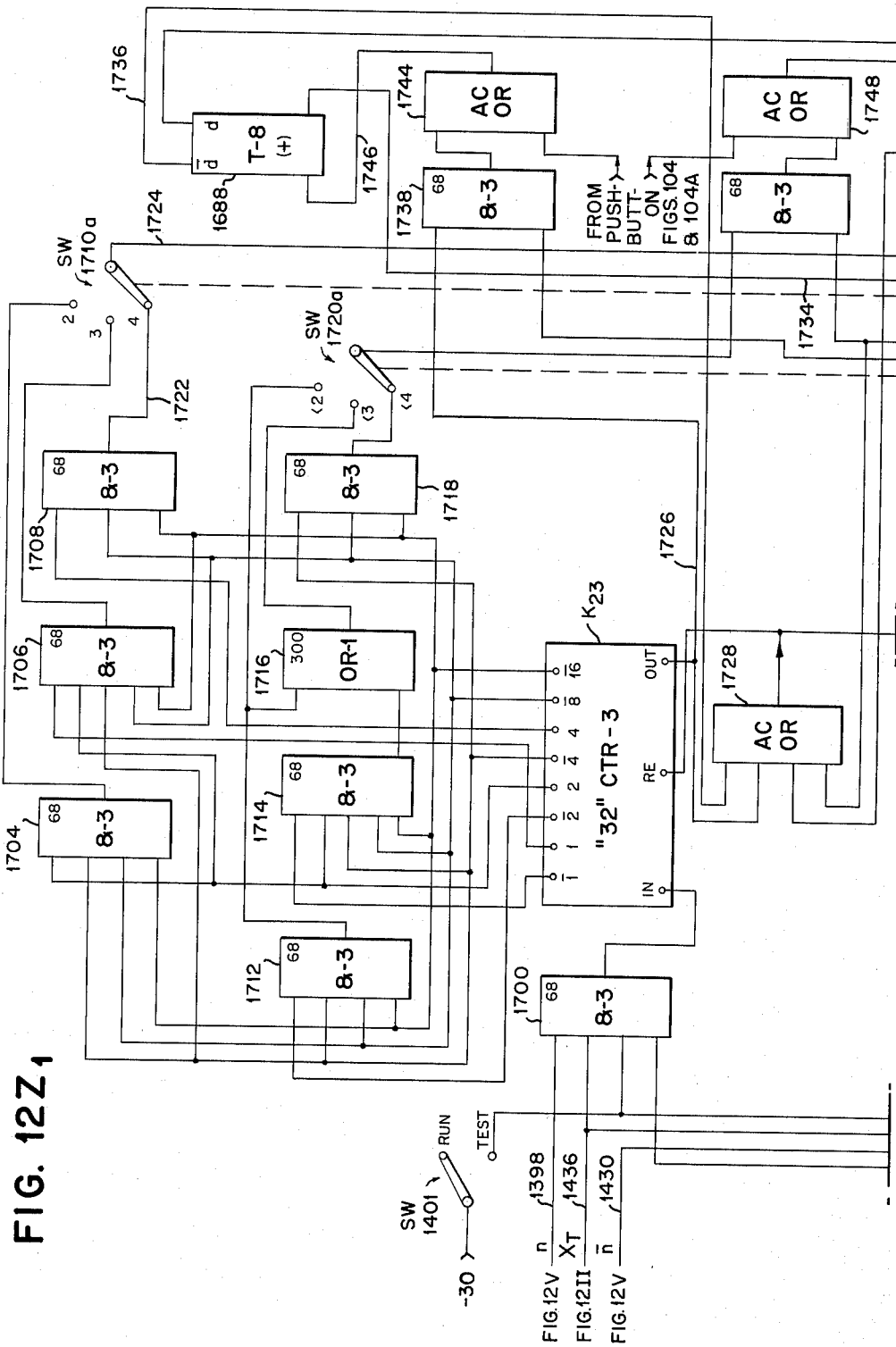

Dec. 7, 1965 J. P. LAZARUS 3,222,650
INTERPRETATION MACHINE
Filed Dec. 30, 1960 80 Sheets-Sheet 33
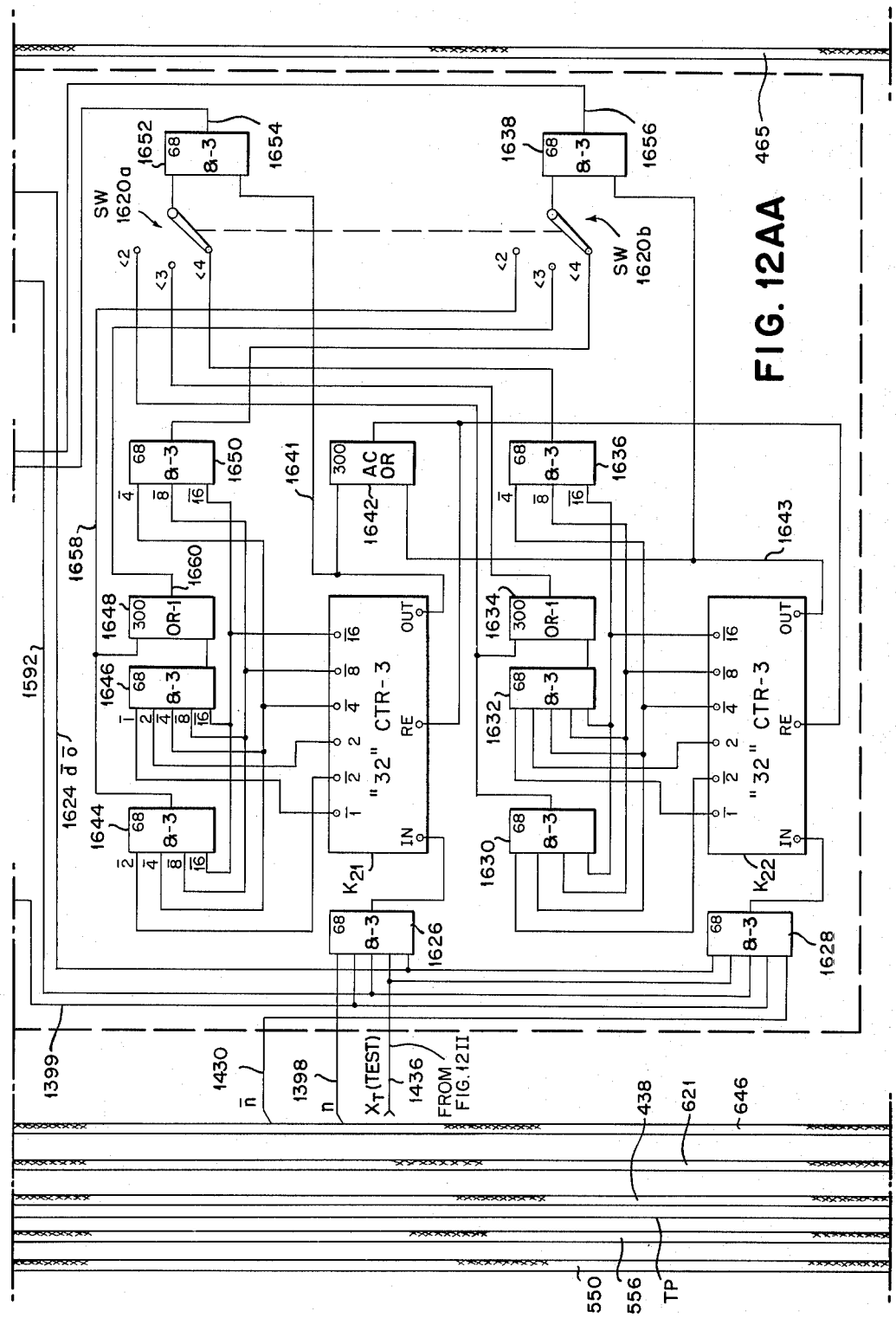

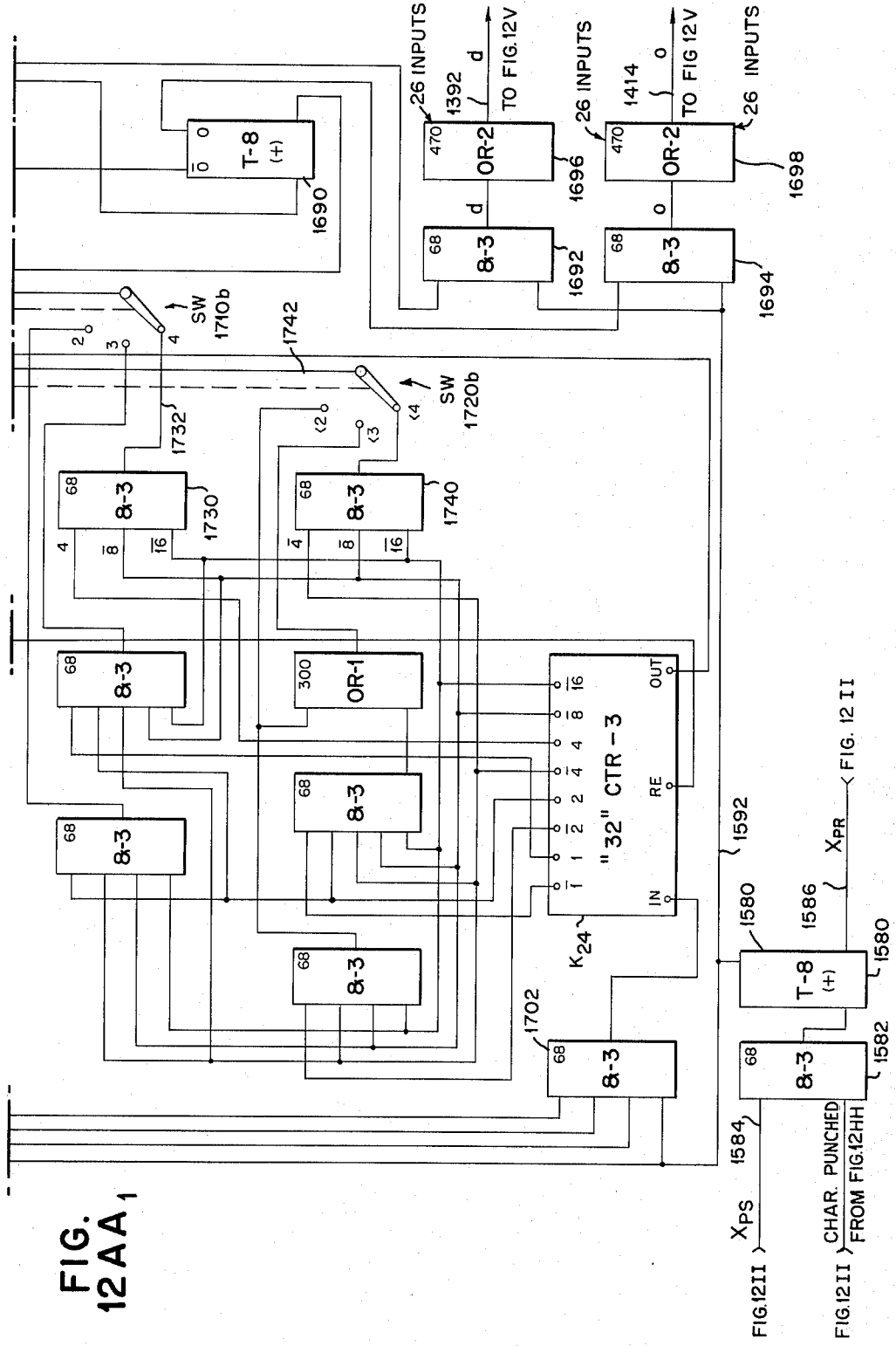

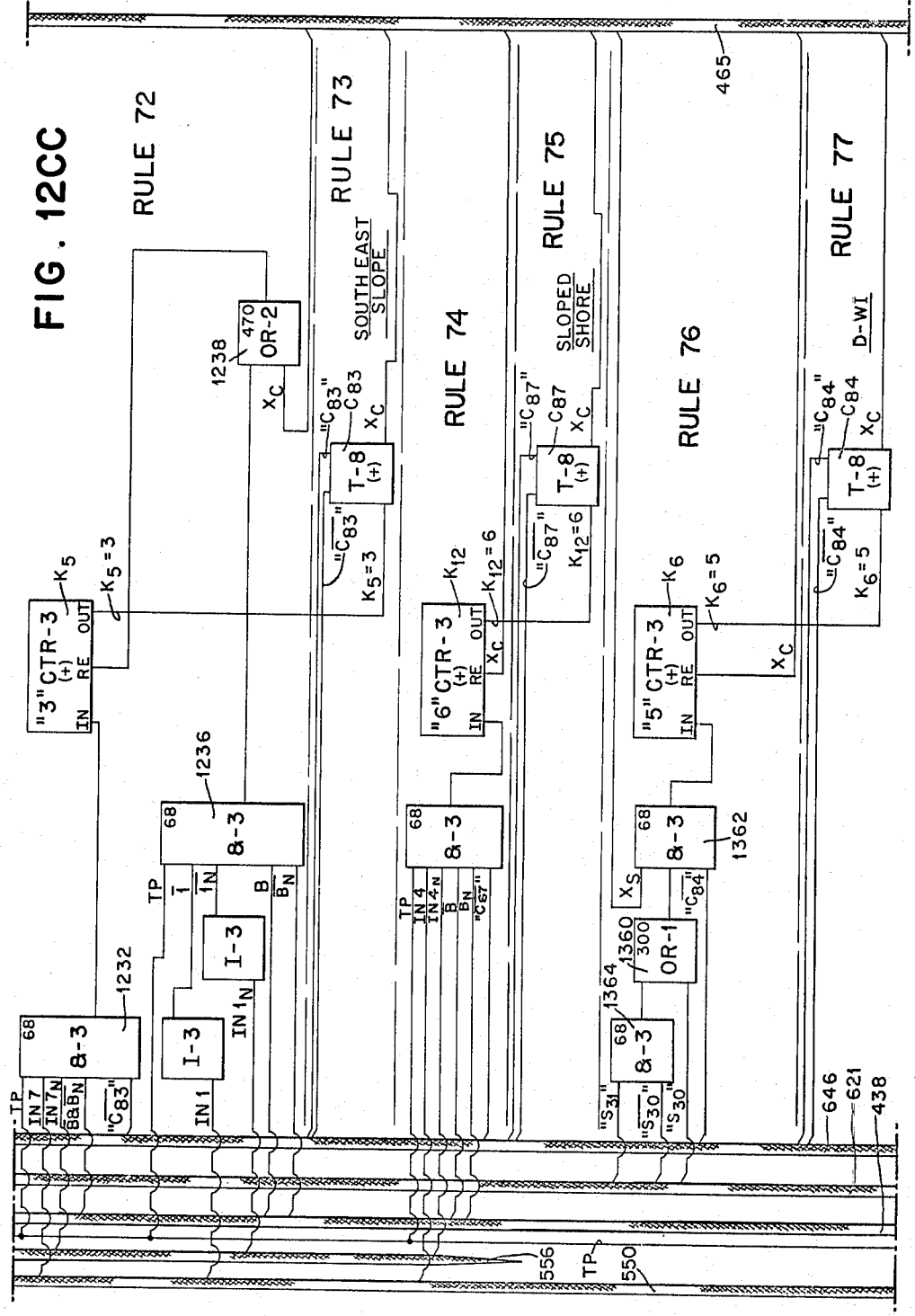

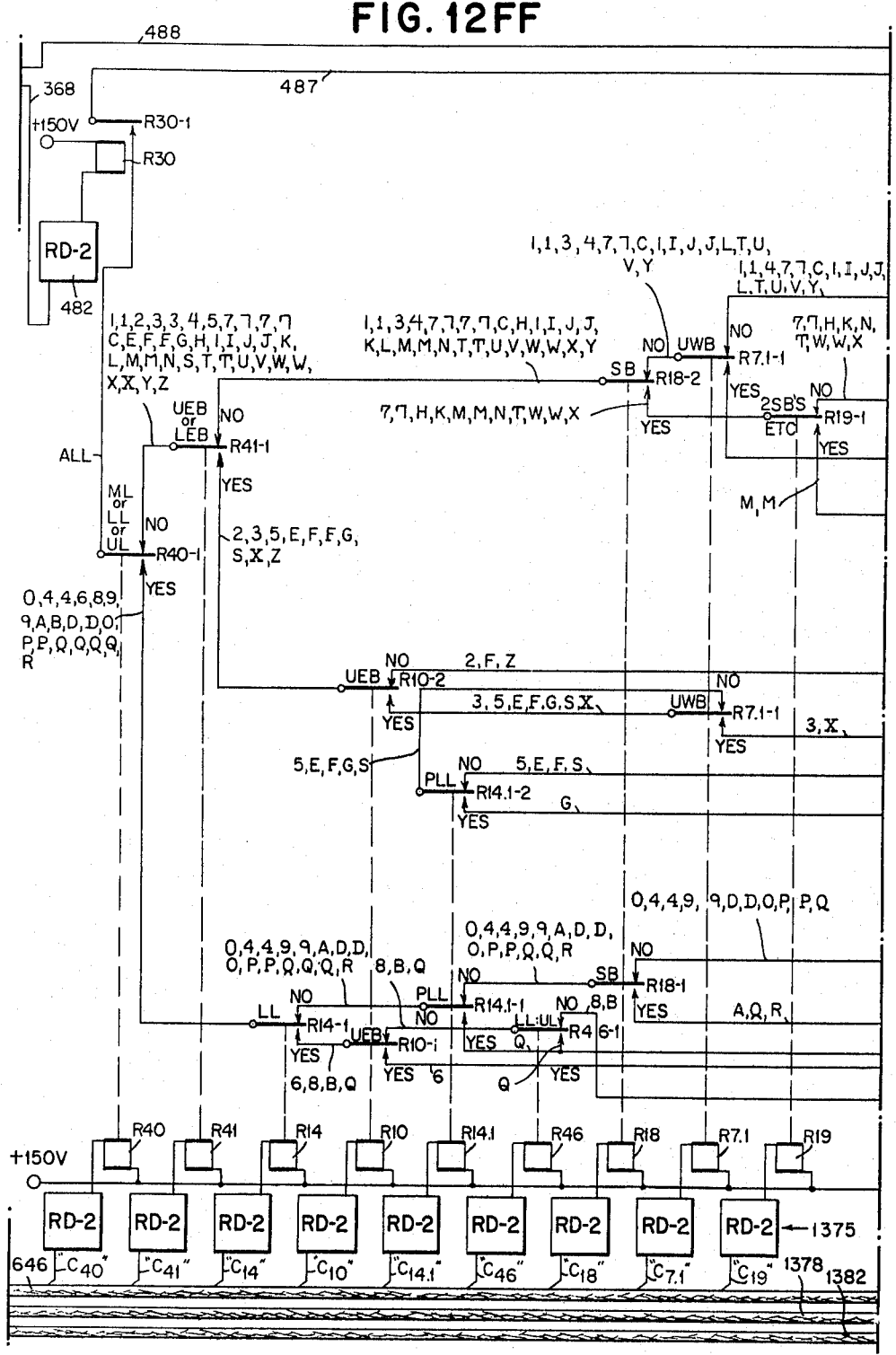

Dec. 7, 1965  J. P. LAZARUS  3,222,650
INTERPRETATION MACHINE
Filed Dec. 30, 1960  80 Sheets-Sheet 40

Dec. 7, 1965

J. P. LAZARUS 3,222,650

INTERPRETATION MACHINE

Filed Dec. 30, 1960

Dec. 7, 1965  J. P. LAZARUS  3,222,650
INTERPRETATION MACHINE
Filed Dec. 30, 1960  80 Sheets-Sheet 43
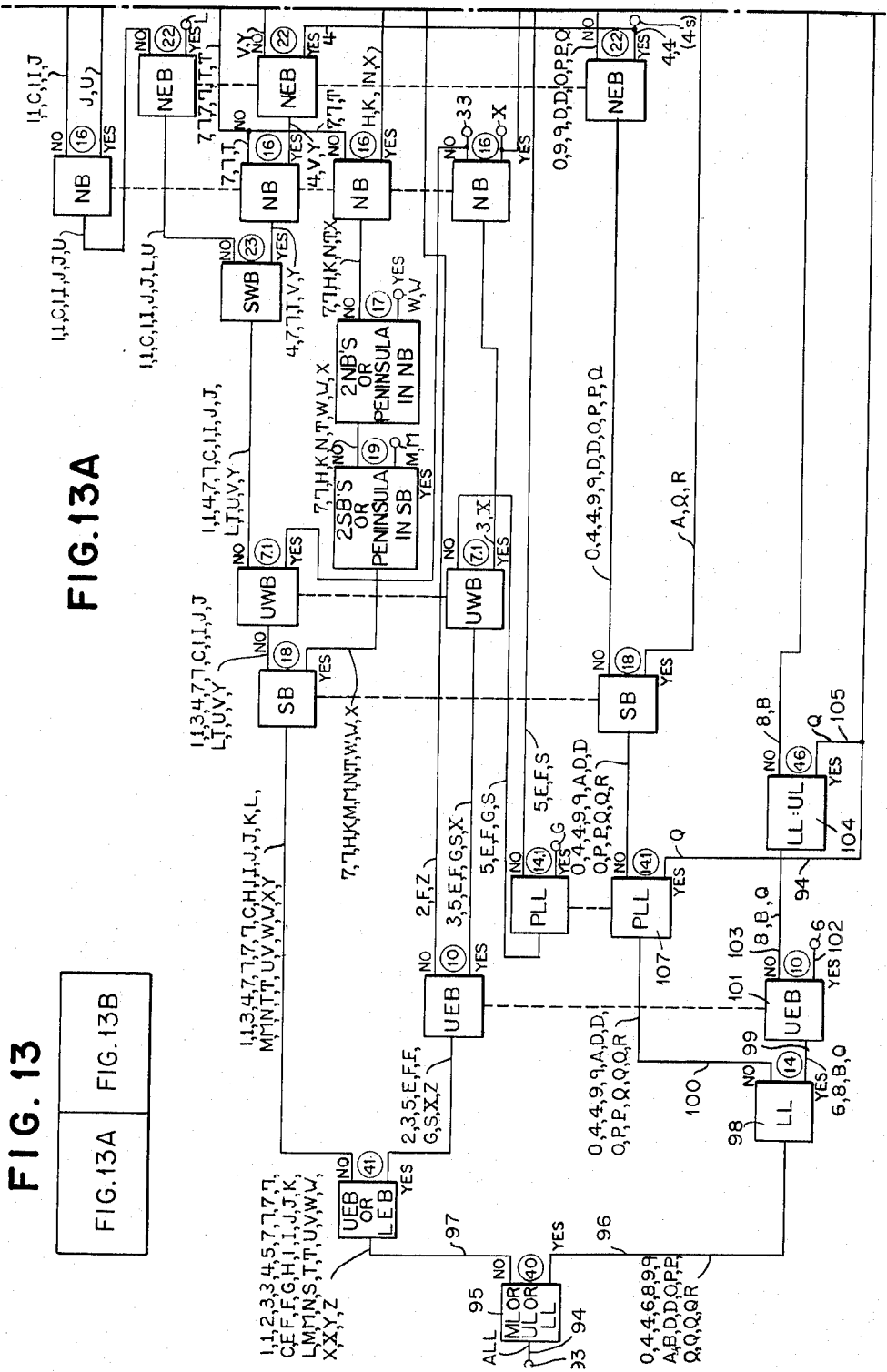

Dec. 7, 1965     J. P. LAZARUS     3,222,650
INTERPRETATION MACHINE
Filed Dec. 30, 1960     80 Sheets-Sheet 44

Dec. 7, 1965           J. P. LAZARUS           3,222,650

INTERPRETATION MACHINE

Filed Dec. 30, 1960           80 Sheets-Sheet 45

Dec. 7, 1965     J. P. LAZARUS     3,222,650
INTERPRETATION MACHINE

Filed Dec. 30, 1960     80 Sheets-Sheet 46

Dec. 7, 1965   J. P. LAZARUS   3,222,650
INTERPRETATION MACHINE
Filed Dec. 30, 1960   80 Sheets-Sheet 47
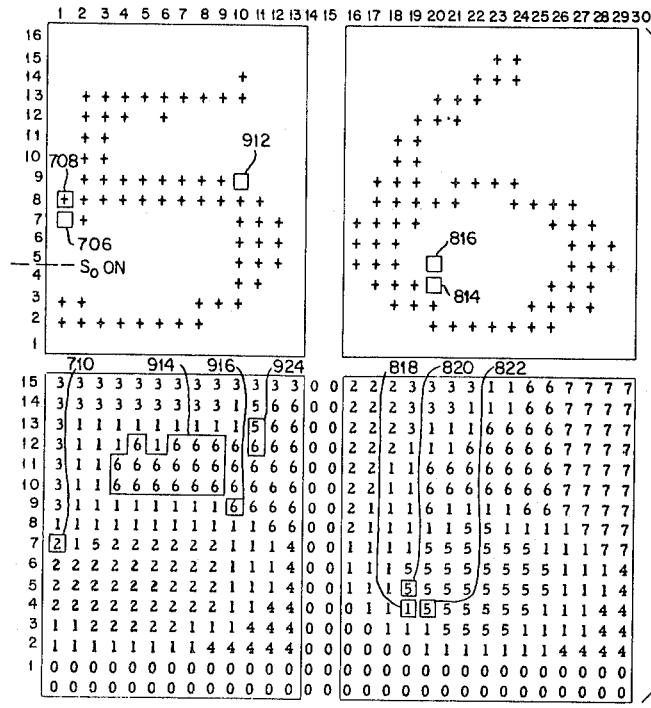
FIG.17
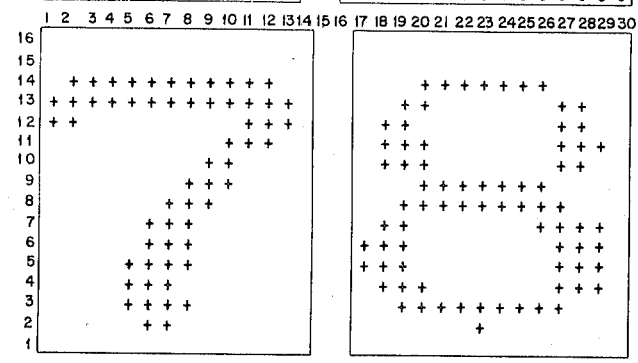
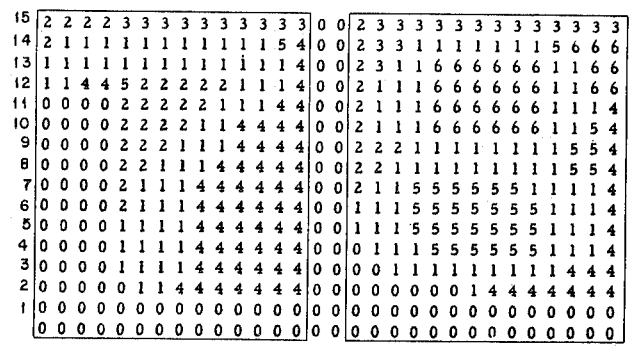
FIG.18

Dec. 7, 1965   J. P. LAZARUS   3,222,650
INTERPRETATION MACHINE
Filed Dec. 30, 1960   80 Sheets-Sheet 48

Dec. 7, 1965  J. P. LAZARUS  3,222,650
INTERPRETATION MACHINE
Filed Dec. 30, 1960  80 Sheets-Sheet 49

Dec. 7, 1965  J. P. LAZARUS  3,222,650
INTERPRETATION MACHINE
Filed Dec. 30, 1960  80 Sheets-Sheet 50

Dec. 7, 1965    J. P. LAZARUS    3,222,650
INTERPRETATION MACHINE

Filed Dec. 30, 1960    80 Sheets-Sheet 51

Figures 27, 28:
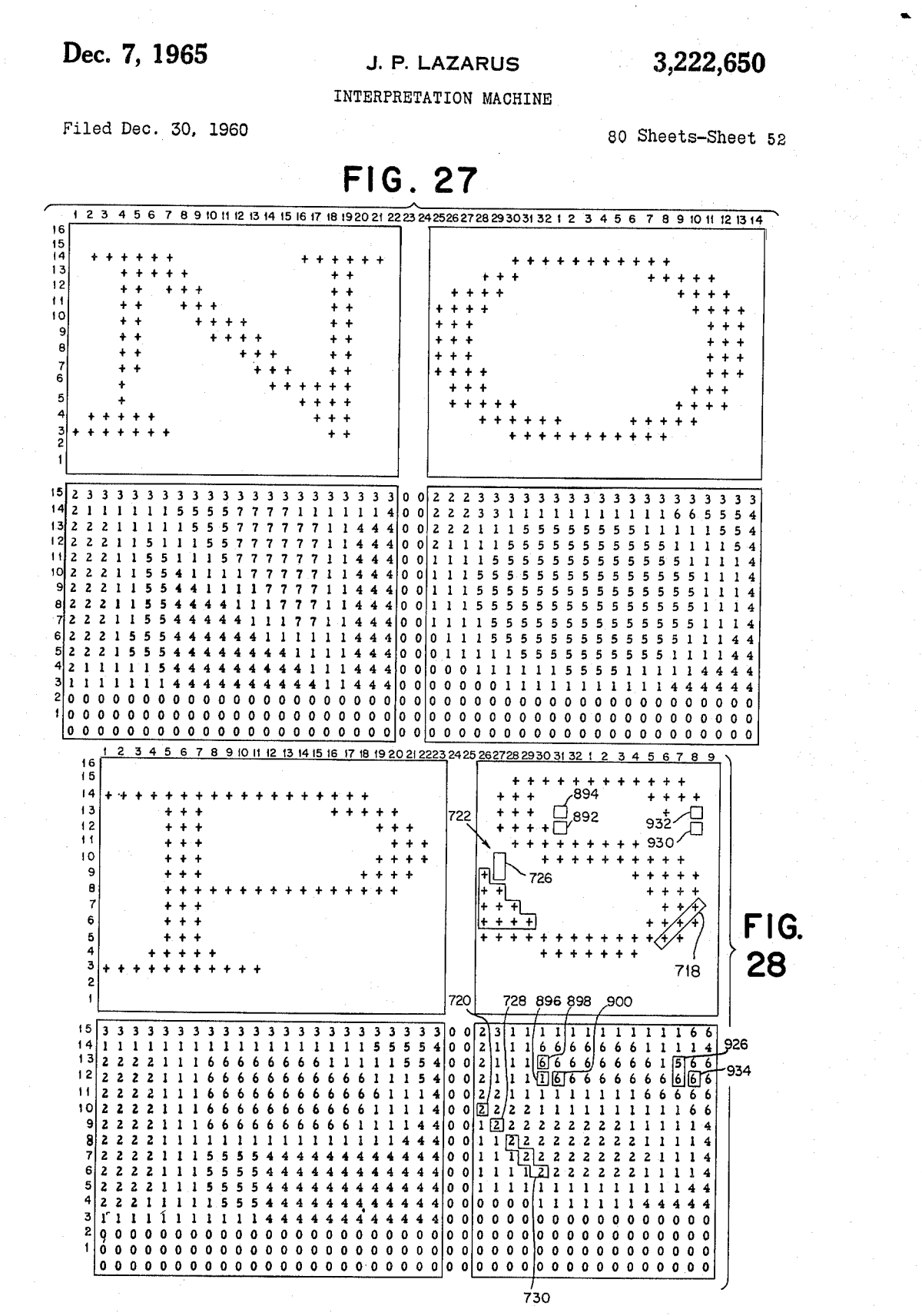

Dec. 7, 1965     J. P. LAZARUS     3,222,650

INTERPRETATION MACHINE

Filed Dec. 30, 1960     80 Sheets-Sheet 52

Figures 29, 30:
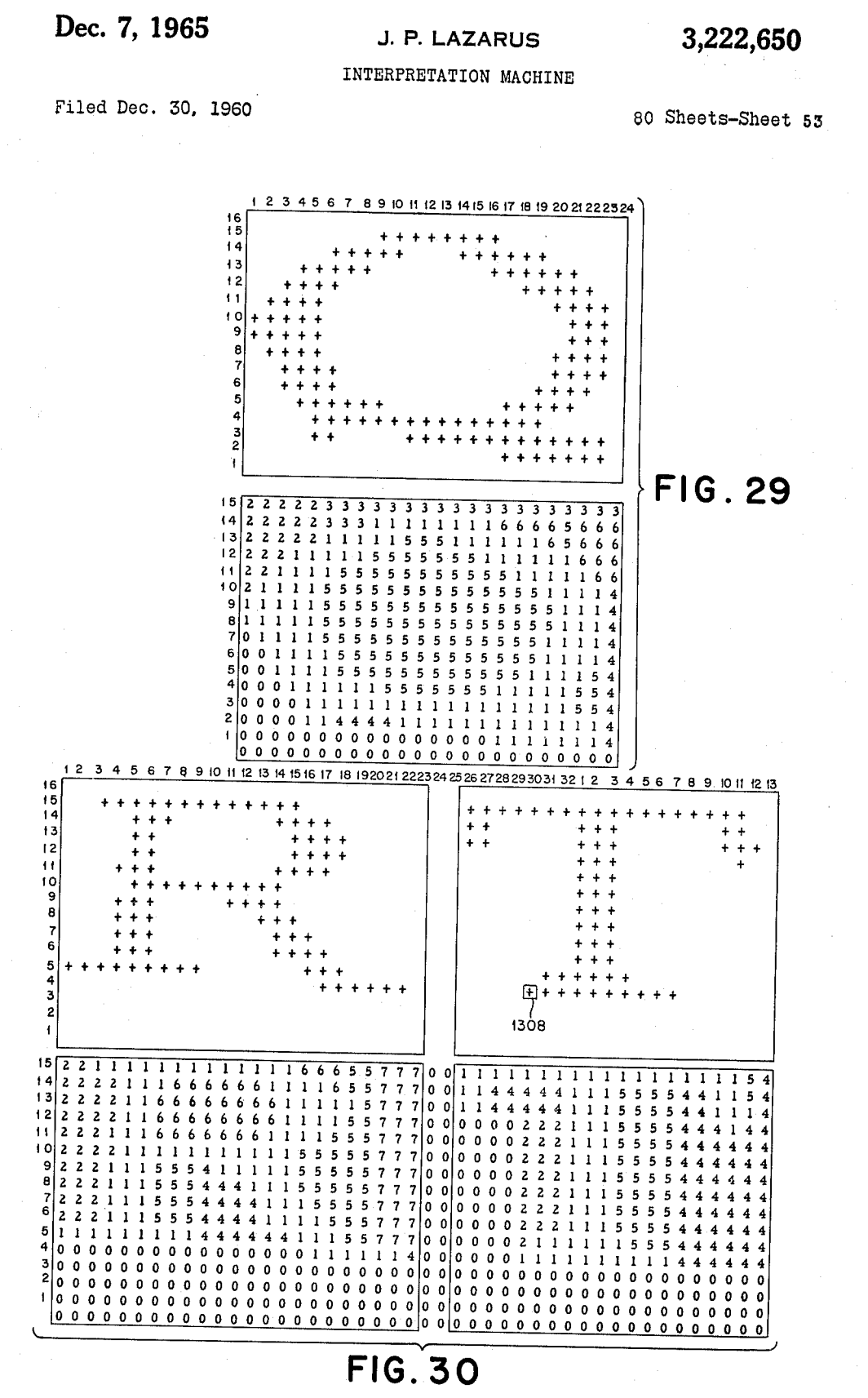

Dec. 7, 1965   J. P. LAZARUS   3,222,650
INTERPRETATION MACHINE
Filed Dec. 30, 1960   80 Sheets-Sheet 53

Dec. 7, 1965   J. P. LAZARUS   3,222,650
INTERPRETATION MACHINE
Filed Dec. 30, 1960   80 Sheets-Sheet 54
FIG. 31
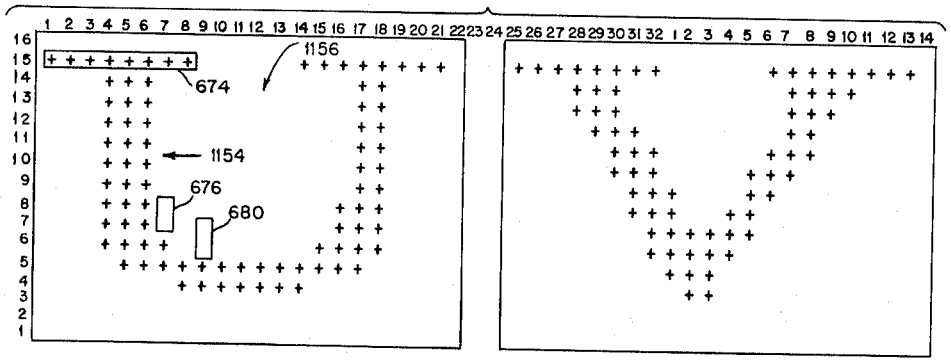
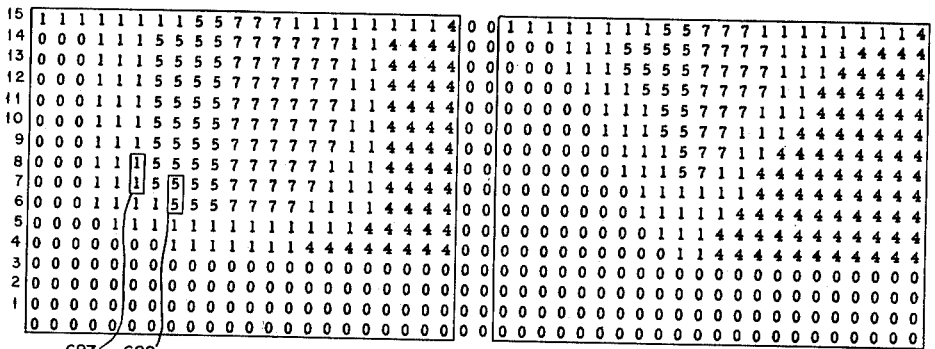
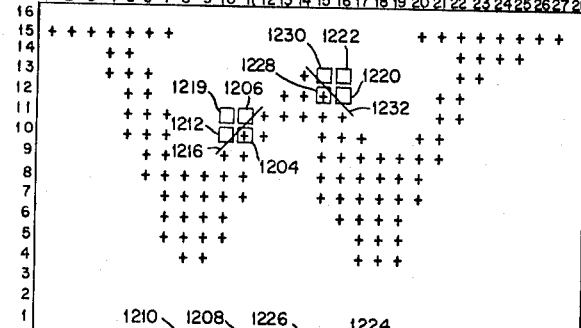
FIG. 32
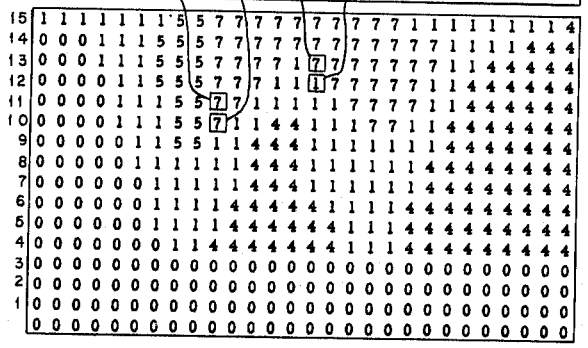

Dec. 7, 1965   J. P. LAZARUS   3,222,650
INTERPRETATION MACHINE
Filed Dec. 30, 1960   80 Sheets-Sheet 55

Dec. 7, 1965    J. P. LAZARUS    3,222,650
INTERPRETATION MACHINE
Filed Dec. 30, 1960    80 Sheets-Sheet 56

FIG. 35

```
16 □   □
15 □ 0 □ 2
14 □ 0 □ 2
13 □ 0 □ 2
12 □ 0 □ 2
11 □ 0 □ 2      1st VERT
10 □ 0 □ 2      WHITE ZONE
 9 □ 0 □ 2
 8 □ 0 □ 2
 7 □ ┌0 □┐2
 6 □ │0 □│2 ----- S₀ ON
 5 □ │0 ■│1 ----- S₁ ON, RESET S₀
 4 □ │0 ■│1 ----- RESET S₀
 3 □  0 □ 0
 2 □  0 □ 0
 1 □  0 □ 0
    0    0
(a)(b)(c)(d)
  1st    2nd
 VERT   VERT
 SCAN   SCAN
```

FIG. 36

```
16 □
15 □   3
14 □   3   2nd VERT
13 □   3   WHITE ZONE
12 □   3
11 □   3 ----- S₀ ON
10 ■   1 ----- S₂ ON, RESET S₀
 9 ■   1
 8 □   2
 7 □   2 ----- S₀ ON
 6 □   2 ----- S₁ ON, RESET S₀
 5 ■   1 ----- RESET S₀
 4 ■   1
 3 □   0
 2 □   0
 1 □   0
       0
  (e) (f)
```

FIG. 37

```
16 ■   □ ----- 3rd VERT WHITE
15 ■ 1 □ ----- S₀ ON    ZONE
14 ■ 1 □ 7 ----- S₃ ON, RESET S₀
13 ■ 1   1
12 ■ 1 □ 6
11 ■ 1 □ 6    2nd VERT
10 ■ 1 ■ 1    WHITE ZONE
 9 ■ 1 ■ 1
 8 ■ 1 ■ 1
 7 ■ 1 ■ 1
 6 ■ 1 □ 5
 5 ■ 1 □ 5    1st VERT
 4 ■ 1 ■ 1    WHITE ZONE
 3 ■ 1 ■ 1
 2 □ 0 □ 0
 1 □ 0 □ 0
     0   0
(a)(b)(c)(d)
```

| FIG. 40A | FIG. 40B | FIG. 40C | FIG. 40D | FIG. 40E | FIG. 40F | FIG. 40G | FIG. 40H | FIG. 40I |
|---|---|---|---|---|---|---|---|---|

Dec. 7, 1965  J. P. LAZARUS  3,222,650
INTERPRETATION MACHINE
Filed Dec. 30, 1960  80 Sheets-Sheet 59

Dec. 7, 1965  J. P. LAZARUS  3,222,650
INTERPRETATION MACHINE

Filed Dec. 30, 1960  80 Sheets-Sheet 61

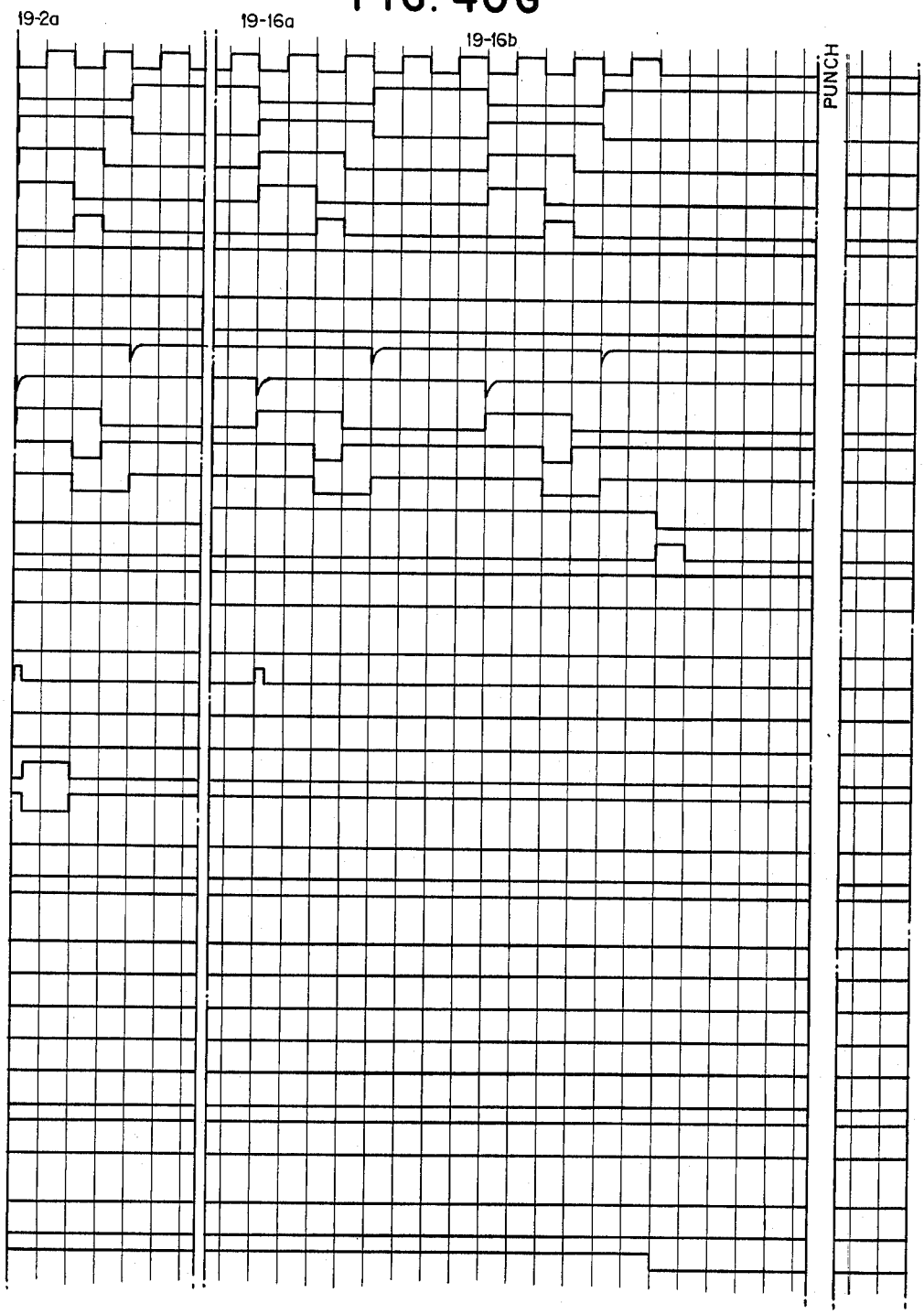

Dec. 7, 1965  J. P. LAZARUS  3,222,650
INTERPRETATION MACHINE

Filed Dec. 30, 1960  80 Sheets-Sheet 66

Dec. 7, 1965  J. P. LAZARUS  3,222,650
INTERPRETATION MACHINE

Filed Dec. 30, 1960  80 Sheets-Sheet 67

Dec. 7, 1965  J. P. LAZARUS  3,222,650
INTERPRETATION MACHINE

Filed Dec. 30, 1960  80 Sheets-Sheet 68

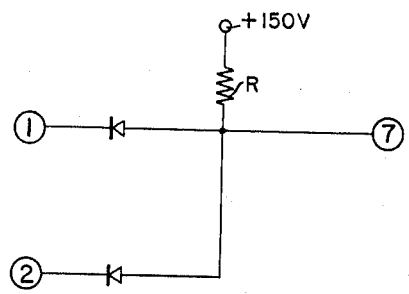
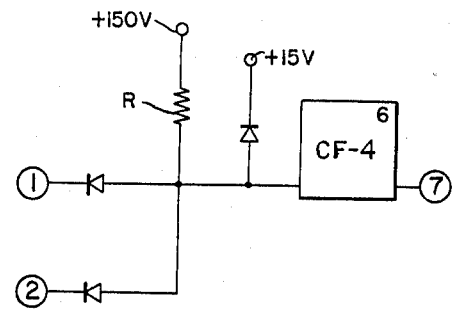
FIG. 56　　　　　FIG. 57
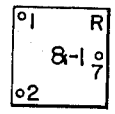
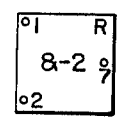
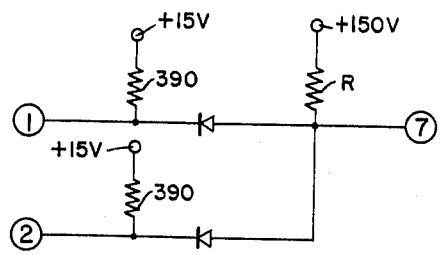
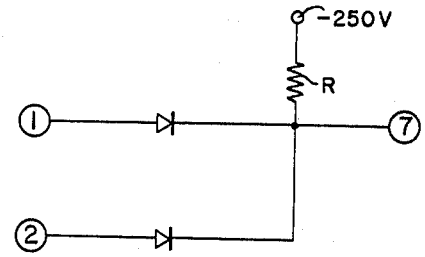
FIG. 58　　　　　FIG. 59
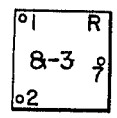
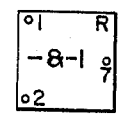

Dec. 7, 1965  J. P. LAZARUS  3,222,650
INTERPRETATION MACHINE
Filed Dec. 30, 1960  80 Sheets-Sheet 70
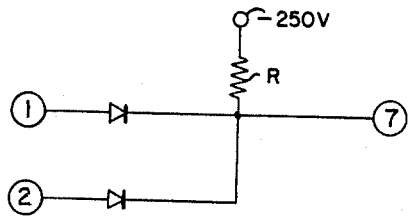

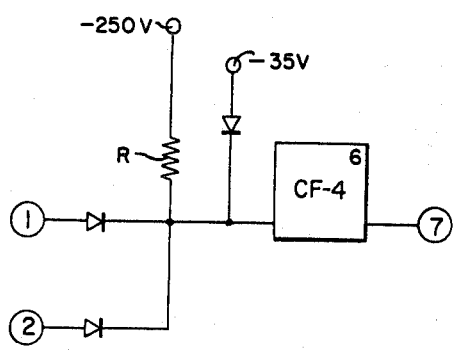

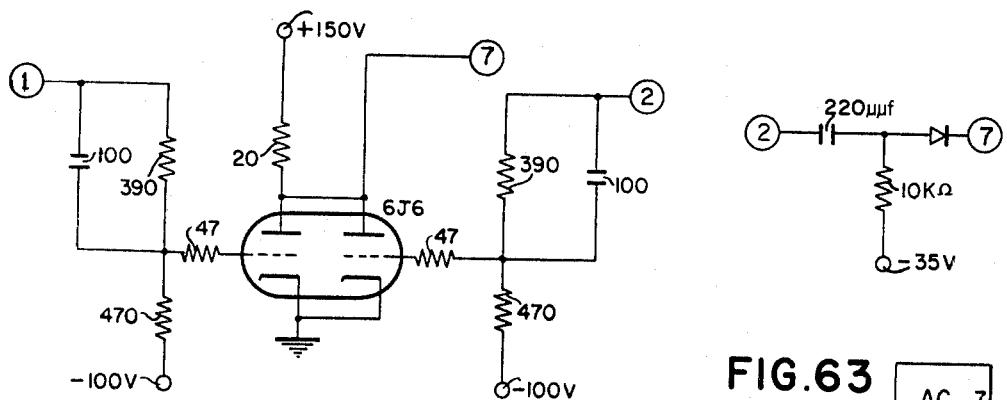
FIG. 62
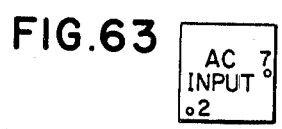
FIG. 63
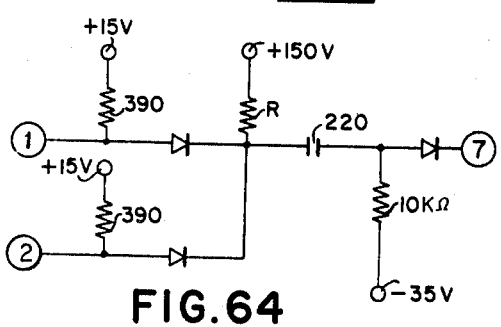

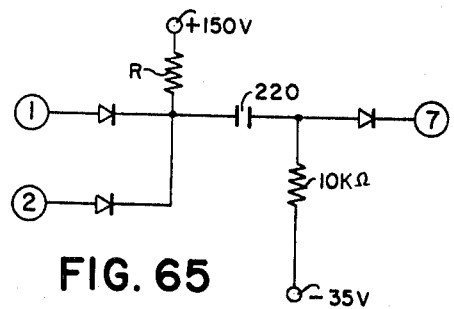

Dec. 7, 1965   J. P. LAZARUS   3,222,650
INTERPRETATION MACHINE
Filed Dec. 30, 1960   80 Sheets-Sheet 71
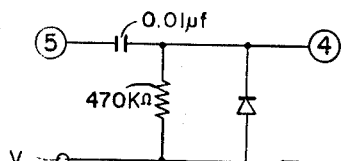
FIG. 66
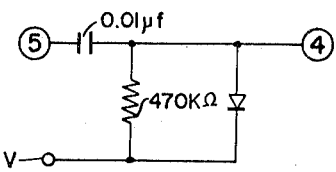
FIG. 67
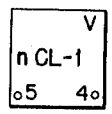
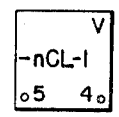
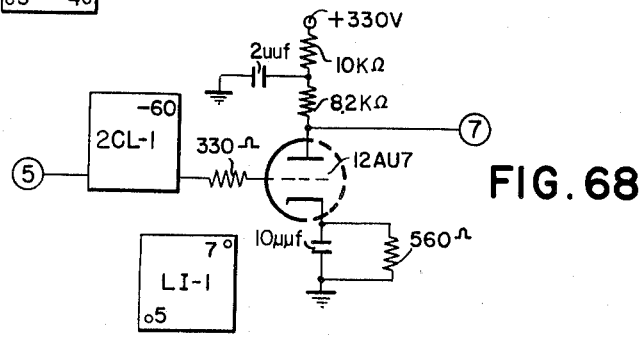
FIG. 68
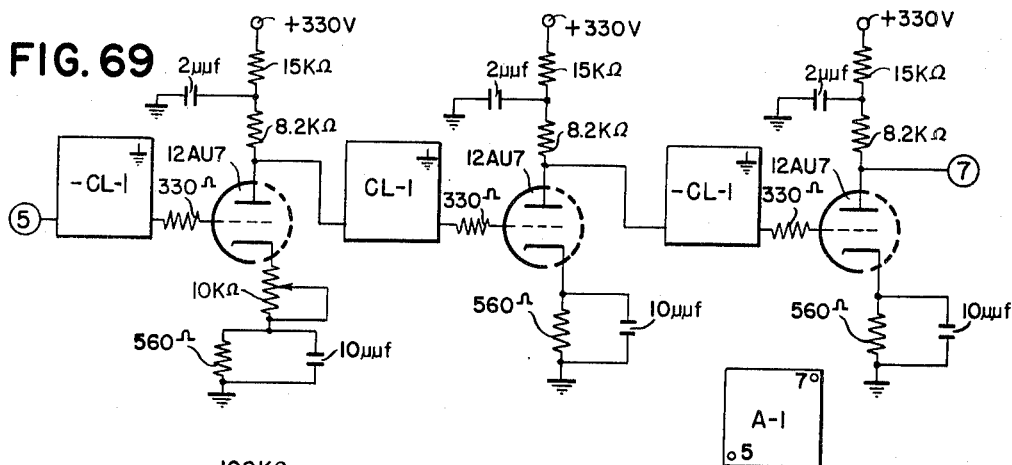
FIG. 69
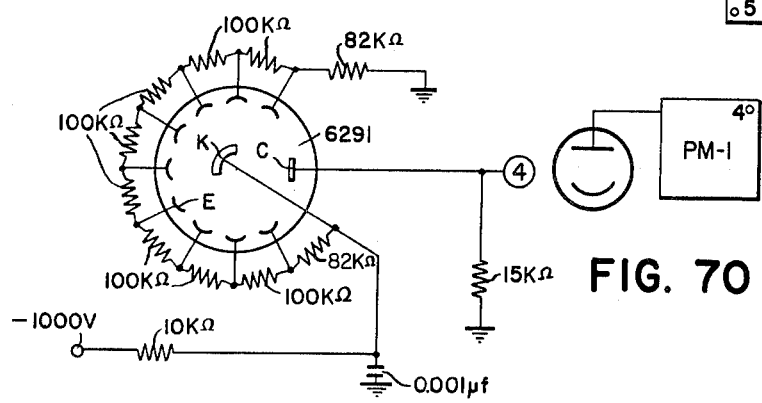
FIG. 70

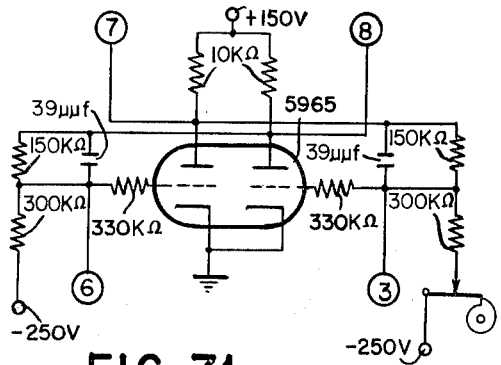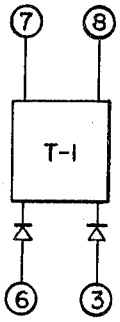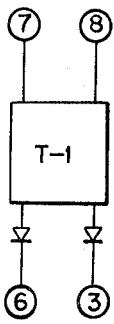
FIG. 71  FIG. 72  FIG. 73
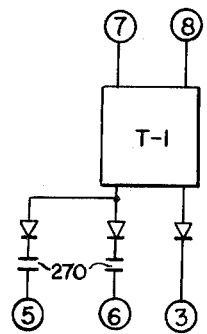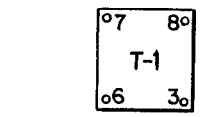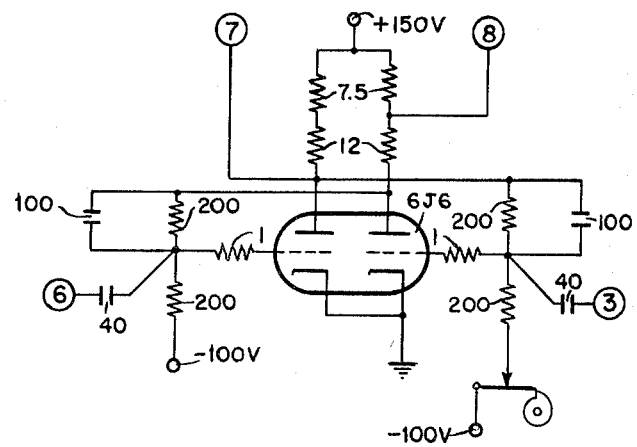
FIG. 74
FIG. 75
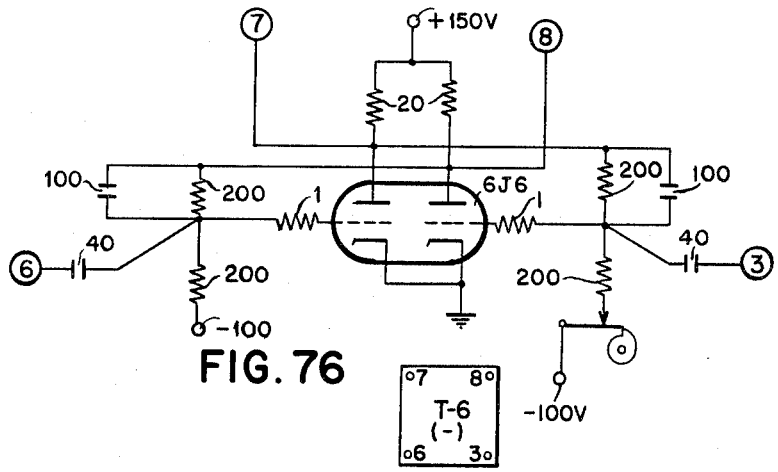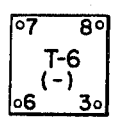
FIG. 76

Dec. 7, 1965  J. P. LAZARUS  3,222,650
INTERPRETATION MACHINE

Filed Dec. 30, 1960  80 Sheets-Sheet 74

| t-μ Sec | R | C |
|---|---|---|
| 2 | 130 | 20 |
| 5 | 330 | 20 |
| 10 | 680 | 20 |
| 30K | 5.1 Meg | 0.02 μf |
| 500K | 4.4 Meg | 0.02 μf |
| 1 Meg | 4.4 Meg | 0.1 μf |

| t-μ Sec | R | C |
|---|---|---|
| 1 | 22 | 50 |

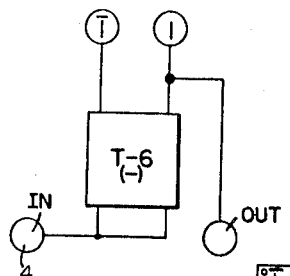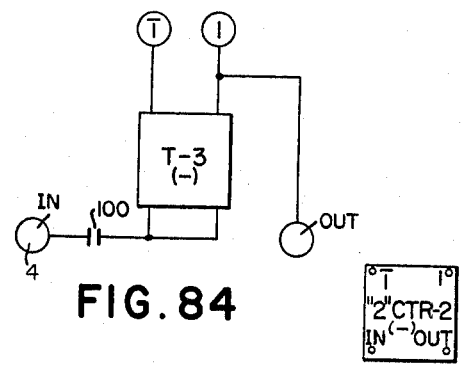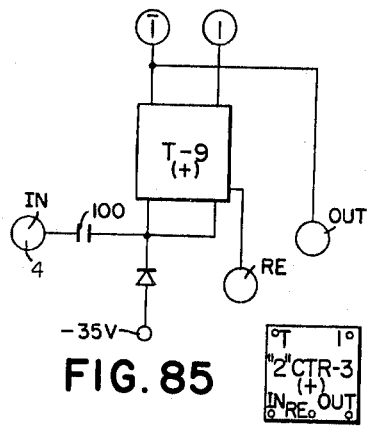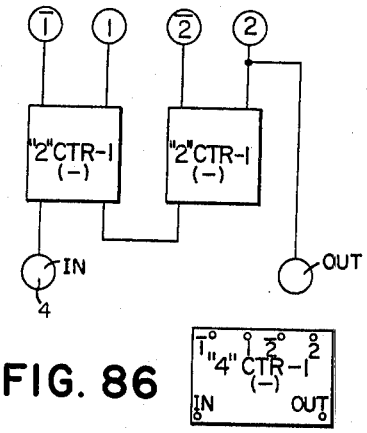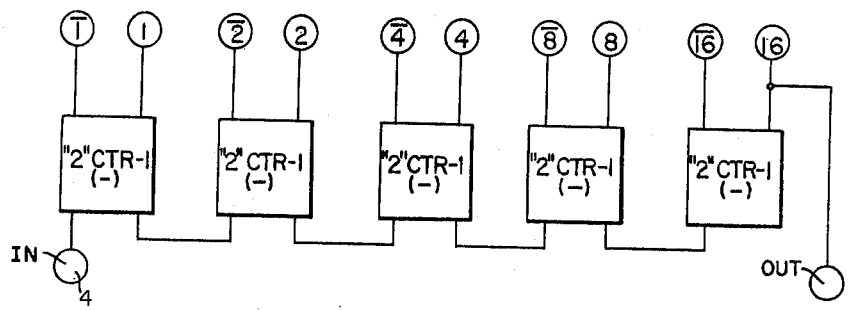

Dec. 7, 1965   J. P. LAZARUS   3,222,650
INTERPRETATION MACHINE
Filed Dec. 30, 1960   80 Sheets-Sheet 76

Dec. 7, 1965  J. P. LAZARUS  3,222,650
INTERPRETATION MACHINE
Filed Dec. 30, 1960  80 Sheets-Sheet 77
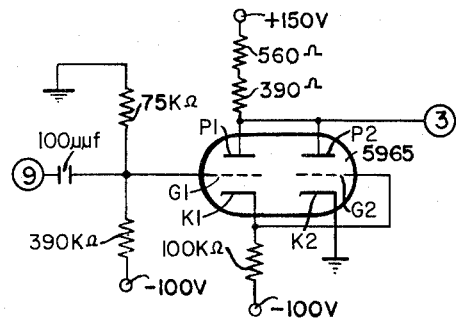
FIG. 93  PKR-1
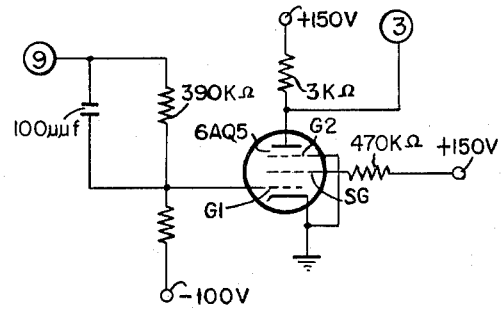
FIG. 94  PW-1
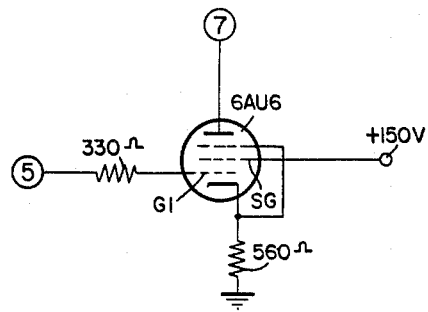
FIG. 95  CD-1
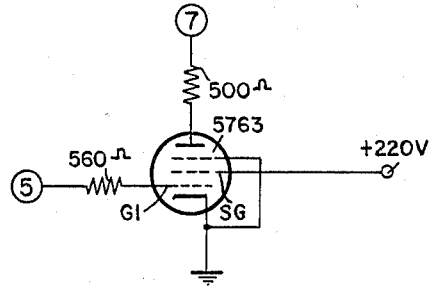
FIG. 96  CD-2
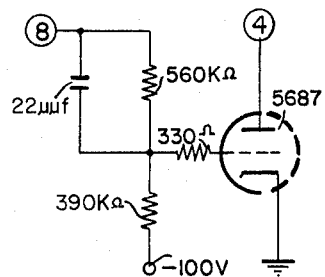
FIG. 97  nRD-1
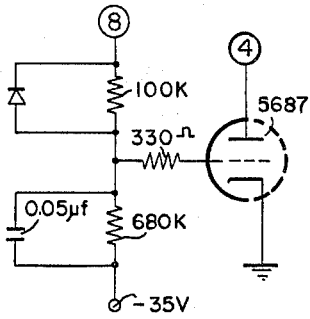
FIG. 98  nRD-2

Dec. 7, 1965  J. P. LAZARUS  3,222,650
INTERPRETATION MACHINE
Filed Dec. 30, 1960  80 Sheets-Sheet 78

| | R-K ohms |
|---|---|
| DE-1 | 256 |
| DE-2 | 127.67 |
| DE-4 | 63.6 |
| DE-8 | 31.66 |
| DE-16 | 15.62 |

Dec. 7, 1965  J. P. LAZARUS  3,222,650
INTERPRETATION MACHINE
Filed Dec. 30, 1960  80 Sheets-Sheet 79

Dec. 7, 1965    J. P. LAZARUS    3,222,650
INTERPRETATION MACHINE
Filed Dec. 30, 1960    80 Sheets-Sheet 80

FIG. 104

```
    2000
+ o—/ o → TURN ON "d" GROUP TRIG. TO RESPECTIVE AC OR 1604 FIG. 12Z
       E → TURN ON "d" GROUP TRIG. TO RESPECTIVE AC OR 1604 FIG. 12Z
       T → TURN ON "o" GROUP TRIG. TO RESPECTIVE AC OR 1608 FIG. 12Z
       S → TURN ON "o" GROUP TRIG. TO RESPECTIVE AC OR 1608 FIG. 12Z
       H → TURN ON "o" GROUP TRIG. TO RESPECTIVE AC OR 1608 FIG. 12Z
       F → TURN ON "o" GROUP TRIG. TO RESPECTIVE AC OR 1608 FIG. 12Z
       C → TURN ON "o" GROUP TRIG. TO RESPECTIVE AC OR 1608 FIG. 12Z
       M → TURN ON "o" GROUP TRIG. TO RESPECTIVE AC OR 1608 FIG. 12Z
       P → TURN ON "o" GROUP TRIG. TO RESPECTIVE AC OR 1608 FIG. 12Z
       W → TURN ON "o" GROUP TRIG. TO RESPECTIVE AC OR 1608 FIG. 12Z
```

FIG. 104A

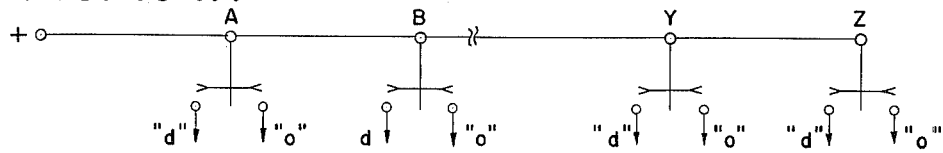

TURN ON RESPECTIVE "d" OR "o" GROUP TRIGGER    FIG. 12Z

FIG. 105

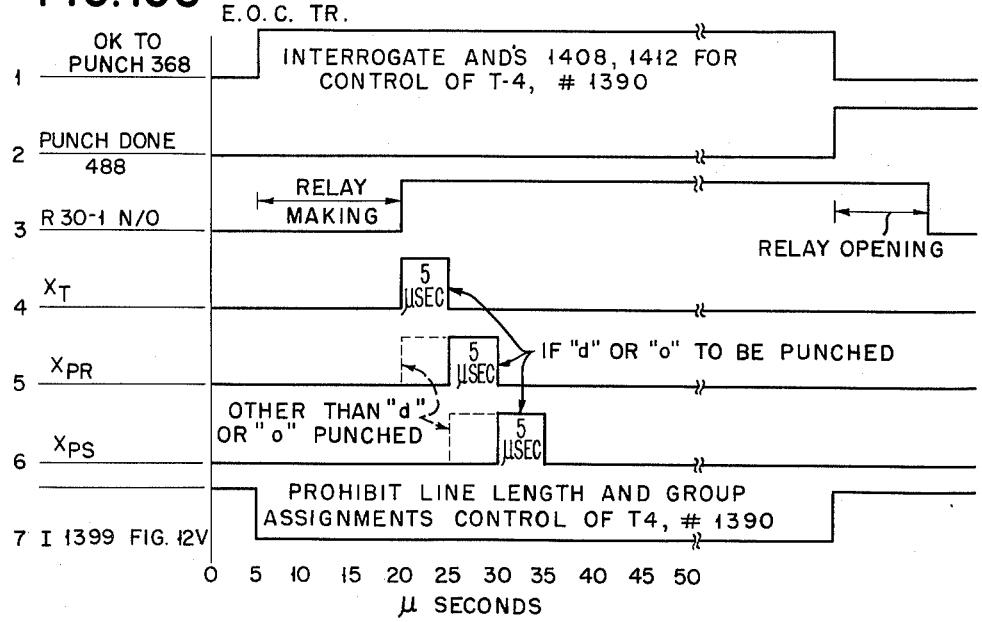

United States Patent Office 3,222,650
Patented Dec. 7, 1965

3,222,650
INTERPRETATION MACHINE
John P. Lazarus, San Jose, Calif., assignor to International Business Machines Corporation, New York, N.Y., a corporation of New York
Filed Dec. 30, 1960, Ser. No. 79,900
27 Claims. (Cl. 340—172.5)

This invention relates to decision making in information processing machinery, to a mechanism for interpreting information, and, in particular, to a machine faculty whereby the interpreter may adjust itself to the peculiarities of the information being processed.

The invention involves a logical feedback system which improves a decision process in information processing machines.

In the processing of information by machines thus far developed in the art, decisions are made on the basis of predetermined orders of magnitude for certain criteria or combinations thereof. This approach results in placing restrictions on the machine that are founded on estimates of the operator as to the nature of the information being handled. It will be apparent that a superior approach to the problem of decision making in machines would be to permit the machine, on the basis of experience with the information being handled, to adjust its own orders of magnitude for criteria and thus to arrive at better and more efficient decisions. Such an approach is similar to the evaluation process of a person who compares what he sees with what he knows in making a decision, and from each decision he learns to restrict his field in evaluation to the critical elements only, that govern the decision. This markedly improves an individual's efficiency and permits him to do repetitive jobs with greater speed and accuracy.

What has been discovered is a technique of imparting to an information processing machine the faculty of comparing that which is recognized with knowledge gained through experience in handling the particular information being processed; and on the basis of both the recognition, and the experience knowledge, to make a reinforced decision, and then further, to adjust the recognition criteria to agree with the experience knowledge. This faculty permits the machine to literally "tune-up" to the peculiarities of the particular information being handled and to self adjust its recognition criteria to the point where the distinguishing feature is brought sharply into focus.

The invention has application in arts where it is desirable to have an information handling machine make a decision in a situation where knowledge gained from an insight into, or experience with the subject matter being handled, could be coupled with an observed fact to provide a more reliable decision and to permit the machine to adjust the interpretation of what it observes so as to make more reliable decisions on observations alone. The faculty imparted to the machine by the invention may, as another illustration of its utility, permit conditions to be imposed on a decision in the actual form of the knowledge on hand as a governing, for example negative, limitation.

In order to illustrate the application of the invention to the various arts, two problems have been selected. These problems are as follows:

In the character recognition art, wherein the character shape is evaluated by a study of the background area, the distinguishing of D's and O's; and In the fluid dynamics art, the evaluation of the stability of certain shapes.

These problems have been selected to show how the mechanism of this invention may be applied in widely diversified fields to affect and improve decisions made by a machine in the processing of information in each field and how, knowledge peculiar to the particular field, may be introduced to influence and improve the decisions.

It is an object of this invention to provide an information processing machine having information feedback loops.

It is an object of this invention to impart to an information processing machine the ability to improve its decision making in critical areas.

It is another object of this invention to impart to an information processing machine the ablity to confine a differentiation between related criteria to the differences between the criteria.

It is still another object of this invention to provide a means for adjusting the criteria of a decision in information processing machinery in response to the particular characteristics of the material being handled.

It is still another object of this invention to provide an information processing machine with the means to employ experience gained from the information being handled to improve the quality of the decisions being made on the information.

It is yet another object of this invention to impart a learning faculty to an information processing machine.

It is yet another object of this invention to impart a learning faculty to a character recognition machine.

It is another object of this invention to provide a improved means of employing and improving probability statistics in an information processing machine.

It is another object of this invention to provide an improved means of employing context statistics in a character recognition machine to effect a decision in critical recognition areas.

It is a related object of this invention to provide a character recognition machine with the ability to learn the handwriting of a given source.

It is another related object of this invention to provide a character recognition machine with a means of improving its own measurement in critical areas on the basis of past experience with a document or a set of documents from a given source.

It is still another related object of this invention to provide a character recognition machine employing context statistics to improve its own context statistics on the basis of past experience with a given source of information thereby learning the language of the particular information being handled.

The foregoing and other objects, features and advantages of the invention will be apparent from the following more particular description of preferred embodiments of the invention as illustrated in the accompanying drawings.

In the drawings:

FIG. 2 is a diagram illustrating a logical comparison of a measured value with experience probability.

FIG. 3 is a diagram illustrating a comparison of the relative frequency of occurrence of events.

Figure 4:
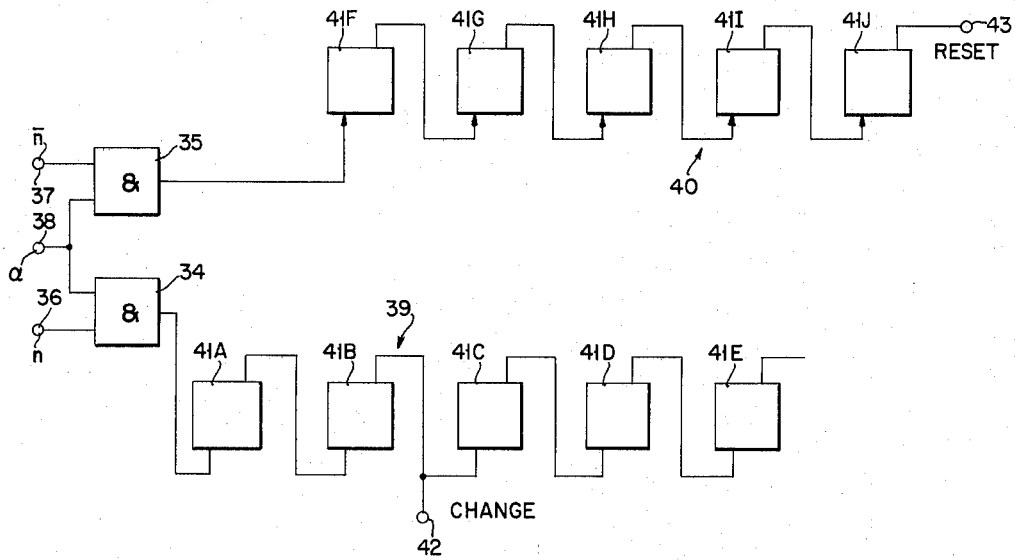
FIG. 4 is a diagram illustrating the computation of a ratio of occurrence of events.
Figure 5:
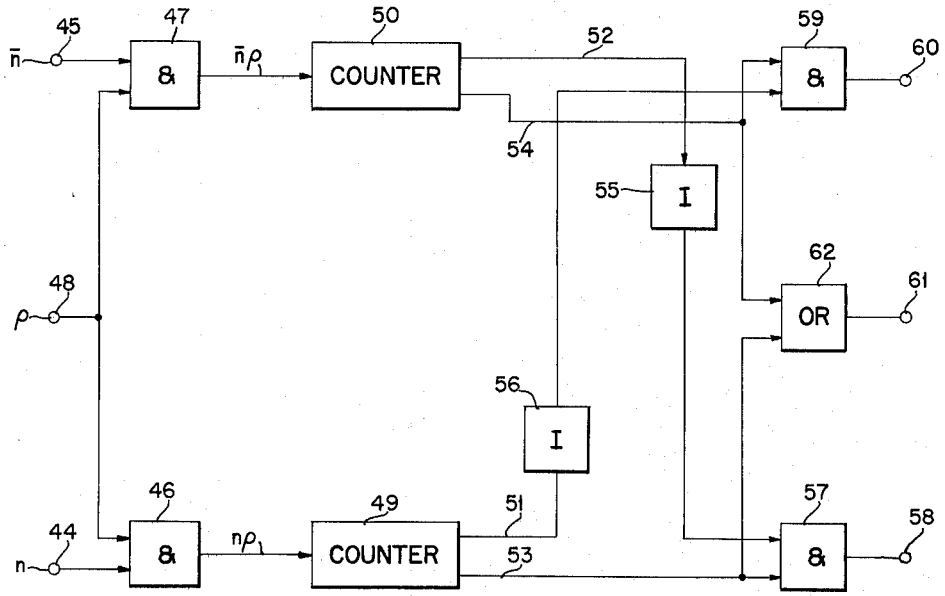
FIG. 5 is a diagram illustrating the comparison of information to provide a basis for predictions.
Figure 6:
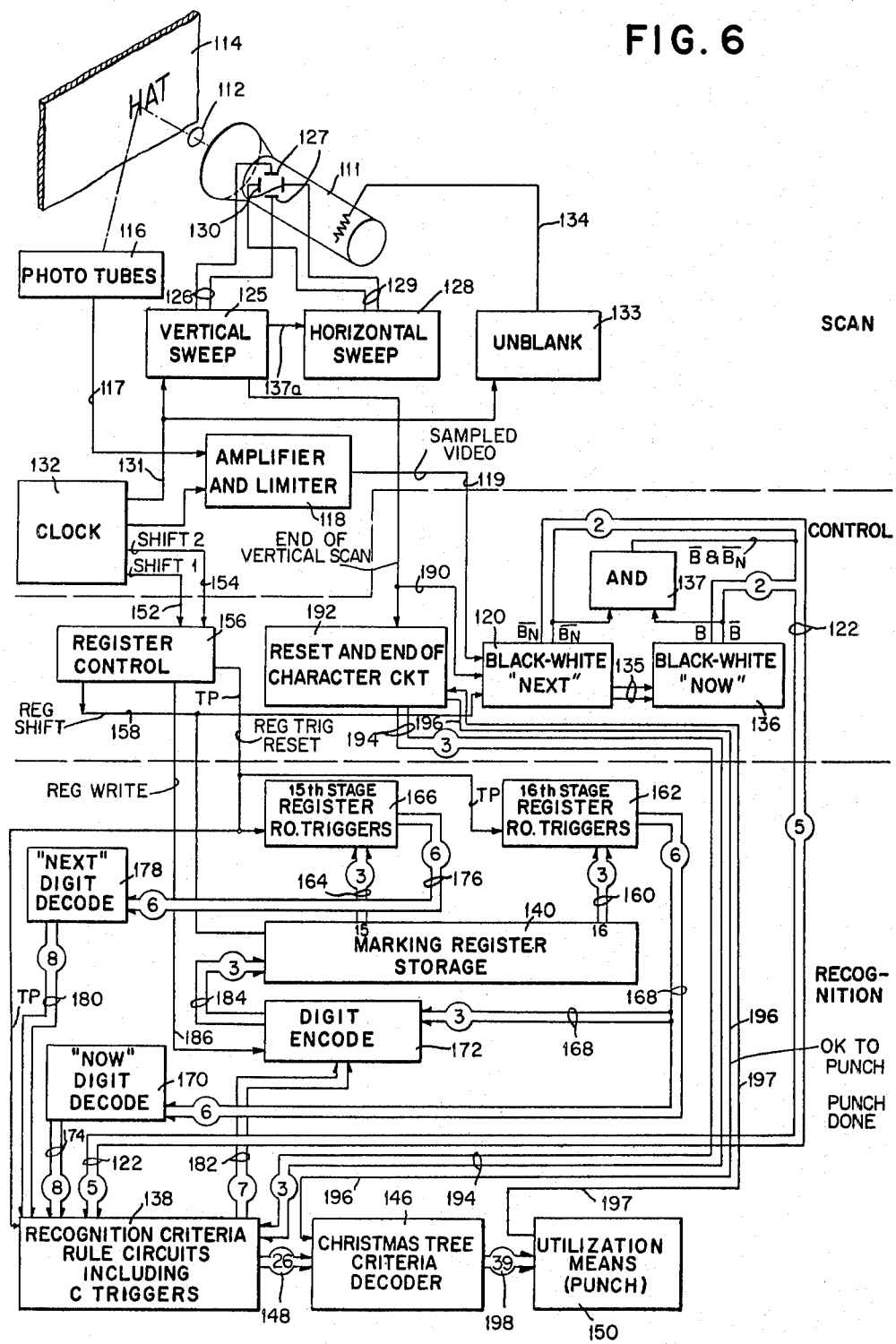

FIGS. 6 through 105 describe the electronic circuitry of a character recognition system including circuitry illustrating the decision making principles of FIGS. 1–5 to differentiate between a D and an O in a character recognition system.

FIG. 6 is a schematic flow diagram of a character recognition system.

FIG. 7 is a diagram illustrating the relative position of nine of the eighteen basic shapes in a character.

FIG. 8 is a diagram illustrating the relative positions of six more of the basic shapes in a character.

FIG. 9 is a diagram illustrating the nature of the other three basic shapes in a character.

FIG. 10 is a diagram illustrating two of the five special shapes utilized as recognition criteria.

FIG. 11 is a diagram illustrating three of the miscellaneous recognition criteria.

Figure 12A:
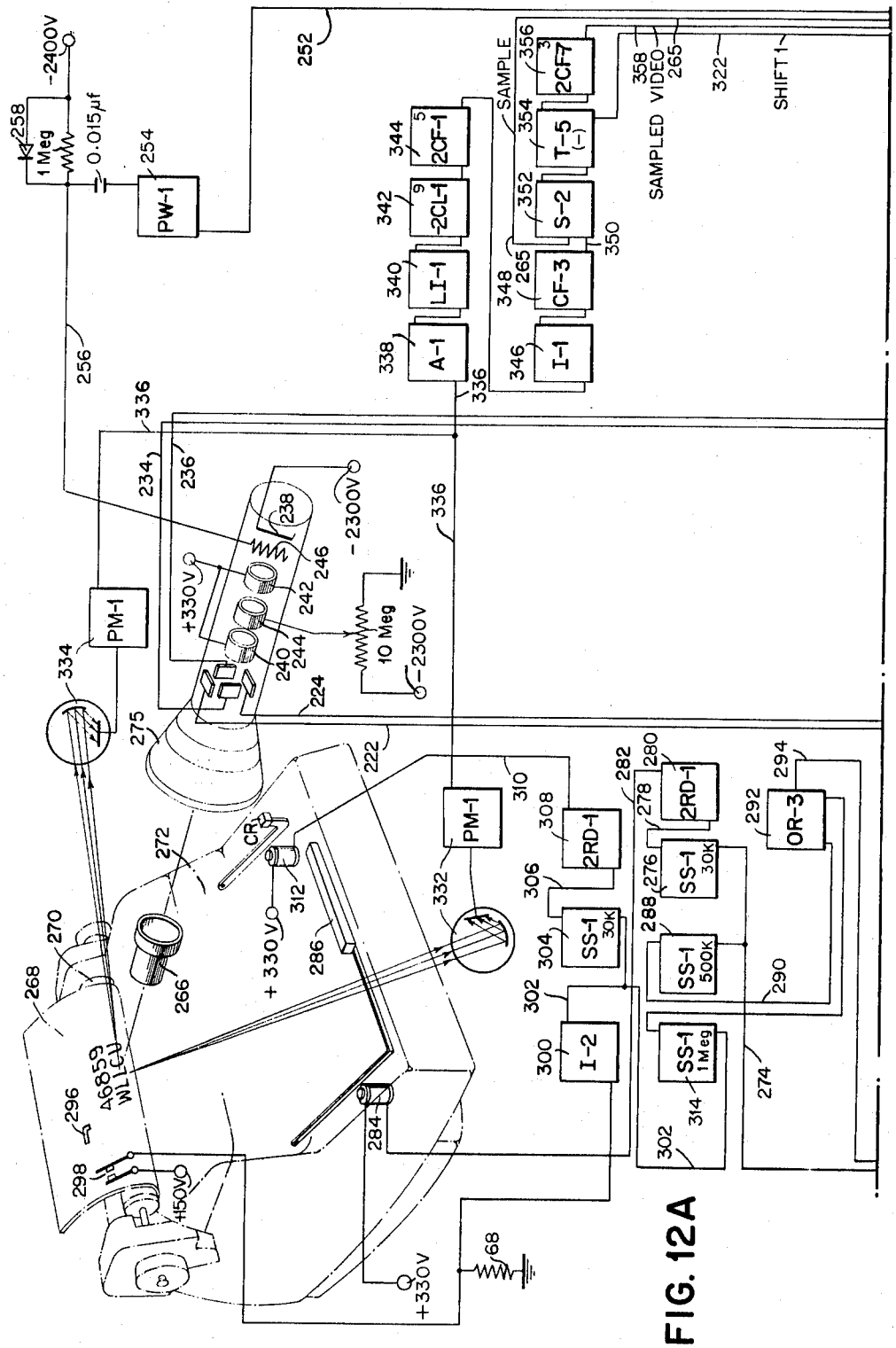
Figure 12B:
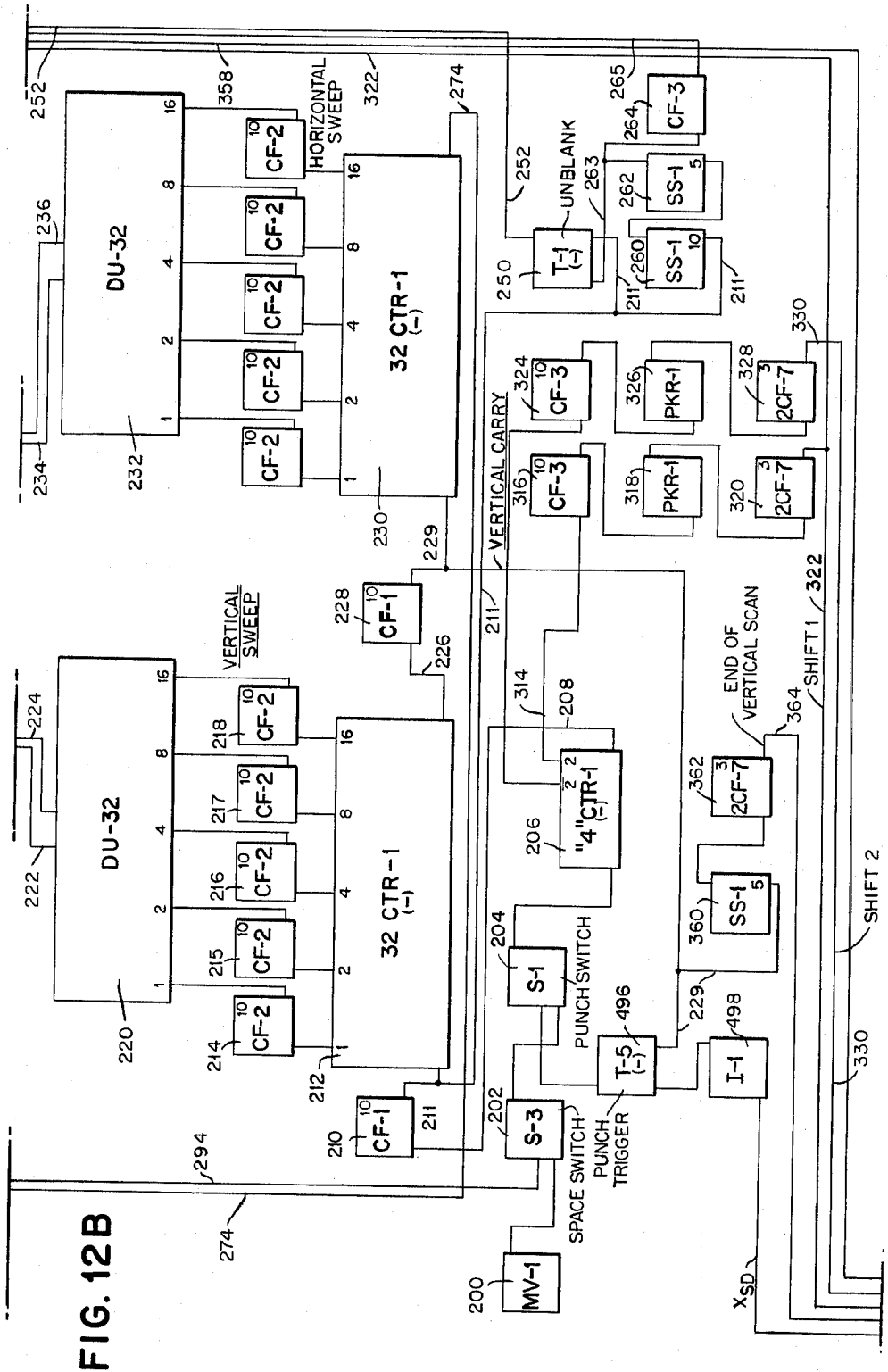
Figure 12C:
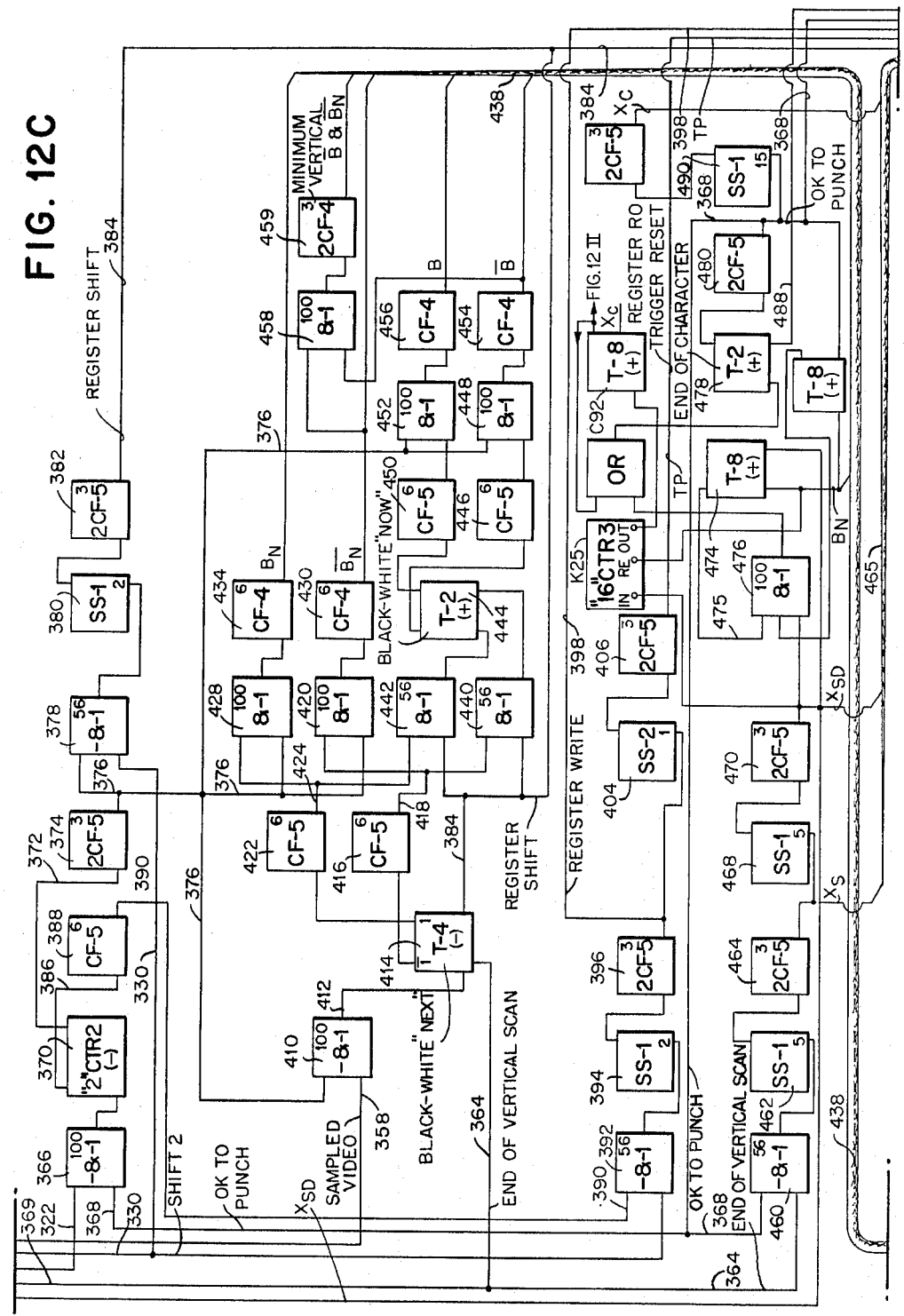
Figure 12E:
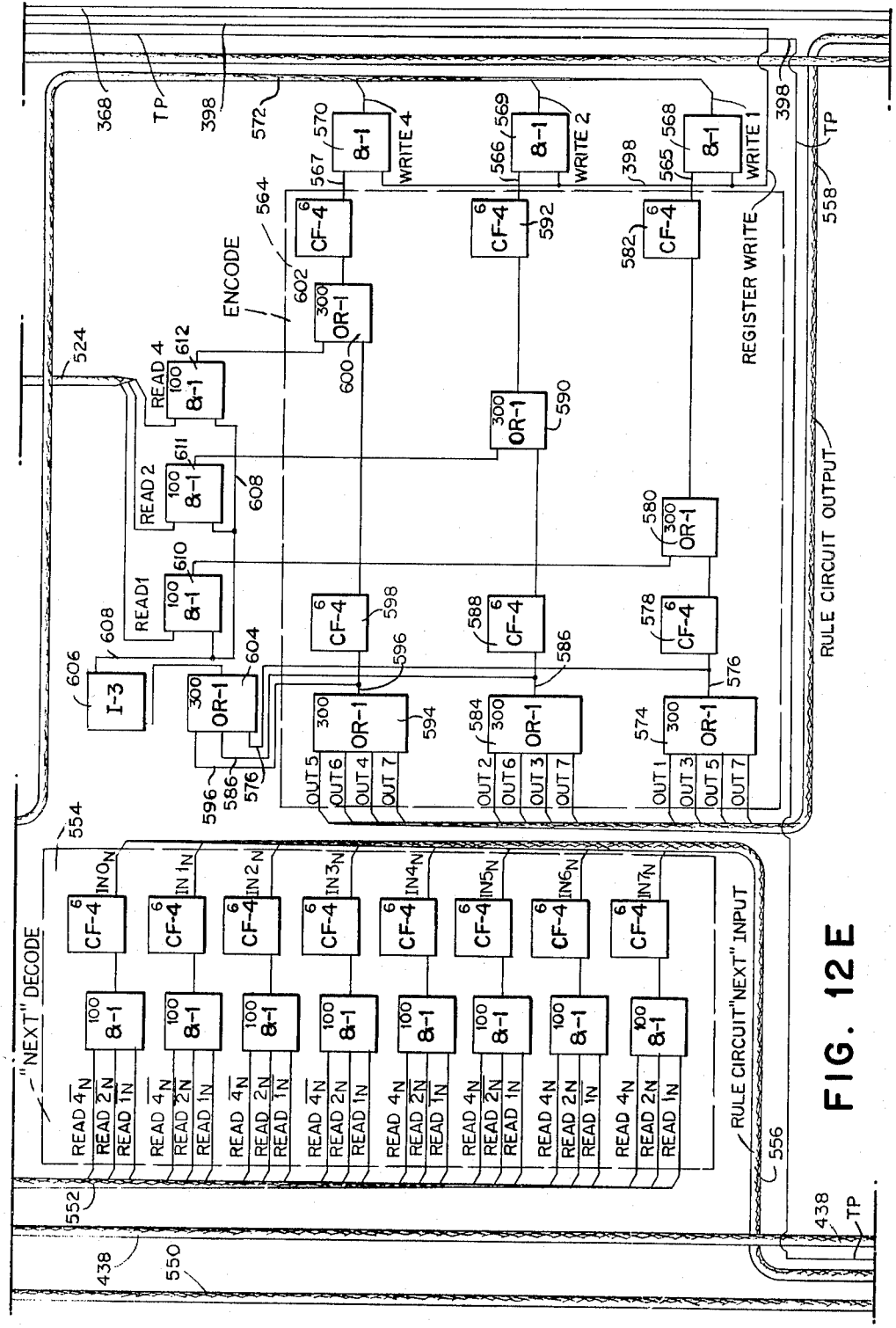
Figure 12R:
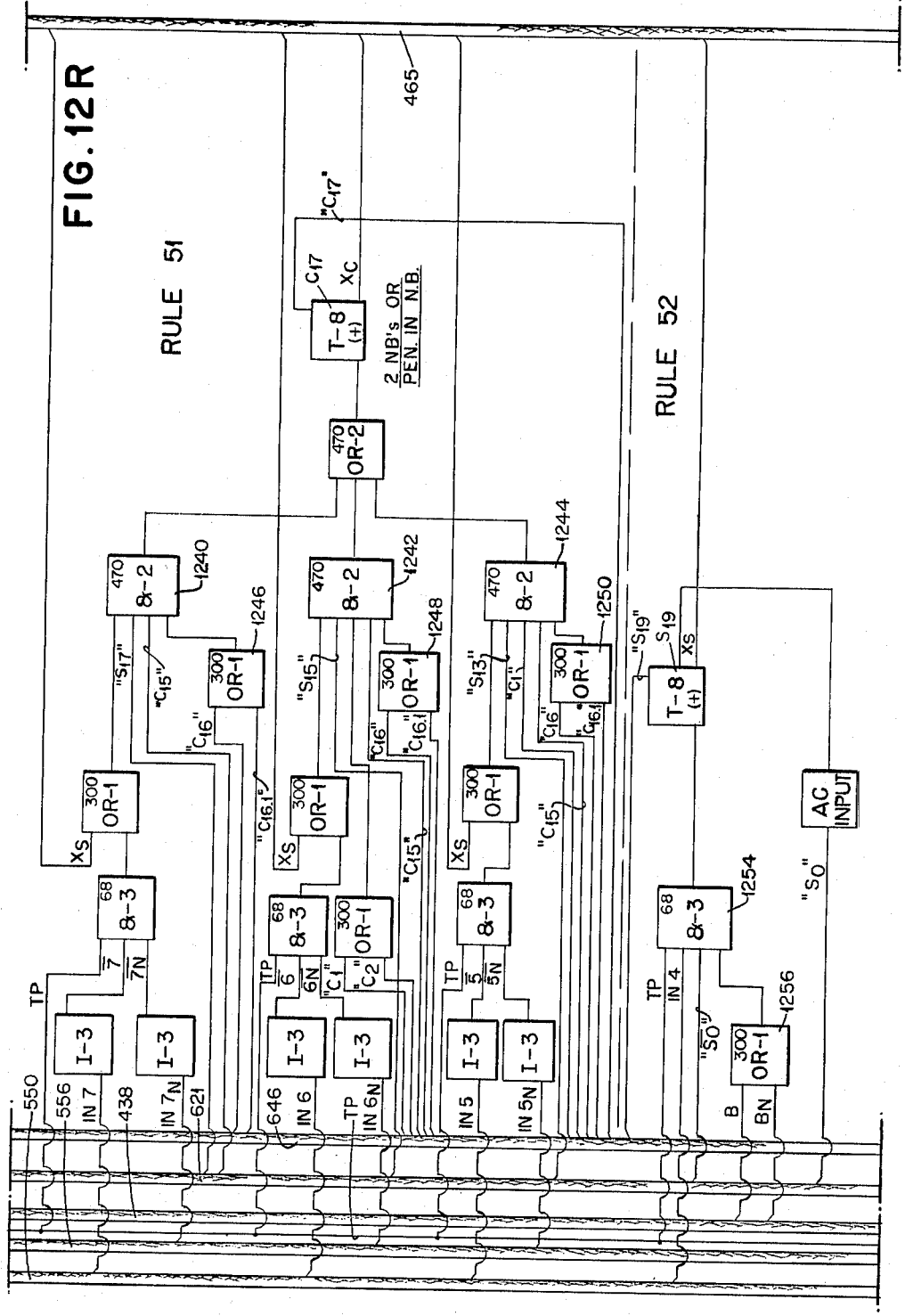
Figure 12T:
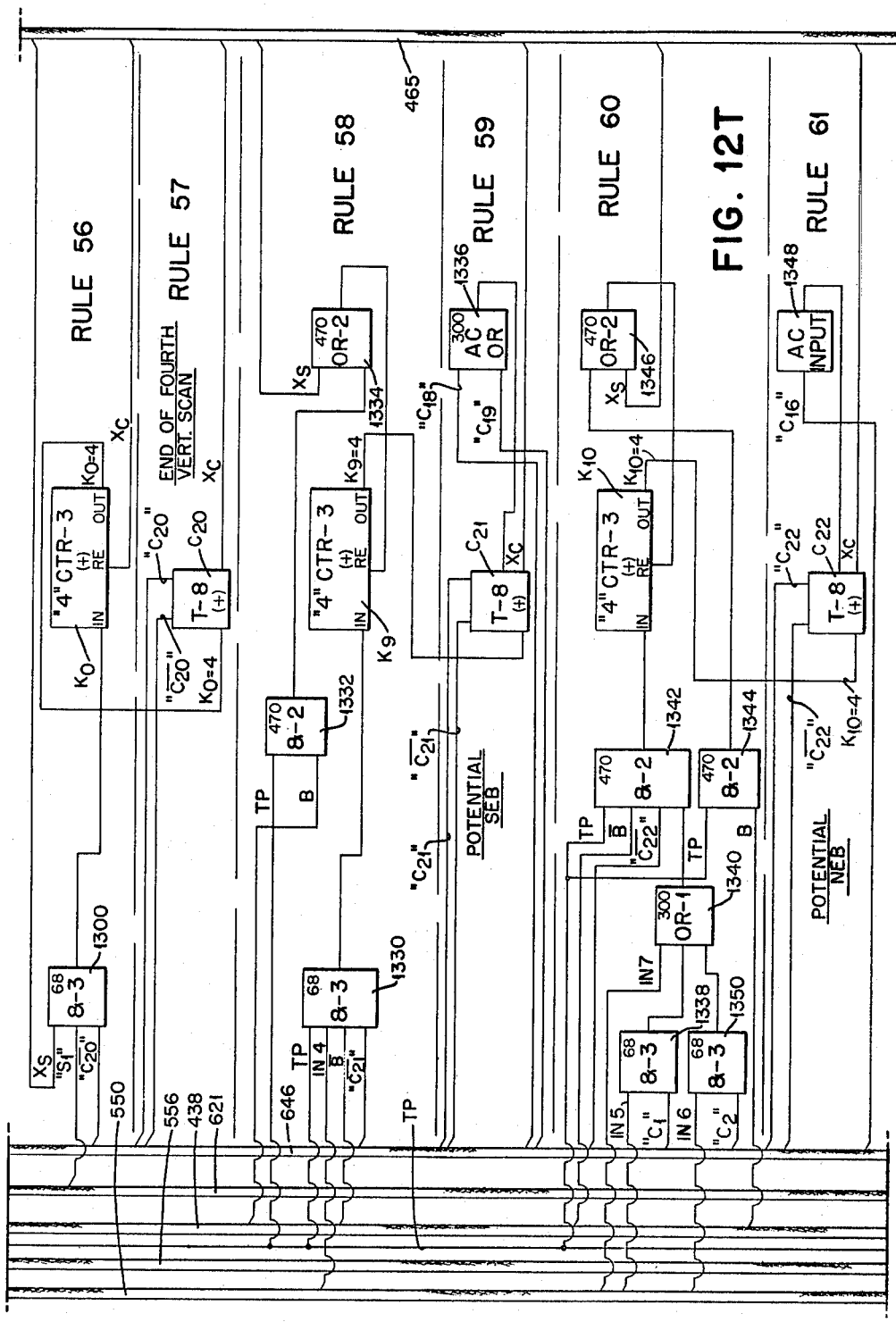
Figure 12V:
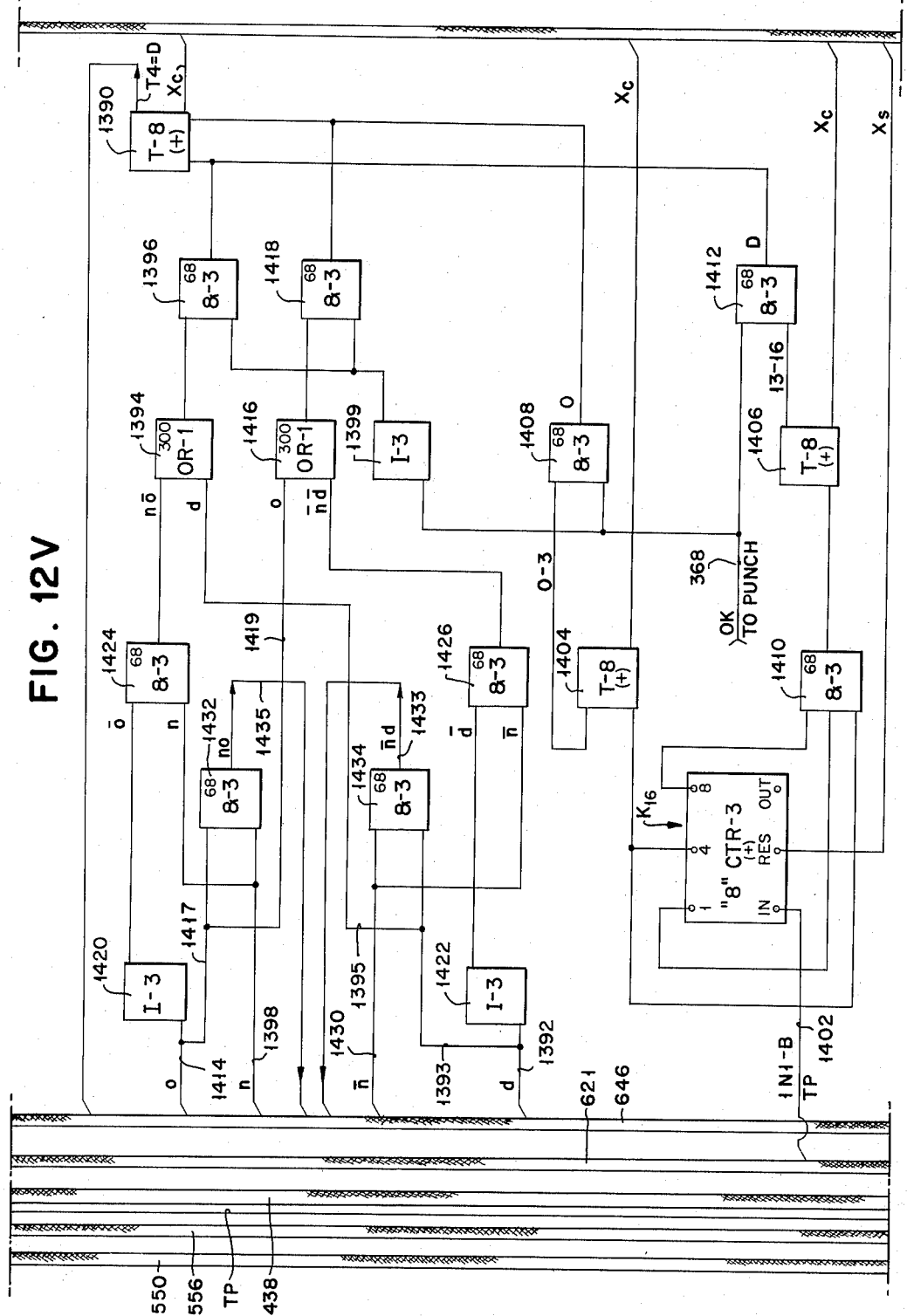
Figure 12X:
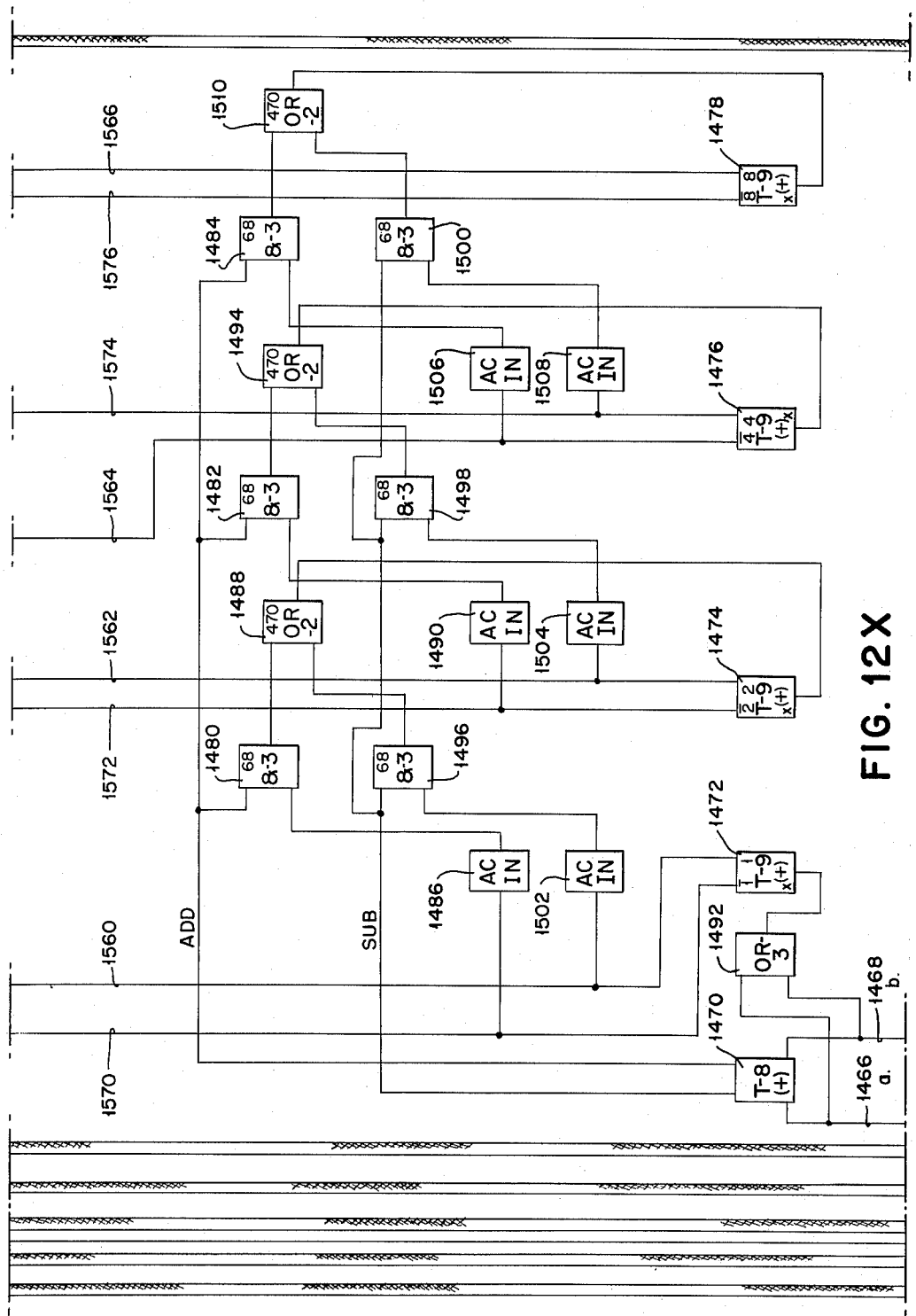
Figure 12Z:
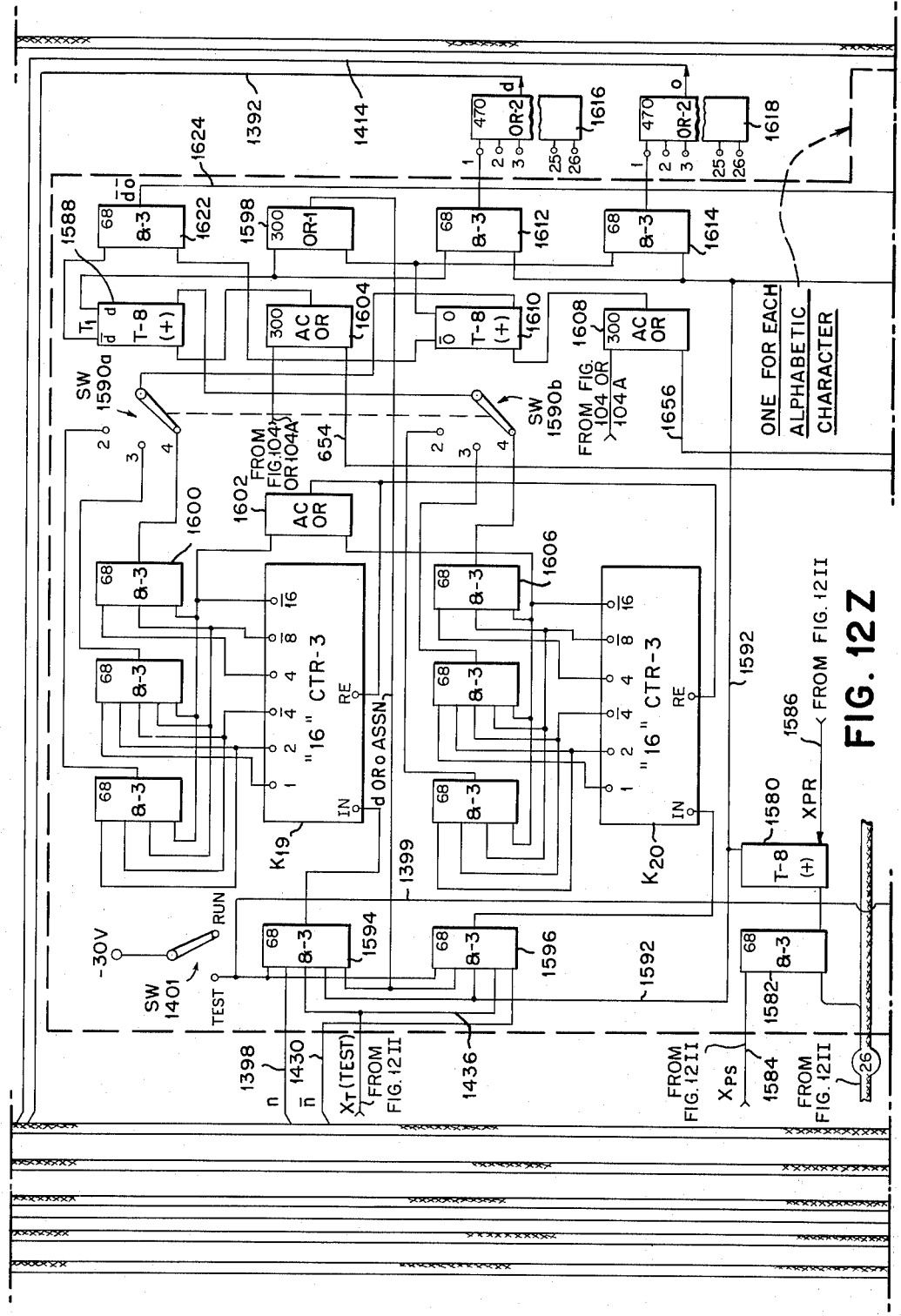
Figure 12B:
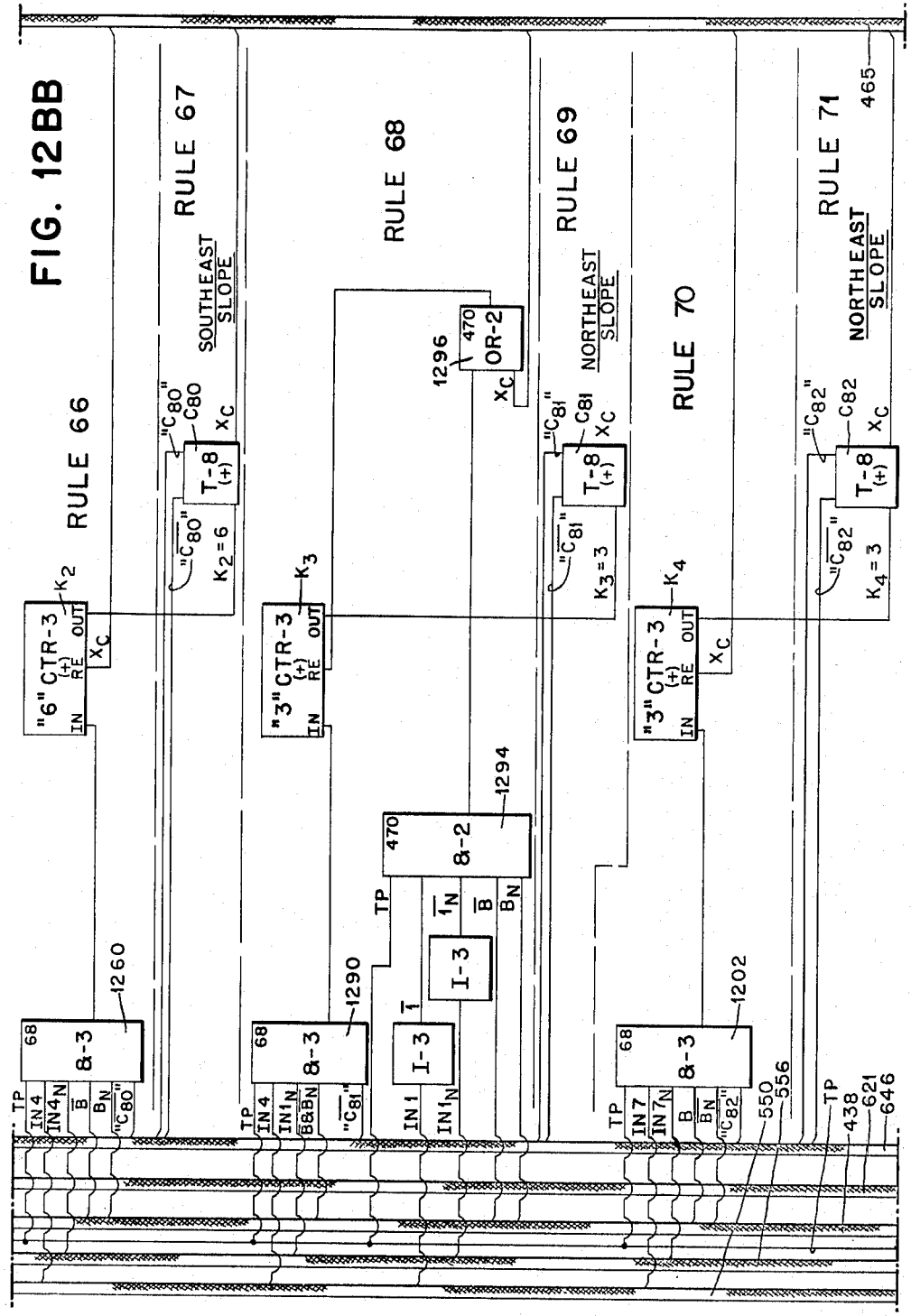
Figure 12D:
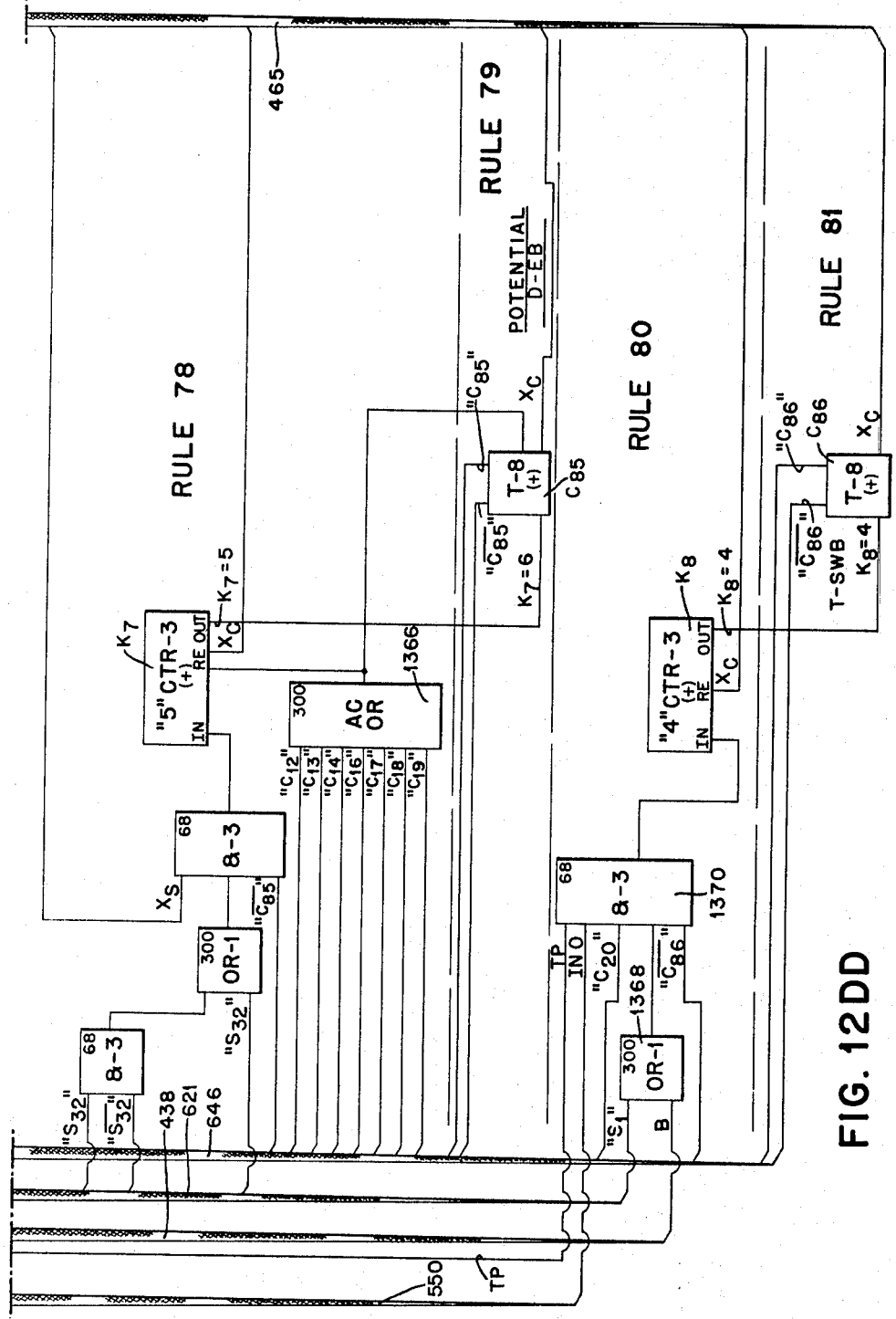
Figure 12E:
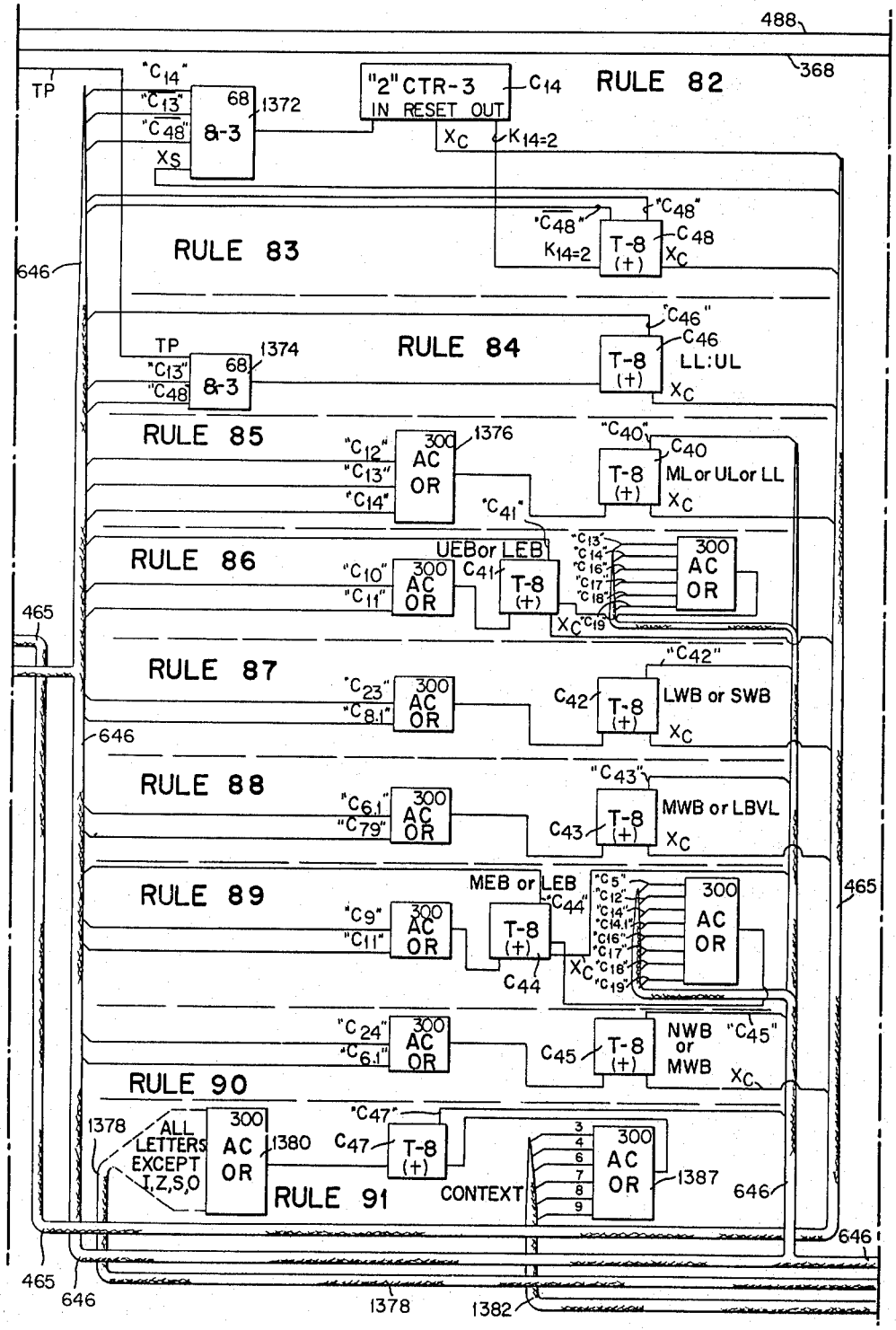
Figure 12G:
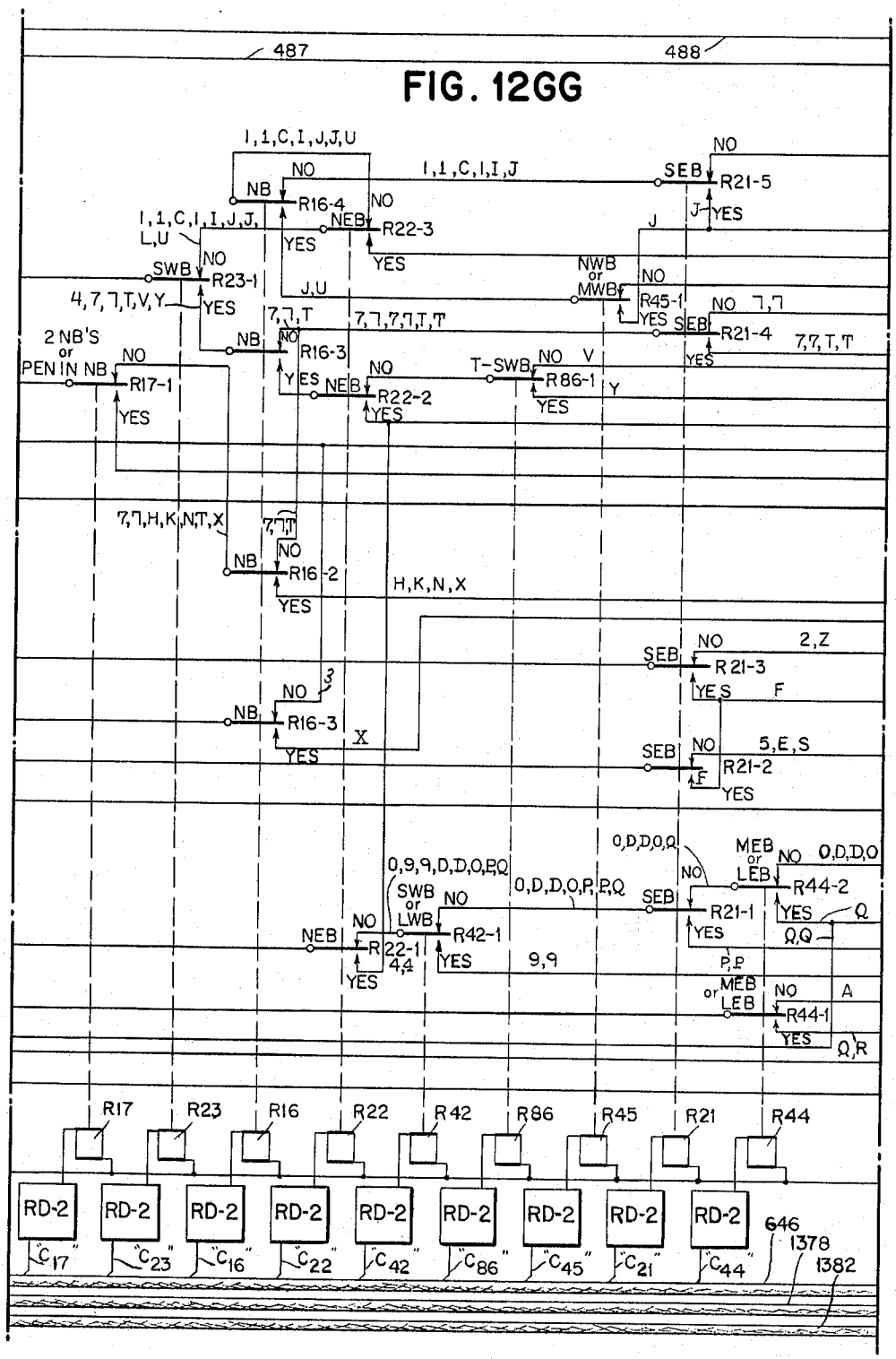
Figure 12:
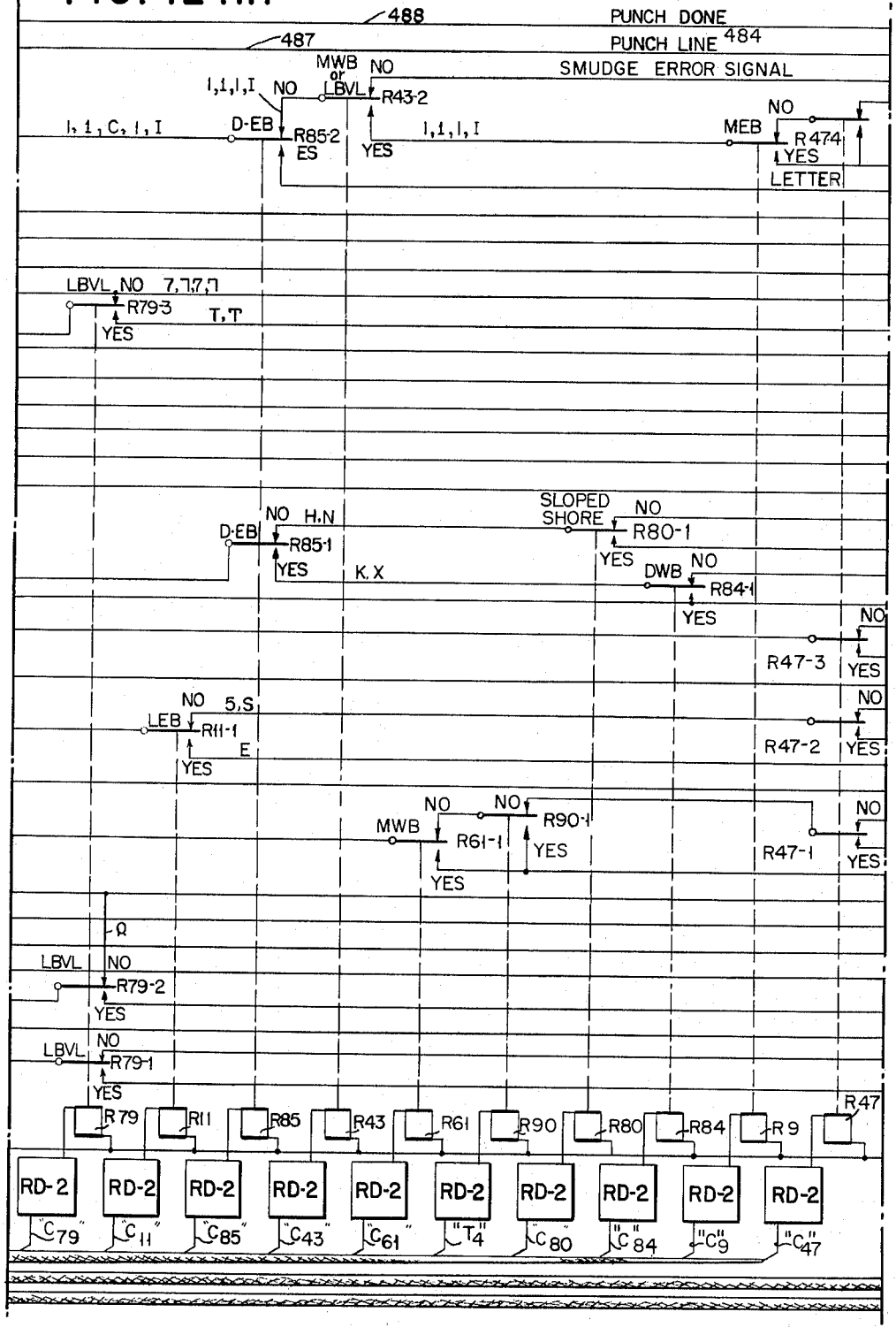
Figure 12:
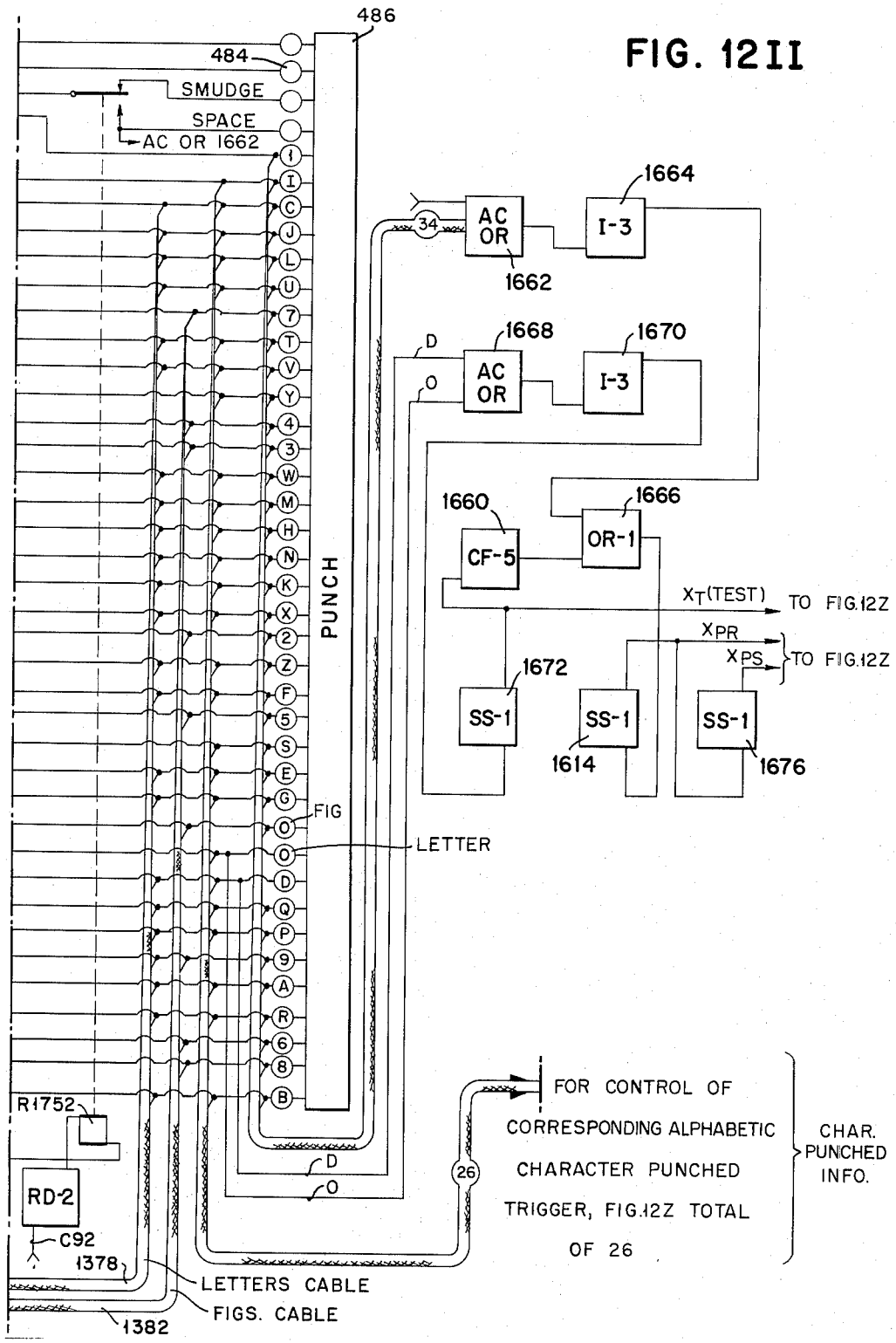

FIG. 12 is a diagram showing the manner in which FIGS. 12A to 12II are to be arranged to constitute a complete view.

FIGS. 12A to 12II, when arranged in the order indicated in FIG. 12, comprise a wiring diagram of the circuits of the character recognition system embodying the invention.

Figure 13B:
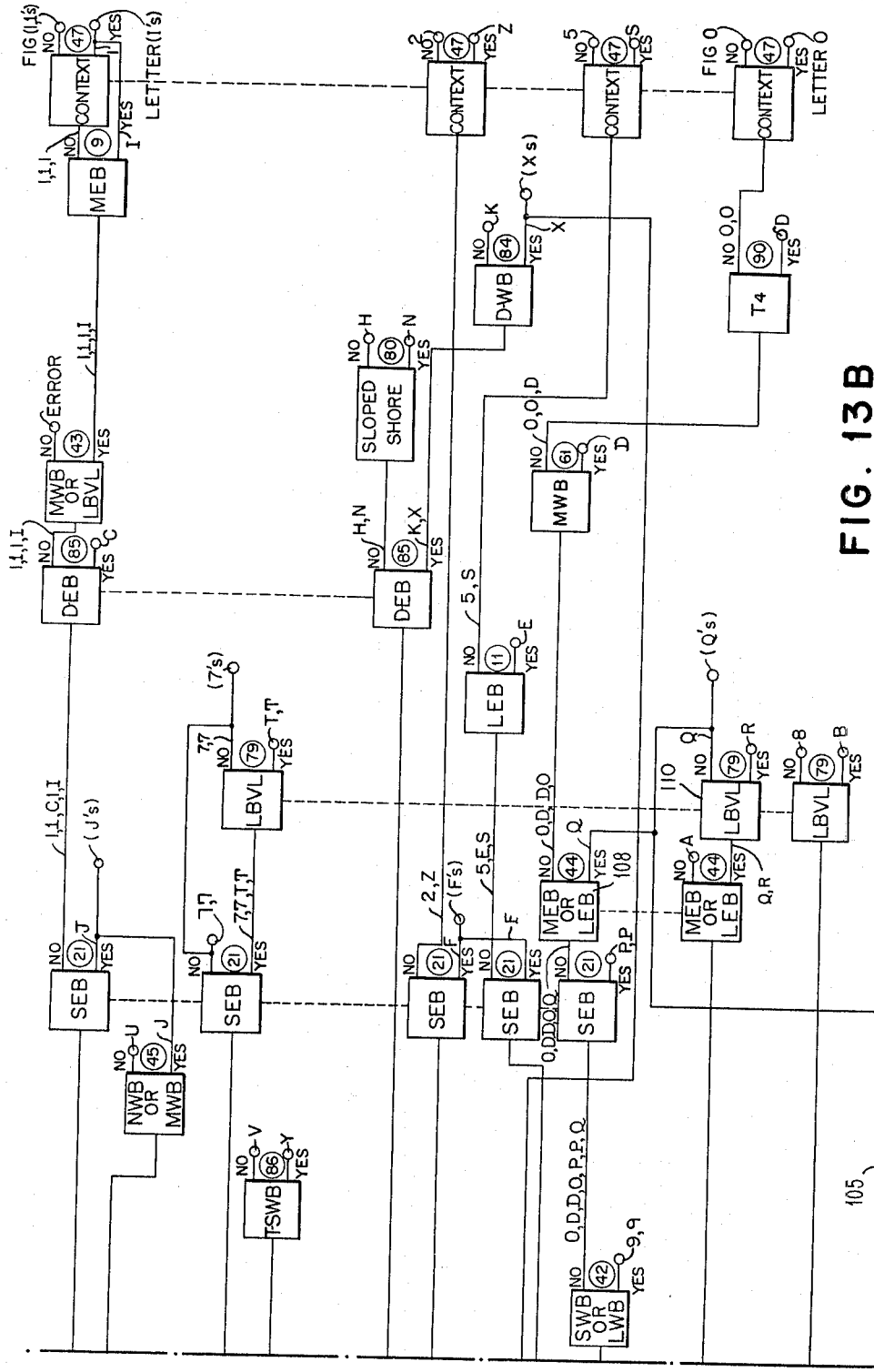

FIG. 13 is a diagram showing the manner in which FIGS. 13A to 13B are to be arranged to constitute a complete view.

FIGS. 13A to 13B, when arranged in the order indicated in FIG. 13, comprise a schematic flow diagram of a Christmas tree shape decoder.

Figure 14:
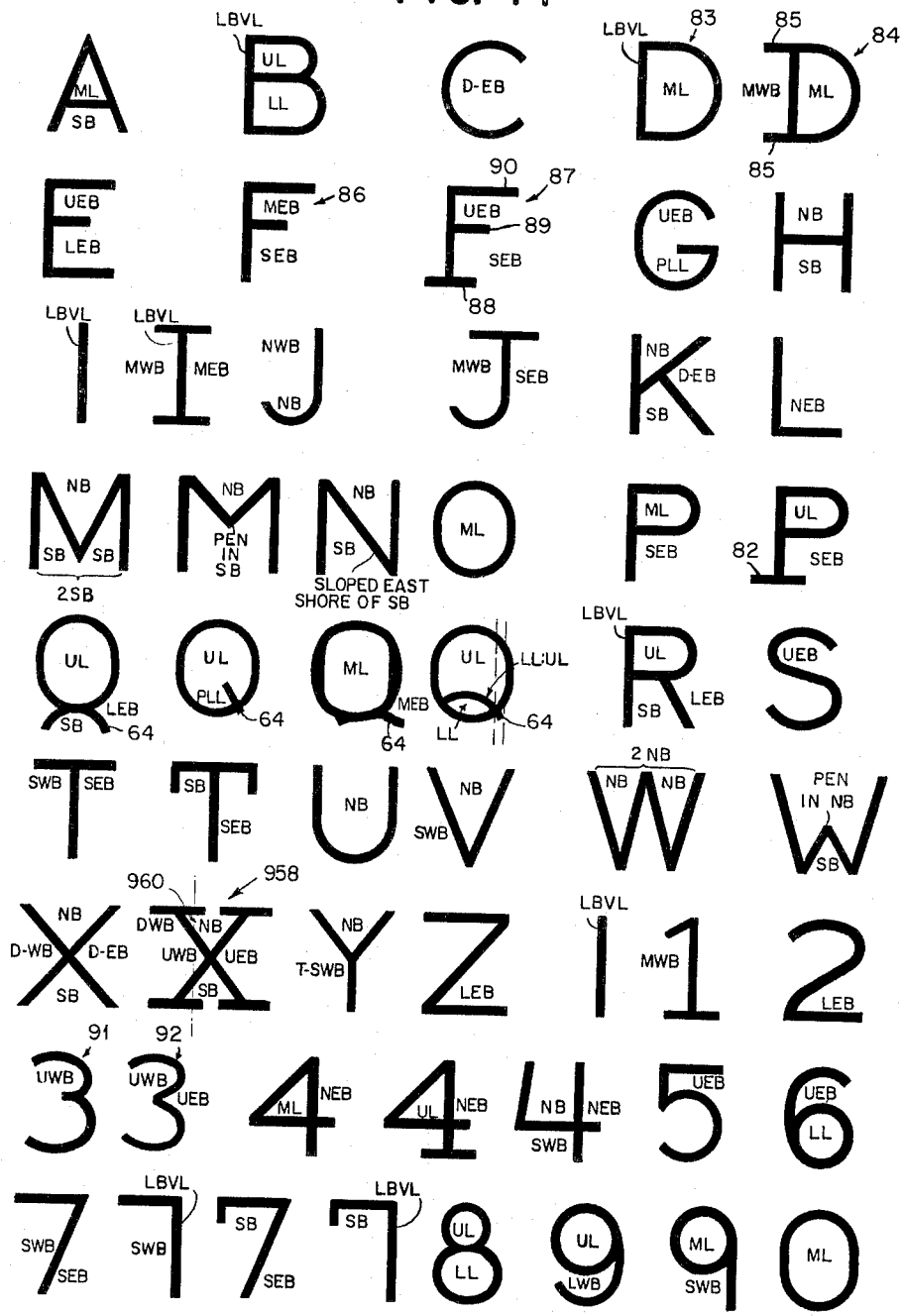

FIG. 14 is a diagram indicating the positive regional criteria to be detected for recognition of the different alphanumeric characters.

Figure 15:
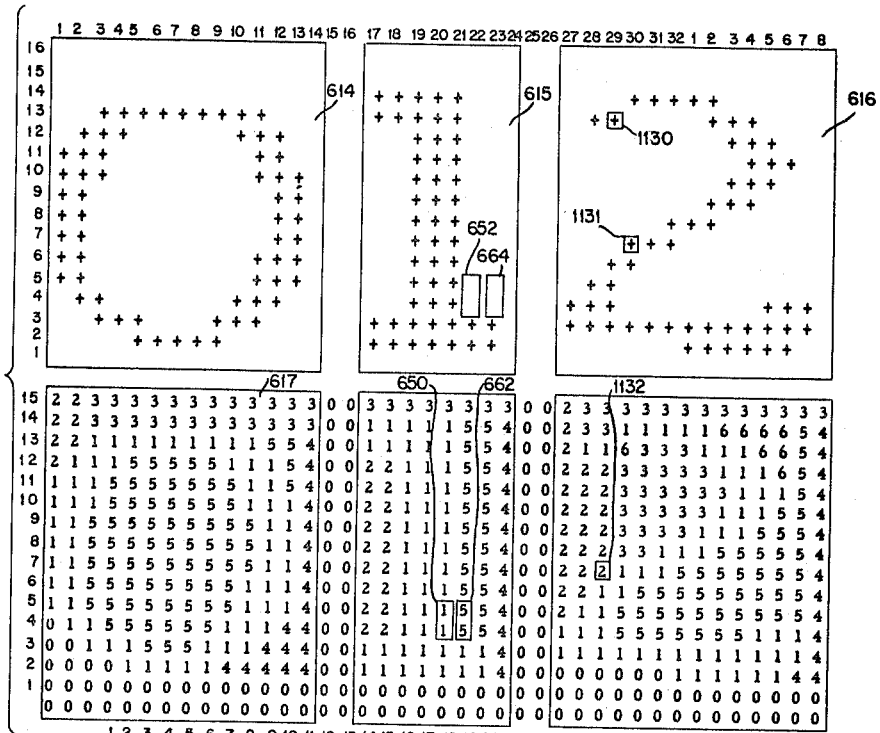

FIG. 15 is a diagram indicating the black bits in a scan of the numerals 0, 1, and 2, located above the corresponding contents of the marking register during the scan.

Figure 16:
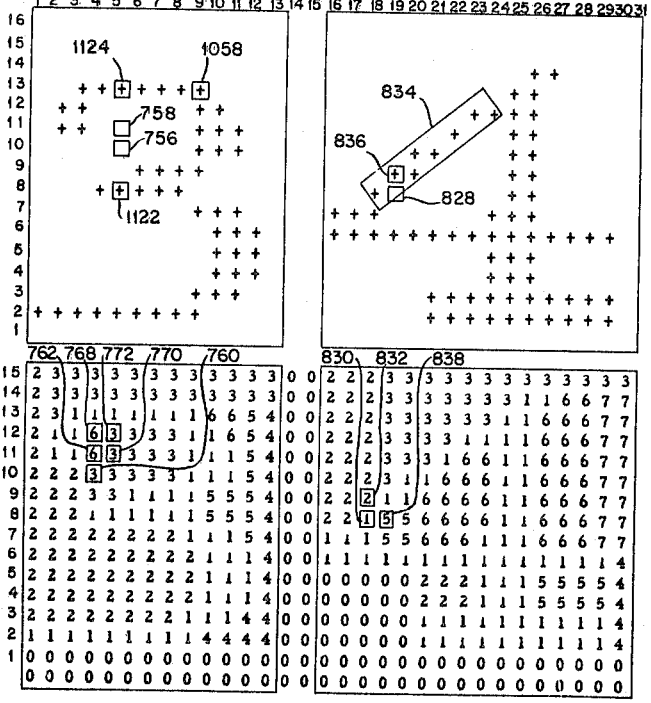

FIG. 16 is a diagram similar to FIG. 15 for the scan of the numerals 3 and 4.

FIG. 17 is a diagram similar to FIG. 15 for the scan of the numerals 5 and 6.

FIG. 18 is a diagram similar to FIG. 15 for the scan of the numerals 7 and 8.

Figure 19:
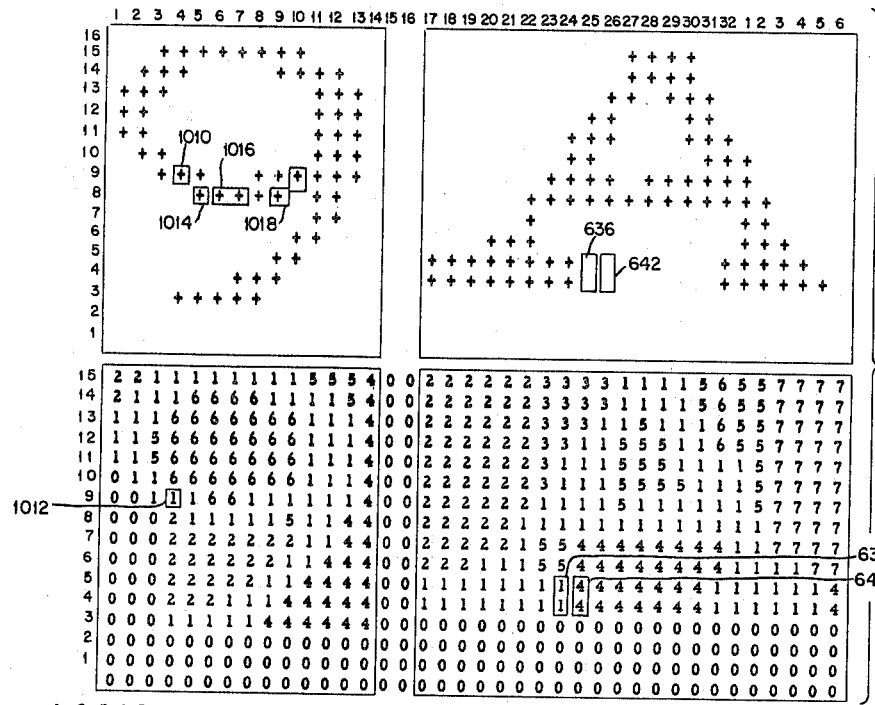
Figure 20:
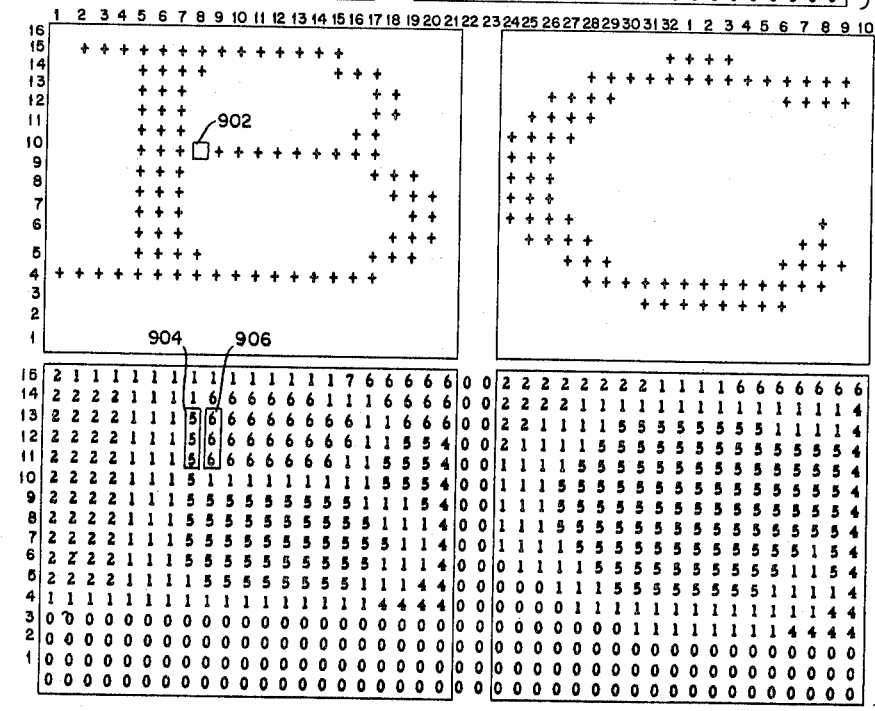

FIG. 19 is a diagram similar to FIG. 15 for the scan of the numeral 9 and the letter A.

FIGS. 20 through 34 are diagrams similar to FIG. 15 for the scan of all the rest of the letters of the alphabet.

FIG. 35 is a diagram illustrating the operation of the recognition criteria circuits in assigning the coded numbers 0, 1, and 2 to the marking register.

FIG. 36 is a diagram illustrating the operation of the recognition criteria circuits in assigning the coded number 3 to the marking register.

FIG. 37 is a diagram illustrating the operation of the recognition criteria circuits in assigning the coded numbers 5 and 6 to the marking register.

FIG. 38 is a diagram illustrating the operation of the recognition criteria circuits in assigning the coded numbers 4 and 7 to the marking register.

FIG. 39 is a diagram showing the manner in which FIGS. 40A to 40I are to be arranged to constitute a complete view.

FIGS. 40A to 40I, when arranged in the order indicated in FIG. 39, comprise a timing chart of one horizontal scan by the character recognition circuits.

FIGS. 41 to 49 are detailed circuit diagrams and respective block representation of cathode followers employed in the invention.

Figure 50:
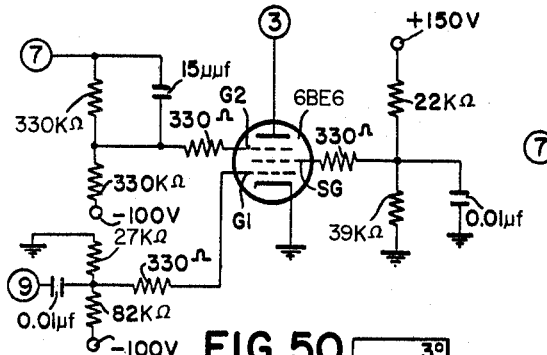
Figure 51:
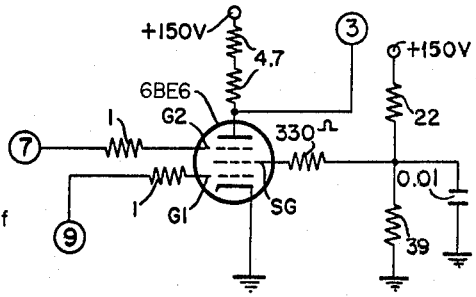
Figure 52:
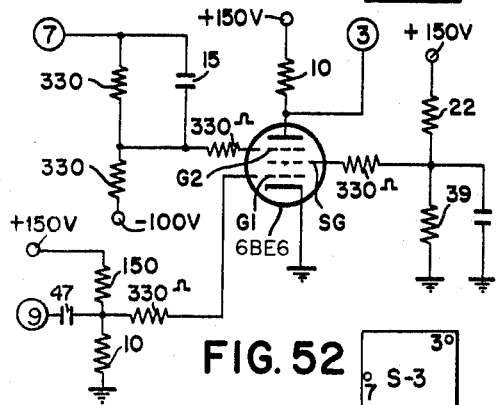

FIGS. 50 to 52 are detailed circuit diagrams and respective block representation of multigrid switches employed in the invention.

Figure 53:
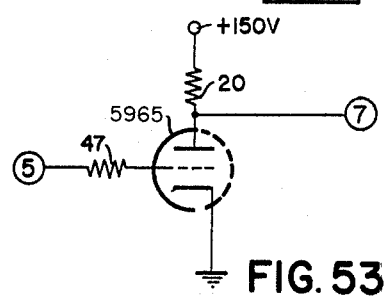
Figure 54:
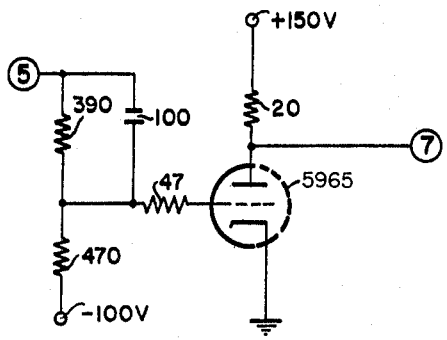
Figure 55:
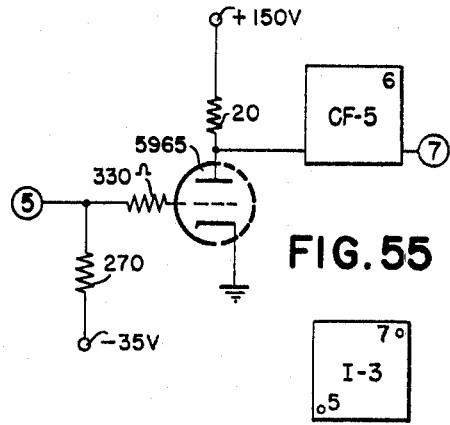

FIGS. 53 to 55 are detailed circuit diagrams and respective block representations of inverters employed in the invention.

FIGS. 56 to 59 are detailed circuit diagrams and respective block representations of AND circuits employed in the invention.

Figure 60:
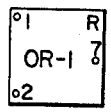
Figure 61:
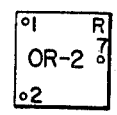

FIGS. 60 to 62 are detailed circuit diagrams and respective block representations of OR circuits employed in the invention.

FIG. 63 is a detailed circuit diagram and corresponding block representation of an alternating current (A.C.) input circuit employed in the invention.

Figure 64:
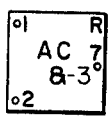

FIG. 64 is a detailed circuit diagram and corresponding block representation of an A.C. AND circuit employed in the invention.

Figure 65:
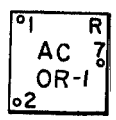
Figure 77:
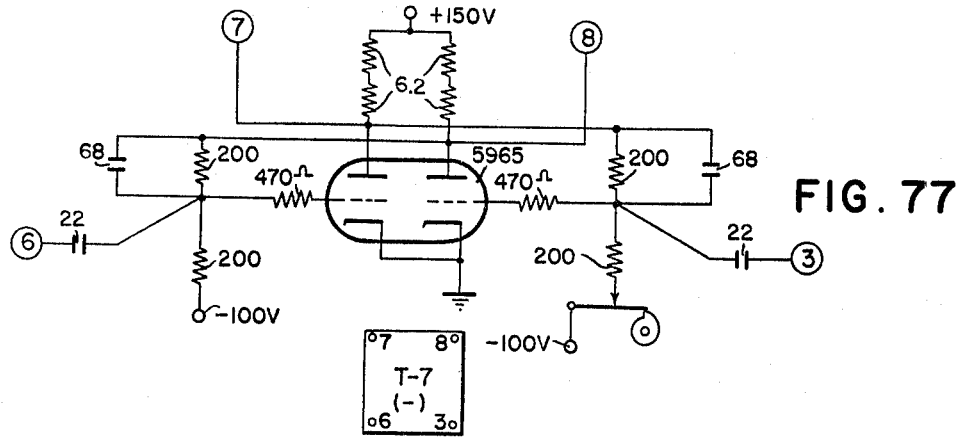
Figure 78:
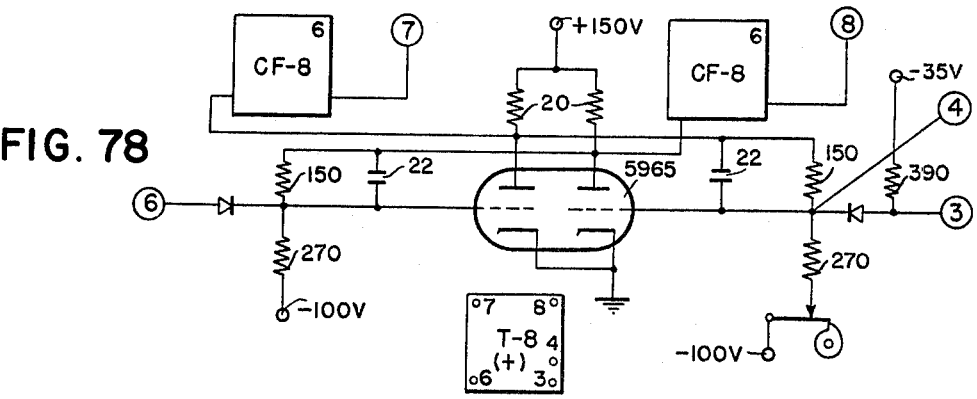
Figure 79:
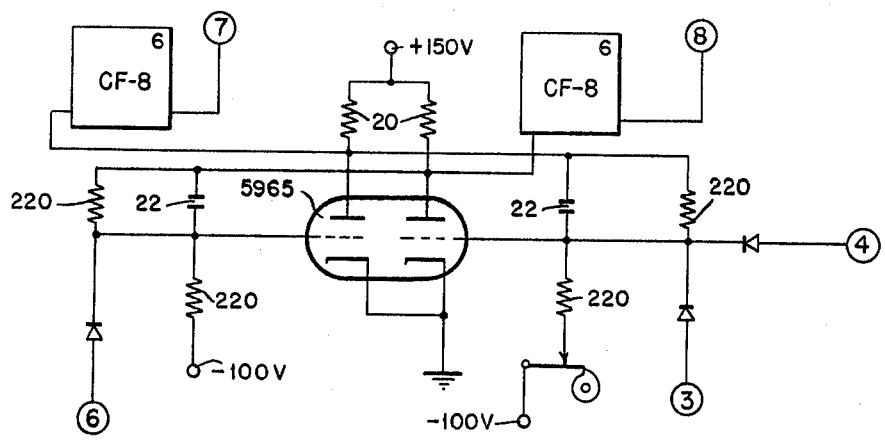

FIG. 65 is a detailed circuit diagram and corresponding block representation of an A.C. OR circuit employed in the invention.

FIGS. 66 and 67 are detailed circuit diagrams and respective block representations of clamp circuits employed in the invention.

FIG. 68 is a detailed circuit diagram and corresponding block representations of a limiter circuit employed in the invention.

FIG. 69 is a detailed circuit diagram and corresponding block representations of an amplifier employed in the invention.

FIG. 70 is a detailed circuit diagram and corresponding block representations of a photo-multiplier employed in the invention.

FIGS. 71 through 79 are detailed diagrams and respective block representations of electronic triggers employed in the invention.

Figure 80:
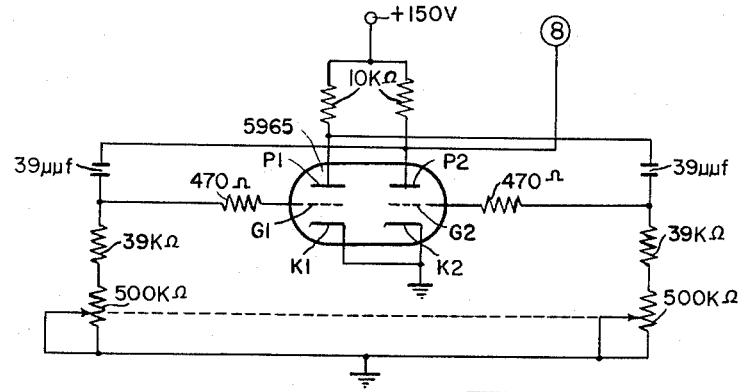

FIG. 80 is a detailed circuit diagram and corresponding block representations of a free running multivibrator employed in the invention.

Figure 81:
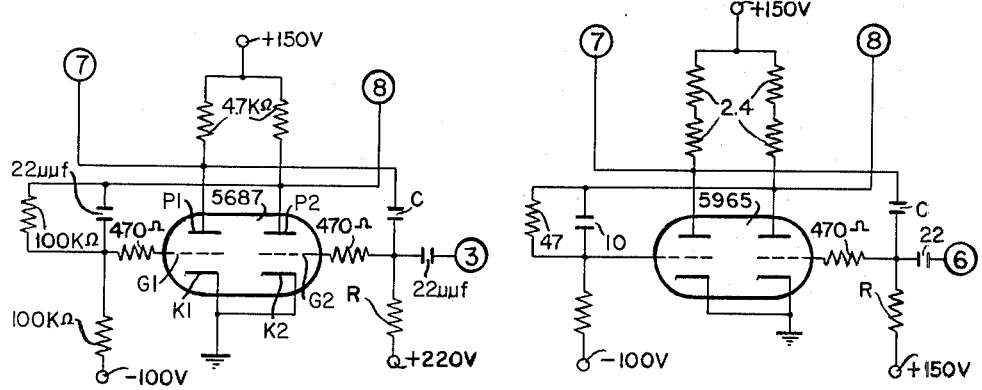
Figure 82:
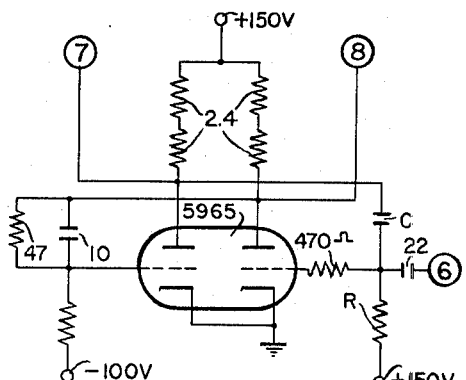
Figure 88:
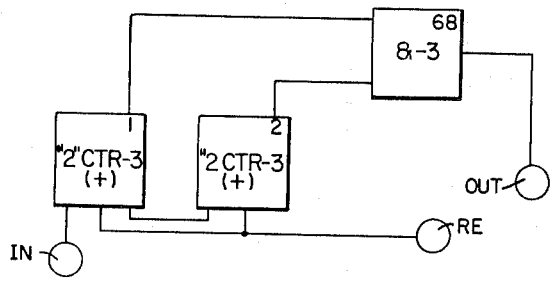
Figure 89:
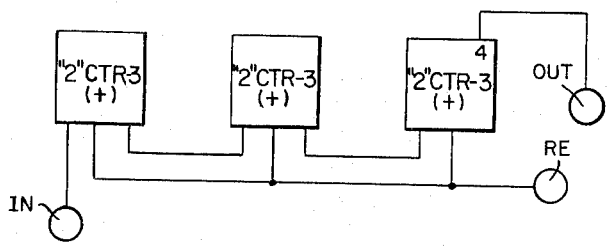

FIGS. 81 and 82 are detailed circuit diagrams and respective block representations of single shot multivibrators employed in the invention.

FIGS. 83 through 92 are detailed circuit diagrams and respective block representations of counters employed in the invention.

FIG. 93 is a detailed circuit diagram and corresponding block representations of a peaker employed in the invention.

FIG. 94 is a detailed circuit diagram and corresponding block representations of a power unit circuit employed in the invention.

FIGS. 95 and 96 are detailed circuit diagrams and respective block representations of core drivers employed in the invention.

FIGS. 97 and 98 are detailed circuit diagrams and respective block representations of relay drivers employed in the invention.

Figure 99:
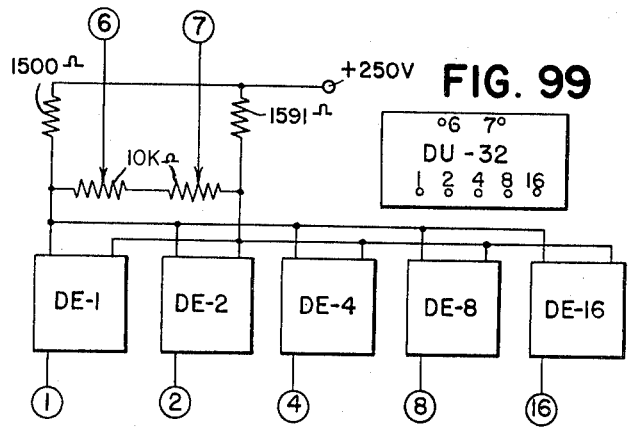

FIG. 99 is a detailed circuit diagram and corresponding block representations of a deflection stage employed in the invention.

Figure 100:
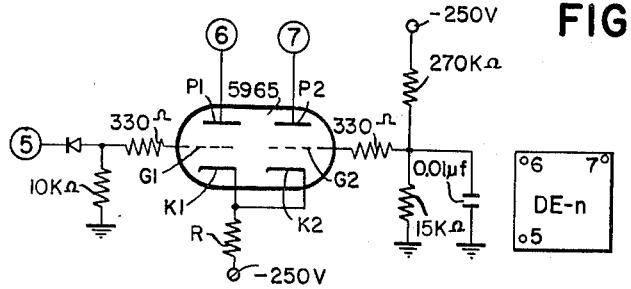

FIG. 100 is a detailed circuit diagram and corresponding block representations of a deflection unit employed in the invention.

Figure 101:
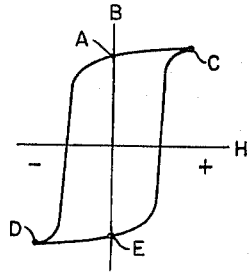
Figure 102:
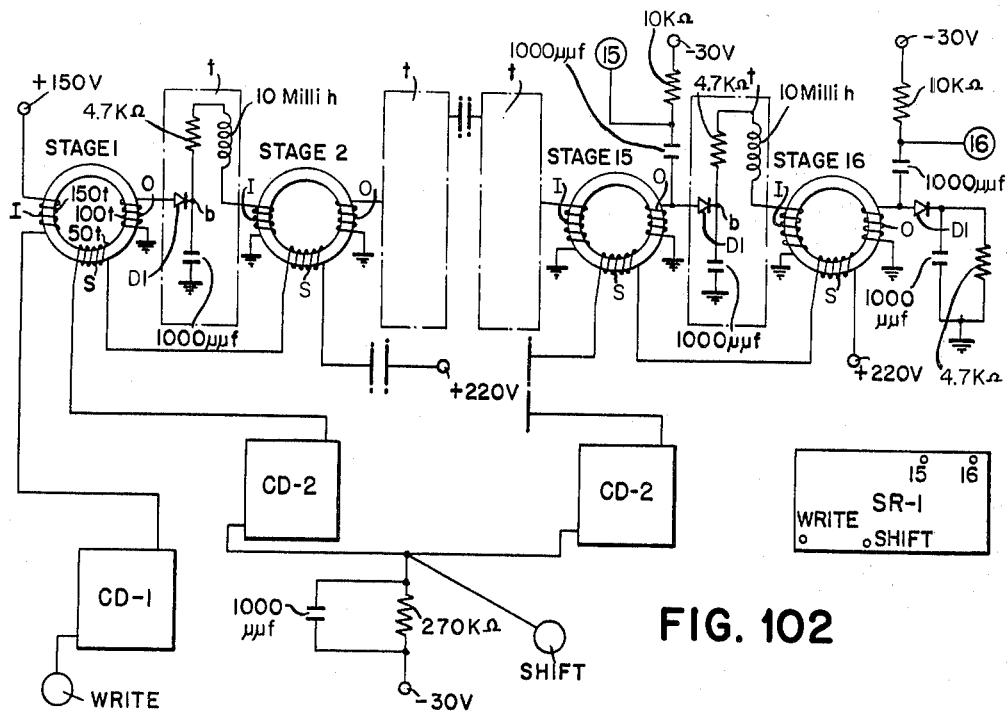

FIG. 101 is a curve illustrating a preferred hysteresis characteristic for the material of the cores shown in FIG. 102.

FIG. 102 is a detailed circuit diagram and corresponding block representations of a core shifting register employed in the invention.

Figure 103:
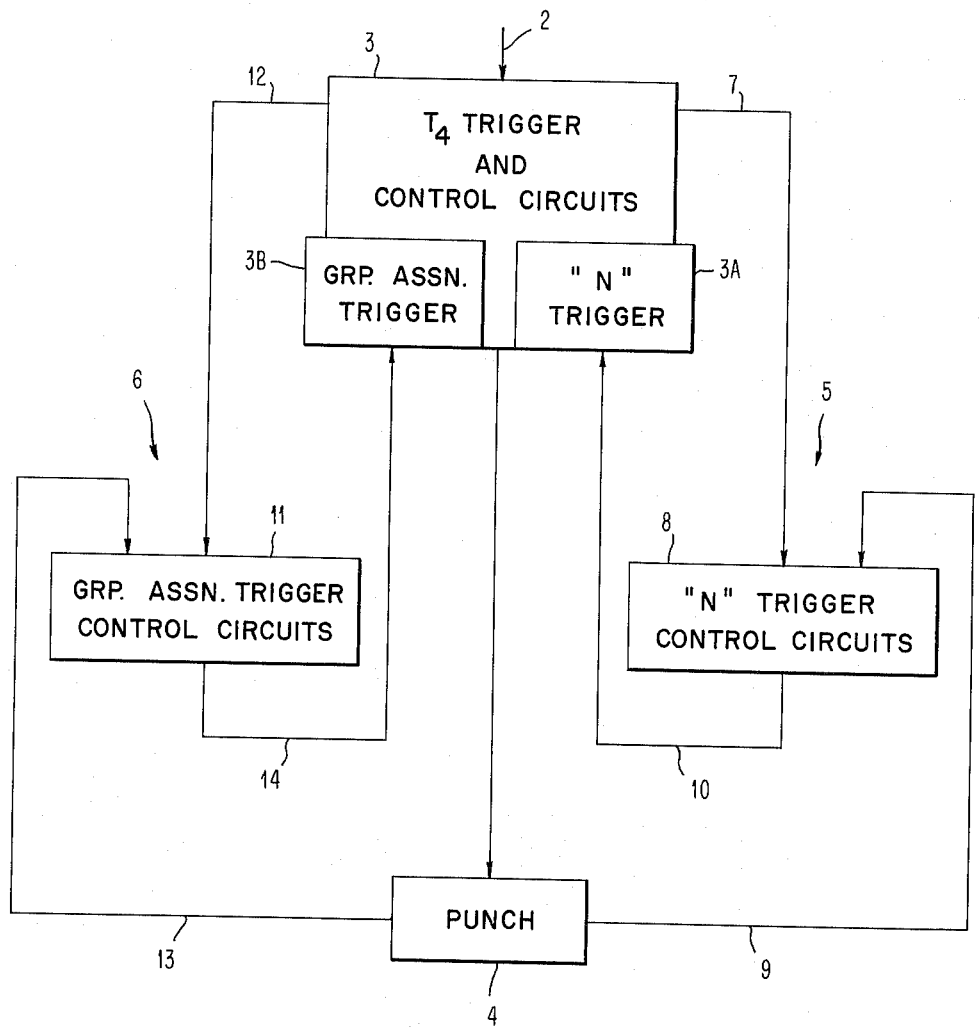

FIG. 103 is a functional block diagram of the recognition circuits of FIGS. 12V to 12AA.

FIG. 104 is an illustration of structure for predetermined group assignments.

FIG. 104A is an illustration of an alternate structure for predetermined group assignments.

FIG. 105 is a timing chart for the punching operation.

In the processing of information, a situation may arise wherein a decision must be made based upon a criterion that bears a relationship to another criterion such that an order of magnitude determination of a particular parameter is necessary in order to determine which of the related criteria is satisfied. The parameter may be a single specific physical characteristic, such as the length of a line, or it may be a factor expressing a relationship of a plurality of independent physical characteristics such as, for example, the quantity inertia. Once the decision is made, as further decisions are presented, based upon the same type of information, the machine employing this invention is able to apply knowledge gained from past decisions to help it decide and to adjust its requirements to point out the distinguishing feature between the two related criteria so as to tune up to the particular idiosyncrasies of the information being handled. In the machine of this invention, decisions are reinforced by providing information feedback loops which permit individual decision comparison with past decisions and variation of decision making factors as the decisions made indicate the desirability of such changes. These faculties are imparted to the information processing machine involving this invention by reducing a decision parameter to a single order of magnitude determination, comparing the order of magnitude value with a decision criterion value, employing experience available concerning the particular information being processed in cases where satisfaction of the decision criterion value is marginal monitoring the occurrence of events where the experience governed the decision and on the basis thereof adjusting the criterion value to conform with experience and adjusting the store of experience knowledge as further information is processed.

Figure 1:
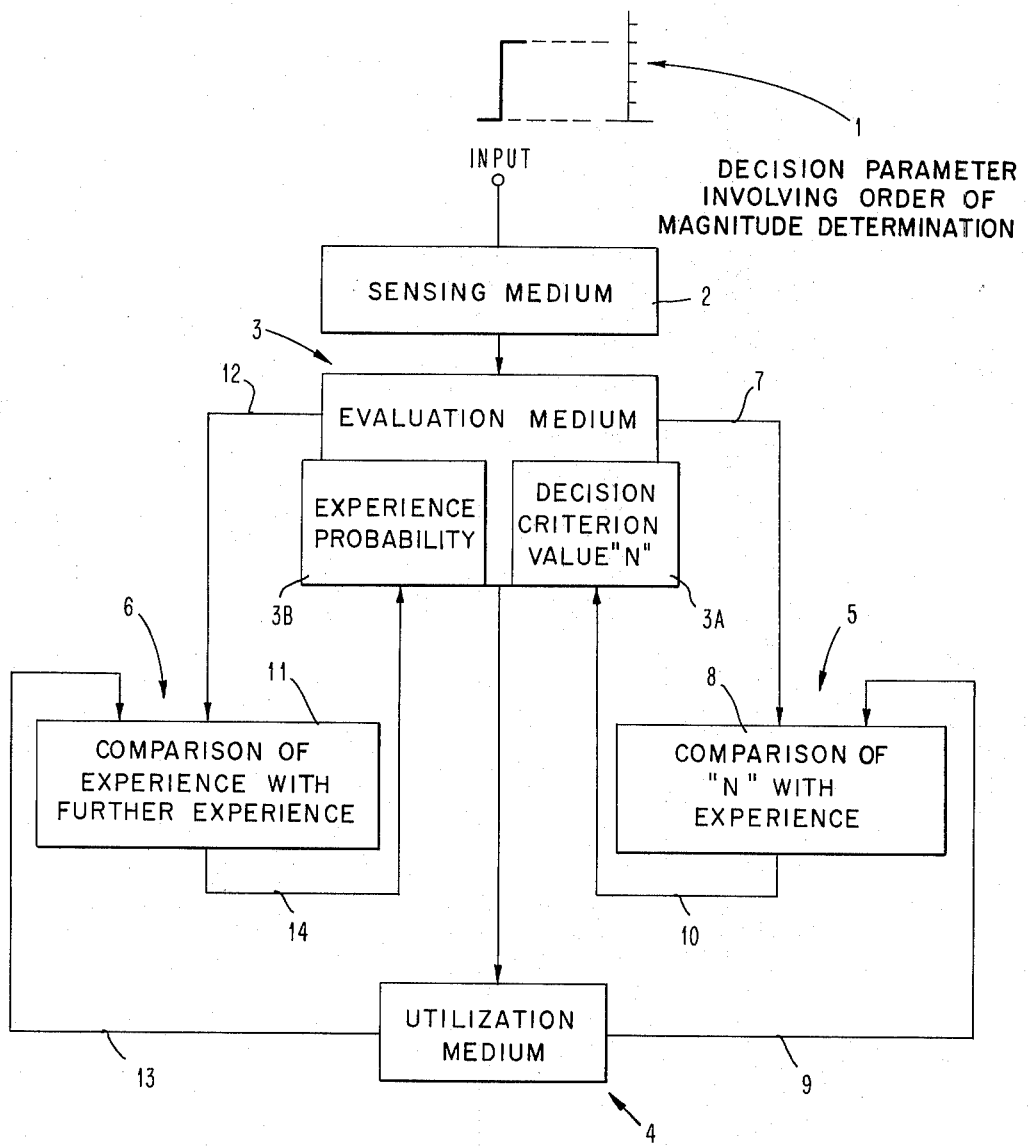
FIG. 1 is a diagram illustrating the information feedback loop principles of the invention.

Referring now to FIG. 1, a diagram is shown of the decision process of this invention. The diagram illustrates in a region labelled 1, a typical decision problem encountered in information processing machinery. In order to establish a concrete illustration to enable one skilled in the art to practice the principles of the invention in decision making machinery, a specific example has been chosen of the magnitude of a given signal and a hypothetical scale has been shown adjacent the signal. The signal is chosen to represent an order of magnitude determination of a particular parameter, which parameter may be, for example, a single physical characteristic, such as the length of a vertical line. The signal representing the parameter applied to the input of a sensing medium 2 and is then transferred to an evaluation medium labelled 3. The evaluation medium 3 studies the order of magnitude of the signal representing the parameter and compares it with a decision criterion value set up in a portion labelled 3A. The decision criterion value is labelled N. It then further reconciles the parameter signal with possible decisions representing experience available in the field of the particular information being handled. The experience is usually expressed as a probability and its location is labelled 3B. As a result of the reconciliation of these two criteria, a decision is rendered and delivered to a utilization medium 4 which may perform a function based upon the decision rendered. Along with the decision, information feedback paths are brought into service, two of which are provided for illustration and labelled 5 and 6. These feedback paths impart to the machine employing this invention the ability to reinforce its own decisions, and, to revise its own criteria as a result of the information being handled. Each feedback is made up of a stage which performs a comparison of the particular factor employed in the decision with experience received in handling the data, and on the basis of the camparison, arranges a change in the elements influencing the decisions in the evaluation medium 3. While it will be apparent that as many feedback paths may be employed as there are criteria in an individual decision, for purposes of providing a clear illustration, two feedback paths, labelled 5 and 6, have been shown as being representative of two of the more frequently employed thought processes used in improving the reliability of decisions. These may be described as profiting by past efforts, and increasing the store of knowledge about the subject on which the decision is to be made. In the invention, an information channel 7 conveys the value of the particular order of magnitude criterion employed for each decision to a comparison stage 8. Another information channel 9 conveys the result of each previous decision on the same criteria to the comparison stage 8. The comparison stage 8 studies the frequency of occurrence of conditions where experience proved more reliable than a measured value and upon a proper set of conditions, delivers through an information channel 10 a signal instructing a change in the order of magnitude value N used in the decision in a direction to conform with what has been learned from past efforts. Through the path 5, the machine keeps track of the decisions it makes and, on the basis of what it has decided, it adjusts the value of its criteria so as to reinforce its own decisions and at the same time confines its attention to the part of the criterion that makes the difference thereby improving its own efficiency.

In order to appreciate one advantage of this, consider a condition wherein the particular machine is capable of measuring an order of magnitude plus or minus ten percent. If an order of magnitude of two to six units is initially selected for N so that a positive decision is to be rendered on all values greater than two but less than six, and experience in practice with the information being handled indicates that a positive decision should be rendered in cases where N is never less than four or greater than five, in accordance with the invention the feedback path 5 will arrange a new value for N that permits the machine to move its attention and its tolerance directly to the order of magnitude affecting the decision. It will be immediately apparent that from the tolerance standpoint alone, the machine then applies its tolerance only to the critical part of the measurement, thus making much more reliable decisions.

The invention also provides for increasing the store of knowledge about the general subject area in which decisions are to be made. This is done through feedback path 6.

The feedback path 6 is similar to path 5 in that it compares in a stage 11 the particular experience information used in each decision delivered via a channel 12 with previous decisions delivered via a channel 13 so that the experience probability in 3B, which, in essence, is what one would believe the decision to be, based on what we know about the subject, may be adjusted by a signal on a channel 14 when continued handling of the information indicates that the value representing experience should be changed.

A machine employing the principles of this invention must not exhibit so close a coupling in its feedback paths, that stray deviations in the quality of the information presented can influence the machine decisions. For this purpose a stability control is built into the feedback paths in the form of a requirement for the occurrence of a certain number of similar events and weight in the form of a ratio of events is given to information in a particular channel. From a physical embodiment standpoint, this may be conveniently accomplished in the stages 8 and 11. The stability factor can best be provided by counting events and by using a statistical distribution such as the Poisson distribution for the number of events and requiring a specific deviation which may vary with the type of information being processed. As a general rule, such a factor is on the order of 0.5%. In accordance with the invention, the comparison stages 8 and 11 of FIG. 1 may be provided with a feature which is constructed of elements capable of counting the number of events reported through the information channels 7, 9, 12 and 13.

Referring now to FIG. 2, an example is provided of a counter circuit for a stage such as 8 or 11 of FIG. 1. In a comparison stage, it is desirable that two situations be handled. One, where the measured order of magnitude value as delivered by, for example, channel 7 is greater than the criterion value N being used as delivered by, for example, channel 9; and, two, where the measured value is less than the used value.

Considering for purposes of explanation that the event that a measured value as great as the value N required by the machine may be assigned the symbol $n$, that the event that a measured value not as great as the required value may be expressed as $\bar{n}$, that the event that a previous decision predicted the decision $n$ may be assigned the symbol $d$, and, that the event that a previous decision predicted the decision $\bar{n}$ may be expressed as $o$. Under these conditions, then, a decision, where a prediction based on the measured value agrees with a prior decision prediction may be expressed as $nd$ or as $\bar{n}o$. It will then be seen that the events $\bar{n}d$ and $no$ indicate conflicts in that the value required by the machine is different from the measured value and that the decision is being made on other considerations. If one of these events occurs more often than the other, it is an indication that a correction in the value of N should take place. Specifically, $no$ implies that the value of N is too small and the machine's predictions based on this criterion is being overridden by other considerations. $\bar{n}d$ implies that N is too large and hence either not in the range to provide a proper criterion or that the machine is making incorrect assumptions based on this criterion.

Referring again to FIG. 2, a logical diagram is shown wherein three information storage elements are used in connection with two coincidence elements to provide a signal on an information channel when either a comparison or a non-comparison between the event $n$ and the predicted decision $d$ or $o$, occurs. The diagram is provided with a first storage element 10 which records the fact that a decision has been made predicting the decision $n$. Element 10 has been labelled $d$ to facilitate following the logical operation performed by the diagram. A second storage element 11 is provided to indicate the fact that a decision has been made predicting the decision $\bar{n}$. This element has been labelled $o$. A third storage element 12 is provided to indicate an agreement between the currently required value for $n$ and the measured value. This element has been labelled $n$. The storage elements 10, 11 and 12 are equipped with the ability to indicate the presence of information at one output, the absence of the information at a second output and are capable of being set to a reference state by a signal on an input independent of the information channel to which they are connected. Terminals 13, 14 and 15 are provided for resetting. In an electrical embodiment of this invention, the Eccles-Jordan type binary trigger will satisfy these requirements. A first coincidence element 16 labelled $no$ is provided to indicate the condition where the measured value is as great as the currently required value $N$ and the decision previously made, did not correctly predict the decision. A second coincidence element 17 labelled $\bar{n}d$ is provided to indicate the condition where the measured value is not as great as the currently required value N and the previous decision did not correctly predict the decision. As previously discussed the condition $no$ implies that the currently required value of N is too small and the condition $\bar{n}d$ implies that the currently required value of N is too large. It will be apparent to one skilled in the art that in decisions where there are more than $d$ and $o$ possibilities each may be expressed in a separate storage element and logically combined with other stored conditions along the pattern indicated in FIG. 2 to result in the expression of a recommendation of a change in the value of N.

In order to introduce stability into the feedback loops of a machine employing this invention, the recommendation that the required value of N be changed should not be acted upon immediately. Depending on the nature of the information being handled, it is generally advantageous not to build too tight a regulation into the system. In all decisions there is a certain degree of accuracy in each fact having a bearing on the decision. All measurements are accurate to a given tolerance, and the regulation should not be tighter than the combined tolerances of the facts involved will permit. In the case of the analysis of printed material, for instance, it is desirable that imperfections in printing, peculiar to individual characters rather than to members of a class, not be permitted to enter the feedback loops in the form of recommended changes in the value of N. In order to provide regulation in the feedback loops that may be adjusted to the particular requirements of the material being handled, the diagram of FIG. 3 is provided.

FIG. 3 is a diagram of two parallel chains of information storage elements logically combined to give a signal on an appropriate information channel of the more frequent of two events or the frequency coincidence of the events. The diagram has a first chain 20 of, serially connected, information storage elements 21A through 21F to record the frequency of one event for example, $no$. A second chain 22 of serially connected storage elements 23A through 23F is provided to record the occurrence of another event, for example, $\bar{n}d$. The storage elements have the properties that in response to a signal on one information channel, the element stores the information, it gives a simultaneous indication on two separate output information channels of the presence or absence of information stored and it can be reset by an information channel separate from the input. In an electrical embodiment of the principles of this invention, the storage elements may be bistable circuits, for example Eccles-Jordan type triggers. The last storage element of each chain delivers an indication of information stored to a coincidence element and an alternational element. In the case of element 21E in chain 20, a signal indicating the desired minimum number of occurrences of an event, for example $no$, which were introduced into the chain at terminal 29 is delivered to storage element 24 which in turn inhibits a first coincidence element 25; on the other hand, element 23E in chain 22 delivers a signal indicating the desired minimum number of occurrences of an event, for example $\bar{n}d$, which were introduced into the chain at terminal 30, to a storage element 26 inhibiting a coincidence element 27. A signal indicating the presence of information stored in element 21F is transmitted to element 27 and to alternational element 28 labelled OR. Element 23F likewise delivers a signal indicating the presence of information simultaneously to elements 25 and 28. Thus, with the arrangement of FIG. 3, the presence of a desired number of events in one chain and the absence of an occurrence of a minimum desired number of events in the other chain produces a signal at either terminal 31 or 32; these signals have been labelled A and B. A serves to actuate a means to increase and B serves to actuate a means to decrease the value of N by one increment. An indication of information stored in either element 23F or 21F is delivered at terminal 33 and used for resetting all storage elements. Terminal 33 has been labelled RESET.

The ratio of the desired number of events in one chain to a minimum desired number of events in the other chain controls the stability to change in one direction of the required value of N. This ratio can be different for different directions and can be any desired value as will be apparent to anyone skilled in the art. The symmetrical relationship of 2 events to 1 event is an illustration of the establishment of the criterion by assuming a Poisson distribution for the number of counts and requiring a deviation of more than $3\delta$ (probability less than 0.5%). This use of a Poisson distribution is quite conservative and makes the feedback loop very stable.

It will be apparent to one skilled in the art that the logical operation to be performed by the diagram of FIG. 3 is to keep track of the relative frequency of occurrence of a plurality of events that are indicative of the fact that there exists a better value for N than the one being used, and to, in a stable relationship of frequency of occurrence, logically combine the elements recording the events to give a signal usable as an instruction to increase or decrease the value of N by an increment. The elements of the diagram of FIG. 3, in an electrical embodiment of the invention may conveniently be trigger circuits, AND circuits, and OR circuits. Further, it will be apparent that the components could be saved in such an embodiment over the quantity illustrated by ANDing and ORing the plates of the triggers to get the binary equivalent of the number desired.

Referring again to FIG. 1, the combination of FIGS. 2 and 3 wherein from FIG. 2 the $no$ and $\bar{n}d$ signal channels are connected to terminals 29 and 30 respectively of FIG. 3 provides the comparison element 8 in the feedback loop 5 and the A and B pulses of FIG. 3 may be delivered by information channel 10 to element 3A to execute the change in the value of N.

The feedback loop 6 of FIG. 1, is to be considered next, in this feedback loop, the comparison element 11 wherein experience is compared with further experience requires an additional item of control not required for the element 8. As has been previously mentioned, "experience" or information already known about the particular data being handled is best expressed in the form of a probability predicting a certain decision on the basis of prior decisions and past experience with the usual decision following these same prior decisions, independently of the circumstances for this particular occasion of the certain decision. This probability should be subject to change as more becomes known about the particular data being handled, and the particular decisions being made. This is accomplished in accordance with the invention by providing a pair of devices capable of keeping track of events, for example the counter chains shown in FIG. 3, for each item of experience to be considered in a decision. Each particular item of experience is responsible for either a positive or a negative prediction of an ultimate decision so that a particular item of experience could result in one of two groups leading to a positive or negative prediction of a decision. For purposes of explanation, the symbol $\alpha$ is assigned to the event that one of a group of circumstances leading to a prediction of $n$ has occurred. The machine, for each certain decision, is making the previously described order of magnitude determination measurement and delivers a signal $n$ if the measurement equals or is greater than the currently used criterion value N and delivers a signal $\bar{n}$ if the measurement is less than N. Under these circumstances, if the frequency of $\bar{n}\alpha$ becomes larger than a small fraction of the $n\alpha$ events, this would indicate that for this particular data being handled $\alpha$ was not reliable giving a positive prediction and a change in the group encompassed by $\alpha$ would improve operation. Where a situation arises in which certain experience is considered pertinent, and not enough is known for a prediction but it is realized that more information may be gained from the data being handled that may make using this experience desirable in the future, occurrence of such event which we can call $\rho$, is compared with $n$ and a recommendation based on the relative frequency of occurrence of $n\rho$ over $\bar{n}\rho$ is provided.

Referring now to FIG. 4, a generalized diagram is provided illustrating a manner of comparing experience. In the diagram of FIG. 4, two coincidence elements for example AND circuits, elements 34 and 35 compare $n$ inserted at terminal 36 and $\bar{n}$ inserted at terminal 37 with a probability experience prediction group labelled $\alpha$ inserted at terminal 38. The frequency of occurrence of coincidence is recorded in counting channels 39 and 40 and a count comparison or ratio is employed by appropriate connection to the storage elements 41A through 41E to generate a signal on an appropriately connected output 42 causing a change in group before a signal to reset the physical embodiment of the machine is generated at terminal 43. For purposes of stability, a Poisson distribution for these events indicates that a ratio of 1:8 is a desirable ratio. The desired ratio may conveniently be established by taking the magnitude of the counting chain 40 as a base determining the time of reset and establishing the output 42 in the chain 39 at the desired fraction of that base. The chains 39 and 40 of FIG. 4 are shown for illustration as a series of individual elements, however, it will be apparent to one skilled in the art that a variety of counting elements are available that will accomplish the functions desired in a single unit; for example, a gas tube, transistor or magnetic core counter.

Referring next to FIG. 5, a diagram is provided illustrating the handling of a situation wherein although the experience is considered pertinent, not enough is known for prediction but it is realized that more information may be gained from the data being handled that may permit using this experience. In the diagram of FIG. 5, the determinations $n$ and $\bar{n}$ are introduced at terminals 44 and 45 and compared in coincidence elements 46 and 47 with the experience $\rho$ introduced at terminal 48. The determinations $n\rho$ and $\bar{n}\rho$ are counted in counters 49 and 50 respectively which are set to deliver a signal on one channel if the counter number has been reached and to deliver a signal on a second channel if the counter number has not been reached. For counter 49 the channel indicating the counted number is labelled 53 and for counter 50 this channel is labelled 54. Similarly, the channel indicating that the number has not been counted for counter 49 is 51 and for counter 50 is 52. Signal polarity elements 55 and 56 are provided to make the signal of a particular indication from one counter compare with the opposite type of signal from the other counter. The coincidence of the counting of a certain number of $\bar{n}\rho$ events and the failure to count another certain number of $n\rho$ events is compared in coincidence element 59 and a signal is delivered at terminal 60 indicating that the presence of $\rho$ should predict the decision $\bar{n}$ and should be a member of an experience group making such a prediction. Similarly, the coincidence of the counting of a certain number of $n\rho$ events before counting another number of $\bar{n}\rho$ events is compared in coincidence element 57 and a signal is delivered at terminal 58 indicating that the presence of $\rho$ should predict the decision $n$ and should be a member of an experience group making such a prediction. Resetting of the counters after a certain number of events is accomplished by a signal on terminal 61 from alternational element 62. A Poisson ratio of one set of events over the other can be maintained by the respective setting of the counters. A value of eight to one is recommended. In an electrical embodiment of this invention, the counters 49 and 50 may be serially connected bistable circuits, well-known in the art. The coincidence elements may be AND circuits, the polarity elements may be inverters and the alternational element may be an OR circuit, each well-known in the art.

Thus, the feedback loop 6 of FIG. 1 would be made up of the counters as shown in FIGS. 4 and 5 comprising the element 11 wherein the determinations $n$ and $\bar{n}$ are delivered on channel 12, the events $\gamma$ and $\rho$ are delivered on channel 13 and the predictions from each are delivered to element 3B on channel 14.

What has been thus far described is a technique for imparting to an information processing machine the faculty of adjusting its decisions as greater experience with the information being processed is acquired. The technique involves a process of feeding back of logical information; wherein an order of magnitude criterion is employed in a comparison with what is already known to influence future decision making. The technique has been illustrated involving two characteristic feedback loops, one resulting in a change in the machine's criterion of an order of magnitude value and the other resulting in a change in experience probability based on the frequency of occurrence of a known fact. The feedback is accomplished by monitoring conflicts between measurement and experience. With the two feedback paths simultaneously in operation, an information processing machine may then "tune-up" to the particular information being processed and thereby improve its own accuracy and efficiency. In order to more clearly appreciate the learning faculty imparted to an information processing machine, through application of the principles of this invention, let us consider some particular examples. As a first example, in the character recognition field where imprinted or written characters are analyzed and recognized as a result of the light and dark areas in their background, the difference between a D and an O is an order of magnitude determination of the length of the vertical line. This order of magnitude determination would then correspond with the decision criterion value N previously discussed.

As the second example, consider the stability of the particular shape, a problem which is encountered in the hydrodynamics field. Here the stability of a particular shape may be based upon an order of magnitude determination of the distance between two points in the shape through which the resultants of the forces applied to the shape are located. In the shipbuilding industry the stability of a vessel is measured by the distance from the center of gravity to a point around which the vessel mass rotates in rolling. This distance is known as the metacentric height. Similarly, the stability of a volume mass in a free fluid may be measured by the distance from the centroid through which the resultant of a force tending to move the object will be located and the center of gravity through which the resultant of the parallel vertical forces of gravity is located.

In each situation, in accordance with the principles of the invention, a value N is assigned to a specific order of magnitude of the physical characteristic being studied. In the case of the character recognition example, the number of length increments in the vertical line that identifies a D from an O would be the decision criterion value set in element 3A of FIG. 1. Similarly, in the stability problem, the decision criterion value N would be the number of length increments from the critical points of the shape, for example the number of length increments in the metacentric height of a ship.

The experience with the particular information being handled is next brought into consideration. In all arts there are cretain probabilities based on the existing information, that tend to predict the existence of further information. In the case of the character recognition problem, there is what is known as language statistics developed at least partially in the science of cryptography. These statistics set forth the probability of one letter following another.

In the case of the example of stability, we known that as the metacentric height becomes smaller, instability will be greater. The amount of proximity between the metacenter and the center of gravity that can be tolerated is determined by the particular conditions of use, and, that in all applications there is a value beyond which the instability would be so great that the particular object would be totally unsuitable for the purpose. Thus, the criterion value for N would be set at that value beyond which the particular shape would be unsuitable.

The experience in this example will be the probability of predicting the stability and hence the length of the metacentric height on the basis of prior stable shapes and past experience with the fact that a shape is usually acceptable following these same prior decisions, independently of the circumstances of the particular shape under study. From past experience with shape stability, groups of conditions relating to shapes in general, that tend to predict acceptability or non-acceptability are established as experience. A prediction that a shape will be stable and hence that the metacentric height will be greater than the decision criterion N is indicated from experience with shapes and materials and other measurements performed on a particular shape. Such measurements might be, for example, the contours of the internal and external surfaces of the shape, the mass distributions of the shape, or the relationship between the maximum and minimum dimensions of the shape, the density of the shape, and the density of the fluid in which the shape will be immersed.

Along the same line, returning to the character recognition problem, as the line becomes longer, the particular character being studied is recognized as being a D in contrast to an O. Here, the degree of line length that should be allowed before calling an O a D is determined by the particular writing or printing being analyzed. It will be apparent in this problem that there is always a point or discrete segment in the O vertical line where it begins to become a D in accordance with the peculiarities of the particular printing or writing being handled. It will be seen that the learning function of this machine will bring this region where the actual distinguishing feature lies into shape focus, whereas in the previous techniques employed in the art, the overall length of the line was considered and the ever existing measuring accuracy tolerance of the machine involved is applied always to the whole instead of to the part where the change is taking place.

In each of these cases in accordance with the invention, the parameter value that is sensed is investigated to determine whether or not the magnitude satisfies a recognition criterion set up in element 3A of FIG. 1 and whether it is probable that the recognized information would follow from what is known as set up in element 3B of FIG. 1. A record is kept of the relationship of the probability with measurement in element 11 of FIG. 1, and a further record is kept of the actual decision made in comparison to the value that would have predicted it, so that the measurement criteria, the value of N, may be adjusted as experience is gained with the information being handled and the probability of predicting the decision is adjusted as further experience is gained. These adjustments are fed through channels 14 and 10 into the evaluation medium 3 of FIG. 1.

To return to our particular examples, in the case of the character recognition problem, in accordance with the invention, if language statistics probabilities indicated that in too many instances a letter recognized as a D should have been called an O, the value of N of the vertical line would be increased so that the writing or printing in having less perfectly formed O's would be read as the character intended by the writer. Similarly, in the case of the stability problem, in accordance with the invention, if probability indicated that shapes that should be acceptable under the proposed conditions of use, were not in fact found to be acceptable for reasons relating to other physical characteristics, then the value N would be decreased to a value where all shapes recognized as acceptable would in fact be acceptable.

While for the sake of simplicity, situations are being discussed as examples wherein only two dimensions or a few criteria are being considered so as to reduce the probability to a single factor, it will be apparent that the probability may be the result of a plurality of factors comprising every known influencing situation with weight being given by appropriate connection of the chains described in FIGS. 3, 4 and 5 in comparison to other factors, so that the overall probability may be based on relative importance of the individual influencing criteria. As we have mentioned, in the character recognition field, there exist what are known as context statistics which can be employed to measure the probability of occurrence of a certain letter based on the occurrence of a previous letter. The statistics can be compiled in many ways, some being more accurate in their predictions than others. The best known of these two, are digram statistics involving two letters and trigram statistics involving three letters. With the knowledge of two letters already present, the probability predicted by the trigram statistics is more reliable so that greater weight may be given to this probability in adjusting N. Where both types of statistics can be used it will be apparent in constructing the chains of FIGS. 3, 4 and 5, that it would be advantageous to give more weight, in other words, make a definite prediction on less information in the case of the use of a trigram statistical probability over a digram statistical probability.

Another valuable feature of this invention is that it will permit, in a recognition decision, the insertion of criteria based on information fragments wherein all the aspects of the problem are not known. An illustration of this may be seen in considering in more detail, the point involving density touched upon above in connection with stability. For example, in the shipbuilding art in evaluating stability of shapes, for all situations that could come to a designer's mind, a certain tolerance on stability, distance between centroid and center of gravity, or length of metacentric height is acceptable but the designer could conceive a situation where a shape could be made of a material that could be so dense that while otherwise acceptable, the density acting through the stability tolerance would have a moment such that recovery would take too long. While such a material may not be known to the designer or readily available in the literature, the very fact that this condition could exist would be a source of concern to one charged with the problem. In such a case, the principles of this invention would permit the insertion of criteria influencing the decision of the magnitude of N in the form of a negative limitation without the designer even knowing any more than the fact that if such a situation were to exist it would be undesirable. Referring to FIG. 1, the negative limitation is inserted into the evaluation medium 3 of FIG. 1, through the experience probability element 3B in terms of a negating condition if the density of the particular material being handled is greater than a specific value, thus, should a shape involving a particular material be evaluated and the density of that material turn out to cause the stability tolerance to be too large for this particular material, the correct decision would be made. It will be apparent that this would be a saving of machine hardware over considering density in every case and thereby taking up a substantial amount of machine and equipment to accomplish this if in the majority of cases density does not enter into the problem. Thus, with the principles of this invention, a not frequently occurring criterion can be inserted in the form of negative limitation rather than as an item to be considered in every decision.

In order to fully appreciate the advantages of the principles of this invention, and to enable one skilled in the art to have a specific illustration from which to begin in his application of the principles to more sophisticated machines, a detailed embodiment of the invention will be described in the following pages. While the character recognition embodiment sets forth the best mode that is contemplated for the application of the general principles of the invention it will be apparent to one skill in the art that the principles of the invention, in essence, relate to the use of previous decisions and experience based on fact in information processing machinery and as may be seen from the stability example already discussed, these principles go far beyond a particular field such as that of character recognition.

A detailed description of a learning character recognition machine operating on the principle of the lakes and bays type of analysis of the background of the letter is hereafter described in which the principles of this invention provide the machine with means for adjusting to the environment or in other words, "tuning-up" to the particular source of printed information. The machine will be able to recognize over a wider class of characters since it can shift the mean values of its parameters and thus encompass more of any unimodal distribution.

In the field of character recognition one approach to shape analysis has been to compare portions of the combined background and shape with certain well-known objects. This type of approach has been known as the lakes and bays approach. A character recognition machine of this type has been described in copending patent application Serial No. 631,765, filed December 31, 1956, titled, Character Recognition Machine and assigned to the assignee of this invention. In the character recognition system of the lakes and bays type as described in that application, a D is separated from an O by noting the presence or absence of a vertical line on the left side of the character in question. Since even the O may have a vertical line, the criterion used to distinguish these two characters is the length of the line. For purposes of this illustration the length of this line shall be symbolized as N. It will further be apparent that in the case of handwriting, the individual forming the character may make O's very similar to D's so that it will be extremely advantageous to focus on the point at which the distinguishing feature takes place.

The character recognition machine illustrating this invention involves a "tuning-up" process where the machine profits in its decision making from what it learns from the nature and characteristics of the information being processed. In this character recognition machine, the principles of the invention are applied in analyzing the mathematical topology of the characters. The machine is of the type in the above described application, which looks for a greater number of regional criteria in the characters and utilizes such criteria as lakes, bays, peninsulas, partial lakes, etc., in the background of the character. It looks for the relative position of the lakes and bays, the direction of the bay openings and the height and depth of the bays. It also studies the slope of the bay shores and the length of the shores. The machine employing the principles of this invention can make decisions during the scan of the character as to the apparent location and apparent type of region being studied and may modify the decisions based on further information as the scanning continues, and, as a result of its experience with the information being handled, it can adjust its own criteria as to what elements will result in a particular decision so as to improve its own accuracy and efficiency with a particular piece of writing or printed material. It not only recognizes the regional criteria but notes the relative time in which the regional criteria decision was made, a possibility of a plurality of the same regional criteria in a character are considered by the machine, and the machine distinguishes between hard to distinguish characters by context statistics, and employs the decision so made to adjust its own criteria so as to call the proper letter correctly based on past experience and to modify the context statistics where it is found that such a modification is desirable.

The improved character recognition machine embodying the principles of this invention, accomplishes the following items:

It provides means to distinguish characters by experience probabilities based upon context.

It provides means for continuously making and changing decisions as to recognition criteria present so that by the end of the scan of the character a decision is reached as to the character being scanned, and that decision is based upon comparison of all the criteria being present and on the probability based on experience of the proper prediction of the decision.

It provides an improved means for identifying patterns by analyzing the background region of the pattern.

It provides improved means for identifying patterns or characters by analyzing the nature of the bounded background region in it, and in other predetermined recognition criteria.

It provides means for distinguishing between standard characters having different inherent basic shapes or recognition criteria.

It provides means for identifying characters by detecting the presence of location of lakes and bays in the characters.

It provides means for identifying by the direction of opening of the bays in the characters.

It provides means for identifying characters by the direction and opening of bays, peninsulas, partial lakes and sloping shores and provides means for detecting the sequence in which recognition criteria are found during the scan of a character.

The character recognition machine embodying the principles of this invention further includes means for accomplishing the following specific operation.

It identifies characters by detecting the presence and location of lakes and bays in the characters.

It identifies characters by the direction of opening of the bays therein.

It detects peninsulas in a character and employs their existence as a recognition criterion.

It detects partial lakes in a character and employs the existence of a partial lake as a recognition criterion.

It detects the slope of shores in a character and employs the existence of a sloped shore as a recognition criterion.

It detects the sequence in which recognition criterion are found during the scan of a character.

It detects bays opening parallel to the direction of the scan slides of a character.

It detects the level of the background regions bounded by the line trace of the character.

It detects a minimum size background area and ascertains and compares the level of the background zone with the overall line trace of the character.

It compares a minimum size background area and its location with the direction of a line trace bounding the area in the character.

It arrives at partial decisions based on information present as scanning progresses and modifies these decisions as various recognition criteria are satisfied.

It uses the line trace of a character for separating east bays from west bays and north bays from south bays.

As a portion of its decision process, it ascertains that an originally indicated zone is divided into a first and second zone and a later portion of the scan selectively modifies the recognition criteria indicated by the originally indicated zone.

It modifies its recognition criteria when it is determined in later scanning of the character that the number of background zones for which the recognition criteria have been assigned is reduced.

It correctly detects recognition criteria which are not satisfied in the particular character due to a serif or imperfection in the line trace and if the imperfection is present in all letters it modifies the criteria to take the difference into consideration.

It detects bays in a character bounded by two perpendicular line traces; one of which is relatively parallel to the direction of the scan of the character.

It can ascertain when a bay, which is bounded on three sides by line traces is closed on the fourth side to produce a lake indication.

It is capable of ignoring imperfections in the characters of smaller than predetermined size and it ignores openings in the line trace bounding the background regions if smaller than predetermined size.

The machine senses the presence of a line trace or background region at each bit of the scanning operation of the character and stores the information representative of that presence and of a plurality of previously determined conditions according to a predetermined coding in a marking register containing a storage position corresponding to each bit of the scan. It records the information being scanned and the past history of the background at the particular level within the scan as the scanning progresses. The machine provides a look-ahead feature by the temporary assignment of information for a present or "now" piece of the scan for comparison with the background region determined by the scan in later or "next" bits of the particular scanning operation. The machine is capable of making partial decisions based on the presence of a minimum size background region and the past history to date in the scan of the background region of the character. The machine is capable of suspending its decision based upon the detection of an imperfection consisting of a projection to a white region of a piece of the line trace of the character of smaller than predetermined size pending the collection of further information.

The machine embodying the principles of this invention accomplishes all of the above features and with these the machine introduces a learning faculty wherein the individual criteria used for a decisioin are modified based upon the actual decision made and the probability that the decision made was the correct one, and altered based on the experience with previous decisions made so as to increase reliability and efficiency.

General description

In the following character recognition embodiment of the invention, the area around printed characters on a sheet is divided into a suitable number of elemental areas. The number of areas is fixed by the degree of resolution required and may be changed as the circumstances dictate. The character is scanned by a moving light source which applies light to one elemental area at a time. The light source is deflected vertically, in steps, and the light reflected from the paper at each elemental area or bit is analyzed as having been or not having been reflected from the black lines of the character. The results of each vertical scan are stored as coded numbers in a marking register which moves in synchronism with the scanning light beam.

A regional criteria rule circuit in the machine provides a means for modifying the coded numbers put into the marking register, dependent upon the apparent white region criteria in the characters being read. As a result of the logical coincidence of certain predetermined events involving the presence of a "now" white or black bit, the condition of the "next" white or black bit, the contents of the marking register positions corresponding to the "now" and "next" scan bit positions, and the state of temporary S triggers in the criteria rule circuit, memory C triggers may be turned ON or the contents of the marking register may be further modified. The condition of the memory C triggers are also dependent in certain instances on one another. A novel feature of the invention is that the criteria memory C triggers may be both turned ON and reset by certain particular conditions at any time during the scan. This action proceeds while the vertical scan progresses across a character, with the result that a unique configuration of the criteria memory C trigger states is obtained for each different character to be recognized. Thus, by the time a character has been completely scanned, a decision by a Christmas tree criteria decoder circuit dependent upon the states of the criteria memory C triggers will have been made as to the identity of the character.

Analysis of white regions—recognition criteria

One of the features of this machine is the use of mathematical topology in getting at the crux of the distinctive features. From this point of view, little attention is paid to the lines of the character as such, but the lines are only important insofar as they bound white regions. This embodiment of the subject alphanumeric character recognition system utilizes 27 different recognition criteria arbitrarily divided into 18 basic shapes, 5 special shapes, and 4 miscellaneous recognition criteria.

Recognition criteria—basic shapes

The 18 basic shapes include different variations of lakes, bays and peninsulas. A lake in a character is a white region completely surrounded by the black lines of the character. A bay is a white region within a character partially surrounded by the black lines of the character so as to have an opening out of the character. A peninsula is defined generally as a projection of a black line defined white region into a lake or bay of the character.

A bay may be further defined by its relative position in the character, and the direction of the opening out of the character. A lake is defined by its relative position in the character, and a peninsula by the direction of the projection and the type of basic shape into which it projects.

FIG. 7 shows an arbitrary character to illustrate both the relative positions of nine of the lakes and bay basic shapes and the direction of the opening out of the character of the bay basic shapes. The upper left white region in FIG. 7 is called a northwest bay (NWB) and is defined as a partially enclosed white region opening to the north (i.e., upward) and west (i.e., left). The white region in the lower left corner of FIG. 7 is called a southwest bay (SWB) and is defined as a partially enclosed white region opening to the south (i.e., downward) and west. Similarly, the white regions in the upper right and lower left hand corners of FIG. 7 are known respectively as a northeast bay (NEB) and a southeast bay (SEB).

In between the northwest bay (NWB) and the northeast bay (NEB) in FIG. 7 is a north bay (NB) which is defined as a bay having an opening to the north only and having its east shore line 70 at least substantially as long as its west shore line 71. In between the southwest bay (SWB) and the southeast bay (SEB) in FIG. 7 is a south bay (SB), which is defined as a bay having an opening to the south only and having its east shore line 72 at least substantially as long as its west shore line 73.

A middle west bay (MWB) is shown in FIG. 7 having an opening only to the west and thus having a north shore line 74 and a south shore line 75. By the nature of a middle west bay, it can only exist if there are no other lakes or bays above or below it having both a north and south shore line, as will be more fully described presently. A middle east bay (MEB) is shown having an opening to the east only, and can only exist if there are no other lakes and bays above or below it having both a north and south shore line. The ninth basic shape of FIG. 7 is a middle lake (ML) which is enclosed by black on all four sides and can only exist if there are no other lakes and bays above or below it having both a north and south shoreline.

In FIG. 8 are shown six more of the basic shapes found in characters, which include an upper west bay (UWB), a lower west bay (LWB), upper lake (UL), lower lake (LL), upper east bay (UEB), and lower east bay (LEB). The upper right hand white region is an upper east bay (UEB) and is defined as a bay opening to the east and having a lake or bay below it with both a north and a south shoreline. When the upper east bay (UEB) is detected, the bay or lake below it with a north and south shoreline has its designation changed from a "middle" to a "lower." Thus, in FIG. 8, a lower east bay (LEB) is shown below the upper east bay (UEB). This lower east bay may have been detected as a potential middle east bay, but since the scan of the character proceeds upward, as will be more fully described hereinafter, when the north shoreline 76 is detected, an upper east bay (UEB) is noted and the potential (MEB) below has its designation changed to a potential lower east bay (LEB). Therefore, by definition a lower east bay (LEB) is a bay opening only to the east and having a lake or a bay with a north and south shoreline above it. It can now be understood that the reason for requiring a north and south shoreline is so that a middle east bay (MEB) can exist below the northeast bay (NEB) (which has no north shoreline) as shown in FIG. 7 but cannot exist below an upper east bay (UEB).

Similarly, the upper left hand white region is an upper west bay (UWB), defined as a bay opening to the west and having a lake or bay below it with a north and a south shoreline. An upper lake (UL) is enclosed by black on all four sides and having a lake or bay below it with a north and a south shoreline.

A lower west bay is then defined as a bay open to the west and below either a UWB, UEB or UL. A lower east bay is defined as a bay open to the east and below either a UWB, UEB or UL. A lower lake is a lake below a UWB, UEB or UL.

The remaining three basic shapes are illustrated in FIG. 9. A character W is shown which has a black line defined white region 77 projecting into a north bay to illustrate a north peninsula in a north bay (Pen in NB) basic shape. Similarly, a character M is shown in FIG. 9 having a black line defined white region 78 projecting into a south bay to illustrate a south peninsula in a south bay (Pen in SB) basic shape. The character G in FIG. 9 illustrates a partial lower lake basic shape (PLL) which is defined as a white region completely closed at the west and on the lower east, but being below an opening on the upper east.

*Recognition criteria—special shapes*

Two of the special shapes are a deep west bay (D-WB) and a deep east bay (D-EB). A deep west bay (D-WB) is defined as a deeper than normal bay that is either a middle west bay (MWB), or upper west bay (UWB) having a predetermined minimum horizontal depth to be more fully described hereinafter. Similarly, a deep east bay (D-EB) is a deeper than normal bay that is either a middle east bay (MEB), or upper east bay (UEB) having a predetermined minimum horizontal depth.

A tall south west bay (T-SWB) is a taller than normal south west bay of a predetermined height.

FIG. 10 indicates the two other special shapes. The letter N in FIG. 10 has a south bay which has a sloped east shoreline 79 of a predetermined minimum length. This loped east shoreline in a south bay is a special shape. The letter D in FIG. 10 has a long black vertical line (LBVL) 80 that is defined as a special shape having a black line of a predetermined length and standing in a vertical position. This long black vertical line is an example of an order of magnitude determination the value (N) of which is subject to control through the principles of this invention.

*Recognition criteria—miscellaneous*

There are a number of miscellaneous recognition criteria, three of which are shown in FIG. 11. The type of W shown in FIG. 11 differs from that in FIG. 9 because it has two north bays (2-NB's). This is true because, by definition, a north bay (NB) basic shape requires that the east shoreline be at least substantially as high as the west shoreline. Thus, the W of FIG. 9 has only one north bay (NB). Since the projection 81 of the W of FIG. 11 is a tall one, two north bays are detected. This presence of a plurality of the same shape, two north bays (2-NB's) in this case is one miscellaneous recognition criteria. Similarly, the M of FIG. 11 includes two south bays (2-SB's) which is another special shape.

One of the features of this machine is that the potential recognition criteria are determined during the scan, and not at fixed times in the scan. As will be more fully described, the scan of characters proceeds upward and to the right. Thus, in the scan of the Q in FIG. 11, the lower lake basic shape will be detected before the upper lake basic shape. This recognition criteria then requires that a lower lake be detected before an upper lake and is abbreviated a LL:UL.

There are some printed characters that are difficult to differentiate: i.e., the numeral 1 (one) from the letter I. It has been found, in these "difficult to differentiate" situations, that the use of context statistics are helpful. As we have described, these statistics predict the next character. In the difference between a 1 (one) and the letter I, it is much more likely that the letter I would follow another letter, and that the numeral 1 (one) another number. The use of various applications of context statistics in miscellaneous recognition criteria will be described more fully hereinafter.

Positive recognition criteria in characters

It is now possible to understand how the Recognition Criteria may be used to recognize alphanumeric characters. FIG. 14 illustrates the different printed characters and the positive recognition criteria in the characters utilized in the preferred embodiment. The term "positive recognition criteria" is used herein to distinguish from a negative recognition criteria which means the absence of a particular recognition criteria. It will be shown presently, that characters are recognized not only because of the presence of particular positive recognition criteria but because of the absence of other particular recognition criteria.

It can be observed in FIG. 14 that some of the printed characters are shown as having more than one variation. In some cases the variation is due to an unusually large serif or serifs in the character such as, for instance, the serif 82 in one of the P's of FIG. 14. Wherever serifs will not effect the final recognition criteria, they have been ignored in this description. It is to be understood at this point that most of the printed characers in use today, even though of different type fonts, will have the recognition criteria that are shown in FIG. 14.

Looking at the character D 83 of FIG. 14, there are two positive recognition criteria listed therewith; a middle lake (ML) and a long black vertical line (LBVL). The character D 84 is shown with serifs 85 that extend so far to the left so as to appear as a middle west bay (MWB) to the recognition machine. It will presently be shown how both types of D characters 83 and 84 are recognized as the same character D.

Similarly, the character F 86 of FIG. 14 is shown as having a middle east bay (MEB) and a southeast bay (SEB) while the character F 87 has a serif 88 long enough so that a potential lower east bay appears between serif 88 and the line 89 of the character, which is enough to cause an upper east bay recognition criteria to appear between the line 89 and a line 90. Later in the scan, it will be determined that the lower east bay (LEB) is really a southeast bay (SEB), but this will have no effect on the upper east bay designation. Again, it will be shown presently how both characters 86 and 87 are recognized as the character F.

Characters which may appear differently in different fonts, due to other factors than long serifs are the characters M, Q, W, 3, 4, 7, and 9. Since the two types of M's and W's have been hereinbefore briefly noted in conjunction with the description of FIGS. 9 and 11, they will not be further described at this point.

The 3 character 91 differs from the 3 character 92 because it has an upper east bay (UEB). The differences between the variations in the 3's, 4's and 9's are evident from FIG. 14. The character Q has four basic variations due to the different position and length that the line 64 can take. The different recognition criteria resulting from the four different Q characters are evident from the study of FIG. 14.

Christmas tree block differentiation

In a general alphanumeric recognition system, it is obvious that characters may be distinguished from each other by the fact that no two characters will have the same combination of recognition criteria. FIGS. 13A and 13B illustrate a schematic Christmas tree flow diagram indicating the logical process by which the recognition criteria are utilized to determine the character being read, each of the different recognition criteria being shown as a block or part of a block. The recognition criteria are combined in some blocks in order to produce one operable Christmas tree block, but it will be obvious that other Christmas tree blocks could be designated to determine the combination of recognition criteria present in the characters being read. In FIGS. 13A and 13B, the lower right-hand exit lead of each recognition criteria block is a "yes" lead which indicates the presence of that particular recognition criteria in the character being analyzed, and the upper right-hand exit lead of each recognition criteria block is a "no" lead to indicate the absence of the particular recognition criteria. By the time the end of the character is reached, the "yes" and "no" conditions of the different recognition criteria blocks are already set up, and a path can be traced from the further-most left terminal 93 of FIG. 13A, through lead 94, towards the right through the blocks and the leads, corresponding to the presence or absence of the recognition criteria of the respective blocks, to one of the labelled terminals in order to determine which character has been read. While there may be different paths in the tree for the different versions of the characters and some of the characters with serifs, the outputs will be so connected that there will be only one output terminal representing each character.

In FIG. 13A, the lead 94 is connected to an ML or UL or LL block 95. Block 95 represents the presence of either a middle lake, upper lake or lower lake recognition criteria, via a character having any one or more of these recognition criteria present will appear on its "yes" lead 96. Those characters without any of these three lakes appear on a "no" lead 97 from block 95. The characters on the "yes" lead 96 are further separated from each other by the detection of a lower lake basic shape. The "yes" lead 96 (FIG. 13A) from the block 95, is connected to a lower lake regional criteria block 98. Characters having a lower lake (6, 8, B and one of the Q's) appear on the "yes" lead 99, and characters without the lower lake appear on the "no" lead 100.

To further separate the 6, 8, B and the Q having a lower lake, the presence of an upper east bay regional criteria is detected by connecting the "yes" lead 99 of the lower lake block 98 to an upper east bay block 101. Since a study of the characters shows that a character 6 is the only one of the four having an upper east bay, the character 6 appears on the "yes" lead 102 and is connected to a terminal representative of a 6. Thus, it has just been shown that a character 6 is recognized as such when a middle lake, upper lake or lower lake, and more specifically, a lower lake plus an upper east bay, is detected.

No other character is detected in FIGS. 13A and 13B by only positive recognition criteria. For example, a "no" lead 103 of the upper east bay block 101 represents the character 8, B, and the Q having a lower lake. The Q with the lower lake can be further separated from the 8 and B by detecting presence of the lower lake followed by upper lake (LL:UL) recognition criteria. This is accomplished by connecting the "no" lead 103 to an LL:UL block 104 upon the "yes" lead 105 of which appears a character Q. Lead 105 is also connected to the "yes" output of partial lower lake block 107, the "yes" output of a middle east bay or lower east bay block 108 (FIG. 13B) and the "no" output of a long black vertical line block 110, and to a terminal representing the character Q. Thus, if a path is made through the blocks to any one of blocks 104, 107, 108 or 110 and to lead 105, the character Q is recognized.

It is believed unnecessary to follow through a complete written description of how the rest of the characters of FIG. 14 are recognized. However, it will be a relatively simple matter to trace the selection of the characters which have not been described, through the Christmas tree network of FIGS. 13A and 13B. The actual physical structure for the Christmas tree will be described hereinafter.

Flow diagram—scanner

Referring now to FIG. 6, a flow diagram of the preferred embodiment of the invention is shown as basically consisting of scan, control and recognition circuits. The scan circuits include a cathode ray tube 111. A spot of light on the fluorescent screen of the cathode ray tube 111, produced by a beam therein, is focused by a lens system 112 onto a document 114 which contains the characters to be identified. The reflected light is collected by photo tubes 116 which produces an output signal proportional to the amount of light striking them. Since the light reflected from an inked or black area of the document 114 is less than that reflected from an uninked or white area, a smaller signal will be produced by the black area. The signal is fed via a lead 117 to an amplifier limiter unit 118 which amplifies it, but selects only the large signals, i.e., the white signals for transmissions via a sampled video lead 119 to a black-white "next" circuit 120. The black-white "next" circuit 120 can then make a determination if a white signal has been transmitted to it, and thus produce a signal on the white "next" lead $\overline{B}_N$, or if there was no white signal, producing a signal on the black "next" lead $B_N$. The leads B and $B_N$ are connected into a black-white determination cable 122.

The beam producing the spot of light may be moved stepwise vertically by a suitable vertical deflection generator 125 acting via leads 126 on vertical deflection plates 127. The beam may be moved stepwise horizontally by a horizontal deflection generator 128 acting via leads 129 on horizontal deflection plates 130. The vertical deflection generator is controlled via a lead 131 by a clock circuit 132 which is the master timer for the character recognition machine.

The vertical deflection generator 125 causes the beam to move vertically upward on the face of the scope in thirty-two discrete steps. Even though the presence of black or white is determined at each of the thirty-two discrete steps, only sixteen steps, or every other one of the thirty-two steps, is utilized in the recognition scheme because it has been found that the analysis of 16 bits per vertical sweep produces adequate recognition results. It may be understood, however, that more or less bits may be used without materially altering the invention. The beam is not moved continuously because of the problem of phosphor persistence of the spots of light on the cathode ray tube screen 111. An unblank circuit 133 is controlled by the clock circuit 132, via lead 131, and in turn is connected to the control grid of the cathode ray tube 111 via a lead 134 to permit the beam to place the spot of light on the cathode ray tube screen only during a portion of the time that the beam is at rest.

Before the white signal is transmitted via the sampled video lead 119 to the black-white "next" circuit 120, the black-white "next" determination is shifted via a pair of leads 135 to the black-white "now" circuit 136 producing a signal on a white "now" lead $\overline{B}$ if the determination shifted was white, and producing a signal on a black "now" lead B, if black was shifted. Leads B and $\overline{B}$ are also connected to the black-white determination cable 122. Then when the sampled video is transmitted over lead 119 to the black-white "next" circuit 120, cable 122 will contain both a black-white "next' and a black-white "now" determination. For reasons of convenience in detecting a minimum white area, to be described hereinafter, the $\overline{B}$ lead and the $\overline{B}_N$ lead are connected to an AND block 137, the output of which is a lead $\overline{B}$ and $\overline{B}_N$, which is also connected into black-white determination cable 122.

The scanning process normally starts with the spot at a lower left home position. Upon reaching the top of the vertical scan, the vertical deflection generator 125 resets the beam to the home position and via a lead 137a steps the horizontal deflection generator 128 to cause the next scan to begin one horizontal step to the right of the previous vertical scan. The vertical scanning progresses across the characters from left to right until there is a complete absence of black during one complete vertical scan, which indicates the end of the character being scanned.

*Marking register coding*

During the progress of the scanning and at the end of character, recognition circuits operate to detect the presence of the recognition criteria. These recognition circuits comprise recognition criteria rule circuits 138 (FIG. 6) and storage means. The storage means are shown in FIG. 6 as a marking register 140 and C trigger storage within the recognition criteria rule circuits. The marking register 140 stores binary coded numbers which are determined by the result of each "now" bit and its "next" bit, and the history of previous bits, as modified and controlled by the recognition criteria rule circuits 138. The C triggers within the recognition criteria rule circuits 138 are utilized to store the finding of the particular criteria of the recognition criteria which are present in the character being scanned.

The marking register 140 has 16 positions of storage corresponding to the 16 utilized bits of the vertical scan. Each position of storage is capable of storing any number from 0 to 7 in binary coded form. The binary coded numbers, stored in the marking register 140 are caused to step through the marking register 140 in synchronism with the scanning beam.

These binary coded numbers are assigned by the recognition criteria rules circuits 138 into the marking register 140 for each elemental area or bit according to a predetermined code. At the start of the scanning of a character, white bits are assigned the code number 0. Whenever a black "now" bit is detected, the coded number 1 is assigned. This is illustrated in FIG. 35 where Column (a) illustrates the black-white determinations made in a first vertical scan. All 16 bits are shown as white. Column (b) of FIG. 35 which illustrates the different coded numbers assigned to the different stages of the marking register indicates that coded 0's were assigned to all the 16 positions of the marking register to represent the 16 white bits in the vertical scan of Column (a).

The recognition machine operates to automatically indicate a white "now" determination at the beginning of each vertical scan, so that when the black-white "next" determination is made of the first or lowest bit in a vertical scan, a coded 0 will remain in the first stage of the marking register to indicate this white "now." In addition, the last coded number in Column (b) is the coded 0 in the first stage of the marking register when the sixteenth bit of Column (a) is read as a white "next" bit. Thus, the coded numbers assigned to the marking register at any time appear in FIGS. 35 through 38 to be offset one position downward in relation to the bits being sensed.

Column (c) illustrates the black-white determination made, in the same character, in a second vertical scan, and the assigned numbers therefore are illustrated in Column (d). The first, second and third bits from the bottom, which are indicated as white in Column (c), continue to have the coded number 0 assigned to them. It can be observed that the fourth and fifth bits from the bottom, which are illustrated as black in Column (c), have each been assigned the coded number 1 thereto in Column (d) to indicate this fact (i.e., assign a coded 1 for each black "now" bit).

All the coded numbers 2 to 7 are assigned for white bits according to the "vertical white zone" the bits are in, the "past history of black," the presence of a "minimum white height," and certain "particular conditions." The first three of these conditions will now be described briefly and a more detailed description of these three conditions and the particular conditions will be given hereinafter with the description of the recognition criteria rule circuits.

There are three possible "vertical white zones." In any vertical scan, the white bits above the first black bits crossed by the scan are in the first vertical white zone. In Column (c) of FIG. 35, the white sixth through sixteenth bits are vertically above the black fourth and fifth bits and thus are considered in the first vertical white zone. Column (e) of FIG. 36 illustrates the situation where the first vertical white zone is closed above by a second black crossing comprising the black ninth and tenth bits. The white eleventh through sixteenth bits above this second black crossing are then considered in the second vertical white zone. In Column (c) of FIG. 37, the thirteenth and fourteenth black bits are illustrative of a third black crossing in a scan and the white fifteenth and sixteenth bits above the third crossing are therefore in the third vertical white zone.

The "past history of black" refers to an examination as to whether there are any black bits to the left on the horizontal level of the bit being observed. This examination is necessary in the separation of east white regions from west white regions.

The "minimum white height" consists merely of the simultaneous presence of a white "now" and white "next" determination, signifying a region two white bits high.

The coded number 2 is assigned where the following conditions are met. There is no "past history of black" to the left, a "minimum white height" exists, and the bit being examined is in the first "vertical white zone." For example, in FIG. 35, when assigning a coded number to the marking register representative of the sixth bit from the bottom of Column (c), an indication will be available that the sixth bit is in the first vertical white zone. Not only is a black-white determination available on the sixth white bit of Column (c) (the "now" determination), but also a black-white determination of the seventh white bit of Column (c) is made (the "next" determination); the two white bits indicating a minimum white height. In addition, information is available that there is no history of black to the left of the sixth and seventh bits. This information is ascertained by the fact that coded number 0's were assigned in the marking register illustrated in Column (b) representative of the sixth "now" bit and the seventh "next" bit of the previous scan. Coded 0's to the left always indicate no history of black to the left. These three conditions are perceived by the recognition criteria rules circuit 138 causing a coded number 2 to be assigned in the marking register Column (d) in place of the "now" bit of Column (b). All the other bits in the scan of Column (c) will be assigned to coded number 2 for the same reason as that described for the sixth bit.

The coded number 3 is assigned where there is no past history of black to the left, a minimum white height exists, and the bit being examined is in the second vertical white zone. For example, FIG. 36, Column (e) shows a later vertical scan of the same character as that of FIG. 35. The eleventh bit, as the "now" determination and the twelfth bit, as the "next" determination are both white, and this fact is recognized as a minimum white height by the recognition criteria rule circuits, which also recognize that these bits are in the second vertical white zone. The fact that there is no history of black to the left is ascertained by the coded 2's assigned in marking register Column (d) of FIG. 35 representative of the eleventh "now" bit and the twelfth "next" bit of the previous scan. Coded 3's are assigned in Column (f) of FIG. 36 to the twelfth to fifteenth white bits of Column (e) for the same reasons described to the assignment of the eleventh bit of Column (e). It may be stated at this point, that any coded number assigned in a vertical scan to the marking register for a particular horizontal bit position, is recirculated in the succeeding vertical scans at the same horizontal position if there are no new coincidences of the conditions previously mentioned for assigning a new coded number. For example, FIG. 36, Column (e) illustrates the vertical scan immediately succeeding the vertical scan of Column (c) of FIG. 35. It can be observed that the bits of FIG. 36 Column (e) up to the eighth bit from the bottom are exactly like those of Column (c) of FIG. 35. Therefore, the coded numbers in Column (f) of FIG. 36 up to the eighth bit are exactly like those of Column (d) of FIG. 35.

One of the features of this invention is that a determination can be made of potential recognition criteria during any of the scans after the first vertical scan of the character. For example, coded number 0's in a particular bit arrangement may be a potential southwest bay. Coded number 3's in a particular arrangement may indicate a potential northwest or upper west bay. Coded number 2's in a certain arrangement may indicate a potential middle west bay, a lower west bay, or northwest bay. Enough information has now been described to understand what the recognition criteria circuits look for in recognizing west bays. In most of the bays and lakes utilized as recognition criteria, a minimum white region, two bits high by two bits wide, is required to produce the indication of the particular bay or lake. This minimum white region will hereinafter be referred to as a 2 x 2 white region. When a 3 "now" and a 3 "next" bit are sensed simultaneously with a white "now" and white "next" determination, a 2 x 2 white region is discerned. Coded 3's will now be assigned in this new scan for the white "now" determination and one bit later for the white "next" determination. For convenience of description, this condition is known as a 2 x 2 region of coded 3's, even though it may be understood that such a condition has no physical meaning as such. If the coded numbers of these two vertical scans were placed adjacent to each other, the adjacent minimum white height region of coded 3's would make a 2 x 2 region of coded 3's. Thus, the presence of a 2 x 2 region of coded 3's implied no history of black to the left, and a white region of a predetermined minimum dimension in the second vertical white zone. This minimum dimension has been selected after an intensive study of the alphanumeric characters to be recognized. A bay or a lake in the first vertical white zone may be a middle or lower bay or lake, while a bay or lake in the second vertical white zone may be an upper bay or lake. To recognize an upper west bay, in addition to the above implications, a requirement exists that the 2 x 2 region of coded 3's is blocked by black above and to the right.

As soon as the existence of these facts are recognized by recognition criteria rules circuits 138, and the primer triggers, a C trigger in the recognition criteria rule circuits will be operated to indicate this fact.

If the recognition criteria rules circuit indicates coded number 3's in a 2 high x 4 wide pattern with no black above but black to the right, a northwest bay indication will be made by the C trigger storage indicating a northwest bay. This will be described hereinafter in greater detail.

In the same way, a group of coded number 0's 2 high x 4 wide blocked by black from above and to the right cause the recognition criteria rules circuit 138 to produce a southwest bay indication in the C trigger storage.

A 2 x 2 region of coded number 2's blocked above by black produces a possible middle west bay indication in the C trigger storage. However, when either an upper west bay, upper lake, or upper east bay is recognized, the possible middle west bay indication is changed to a potential lower west bay indication. Then, if in the later vertical scan, it is determined that this region is blocked to the right or east by black, the potential lower west bay indication is recognized as a true lower west bay.

A northwest bay indication will also be obtained if instead of having a region of 2 high x 4 wide coded 3's, a region of 2 high x 4 wide coded 2's is detected along with the no black above and black to the right limitation previously described for the northwest bay.

*Assignment of coded numbers for bits with a past history of black to the left*

The nature of lakes, north bays, south bays and east bays is such that they require a past history of black to the left, and to aid in recognizing them, the coded numbers 4 through 7 are utilized. As hereinbefore described, a coded 0, 2 or 3 in the marking register indicates no past history of black to the left, and a coded 1 indicates a black "now" bit. The coded number 5 is assigned where a minimum white height exists, the bit being examined is in the first vertical white zone, and the bit has a past history of black to the left. The coded number 6 has the same requirements except that the bit being examined must be in the second vertical white zone rather than the first vertical white zone. A coded number 7 may be assigned where the conditions that exist are the same as for the assignment of coded 5's and 6's except that the bit examined is in the third vertical white zone.

For example, Column (*a*) of FIG. 37 illustrates the bits determined in some vertical scan of a character which may be one other than the one discussed for FIGS. 35 and 36. The first and second bits from the bottom are shown as white and have the number 0 assigned thereto in Column (*b*). All the other bits are black and therefore are represented by coded number 1's in Column (*b*). In Column (*c*), which represents the next vertical scan, the fifth and sixth, the eleventh and twelfth, and the fifteenth and sixteenth bits are white. At the time of the assignment of a coded number for the fifth bit, the information as to the fact that a coded 1 was assigned in the marking register for the fifth and sixth bits of the previous scan, indicates a past history of black to the left. The fact that the fifth "now" determination and the sixth "next" determination are both white indicates a minimum white height. The recognition criteria rule circuits will also be aware of the fact that the bit being examined is in the first vertical white zone. The combination of these factors causes a coded 5 to be written into the marking register as shown in Column (*d*) of FIG. 37. Coded 5's will continue to be written in the marking register for this white region until a black bit is recognized. Thus, the fifth and sixth bits will both have the coded number 5 assigned thereto.

In assigning a coded number for the eleventh bit of Column (*c*) of FIG. 37, the same factors exist as for the fifth bit except that this bit is in the second vertical white zone. This fact then causes a coded number 6 to be placed in the marking register for the eleventh and twelfth bits. In assigning a coded number for the fifteenth bit of Column (*c*) of FIG. 37, the same factors exist except that this bit is in the third vertical white zone and therefore a coded 7 is assigned to the marking register Column (*d*).

The presence of a 2 x 2 region of coded 6's implies a history of black to the left, and a white region to predetermined minimum dimensions in the second vertical white zone. To recognize a potential upper east bay, an additional requirement that the 2 x 2 region of coded 6's are blocked by black above is necessary. If a later vertical scan determines that the potential upper east bay is blocked by black to the right, the white region of coded 3's is now closed by black in all four directions and the potential upper east bay indication will be changed to an upper lake indication.

A 2 x 2 region of coded number 5's blocked above by black produces a possible middle east bay indication in the C triggers. When the possible middle east bay is subsequently blocked by black to the right, the indication is changed from a middle east bay to middle lake. However, if either an upper west bay, upper lake, or upper east bay is recognized, the possible middle east bay indication is changed to a potential lower east bay indication. Then, if in a later vertical scan it is determined that this region is blocked to the right by black, the potential lower east bay indication will be changed to a lower lake indication.

The only other coded number assigned to the marking register is a coded 4, the assignment of which is illustrated in FIG. 38. The coded number 4 is assigned where a minimum white height exists, there is a past history of black to the left, and there are no black bits below the bit being examined, i.e., the vertical scan has not yet entered the first vertical white zone. For example, Columns (*a*) and (*b*) of FIG. 38 are similar to Columns (*a*) and (*b*) of FIG. 37. In FIG. 38, however, Column (*c*), which represents the next vertical scan, contains all white bits except bits 7 through 10. Looking at Column (*c*), the following factors are present: both the third "now" bit and the fourth "next" bit are white, both are blocked by black to the left, and there are no black bits below the third bit in Column (*c*) (i.e., the first vertical white zone has not been entered). The simultaneous occurrence of all these factors represents a condition known as a single dropout to the south. As an indication of all these conditions, coded number 4's are assigned for the white bits. These 4's have been assigned in Column (*d*) representative of the bits of Column (*c*).

If the recognition criteria rule circuits indicate coded number 4's in a 4 high x 2 wide pattern, a potential southeast bay indication is stored in the C trigger storage. The reasons for the southeast bay being 4 high x 2 wide rather than 2 high x 4 wide like the southwest bay, will be described hereinafter. If a 2 x 2 region of coded 4's is blocked to the right by black, the recognition criteria rule circuits 138 produce a south bay indication in the C triggers.

In FIG. 38, the eleventh and twelfth bits are white, and since they have a past history of black to the left and they are in the first white vertical zone, the coded number 5's will be assigned thereto as previousy described. Since there are no black bits above the eleventh bit, at the end of the sixteenth bit an indication of a single dropout to the north will be produced in the recognition criteria rule circuits. In Column (*e*) a similar situation exists (that is, all white bits above the eleventh bit), and the same numbers are assigned in Column (*f*) as were assigned in Column (*d*). At the end of the sixteenth bit of Column (*e*) an indication of a double north dropout will be produced in the recognition criteria rule circuits. In the scan illustrated in Column (*g*) when assigning a coded number for the eleventh bit, the presence of a minimum white region and a double dropout will cause the recognition criteria rule circuit to assign a coded 7 to the marking register as shown in Column (*h*). Coded number 7's therefore may represent potential northeast bay. If a recognition criteria rule circuit indicates coded number 7's in a 4 high x 2 wide pattern with no black to the right, a potential northeast bay indication will be made by the C trigger storage. Since all that is necessary for a potential northeast bay indication is a 4 high x 2 wide white region having black to the left and below but not above and to the right, a northeast bay may also be indicated by 4 high x 2 wide pattern of 5's or 6's when there is a double dropout indication. Where at least a minimum white region of coded 7's is blocked to the right by black, a north bay indication is produced. A north bay indication may also be minimum white regions of coded 5's or 6's in conjunction with a double dropout and blocked by black to the right.

Just enough of the reasons for the assignment of the coded numbers and the analysis of the recognition criteria represented by the arrangement of the coded numbers has been described so as to allow the general description of the machine to be continued. Other reasons for assignment of coded numbers and the analysis of the coded numbers for the recognition criteria will be described hereinafter.

The end of character determination is made when there is a complete vertical scan having all white bits. At the end of character indication, a Christmas tree criteria decoder 146, which operates like the previously mentioned Christmas tree of FIGS. 13A and 13B analyzes the C triggers via leads 148, to determine the alphanumeric character on the document 114. This alphanumeric character may then be punched out on a punch or used by any other utilization means 150, as desired.

*Flow diagram—control and recognition circuits*

The method for detecting some of the recognition criteria from the binary coded numbers in the marking register 140 and the status of the memory C triggers, has been briefly described. The means for detecting the other recognition criteria will be described later, but the description of the flow diagram of the recognition and control circuits can now be continued.

In order to get the marking register 140 to move in synchronism with the scanning beam, the clock circuit 132 produces pulses alternately at a fixed frequency on a shift 1 line 152 and a shift 2 line 154, and feeds these pulses to register control circuits 156. A pulse appears on the shift 1 line 152 at the same time the vertical sweep generator 125 is pulsed to step the light beam. A pulse fed by the shift 2 line 154 to the register control circuits 156 controls the shifting of the marking register 140 by causing a pulse on a register shift line 158, which is connected to the marking register 140, to cause the contents of the marking register 140 to be shifted one position. The contents of the sixteenth stage of the marking register 140 are thereby shifted through three leads 160 to a sixteenth stage register read out trigger circuit 162 where they are temporarily stored, still in binary form. The contents of the fifteenth stage of the marking register are at the same time shifted through three leads 164 to a fifteenth stage register read out trigger circuit 166 for temporary storage. The information in the sixteenth stage register read out trigger circuit 162 is the "now" bit via the coded number in the marking register for the bit in the previous vertical scan at the horizontal level of the bit being analyzed for coded number assignment. The information in the fifteenth stage register read out trigger circuit 166 is the coded number representative of the "next" bit, via the bit above the "now" bit. Right after shifting, the first stage of the marking register will contain a coded zero until a coded number is written therein.

The "now" bits from the sixteenth stage register read out trigger 162 are applied through six leads 168 to a sixteenth stage "now" digit decode circuit 170 and through three of the six leads 168 to a digit encode circuit 172. The sixteenth stage "now" digit decode circuit 170 converts the binary coded "now" bit to an equivalent one out of eight coded "now" bit indication which is applied via one of eight leads 174 to the input of the recognition criteria rule circuits 138. In the one out of eight code, eight numbers may be indicated by having each number represented by a different one of eight leads being operative.

The "next" bits from the fifteenth stage register read out triggers 166 are applied through six leads 176 to a fifteenth stage "next" digit decode circuit 178, which converts a binary coded "next" bit to one out of eight coded "next" bit which is applied via one of eight "next" leads 180 to the input of the recognition criteria rule circuits 138.

The five black-white determination leads 122 are also connected to the input of the recognition criteria rule circuits 138. It is to be noted that the register shift lead 158 is also connected to the black-white "next" block 120 and it is a register shift signal on lead 158 that causes the shifting of the black-white "next" determination via leads 135 to the black-white "now" block 136.

The recognition criteria rule circuits 138 operate in such a manner that a one out of eight coded indication may appear at its output which is dependent upon the different combinations of one out of eight coded "next" bits from the fifteenth stage digit decode 178, the "now" bits from the sixteenth stage digit decode 170, the black-white "next" determination and the black-white "now" determination cable 122, and, internally, the status of memory C triggers. For instance, as previously described, if the one out of eight input from the sixteenth stage digit decode circuit 170 is a coded 1 and the one out of eight coded input from the fifteenth stage digit decode 178 is a coded 1, and there is a white "now" and white "next" indication in the black-white determination cable 122, a one out of eight coded 5 will appear at the output of the recognition criteria rule circuits 138. As another example, if the one out of eight input from the sixteenth stage digit decode circuit 170 is a coded 5 and the one out of eight coded input from the fifteenth stage digit decode 178 is a coded 5, and there is a white "now" and white "next" indication in the black-white determination cable 122, no one out of eight signals will appear at the output of the recognition criteria rule circuits 138, and the recognition criteria circuit will recognize that this is a minimum white region and also set up an indication in the memory C triggers of a potential middle east bay.

The output one out of eight coded indications are fed through one of seven leads 182 and applied to the digit encode circuits 172. There are only seven output leads 182 because there is no need for a coded 0 to be written in this manner into the marking register. The output one of eight indication in the digit encode circuits 172 is converted to a binary coded indication and fed via three leads 184 for writing into the first stage of the marking register 140. This new bit, in effect replaces the "now" bit in the marking register. Writing into the first stage of the marking register does not occur until a pulse appears on a write line 186 which is connected from the register control circuits 156 to the digit encode circuits 172. The write pulse from the register control circuit 156 is produced by a pulse on the shift 1 line 152 to the register control circuit 156 and therefore occurs between two register shift pulses. At the time of a write pulse, if there is no output one of eight indication on any of the leads 182, the binary coded "now" bit on the three leads 168 is transmitted through the digit encode circuit 172 through leads 184 to the first stage of the marking register 140. Immediately after the register write pulse, a register read out trigger reset pulse from register control circuits 156 over a lead TP, resets the register read out triggers 166 and 162.

The register read out trigger reset pulse is also used as a timing pulse in the recognition criteria rule circuits 138. Thus, the register read out trigger reset lead TP is connected to the recognition criteria rule circuits 138, and the timing pulse TP is used to get an instantaneous sampling of input conditions to the recognition criteria rule circuits 138, once, during the time a particular bit is being examined.

Assume for purposes of illustration, that an all white bit vertical scan has been completed, and that the next vertical scan will sense at least one black bit of the character. At this time, an end of vertical scan pulse is generated by the vertical sweep generator 125 and fed via a lead 190 to the black-white "next" block 120 where it acts to reset the black-white "next" circuit 120 so as to put it in the white "next" condition. The next register shift pulse on lead 158 causes the white "next" condition of the black-white "next" circuit 120 to be shifted to the black-white "now" circuit 136. Now when a sampled video pulse indicative of the black-white condition of the first bit in the vertical scan is fed via lead 119 to the black-white "next" block 120, a decision will be made in the recognition criteria rule circuits 138 based on the first bit in the vertical scan as the black-white "next" bit and a reset white ($\overline{B}$) signal from the black-white "now" block 136. Since the "now" bit will always be white at the start of a vertical scan, nothing but a zero will be written into the marking register at this time. This will be true because, as will be later more fully described, there is no output from the recognition criteria rule circuits to the digit encode circuits 172 for this input. Therefore, no coded number is transmitted via the digit encode circuit 172 to the first stage of the marking register 140. This is the reason that FIGS. 35 to 38 indicate that the first coded number in the marking register in each scan is a coded 0.

After the events for this first bit are completed, the beam is moved vertically upward to where the second scanned spot is to be sampled, and the contents of the marking register are shifted so that the second binary coded digit, then in the fifteenth stage, is shifted to the fifteenth stage register read out trigger 166 and the first binary coded digit (then in the sixteenth stage) is shifted to the sixteenth stage register read out trigger 162. Thus, now the first bit from the bottom is the "now" bit and the second bit from the bottom is the "next" bit. The coded number, if any, to be written into the marking register, is now the coded number shown as the second from the bottom in the coded number columns of FIGS. 35 to 38.

For example, assuming that the first bit is black, in the presence of black "now" on line B of the black-white determination cable 122 combined with the presence of a coded zero on the leads 174 and 180, are indicated on the input of the recognition criteria rule circuits 138. In this case, the one lead of each of the one out of eight outputs from the recognition criteria rule circuits 138 is effective to write a coded 1 and this coded number 1 is transmitted via the digit encode circuit 172 where it is converted to a binary coded number and written into the first stage of the marking register 140. It is understood, of course, that the next bit also may determine the number to be written into the marking register. This process continues in the same manner until the beam reaches the top of the scan when it is returned to the bottom, home position. It is to be recalled that the sixteenth bit from the bottom is never utilized as a "now" bit. At this point, the marking register had gone through a complete cycle and the first coded number is again in the sixteenth stage register read out triggers 162 in position to be read out. At this point, too, the vertical sweep generator 125 produces a pulse on an end of vertical scan line 190. This pulse is fed to a reset and end of character circuit 192. The reset and end of character circuit 192 contains three reset leads 194, which are connected to triggers in the recognition criteria rule circuits 138, for resetting at different times. The vertical scan will continue until a complete vertical scan has taken place without the sensing of a black area, indicating an end of character. An OK to punch signal then appears at the output of the end of character circuit 192 and is transmitted via an OK to punch lead 196 to the Christmas tree criteria decoded circuit 146. The character then represented by the Christmas tree criteria decoded is transmitted through leads 198 to the punch 150 where an indication is made of the character that has been sensed from the document 114.

One more all white vertical scan takes place during punch time, during which time the marking register is shifted through a complete cycle, but the register write pulse is blocked to prevent anything from being written in the marking register and thereby effecting a reset to coded zero of all the stages of the register. After punch time, a punch done lead 199 then transmits a pulse to the reset and end of character circuit which allows the recognition machine to start scanning the next character.

In order to more fully understand the inter-relation between the recognition criteria rule circuits 138, the marking register 140, and the memory C triggers, these circuits must be described in more detail and therefore a description will be given of FIGS. 12A through 12II which comprise the circuits of the preferred embodiment of this invention.

*Conventions employed*

Figure 41:
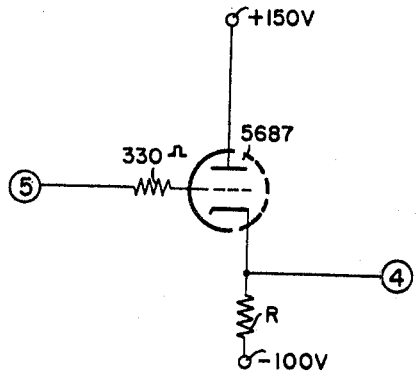
Figure 45:
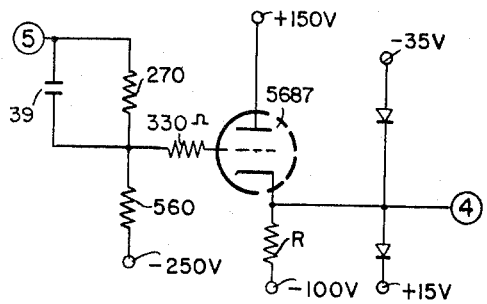
Figure 46:
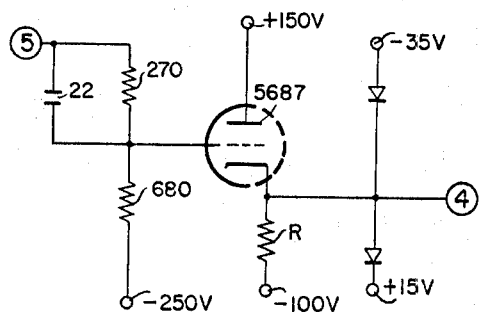
Figure 47:
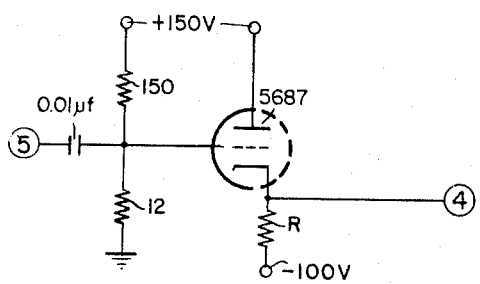
Figure 48:
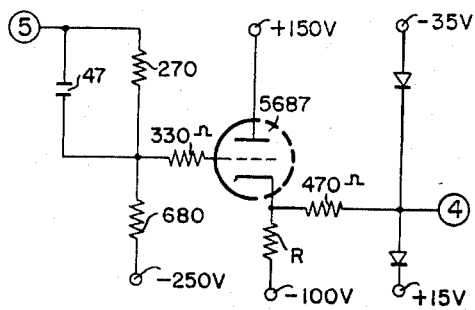
Figure 49:
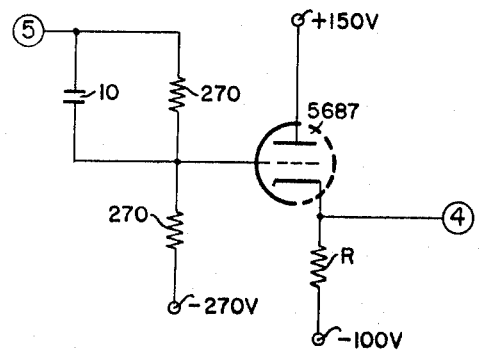

Referring to FIGS. 12A through 12II of the drawings, it will be seen that the different elements comprising the invention are represented by blocks, whose contents are illustrated in other figures of the drawings, the inputs and outputs to the blocks only being indicated in FIGS. 12A through 12II. Before proceeding with a description of the FIGS. 12A through 12II, a detailed description will be given of the respective elements such as the cathode follower, multigrid switch, inverter, AND circuit, OR circuit, clamping circuit, limited circuit, amplifier, photomultiplier, trigger, A.C. input circuit, A.C. AND circuit, A.C. OR circuit, free running multivibrator, counter, peaker, power inverter, core driver, and relay driver. The contents of the respective blocks and the respective block representations are shown in FIGS. 41 through 102. The position of terminals in the blocks of wiring diagrams FIGS. 12A to 12II correspond to the position of the terminals in the blocks of block symbol diagrams FIGS. 41 through 102.

Wherever shown in the drawings, unless otherwise indicated, the values for the various resistors, condensers, and inductances are in thousands of ohms, micromicrofarads, and millihenries respectively. For example, a resistor labelled 200, indicates a 200K (200,000) ohm resistor; a condenser labelled 100 indicates a 100 micromicrofarad condenser; and an inductance labelled 10 indicates a 10 millihenry inductance. Resistors labelled 100 and 1 meg. indicate respectively a 100 ohm and a 1,000,000 ohm Ω resistor. A condenser labelled 0.01 µf indicates a 0.01 microfarad condenser.

Hereinafter, in this specification where a conductor or circuit terminal, etc. is referred to as being shifted positive or negative in potential, this does not necessarily mean that the point in question is positive or negative in an absolute sense, but only more positive or more negative, relative to its previous state. This principle also applies to any description where positive and negative pulses are mentioned.

*Cathode follower—CF*

Referring to FIG. 41, there is illustrated a block symbol of a standard cathode follower and also the details of the circuit within the block. A cathode follower functions to produce an output signal having greater power than the input signal, but of the same polarity and substantially the same wave shape and with no appreciable time difference between the input signal and the output signal.

The cathode follower may employ, for example, a triode tube, the plate of which is directly connected to a positive supply voltage and the cathode of which is connected to an output terminal and via cathode circuit resistance to a negative voltage source. A positive signal applied to the grid of the tube causes an increased flow of current through the tube and cathode circuit resistance. Consequently, due to the increased current flow, a positive voltage shift occurs at the cathode. The voltage of the output signal at the output terminal remains substantially the same as that of the input signal, but due to the increased current flow the power of the signal is increased proportionately. Likewise, it is obvious that a negative shift on the grid will cause the voltage at the cathode to shift relatively negative.

The standard cathode follower (FIG. 41), which may comprise one triode of a dual triode 5687 type tube, has its grid connected via a 330 Ω resistor to an input terminal "5," and its plate directly connected to a +150 volt supply. The cathode, which is directly connected to an output terminal "4," is connected via a resistance R to a —100 volt supply.

It may be necessary in order to help speed output signal shifts and to permit faster discharging of line capacitance, to operate two or more cathode followers in parallel. This may be accomplished where there are no bleeder resistors in the grid circuit by commonly connecting the input terminals to a new common input terminal "5," and commonly connecting the output terminals to a new common output terminal "4." Where there is a bleeder network, in the grid circuit, all but one of the grid circuits are disconnected from their respective bleeder resistor junctions and then the disconnected ends are commonly connected to the bleeder resistor junction of the remaining connected grid circuit.

The standard cathode follower is hereinafter represented by a block containing the alphabetic character CF followed by a numerical designation 1, i.e., CF–1. Where standard cathode followers are connected in parallel, the number of cathode followers so connected is indicated by the number $n$ preceding the CF in the block diagram, for example, if there are two standard cathode followers connected in parallel, the block is identified by the symbol 2CF–1. Further, the value of the effective cathode resistance R which may vary depending on circuit requirements, is indicated in the upper right-hand corner of the block.

Cathode followers $n$ CF–2 through $n$ CF–9 are shown in FIGS. 42 through 49 respectively, and operate in basically the same manner as the standard cathode follower $n$ CF–1. The changes in the cathode followers CF–2 through CF–9 are obvious from the drawings and are well understood in the art. Consequently, no further description of these cathode followers is believed necessary.

*Multigrid switch—S*

Referring to FIG. 50, there is illustrated a block symbol of a standard multigrid switch and also the details of the circuit within the block.

A multigrid switch functions to produce a negative output signal when there is a coincidence of two positive input signals.

The multigrid switch may employ, for example, a multigrid tube, the plate of which is connected via plate circuit resistance to a positive supply voltage. The plate circuit resistance and positive supply voltage may sometimes be shown as part of another circuit. The input terminals of the switch are connected to two grids G1 and G2, and the output terminal is connected in the plate circuit. No current flow through the tube and plate circuit resistance until there is a coincidence of positive signals at both of the Grid G1 and G2. When this occurs, the voltage drop across the plate resistance due to the current flow, causes the voltage at the plate to shift relatively negative.

The standard multigrid switch which includes a 6BE6 type pentagrid tube, which has been illustrated with three grids, for simplicity, in view of the internal connections of the 6BE6 at pin 2 and pin 6, has its grid G1 connected through a 330 ohm resistor to the junction of a bleeder network consisting of an 82K ohm resistor connected to a −100 volt source, and a 27K ohm resistor connected to ground. The junction is also connected via a 0.01 microfarad condenser to an input terminal "9." Grid G2 is connected through a 330 ohm resistor to the junction of a bleeder network consisting of a 330K ohm resistor connected to a −100 volt source, and another 330K ohm resistor paralleled by a 15 micromicrofarad condenser connected to an input terminal "7."

The plate is connected directly to an output terminal "3," implying that the plate resistance and plate voltage are in the circuit to which the switch is to be connected. The screen grid SG, is connected via a 330 ohm resistor to the junction of a bleeder network consisting of a 22K ohm resistor connected to +150 volts, and a 39K ohm resistor connected to ground. The junction of the bleeder network is also connected through a 0.01 microfarad condenser to ground.

The standard multigrid switch is hereinafter represented by a block containing the alphabetic character S followed by a numerical designation 1, i.e., S–1.

Multigrid switches S–2 and S–3 are shown in FIGS. 51 and 52, respectively and operate in basically the same manner as the standard multigrid switch S–1. The changes in the multigrid switches S–2 and S–3 are obvious from the drawings and are well understood in the art. Consequently, no further description of these multigrid switches is believed necessary.

*Inverter—I*

Referring to FIG. 53, there is illustrated a block symbol of an inverter and also the details of the circuit within the block.

An inverter functions to produce an output signal having substantially the same waveshape as the input signal but of opposite polarity and with no appreciable time difference between the input signal and the output signal.

The inverter may employ, for example, a triode tube, the plate of which is connected via plate circuit resistance to a positive supply voltage. A positive signal applied to the grid of the tube causes an increased flow of current through the tube and plate circuit resistance. The voltage drop across the plate resistance due to the increased current causes the voltage at the plate to shift relatively negative. Consequently, since the output is taken from the plate circuit of the triode, a negative signal is produced in response to the positive input signal. Likewise, a negative shift on the grid will decrease the current through the plate resistance with a resulting positive potential at the plate. Consequently, a positive output signal is produced in response to the negative input signal.

The standard inverter (FIG. 53) which may comprise one triode of a dual triode 5965 type tube, has its grid connected via a 47 ohm resistor to an input terminal "5," and its cathode connected to ground. The plate is connected to an output terminal "7" and via a 20K ohm resistor to a +150 volt supply.

The standard inverter is hereinafter represented by a block containing the alphabetic character I followed by a numerical designation 1, i.e., I–1.

Inverters I–2 and I–3 are shown in FIGS. 54 and 55 and operate in basically the same manner as the standard inverter I–1. It is to be noted that inverter I–3 has its plate connected via a cathode follower CF–5 to the output terminal "7." It can thus be understood that inverter I–3 represents an inverter followed by a cathode follower. Since the cathode follower does not affect the logical operation of a circuit, but only the power of the signal, the combined unit may be used to reduce the size, and make for clearer description of the wiring diagram of FIGS. 12A to 12II.

*AND circuit —&*

Referring to FIG. 56, there is illustrated a block symbol of a standard diode AND circuit and also the details of the circuit within the block.

A positive diode AND circuit functions to produce a positive output signal only when there is a coincidence of positive signals at all of the input terminals thereof.

The positive diode AND circuit employs at least two diodes, the cathodes of which are connected to input terminals, while the anodes are connected to an output terminal and via a common resistor R to a positive voltage source. The input terminals are normally biased so that the diodes are in conductive states. It will be remembered that during conduction the resistance of a diode is negligible compared to that of the common resistor R. Consequently, the anodes are at potentials more nearly that of their respective cathodes. If a positive signal is applied to any of the input terminals, the diode to which the signal is applied is cut off as the cathode is now at a more positive potential than the corresponding anode. However, the remaining diode or diodes are still in a conductive state or states, so that the same amount of current flows through the common resistor R and the potential at the anode of the diode to which the positive input signal is applied, does not follow the change at the corresponding cathode but remains at relatively the same potential. Therefore, since the output terminal is connected to the anodes of the diodes, no change in potential is effectively passed to the output terminal when a positive signal is applied to any or all but one of the input terminals. If positive signals are coincidently applied to all of the input terminals, all of the diodes are cut off and the potential at the anodes starts to rise toward that of the positive voltage source connected at the other end of the common resistor R. When the potential reaches a value approximately that at the input terminals, all of the diodes start to conduct, whereupon the potential at the anodes stops rising and is maintained at approximately that at the input terminals. Therefore, since the output terminal is connected to the anodes of the diodes, the rise in potential at the anodes is effectively passed to the output terminal so that the potential at the output terminal is raised to approximately that existing at all of the input terminals. It should be noted at this point that the positive input signals are not necessarily applied simultaneously to the input terminals of the positive diode AND circuit. Hence, in instances where positive signals are applied to all but one of the input terminals thereof, the circuit is said to be conditioned so that when a positive signal is applied to the remaining input terminal there is a coincidence of positive input signals causing the production of a positive output signal in a manner as previously described.

The standard positive diode AND circuit of FIG. 56 comprises at least two diodes (only two of which are shown), the anodes of which are commonly connected through a resistor R to a source of +150 volts. The cathodes are shown connected to input terminals "1" and "2," and the commonly connected anodes are connected to an output terminal "7."

Referring now to FIG. 59, there is illustrated a block symbol of a standard negative diode AND circuit and also the details of the circuit within the block.

A negative diode AND circuit functions to produce a negative output signal only when there is a coincidence of negative signals at all of the input terminals thereof.

The negative diode AND circuit employs at least two diodes, the anodes of which are connected to input terminals, while the cathodes are connected to an output terminal and via a common resistor R to a negative voltage source. The input terminals are normally biased so that the diodes are in conductive states. Consequently, the cathodes are at potentials more nearly that of their respective anodes. If a negative signal is applied to any of the input terminals, the diode to which the signal is applied is cut off as the anode is now at a more negative potential than the corresponding cathode. However, the remaining diode or diodes are still in a conductive state or states so that the same amount of current flows through the common resistor R. Consequently, the potential at the cathode of the diode to which the negative input signal is applied, does not follow the change at the corresponding anode but remains at relatively the same potential and since the output terminal is connected to the cathodes of the diodes, no change in potential is effectively passed to the output terminal when a negative signal is applied to any but not all of the input terminals. If negative signals are coincidently applied to all of the input terminals, all of the diodes are cut off and the potential at the cathodes starts to fall toward that of the negative voltage source connected at the other end of the common resistor R. When the potential reaches the value approximately that at the input terminals, all of the diodes start to conduct whereupon the potential at the cathodes stops falling and is maintained at approximately that at the input terminals. Therefore, since the output terminal is connected to the cathodes of the diodes, the fall in potential at the cathodes is effectively passed to the output terminal so that the potential at the output terminal falls to approximately that existing at all of the input terminals. It should be noted at this point that the negative input signals are not necessarily applied simultaneously to the input terminals of the negative diode AND circuit. Hence, in instances where negative signals are applied to all but one of the input terminals thereof, the circuit is said to be conditioned so that when a negative signal is applied to the remaining input terminal, there is a coincidence of negative input signals causing the production of a negative output signal in a manner as previously described.

The standard negative diode AND circuit of FIG. 59 comprises at least two diodes (only two of which are shown), the cathodes of which are commonly connected through a resistor R to a source of −250 volts. The anodes are connected to input terminals "1" and "2," and the commonly connected cathodes are connected to an output terminal "7."

The standard positive diode AND circuit is hereinafter represented by a block symbol containing an ampersand (&) followed by a numerical designation 1, i.e., &–1, while the standard negative diode AND circuit is hereinafter represented by the designation −&−1. It is to be understood that a positive and negative diode AND circuit may have any number of input terminals so long as a diode is provided between each input terminal and the output terminal. If these are more than two inputs required, leads connected to these inputs are shown in the wiring diagram of FIGS. 12A to 12II, as entering the left side of the block. In both the positive and negative diode AND circuits, the value of the common resistor R, which may vary according to circuit requirements, is indicated in the upper right-hand corner of the block.

Positive diode AND circuits &–2 and &–3 are shown in FIGS. 57 and 58 and operate in basically the same manner as the standard positive AND circuit &–1 of FIG. 56. It is to be noted that positive diode AND circuit &–2 has its common anode connected via a CF–4 type cathode follower to the output terminal "7." It can thus be understood that positive AND circuit &–2 represents a positive diode AND circuit followed by a cathode follower. Since the cathode follower does not affect the logical operation of a circuit, but only the power of the signal, the combined unit may be used to reduce the size, and make for clearer description of the wiring diagrams of FIGS. 12A to 12II.

*OR circuit—OR*

Referring to FIG. 60, there is illustrated a block symbol of a standard positive diode OR circuit and also the details of the circuit within the block.

A positive diode OR circuit functions to isolate two or more positive input signals from each other and to produce a positive output signal in response to a positive input signal at any or all of the input terminals thereof.

The positive diode OR circuit employs at least two diodes, the anodes of which are connected to the input terminals thereof, while the cathodes are connected to the output terminal thereof and via a common resistor to a negative voltage source. The input terminals are normally biased so that the diodes are in conductive states. If a positive signal is applied to either or both of the input terminals, the potential at the anode or anodes to which the input signal or signals are applied, become more positive causing an increased flow of current through the common resistor. Consequently, since during conduction the resistance of a diode is negligible in comparison to that of the common resistor, the potential at the cathodes of those diodes to which the positive input signals are applied follows more nearly that of their respective anodes. Also, since the output terminal is connected to the cathodes of the diodes, the rise in potential at the cathodes is effectively applied to the output terminal so that the potential at the output terminal is raised to approximately that existing at any or all of the input terminals to which the positive input signals are applied.

The standard positive diode OR circuit of FIG. 60 comprises at least two diodes (only two of which are shown), the cathodes of which are commonly connected through a resistor R to a source of −250 volts. The cathodes are connected to input terminals "1" and "2," and the commonly connected anodes are connected to an output terminal "7."

The standard positive OR circuit is hereinafter represented by a block containing the alphabetic characters OR, followed by a numeric designation 1, i.e., OR–1. It is to be understood that a positive diode OR circuit may have any number of input terminals so long as a diode is provided between each input terminal and the output terminal. If there are more than two inputs required, leads connected to these inputs are shown in the wiring diagram of FIGS. 12A to 12II as entering the left side of the block. The value of the common anode register R, which may vary according to circuit requirements, is indicated in the upper right-hand corner of the block.

Positive diode OR circuit OR–2 is shown in FIG. 61 and operates in basically the same manner as the standard positive diode OR circuit OR–1. It is to be noted that positive diode OR circuit OR–2 has its common cathode connected via a CF–4 type cathode follower to the output terminal "7." It can thus be understood that positive diode OR circuit OR–2 represents a positive diode OR circuit followed by a cathode follower. Since the cathode follower does not affect the logical operation of a circuit, but only the power of the signal, the combined unit may be used to reduce the size, and make for clearer description of the wiring diagrams of FIGS. 12A to 12II. Referring now to FIG. 62, there is illustrated a block symbol of a standard triode OR circuit, and also the details of the circuit within the block.

A triode OR circuit functions to isolate two or more positive input signals from each other, and to produce a negative output signal in response to a positive input signal at any or all of the input terminals thereof.

The triode OR circuit employs at least two triodes, the grids of which are connected through circuitry to input terminals, while the plates are connected to an output terminal and via a common plate resistor to a positive voltage source. The grids are normally biased so that the triodes are in non-conductive states. If a positive signal is applied to either of the grids via the input terminals, the respective tube will conduct through the common plate resistor producing a voltage drop across said resistor which causes the potential at the plates and the output terminal to shift negative.

The standard triode OR circuit of FIG. 62 is hereinafter represented by a block symbol containing the alphabetic characters OR and a numerical designation 3, i.e., OR–3.

A.C. INPUT, A.C. AND and A.C. OR circuits

Referring to FIG. 63, there is illustrated a block symbol of an A.C. INPUT circuit, and also the details of the circuit within the block.

An A.C. INPUT circuit is used where it is desired to flip a trigger OFF by a positive shift and still be able to flip the trigger back ON with another pulse even though the positive shift is still applied to the A.C. INPUT circuit.

In a resistance capacitance differentiating circuit, the resistance and capacitance are connected to act as a voltage divider network, and thus the portion of the applied voltage which does not appear across the capacitor, will appear across the resistor. The time constant of the circuit is made short relative to the duration of the applied pulse in order that the capacitor will become charged in a small fraction of the pulse duration. Thus at the first instant, all the voltage drop is across the resistor, but in a very short time the capacitor is charged up and therefore, the voltage across the resistor and at the output of the A.C. INPUT circuit fall off very rapidly.

The output of the A.C. INPUT circuit is thus a very sharp pulse that is usually fed to a trigger to turn it OFF. Since the voltage at the output of the A.C. INPUT circuit does not remain positive, further pulses fed to the input of the trigger can turn it ON even though the input pulse to the input circuit remains positive.

Thus, the standard A.C. INPUT circuit of FIG. 63 has an input terminal "2" connected via an RC differentiating network consisting of a 220 micromicrofarad condenser in series with a 10K ohm resistor to a source of −35 volts. The junction between the resistor and condenser is connected to the anode of a diode, the cathode of which is connected to the output terminal "7."

The A.C. INPUT circuit is hereinafter represented by a block symbol containing the alphabetic characters A.C. INPUT.

Referring to FIG. 64, there is illustrated a block symbol of an A.C. AND circuit, and also the details of the circuit within the block. An A.C. AND circuit is used where it is desired to flip a trigger OFF by a coincidence of a plurality of positive shifts and still be able to flip the trigger back ON with another pulse even though the plurality of positive shifts is still applied to the A.C. AND circuit. The standard A.C. AND circuit of FIG. 64 is an &–3 type AND circuit feeding an A.C. INPUT circuit.

The A.C. AND circuit is hereinafter represented by a block symbol containing the characters A.C. &.

Referring to FIG. 65, there is illustrated a block symbol of an A.C. OR circuit, and also the details of the circuit within the block. An A.C. OR circuit is used where it is desired to flip a trigger OFF by any one or more of a plurality of positive shifts and still be able to flip the trigger back ON with another pulse even though the one or more of the positive shifts is still applied to the A.C. OR circuit. The standard A.C. OR circuit of FIG. 65 is an OR–1 type OR circuit feeding an A.C. INPUT circuit.

The A.C. OR circuit is hereinafter represented by a block symbol containing the characters A.C. OR.

Clamping circuits—CL

Referring to FIG. 66, there is illustrated a block symbol of a positive clamp or clamping circuit, and also the details within the block of the components and their connections.

A positive clamping circuit is a circuit which functions to hold the negative amplitude extreme of input waveform to a fixed reference level of potential. A clamping circuit usually couples two units when it is desired that the signals at the plate circuit of a tube in a first unit be transmitted to the grid of a tube in a second unit, and vary from the fixed reference level.

The positive clamping circuit employs one or more diodes in conjunction with the ordinary resistance capacitance coupling circuit because in coupling between units, a coupling capacitor almost always must be used to keep the high positive D.C. plate potential of the first unit isolated from the grid of the second unit. The input signal of the positive clamping circuit is connected via the coupling capacitor to the cathode of a diode, the plate of which is connected to a D.C. reference level voltage. The output voltage is taken at the junction of the condenser and cathode. Any portion of the input signal more negative than the reference level will be shorted by the conduction of the diode, but the portions more positive than the reference level will be developed across a resistance shunting the diode. Thus any positive swing in the plate circuit of the previous unit is transmitted as a swing in the positive direction from the reference level.

The standard positive clamping circuit (FIG. 66) includes an input terminal "5" connected via a 0.1 microfarad condenser and a 470K ohm resistor to a supply of V volts. An output terminal "4" is connected to the junction of the 0.01 microfarad condenser and 470K ohm resistor, and the junction is also connected to the cathode of a diode which shunts the 470K ohm resistor.

Referring to FIG. 67, there is illustrated a block symbol of a negative clamping circuit.

A negative clamping circuit is a circuit which functions to hold the positive amplitude extreme of an input waveform to a fixed reference level of potentials. Thus, any negative swing in the plate circuit of a previous unit is transmitted by the negative clamping circuit as a swing in the negative direction from the reference level.

The negative clamping circuit employs the same components as the positive clamping circuit except that the connections to the diode or diodes are reversed.

The standard negative clamping circuit (FIG. 67) is similar to the standard positive clamping circuit (FIG. 66) except that the anode of the diode is connected to output terminal "4" and the cathode is connected to the supply of V volts.

It may be necessary, in order to help output signal shifts, to parallel two or more diodes of the clamp. Where this is done, the rest of the circuit remains unaffected.

The standard positive clamp is hereinafter represented by a block containing the alphabetic character CL followed by a numerical designation 1, i.e., CL-1, hereinafter represented by CL-1. Where diodes in a clamp are connected in parallel, the number of diodes so connected is indicated by the number symbolized $n$, preceding the CL in the block diagram, for example, if there are two diodes connected in parallel in a negative clamp, the block is identified by the symbol −2CL-1. Further, the value of the voltage to which the circuit is clamped, which may vary according to circuit requirements, is indicated in the upper right-hand corner of the block.

*Limiter circuits—LI*

Referring to FIG. 68, there is illustrated a block symbol of a limiter circuit, and also the details, within the block, of the components and their connections.

A limiter or clipper circuit is one which removes one extremity or the other of an input wave. A negative portion of the wave may be removed by cut-off limiting, and a positive portion of the wave may be removed by grid limiting. Both cut-off and grid limiting may be performed by one circuit.

Cut-off limiting makes use of the cut-off characteristics of a triode. With a given plate voltage, if the grid is made sufficiently negative with respect to the cathode, all electrons are repelled by it and are forced back to the cathode. No electrons reach the plate and so the plate current is zero. The smallest negative voltage between the grid and cathode which causes the tube to cease to conduct is called the cut-off bias. By clamping the lower level of an input waveform below the cut-off bias, only signals which are greater than the difference between the reference voltage and the cut-off bias will cause the triode to conduct. In this manner, these signals of larger amplitude are selected for transmission through the circuit.

This particular circuit also acts as a grid limiter circuit because it is adapted to remove the positive extremity of the input waveform and this provides for the pulses that pass through to be of no greater than a predetermined amplitude. When the signal at the grid is of a positive potential greater than the potential at the cathode, the resulting grid current causes a drop across the 330 ohm grid resistor and the 470K ohm resistor of the clamp in a direction which tends to counter-balance the positive swing, and the grid therefore will not go materially above the voltage of the cathode. Therefore, the voltage swings at plate will not go negative by more than a predetermined amount.

Referring now to FIG. 68, there is illustrated a standard limiter comprising a clamp and one triode of a 12AU7 type dual triode. The plate of the triode is connected via an 8.2K ohm resistor and a 10K ohm resistor to a source of +330 volts. The junction of the 8.2K ohm resistor and 10K ohm resistor is connected via a 2 micromicrofarad condenser to ground. The plate is also connected directly to an output terminal "7." The cathode is connected via a 560 ohm resistor shunted by a 10 micromicrofarad condenser to ground. The grid is connected via a 330 ohm resistor and a 2CL-1 positive clamp to an input terminal "5." The positive clamp has its reference voltage fixed at −60 volts. Since the cut-off potential of the triode is approximately −15 volts, a signal of greater than +45 volts is required in order to bring the grid above the cut-off. The signals of less than +45 volts will not be transmitted through the standard limiter.

The standard limiter circuit is hereinafter represented by a block containing the alphabetic characters LI followed by a numerical designation 1, i.e., LI-1.

*Amplifier—A*

Referring now to FIG. 69, there is illustrated a block symbol of an amplifier, and also the details of the circuit within the block.

An amplifier is a device consisting of one or more vacuum tubes and associated circuits, employed to increase the magnitude of a signal.

The well known inherent characteristics of certain vacuum tubes cause an input signal, applied to the grid, to produce a signal of greater magnitude (i.e., to be amplified) at the plate. The amplified signal may, when desired, be fed through successive amplifier stages for further amplification.

Referring now to FIG. 69, there is illustrated a standard three stage amplifier. Each stage comprises one triode of a 12AU7 type dual triode. The plate of the first stage triode is connected via an 8.2K ohm resistor and a 15K ohm resistor to a source of +330 volts. The junction of the 8.2K ohm and 15K ohm resistors is connected via a 2 micromicrofarad condenser to ground. The cathode is connected via a 10K ohm gain control potentiometer in series with the parallel connected 560 ohm resistor and 10 micromicrofarad condenser to ground. The grid is connected via a 330 ohm resistor and a −CL-1 type negative clamp to an input terminal "5." A negative signal applied to input terminal "5" will be operated on by the clamp so as to cause it to vary negatively relative to ground. This negative signal is then transmitted via the 330 ohm resistor to the grid of the first stage where it is amplified and appears as a larger positive signal at the plate of the first stage. This positive signal is fed via a CL-1 positive clamp, which causes it to vary positively with respect to ground, to a second stage which is similar in every way to the first stage except that there is no 10K ohm gain potentiometer in the cathode circuit. The positive signal is amplified and inverted, and the now negative signal is fed through a −CL-1 type clamp and a third stage which is exactly the same as the second stage. The output of the standard three stage amplifier is then a positive signal taken off the plate of the third stage at an output terminal "7."

The standard amplifier is hereinafter represented by a block containing the alphabetic character A followed by a numerical designation 1, i.e., A-1.

*Photomultiplier—PM*

Referring to FIG. 70, there is illustrated a circle connected to a square, the combination comprising a block symbol of a photomultiplier. The details within the block of the components and their connections are also shown.

A photomultiplier, which includes a photomultiplier tube and associated circuitry, functions to produce an output signal proportional to the amount of light striking it.

The photomultiplier tube of the standard photomultiplier circuit contains a collector, a plurality of emitters having secondary emission characteristics, and a cathode made of material which emits a number of primary electrons proportional to the amount of light striking its surface. The primary electrons from the cathode are drawn to a first emitter, which is at a higher potential than the cathode and where, due to the secondary emission characteristics, secondary electrons are emitted. The secondary electrons and the reflected primary electrons are drawn to a second emitter where secondary emission also takes place. The process is repeated at successive anodes, each of which is at a higher potential than the preceding one. A collector then collects the electrons from the last emitter and feeds it to an output terminal. Since each electron may knock out five or more secondary electrons, and a large number of emitters are used, very high current amplification is obtainable.

The standard photomultiplier (FIG. 70) which includes a Dumont 6291 type photomultiplier tube has a collector C, a cathode K and nine emitters E. The collector C is directly connected to an output terminal "4" and via a 15K ohm resistor to ground. A source of —1000 volts is connected via a 10K ohm resistor to the cathode K, which is connected via a 0.001 microfarad condenser to ground. The cathode K is also connected via a bleeder network comprising an 82K ohm resistor, eight 100K ohm series connected resistors, and another 82K ohm resistor to ground. The first emitter is connected to the junction of the first 82K ohm resistor and its adjoining 1000K ohm resistor, and each succeeding emitter is connected so that there is one 100K ohm resistor between adjacent emitters. Thus, each emitter is at a higher potential than the preceding emitter.

The standard photomultiplier is hereinafter represented by a circle having a curved line cathode and a straight line collector which is connected to a block containing the alphabetic characters PM followed by a numerical designation 1, i.e., PM–1.

*Trigger—T*

Referring now to FIG. 71, there is illustrated a block symbol of a standard trigger and also the details of the circuit within the block.

A trigger, commonly known as the Eccles-Jordan trigger, functions as a storage or control device inasmuch as it is a bistable device, that is one that remains in either one of two stable states until it is forced or triggered by an input signal to assume the other state, each subsequent input signal being effective to turn the trigger to the opposite state.

The trigger may comprise a cross-coupled dual triode, that is, the plate of the right-hand tube is resistively coupled via a voltage divider network to the grid of the left-hand tube, while the plate of the left-hand tube is resistively coupled via a voltage divider network to the grid of the right-hand tube. Therefore, any changes in potential at the plates of the dual triode are coupled to the grids of the opposite tubes. One stable state of the trigger is termed the OFF state and exists when the right-hand tube is in a conductive state while the left-hand tube is in a non-conductive state. In this state, the plate of the right-hand tube is at a relatively negative potential while the plate of the left-hand is at a relatively positive potential. If the right-hand tube is triggered to a non-conductive state a positive shift of potential occurs at the plate thereof which is coupled via the voltage divider cross-coupling to the grid of the left-hand tube so that the left-hand tube is triggered to a conductive state with a resulting negative shift of potential occurring at the plate thereof. This is the other stable state of the trigger and is termed the ON state. The trigger may also be set to the ON state by triggering the left-hand tube to a conductive state with a resulting negative shift of potential occurring at the plate thereof, which is coupled via the voltage divider cross-coupling to the grid of the conducting right-hand tube so that the right-hand tube is triggered to a non-conductive state. In a similar manner, when the trigger is in the ON state, it may be reset back to the OFF state by triggering the right-hand tube to conduct or the left-hand tube to stop conducting.

The standard trigger (FIG. 71) may comprise a 5965 type dual triode having its right-hand plate connected via a voltage divider network comprising a 150K ohm resistor and a 300K ohm resistor to a —250 volt source. The left-hand plate is connected via a similar voltage divider comprising a 150K ohm resistor and a 300K ohm resistor through normally closed reset cam contacts to a —250 volt source. The junction of the 150K ohm resistor and the 300K ohm resistor in each voltage divider network is connected via a 300K ohm resistor to the respective grids of the dual triode. Additionally, a 39 micromicrofarad capacitor is connected in parallel with each of the 150K ohm resistors. Also, an input terminal "6" is connected to the left-hand junction while an input terminal "3" is connected to the right-hand junction. Each plate of the dual triode is connected via a 10K ohm resistor to a +150 volt source. Output terminal "7" is connected directly to the left-hand plate and output terminal "8" is connected directly to the right-hand plate.

The standard trigger is hereinafter represented by a block containing the alphabetic character T followed by a numerical designation 1, i.e., T–1. The trigger T–1 is never used directly, but rather is used with different input circuits of the types shown in the triggers T–2, T–3 and T–4 of FIGS. 72, 73 and 74 respectively. Trigger T–2 thus includes input terminals "6" and "3" respectively connected to the anodes of diodes, the cathodes of which are connected to the left and right-hand inputs respectively of a trigger T–1. The diodes are inserted in this manner to conduct when pulsed by a positive input, to effect a triggering of T–2 by positive input pulses only. Triggers triggered by positive pulses are hereinafter referred to as positive input triggers and have this fact indicated by a (+) indication in the block under the trigger designation, i.e., trigger T–2 has a (+) indication under the designation T–2. Trigger T–3 is similar to trigger T–2 except that the connections to the input diodes are reversed so that the diodes will conduct when pulsed by a negative input to effect a triggering of T–3 by negative input pulses only. A (—) designation under the designation T–3 indicates that trigger T–3 is a negative input trigger.

Trigger T–4 is similar to trigger T–3 except that its input terminal "6" is connected via a 270 micromicrofarad condenser to the cathode of the input diode, and it has an additional left-hand input terminal "5" connected via a 270 micromicrofarad condenser to the anode of another input diode, the cathode of which is connected to input terminal "6" of a trigger T–1. A negative shift at terminal "5" or "6" is integrated and appears as a negative pulse to turn OFF the trigger. A negative shift appearing at input terminal "3" will turn ON the trigger even if the negative potential is still applied to terminal "5". However, if input terminal "3" remains negative, a negative shift at input terminal "6" will not turn the trigger OFF. It thus becomes apparent that a condenser in the input circuit is provided to permit the trigger to change its state even while the potential which turned it to its present state is still being applied.

In all triggers, the opening of the reset cam contacts disconnects the path between a negative voltage and the right-hand grid causing a positive shift at the right-hand grid which rests the trigger OFF. This reset operation is performed when the machine is turned ON to place all the triggers in the OFF condition.

Triggers T–5 to T–9 are shown in FIGS. 75 to 79 respectively and operate in basically the same manner as the triggers hereinbefore described. The changes in the triggers T–5 to T–9 are obvious from the drawings and are well understood in the art. Consequently, no further description of these triggers is believed necessary.

Free-running multivibrator—MV

Referring to FIG. 80, there is illustrated a block symbol of a standard free-running multivibrator, and also the details of the circuit within the block.

A free-running multivibrator functions to produce nearly rectangular pulses of a specified (and sometimes adjustable) duration.

The free-running multivibrator resembles a standard trigger in that it has two states, but differs in that it oscillates at one frequency between the two states due to its own internal circuitry.

The free-running multivibrator may comprise a cross-coupled dual triode, that is, the plate of the right-hand tube is capacitively coupled to the grid of the left-hand tube, while the plate of the left-hand tube is capactively coupled to the grid of the right-hand tube. Resistors connected from the grid of each tube to ground in combination with the coupling condensers comprise an RC network which is used to control the time duration of the trigger in each state. When the left-hand tube is conducting, the coupling capacitor between the left-hand plate and the right-hand grid charges through the right-hand grid resistance causing the potential at the grid of the right-hand tube to rise toward a relatively positive value. At some positive value the right-hand tube begins to conduct and switching action takes place causing the left-hand tube to turn off. The frequency of the multivibrator may be vraied by simultaneously varying the grid resistance of each tube.

Thus the standard free-running multivibrator of FIG. 80 may comprise a 5965 type dual triode. Plate P1 of the left-hand triode is coupled via a 39 micromicrofarad condenser, in series with a 470 ohm resistor to the grid G2 of the right-hand triode, while plate P2 of the right-hand triode is coupled via a 39 micromicrofarad condenser, in series with a 470 ohm resistor to a grid G1 of the left-hand triode. Connected between ground and the junction of each 39 micromicrofarad coupling condenser and 470 ohm resistor is a 500K ohm potentiometer in series with a 39K ohm resistor. Each plate is connected through a 10K ohm resistor to a source of +150 volts, and the cathodes K1 and K2 are commonly connected to ground. The plate P2 of the right-hand tube is connected to a right-hand terminal "8." For the purpose of the invention, the frequency of the free-running multivibrator may be set to 100 k.c. by varying the two 500K ohm potentiometers.

The free-running multivibrator is hereinafter represented by a block symbol containing the alphabetic characters MV and a numeric designation 1, i.e., MV–1.

Single shot multivibrators—SS

Referring now to FIG. 81, there is illustrated a block symbol of a standard single shot multivibrator, the details of the circuit within the block, and a chart of the different values of resistance and capacitance in an RC network for the different time duration of the signal developed by the multivibrator.

A single shot multivibrator functions to produce positive and/or negative rectangular wave shaped signals of predetermined time duration.

The single shot multivibrator resembles the standard trigger in that it may be triggered to the ON state by an input signal, but differs therefrom in that it automatically returns to the OFF state after a predetermined period of time without requiring a subsequent input signal.

The single shot multivibrator may comprise a cross-coupled dual triode, that is, the plate of the left-hand tube is capacitively coupled via a voltage divider network to the grid of the right-hand tube, while the plate of the right-hand tube is resistively coupled to the grid of the left-hand tube. A capacitor bewteen the left-hand plate and the right-hand grid is connected through a resistor to a source of positive voltage and this resistor and condenser comprise an RC network that is used to control the time duration of the ON state of the single shot multivibrator. The grids of the dual triode are so biased that the single shot multivibrator is normally in the OFF state, that is, with the left-hand tube in its non-conductive state and the right-hand tube in a conductive state. If a negative shift of potential is applied via the input circuit to the grid of the right-hand tube, switching action occurs, as in the standard trigger, and the single shot multivibrator is set to the ON state, with a resulting negative shift of potential occurring at the plate of the left-hand tube, and a positive shift of potential occurring at the plate of the right-hand tube. The single shot multivibrator remains in the ON state for a period of time dependent upon the time constant of the RC network associated with the grid of the right-hand tube. The capacitance of the RC network, connected to the grid of the right-hand tube starts to charge through its associated resistance causing the potential at the grid of the right-hand tube to rise toward a relatively positive value. At a certain positive value the right-hand tube begins to conduct once more and switching action takes place causing the single shot multivibrator to be reset back to the OFF state. The time duration of the ON state of the single shot multivibrator can be varied by varying the values of the resistance and capacitance in the RC network connected to the grid of the right-hand tube.

The standard single shot multivibrator of FIG. 81 may comprise a 5687 type dual triode. Plate P1 of the left-hand triode is coupled via a condenser C in series with a 470 ohm resistor to the grid G2 of the right-hand triode, while plate P2 of the right-hand triode is coupled via a 100K ohm resistor, shunted by a 22 micromicrofarad condenser, in series with a 470 ohm resistor to a grid G1 of the left-hand triode. Connected between −100 volts and the junction of the 100K ohm resistor and 470 ohm resistor is a 100K ohm resistor. The junction between the condenser C and the 470 ohm resistor is connected via a 22 micromicrofarad condenser to an input terminal "3," and also via a resistor R to a source of +220 volts. Each plate is connected through a 4.7K ohm resistor to a source of +150 volts, and the cathodes K1 and K2 are commonly connected to ground. The plate P2 of the right-hand tube is connected to a right-hand output terminal "8," while the plate P1 is connected to an output terminal "7."

The single shot multivibrator is hereinafter represented by a block symbol containing the alphabetic characters SS and numeric designation 1, i.e., SS–1. The time duration of the ON state of single shot multivibrator SS–1 depends on the values of resistor R and condenser C. FIG. 81 contains a chart indicating the different values of resistor R and condenser C for particular time duration $t$. The time duration $t$ is indicated in the drawings at the lower left-hand corner of the single shot multivibrator blocks.

Single shot multivibrator SS–2 is shown in FIG. 82 and operates in basically the same manner as the single shot multivibrator hereinbefore described. The changes in single shot multivibrator SS–1 are obvious from the drawings and are well understood in the art. Consequently, no further description of this single shot multivibrator is believed necessary.

Binary counter—CTR

Referring now to FIG. 83, there is illustrated the block symbol of standard binary counters and also the details of the circuit within the block.

The binary counter may comprise one or more trigger stages, each of which have commonly connected inputs, and each of which reverses between its two stable states each time a new input signal is introduced. A single trigger so connected may thus act as a "2" counter, i.e., one that produces a carry pulse after two input pulses.

Since the right-hand output of a trigger goes positive when the trigger is ON, the presence of a positive potential on the right-hand plate of the trigger, and a negative potential on the left-hand plate of the trigger indicates that one pulse has been applied to the "2" counter. The right-hand plate is therefore labelled 1 to indicate that it is positive after one input pulse, while the left-hand plate is labelled $\bar{1}$ (not one) to indicate that it is negative after one input pulse. At the end of two pulses, the "2" counter returns to its initial state, emitting a carry pulse from is output terminal.

The binary "2" counter of FIG. 83 comprises a T–6 type negative input trigger having its two input terminals commonly connected to an input terminal "IN." The left-hand output terminal of the T–6 trigger is connected to a terminal $\bar{1}$ and the right-hand output terminal of the T–6 trigger is connected to the output terminal 1 and "OUT."

The standard binary "2" counter is hereinafter represented by a block containing the alphabetic characters CTR, preceded by a "2" and followed by a numerical designation 1, i.e., "2" CTR–1. The type of input pulse (+) or (−) necessary to operate the counter is shown in parentheses under the block label.

Binary "2" counters "2" CTR–2 and "2" CTR–3 are shown in FIGS. 84 and 85 respectively, and operate in basically the same manner as the standard binary "2" CTR–1. The binary "2" CTR–3 which is a counter based on a T–9 type trigger has an additional electronic reset terminal "RE" connected to the input terminal "4" of the trigger.

To obtain counts of greater than two binary "2" counters may be connected in cascade by connecting the output terminal of each stage to the input terminal of the succeeding stage. The counts which may be obtained by the counter can be recognized by the number in quotes preceding the alphabetic characters CTR in the block. At the end of two pulses, when the first stage goes from an ON, back to an OFF condition, the carry pulses from the first stage will cause the second stage to go ON. The right-hand plate of the second stage is labelled 2 to indicate that it is positive after two input pulses to the binary counter, and the left-hand plate of the second stage is labelled $\bar{2}$ to indicate that it is negative after two input pulses. On the third input pulse, the first stage is turned ON, and both output terminals 1 and 2 are positive. On the fourth input pulse, the first stage is turned OFF, which in turn, turns the second stage OFF creating a carry pulse. Where there is a third stage, it is turned ON, and its right-hand terminal will be positive. Now it is clear that a "4" binary counter emits a carry pulse after four input pulses and also indicates the number of input pulses, by the status of the output terminals of each stage. The number designating the right-hand output terminal of each stage may then be considered the weighted value of that stage. The weighted value of each stage in a binary counter is always twice as much as that of the previous stage. Thus, to determine the number of input pulses applied to a counter from the last time it was reset to zero, it is only necessary to add the weighted value of the stages in the ON condition.

The counter "4" CTR–1 (FIG. 86) comprises two cascaded "2" CTR–1's to provide weighted value indications up to the count of four and a carry pulse at the count of four. The counter "32" CTR–1 (FIG. 87) comprises five cascaded "2" CTR–1's to provide weighted value indications up to the count of thirty-two and a carry pulse at the count of thirty-two.

To obtain a carry pulse at a count other than that of the normal carry pulse from the last counter stage, it is possible to connect the input terminals of an AND circuit to the right-hand output terminals. The AND circuit will then only provide an output when all the triggers to which the AND circuit are connected are ON. This output will come at a time which can be determined by the sum of the weighted values of the stages connected to the AND circuit.

The counter "3" CTR–3 (FIG. 88) provides a carry pulse at the end of three input pulses and comprises two stages of cascaded "2" CTR–3 type counters, the input terminals of the first stage being connected to the counter input terminal "IN." The right-hand output terminals of the two stages having weighted values of 1, 2, are connected to the input terminals of an &–3 type AND circuit, the output terminal of which is connected to the counter output terminal "OUT." The reset terminals of all the stages are commonly connected to the counter electronic reset terminal labelled "RE."

The counter "4" CTR–3 (FIG. 89) provides a carry pulse at the end of four input pulses and comprises three stages of cascaded "2" CTR–3 type counters. The 4 weighted output lead of the third stage is connected to the counter output terminal "OUT."

Figure 90:
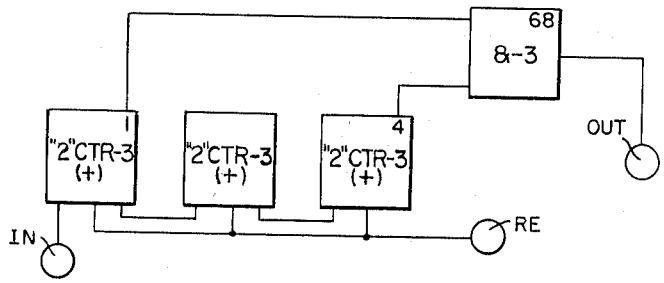
Figure 91:
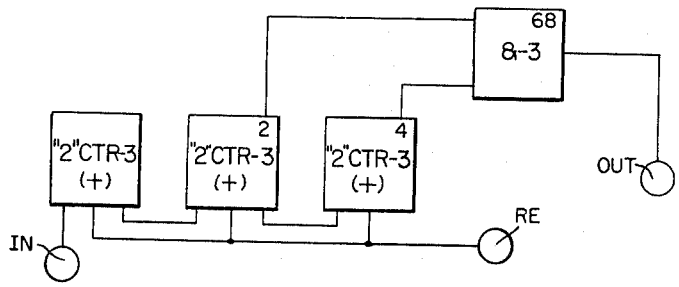
Figure 92:
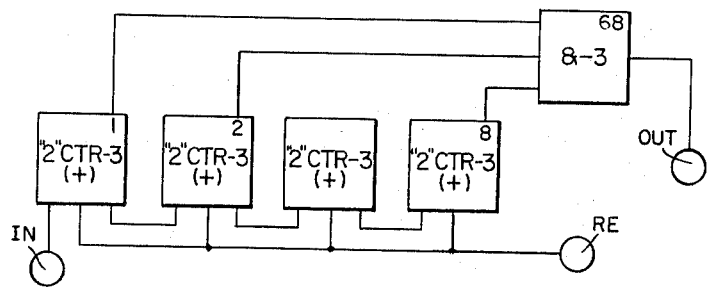

FIGS. 90, 91 and 92 illustrate respectively a "5" CTR–3 "6" CTR–3, and an "11" CTR–3. The input connections to the &–3 type AND circuits (the outputs of which are the output terminals "OUT") are similar to that of the "3" CTR–3 of FIG. 88 but are made to the properly weighted outputs of the counter stages. These connections are obvious from the drawings and no further description will be given.

*Peaker—PKR*

Referring to FIG. 93, there is illustrated a block symbol of a peaker, and also the details of the circuit within the block.

A peaker functions to produce an output pulse of very short duration and with an extremely sharp leading edge. The function performed by a peaker may be accomplished by a multitude of circuit arrangements.

One standard type of peaker utilizes a resistance-capacitance differentiator input feeding to what is effectively a power inverter. In a resistance-capacitance differentiator circuit, the resistance and capacitance are connected to act as a voltage divider network, and thus the portion of the applied voltage which does not appear across the capacitor, will appear across the resistor. The time constant of the circuit is made short relative to the duration of the applied pulse in order that the capacitor will become charged in a small fraction of the pulse duration. Thus at the first instant, all the voltage drop is across the resistor, but in a very short time the capacitor is charged up and therefore, the voltage across the resistor falls off very rapidly. The output at the resistor is thus a very sharp pulse that is fed to the power inverter which inverts the polarity of the pulse and gives it greater power.

The standard peaker (FIG. 93) includes a 5965 type dual triode. The left-hand grid G1 is connected to a junction on a bleeder network comprising a 390K ohm resistor connected to a −100 volt, and 75K ohm resistor connected to ground. The grid G1 is also connected via a 100 micromicrofarad condenser to an input terminal "9." The two plates P1 and P2 are commonly connected to an output terminal "3" and also via a 390 ohm resistor in series with a 560 ohm resistor to a +150 volt supply. The left-hand cathode K1 is connected via a 100K ohm resistor, a −100 volt supply, and also to the right-hand grid G2. The right-hand cathode K1 is connected directly to ground. Due to the bleeder network, the grid of the left-hand tube is kept at approximately −17 volts which is enough to keep the left-hand tube cut off. The cathode of the left-hand tube will therefore be at a negative potential because it is tied via the 100K ohm resistor to −100 volts. Since the cathode of the left-hand tube is connected to the grid of the right-hand tube, the right-hand grid is negative too, and the right-hand triode is cut off. The capacitance of the resistance-capacitance differentiator is the 100 micromicrofarad input capacitor, and the resistance includes the two cathode to grid resistances in series in the path from ground through the cathode K2, cathode K1, and grid G1. A positive going input pulse applied via the 100 micromicrofarad capacitor to the grid G1 will cause the left-hand tube to conduct. The cathode K1 follows the grid G1 and goes positive causing the grid G2, to which it is tied, to go positive. The right-hand tube then conducts and since the only external resistance in the circuit of the right-hand tube are the two low plate resistors, the right-hand tube conducts heavily. The 100 micromicrofarad condenser charges through a path from ground via the cathode K2 to grid G2, and via cathode K1 to grid G1. Since this is a low resistance path, the 100 micromicrofarad capacitance charges very rapidly until −17 volts appear at the right-hand plate at which point the tube has been cut off, as previously indicated. The effect is a very short pulse of high power in the plate circuit.

The standard peaker is hereinafter represented by a block containing the alphabetic characters PKR followed by a numerical designation 1, i.e., PKR–1.

*Power inverter—PW*

Referring to FIG. 94, there is illustrated a block symbol of a power inverter, and also the details of the circuit within the block.

A power inverter functions to produce an output signal having greater power than the input signal. The power inverter is no more than a special inverter inasmuch as the output signal is of opposite polarity and has substantially the same waveshape as the input signal.

A power inverter, however, generally employs a pentode tube and circuitry which provides a greater current flow than is normally obtained in an inverter with consequent increase in power.

The standard power inverter (FIG. 94), which includes a 6AQ5 type pentode tube, has a grounded cathode and a suppressor grid G2 directly connected to the cathode. The screen grid SG is connected via a 470 ohm resistor to a source of +150 volts. The plate, which is directly connected to an output terminal "3," is connected via a 3K ohm resistor to a +150 volts. The grid G1 is connected through a resistor to a −100 volt negative bias supply. Grid G1 is further coupled to the same resistor, in series with a 390K ohm resistor shunted by a 100 micromicrofarad condenser to an input terminal "9."

The standard power unit circuit is hereinafter represented by a block containing the alphabetic characters PW followed by a numerical designation 1, i.e., PW–1.

*Core driver—CD*

Referring now to FIG. 95, there is illustrated a block symbol of a standard core driver and also the details of the circuit within the block.

A core driver is a circuit which provides current to a core winding of sufficient magnitude to cause the core to assume a predetermined state, more fully described presently.

A standard core driver may comprise a pentode having its plate connected to an output terminal which is externally connected through a core winding or windings to a positive D.C. voltage source. The application of a positive pulse to the grid will cause the core driver tube to conduct through the external core winding.

The standard core driver (FIG. 95), which comprises a pentode 6AU6 type tube, has its cathode and suppressor grid commonly connected through a 560 ohm resistor to ground, its screen grid SG connected to a source of +150 volts, and its grid G1 connected via a 330 ohm resistor to an input terminal "5." The plate is directly connected to an output terminal "7."

The standard core driver is hereinafter represented by a block containing the alphabetic characters CD followed by a numerical designation 1, i.e., CD–1.

Core driver CD–2 is shown in FIG. 96 and operates in basically the same manner as the standard core driver CD–1. The changes in the core driver CD–2 are obvious from the drawings and are well understood in the art. Consequently, no further description of this core is believed necessary.

*Relay driver—RD*

Referring now to FIG. 97, there is illustrated a block symbol of a standard relay driver and also the details of the circuit within the block.

A relay driver is a circuit which provides the current required for energizing a relay upon the application of a positive input pulse.

A standard relay driver may comprise a triode having its cathode connected to ground and its plate connected to an output terminal which is externally connected through a relay to a positive D.C. voltage source. The application of a positive pulse to the grid will cause the relay driver tube to conduct through the external relay causing the energization thereof.

The standard relay driver (FIG. 97), which comprises one triode of a dual triode 5687 type tube, has its cathode connected to ground and its plate directly connected to an output terminal "4." The grid is connected via a 330 ohm grid resistor to a junction on a divider network comprising a 390K ohm resistor connected to a −100 volt supply and a 560K ohm resistor, shunted by a 22 micromicrofarad condenser, connected to an input terminal "8."

It may be necessary for current carrying reasons to operate two or more relay drivers in parallel. This may be accomplished by commonly connecting the plates and commonly connecting the cathodes. Each grid is then connected via its own 330 ohm grid resistor to a common point, and where there is a bleeder network input in the single relay driver, the common point is connected to the junction of the resistor in the bleeder network.

The standard relay driver is hereinafter represented by a block containing the alphabetic characters RD followed by a numerical designation 1, i.e., RD–1. Where relay drivers are connected in parallel, the number of relay drivers so connected is indicated by the number $n$ preceding the RD in the block diagram, for example, if there are two standard relay drivers connected in parallel, the block is identified by the symbol 2RD–1.

Relay driver $n$RD–2 is shown in FIG. 98 and operates in basically the same manner as the standard relay driver $n$RD–1. The changes in the relay driver $n$RD–2 are obvious from the drawings and are well understood in the art. Consequently, no further description of this relay driver is believed necessary.

*Deflection unit—DU, and*

*Deflection stage—DE*

Referring now to FIG. 99, there is illustrated a block diagram of a deflection unit containing deflection stage blocks and associated circuitry. FIG. 100 illustrates the standard deflection stage block, the details of the components and connections within the block, and a chart of the number of tubes and the value of cathode resistance for the different variations of the standard block.

A deflection unit is a circuit which may be utilized for deflecting the beam of the cathode ray tube, and functions to provide a control of the voltages at its two output terminals for use by a pair of cathode ray tube deflection plates.

The deflection unit consists of a series of deflection stages, each of which comprises at least one dual triode. The left-hand triode of a deflection stage is normally conducting and the right-hand triode is normally not conducting. The deflection stage can be energized so as to start the left-hand triode conducting and cut off the right-hand triode.

A deflection unit is comprised of a plurality of deflection stages, each of which can provide twice as much current as its previous stage. This permits the input of each stage to be connected to respective right-hand output terminals of a binary counter which, as has been previously described, have stages the outputs of which go positive according to their weighted values. Thus, as the counter is stepped by input pulses and produces voltage conditions at its outputs representative of the number of input pulses, the respective inputs of the deflection stages are energized so that an amount of current flows through the left-hand triode of the deflection stages proportional to the number of pulses applied to the counter. Thus, when the first counter stage produces an output, the first stage of the deflection unit provides a unit amount of current through the left-hand triode to cause a deflection of one unit. Then when the second counter stage is ON, the second stage of the deflection unit provides two units of current to cause a deflection of two units, etc.

The standard deflection stage (FIG. 100) which comprises a dual triode 5965 type tube, has its cathodes commonly connected via a cathode resistance R to a source of −250 volts. The left-hand grid G1 is connected via a 330 ohm resistor to the anode of a diode, the cathode of which is connected to an input terminal "5." The junction of the 330 ohm resistor and the diode is connected via a 10K ohm resistor to ground. The right-hand grid G2 is connected via a 330 ohm resistor to the junction of the resistors of a bleeder network comprising a source of −250 volts connected via a 270K ohm resistor and a 15K ohm resistor shunted by a 0.01 microfarad to ground. The left-hand plate P1 is directly connected to an output terminal "6" and the right-hand plate P2 is directly connected to an output terminal "7."

The standard deflection stage is hereinafter represented by a block containing the alphabetic characters DE followed by a numerical designation $n$, i.e., DE–$n$. The value of $n$ is the weighted values of the deflection stage. The value of the cathode resistance R for the different deflection stages are shown in the chart of FIG. 100. It is to be noted that as the weighted value $n$ of the deflection stage doubles the cathode resistance R approximately halves, providing double the current carrying capacity.

The standard deflection unit (FIG. 99) comprises five deflection stages with commonly connected left-hand output terminals and commonly connected right-hand output terminals. The commonly connected left-hand output of the deflection stages are connected through a 1500 ohm resistor to +250 volts, and the right-hand output of the deflection stages are commonly connected via a 1591 ohm resistor to the +250 volt source. The commonly connected left-hand outputs are also connected via two 10K ohm resistors in series to the commonly connected right-hand outputs. An output terminal "6" is connected to a tap on the 10K ohm resistor that is connected to the commonly connected left-hand terminals, and an output terminal "7" is connected to a tap on the 10K ohm resistor connected to the commonly connected right-hand output terminals. Initially, since all the right-hand triodes are conducting, and the left-hand triodes are not conducting, the right-hand plates are at a negative potential with respect to the left-hand plates and therefore, output terminal "7" of the deflection unit is negative with respect to the output terminal "6." As the left-hand triodes are caused to conduct by the operation of the counter stage, more and more current is caused to flow through the 1500 ohm resistor lowering the voltage at the commonly connected left-hand plates and the output terminal "6," and raising the voltage at the output terminal "7." Due to the nature of the binary counter action, it is obvious that the voltage at terminal "6" goes down in step-wise fashion while the voltage at output terminal "7" goes up in synchronism in step-wise fashion.

The standard deflection unit is hereinafter represented by a block containing the alphabetic characters DU followed by a numerical designation 32. This deflection unit is capable of producing a thirty-two step deflection of the cathode ray tube.

*Magnetic core shifting register—SR*

Referring to FIG. 102, there is illustrated a block symbol of a standard core shifting register and also the details of the circuit within the block.

A magnetic core shifting register functions to store a bit of binary information in each stage thereof and is provided with means for shifting the binary information from each stage to its succeeding stage when externally pulsed.

The magnetic core shifting register may employ a plurality of magnetic cores, each of which has a shift winding, an input winding, and an output winding. The cores, magnetizable to either of two stable states, have remanent flux either clockwise or counterclockwise within the cores. Ordinarily, the value of remanent flux in either direction, referred to as retentivity, is substantially equal. Remanent flux is established in one direction to represent a binary one and in the opposite direction to represent a binary zero. For the purposes of the present invention, a current pulse applied to a shift winding changes the core if in the One state to the Zero state; whereas a current pulse through the input winding, if sufficient in magnitude, changes the core if in the Zero state to the One state. The magnetic state of a core is transferred to the succeeding core by a transfer circuit which is energized when a core changes its magnetic state from One to Zero in response to a shift pulse. If a core is in the One state when a shift pulse is applied, the output winding serves to energize the transfer circuit which establishes the One state in the succeeding magnetic core; if a core is in the Zero state when a shift pulse is applied, the transfer circuit is not energized and the succeeding magnetic core remains in the Zero state.

Before describing a standard core shifting register, a description will be given of FIG. 101 which illustrates an idealized hysteresis loop of commercially obtainable magnetic core material. Points A and E are stable remanent states further adapted for representing binary information, and a core may be driven to either of these states by the application of a positive or negative magnetomotive force respectively. If the state of remanence of a core of such material is that indicated by the point A, application of a positive magnetomotive force greater than the coercive force causes it to traverse the hysteresis curve to point C, and upon relaxation of this positive force, revert to point A. Application of a negative magnetomotive force greater than the coercive force causes the curve to be traversed to point D, and when the force is terminated, traversed to point E. Similarly, when the remanence state of the core stands at point E, the application of a negative magnetomotive force causes the curve to be traversed to point D and returned to point E when the negative force is relaxed; while a positive force greater than the coercive force causes the traversal of the curve from point E to point C and return to point A when the positive force is terminated.

The standard magnetic core shift register of FIG. 102 may comprise sixteen magnetic core stages, only the first two and last two of which are shown. A write terminal is connected to the input of a CF–1 type core driver unit, the output of which is connected through an input winding I to a +150 volt source. A shift terminal is connected through the parallel combination of a 270K ohm resistor and a 1000 micromicrofarad condenser to the source of −30 volts. The shift terminal is also connected to the input of two CD–2 type core drivers, one of which is connected through the series connected shift windings S of the first eight core stages to +220 volts and the other of which is connected through series connected shift windings S of the last eight core stages to +220 volts. A circuit in each core stage is completed from ground through the output winding O to a transfer circuit $t$. The contents of transfer circuit $t$ is shown between the first and second core stages. The output winding O is connected to the anode of a diode D1, in the transfer circuit $t$, the cathode of which is connected to a junction point $b$, and through a 1000 micromicrofarad condenser to ground. The junction point $b$ is also connected through a 4.7K ohm resistor and a 10 millihenry inductance out of the transfer circuit to the input winding I of the succeeding stage to ground. There is a transfer circuit $t$ between each of the core stages.

The output winding O, the fifteenth stage, is also connected via a 1000 micromicrofarad condenser and a 10K ohm resistor to a source of −30 volts. An output terminal "15" is connected to the junction of the 1000 micromicrofarad condenser and 10K ohm resistor.

The output winding O of the last stage is connected to the anode of a diode, the cathode of which is connected to the parallel combination of a 4.7K ohm resistor and a 1000 micromicrofarad condenser to ground. The anode of the diode is also connected through a 1000 micromicrofarad condenser and a 10K ohm resistor to a source of −30 volts. An output terminal "16" is connected to the junction of the 1000 micromicrofarad condenser and the 10K ohm resistor.

With the state of remanence indicated at point A on the curve of FIG. 101 arbitrarily selected as representing a binary One and the state or remanence indicated at point E as a binary Zero application of a negative magnetomotive force, by pulsing a shifting winding S on the Stage 1 magnetic core, simultaneously causes a voltage to be induced on the output windings O of the Stage 1 core if it previously was in the One state; while a negligible voltage is induced in these output windings if the core was in the Zero state. If the Stage 1 core is in the One state when a negative magnetomotive force is applied, the resulting voltage induced on the output winding O establishes current flow through the diode D1 to charge the 1000 micromicrofarad condenser in the transfer circuit $t$ between Stage 1 and Stage 2. Simultaneously, the voltage on each of the output windings O establishes current flow through their respective diodes to charge the 1000 micromicrofarad condensers. As soon as the shift pulse terminates, the charge on the upper plate of the 1000 micromicrofarad condenser discharges through the 4.7K ohm resistor, the 10 millihenry inductance and the input winding I of the Stage 2 core to ground. The positive magnetomotive force established in the Stage 2 core by the discharge current through the Stage 2 input winding I changes the magnetic state of this core from that indicated at point E on the curve in FIG. 101 to that state indicated at point A. Thus, the binary One previously stored in the Stage 1 magnetic core is transferred to the Stage 2 magnetic core in response to the first shift pulse. Thus, it can be understood that each shift pulse applied to the shift terminal will shift all the bits of information to its succeeding stage, leaving the Stage 1 core in a Zero state and providing an output at terminals "15" and "16" which are representative of what the states of Stage 15 and Stage 16 respectively have been. WRITE pulse may be applied to the write terminal between shift pulses and thus provide the information for the Stage 1 magnetic core.

The standard magnetic core shift register is hereinafter represented by a block containing the alphabetic characters SR followed by a numerical designation 1, i.e., SR–1.

Scanner

A description will now be given of the preferred embodiment of the invention, the block circuitry being shown in FIGS. 12A to 12H, and the timing of the electronic signals in the block circuitry being shown in FIGS. 40A to 40I. A multivibrator 200 (FIG. 12B) is used as a parent source of square waves having a ten microsecond period. These square waves are transmitted through a SPACE multi-grid switch 202 and a PUNCH multi-grid switch 204 to the input of a "4" counter 206. Waveform (a) of FIGS. 40A to 40I shows the square waves at the input to "4" counter 206. The operation of the SPACE multi-grid switch 202 and the PUNCH multi-grid switch 204 will be described hereinafter.

Every fourth pulse into the "4" counter 206 produces a negative output shift, i.e., one every forty microseconds, at its output. The output which is shown as waveform (b) of FIGS. 40A to 40I is fed via a lead 208, a cathode follower 210, and a lead 211 to a "32" counter 212. The 1, 2, 4, 8 and 16 terminals of the "32" counter are each connected via cathode followers 214, 215, 216, 217 and 218, respectively, to the terminals 1, 2, 4, 8 and 16, respectively, of a DU–32 type vertical deflection unit 220. The two outputs of the vertical deflection unit 220 are connected via leads 222 and 224 to the upper and lower vertical deflection plates respectively of cathode ray tube 225 (FIG. 12A). As has been previously described, the combination of a "32" counter and a DU–32 type deflection unit acts to produce a 32 step waveform at the vertical deflection plates. The vertical carry pulse from the "32" counter 212 (FIG. 12B) is transmitted via a lead 226, a cathode follower 228, and a vertical carry lead 229 to a "32" counter 230. The "32" counter 230 is connected in a manner similar to the "32" counter 212 to a horizontal deflection unit 232, the two outputs of which are connected via leads 234 and 236 to the left and right horizontal deflection plates respectively of cathode ray tube 225 (FIG. 12A). The combination of the "32" counter 230 and the horizontal deflection unit 232 acts to produce a "32" step waveform to the horizontal deflection plates of the cathode ray tube 225. The height of the total vertical deflection is controlled by varying the 10K ohm taps (see FIG. 99) in the deflection unit 220 and the width of the total horizontal deflection is controlled by varying the 10K ohm taps in deflection unit 232.

The waveforms in FIGS. 40A to 40I are plotted against time from the start of the first vertical scan at the first bit from the bottom to the end of the thirty-second vertical scan at the last bit from the bottom. The bits have been identified by two numbers and a letter, the first number representing the horizontal position and the second number, the vertical position. Since there are thirty-two vertical bits, and only every other one, i.e., sixteen bits, have been found necessary for adequate recognition, the vertical bits have been numbered up to 16 and have been suffixed alternately by a letter $a$ or $b$. The suffix $a$ bits are the ones used in the recognition system, while the suffix $b$ bits are ignored, as will be presently described. For example, the 18 in the notation 18–16$a$ represents the eighteenth vertical column to the right of the first scan and the 16$a$ represents the thirty-first bit from the bottom, but the sixteenth bit used.

The cathode ray tube 225 (FIG. 12A) which is used as a source of the moving light spot, has its cathode 238 directly connected to a source of −2300 volts. The accelerating anodes 240 and 242 are connected to a source of +330 volts, and the focusing anode 244 is connected to a 10 megohm potentiometer, which in turn is connected between −2300 volts and ground. The control grid 246 is ordinarily at a more negative potential than the cathode 238. When the control grid 246 goes positive, however, the cathode ray tube 225 is unblanked to produce a light spot on its fluorescent screen. The negative output shift of the "4" counter 206 (FIG. 12B), is fed through the output lead 208 and the cathode follower 210 and lead 211 to the right-hand input of an unblank trigger 250. A positive shift appears on the right-hand output of trigger 250 (waveform (d) of FIGS. 40A to 40I) and is applied via lead 252 to the input of a power inverter 254 (FIG. 12A). The output of the power inverter is connected through a 0.015 microfarad condenser through an unblank lead 256 to the control grid 246.

Lead 256 is connected to the cathode of a diode 258, the anode of which is connected to a source of —2400 volts. A 1 megohm resistor is shunted across the diode 258. Ordinarily, —2400 volts is applied via the 1 megohm resistor directly to the control grid 246 to prevent the conduction of the cathode ray tube 225. However, when the output of the power inverter 254 goes positive, this positive pulse is applied via the 0.015 microfarad condenser and lead 256 to the control grid 246 to unblank the electron beam and cause a spot of light to fall on the fluorescent screen of the cathode ray tube 225. The discharge time of the 0.015 microfarad condenser and the 1 megohm resistor is relatively slow and so the 0.015 microfarad condenser does not discharge before the positive potential at the output of the power inverter 254 is removed. The same pulse from the "4" counter 206 (FIG. 12B) which turned on trigger 250 via lead 211 is applied to a single shot 260 having a 10 microsecond duration. The waveform (e) of FIGS. 40A through 40I appears at the output of single shot 260 and the negative shift at the end of 10 microseconds is applied to a single shot multivibrator 262 having a 5 microsecond duration positive output (i.e., waveform (f) of FIGS. 40A through 40I). Five microseconds after the input pulse, the output of single shot 262 goes negative (a total of 15 microseconds after the unblank trigger 250 is turned ON) and the negative pulse is fed via a lead 263 to turn OFF unblank trigger 250 and end the unblank pulse (waveform d). The 5 microsecond positive pulse is also applied via lead 263 and a cathode follower 264 to a sample lead 265. The use of the 5 microsecond sample pulse on lead 265 will be described hereinafter.

The unblank pulse permits a spot of light to appear on the surface of the cathode ray tube 225 (FIG. 12A). The spot of light is focused by a suitable lens 266 on to a document 268 upon which are shown a plurality of characters to be recognized. The particular embodiment shown in FIGS. 12A to 12II contemplates the use of a carriage 270 of a standard electric typewriter 272 to move the document. The carriage 270 is stationary for a period of thirty-two vertical sweeps at which time it is caused to space in a well-known manner. The height of the total sweep on the document may be adjusted in a manner previously described, so as to sweep an area as high as the height of the tallest character. (Where all the characters to be read are of the same height, the height is adjusted so that the character is thirteen bits high in the sixteen bit scan.) The width of the total sweep is adjusted so that the first vertical sweep after spacing will occur one horizontal position to the right of the last vertical sweep before the spacing, thus providing for a continuous series of vertical sweeps across the entire line. As will be shown presently, the determination of end of character and beginning of new character takes place independently of the spacing. Thus, it is obvious that the same results could be obtained by moving the document continuously and vertically sweeping in the same horizontal position over the moving document.

Figure 40A:
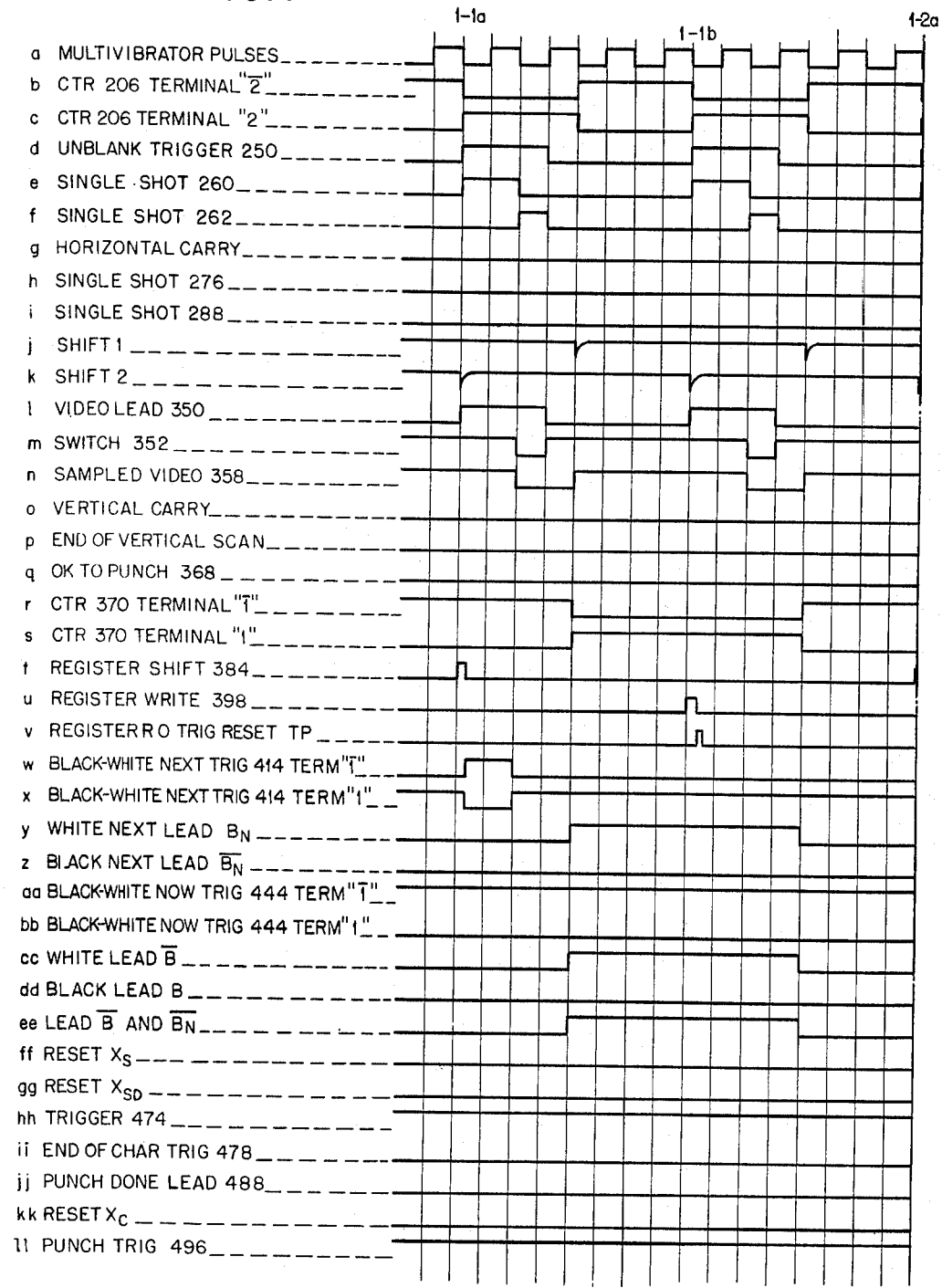
Figure 40B:
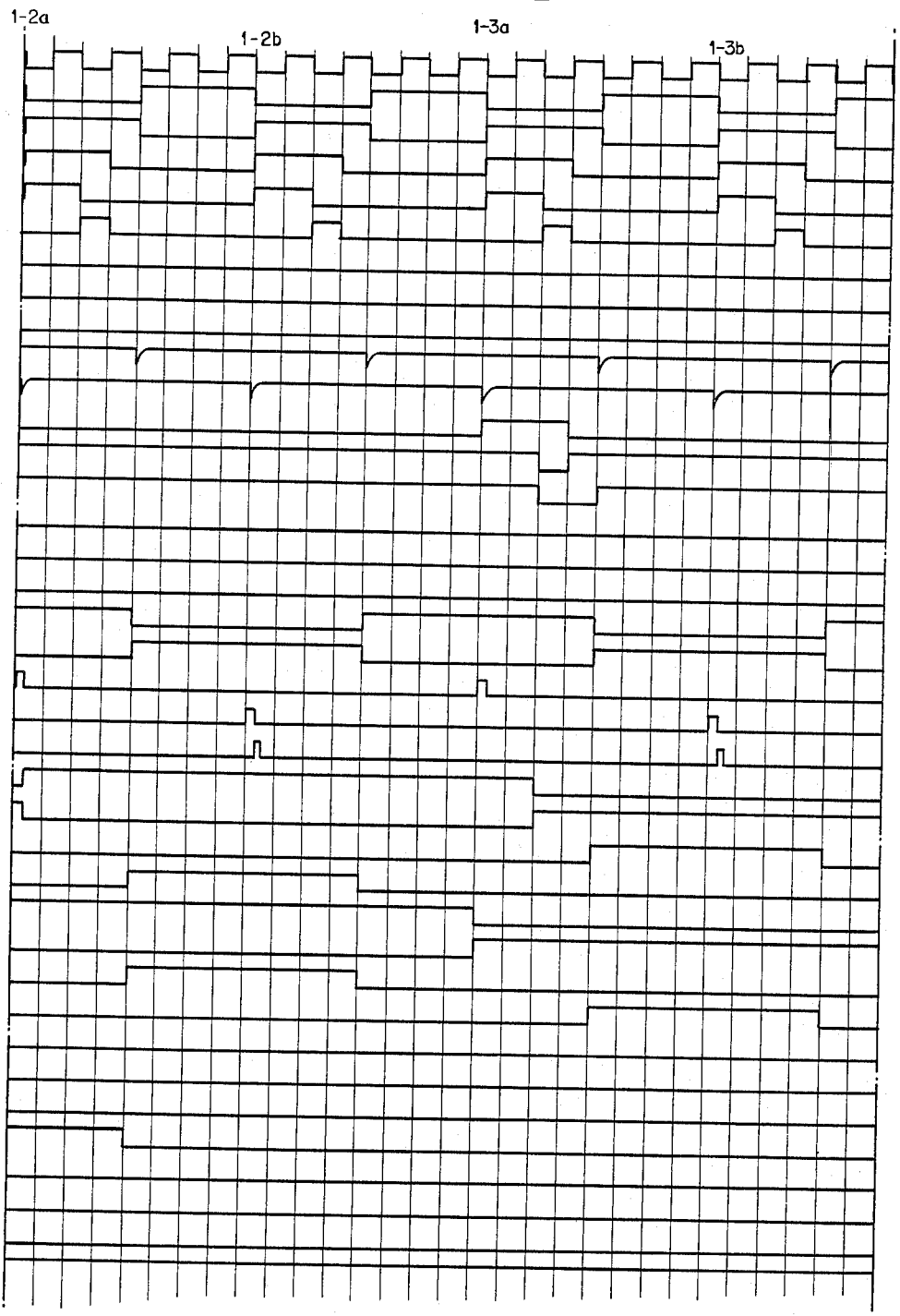
Figure 40C:
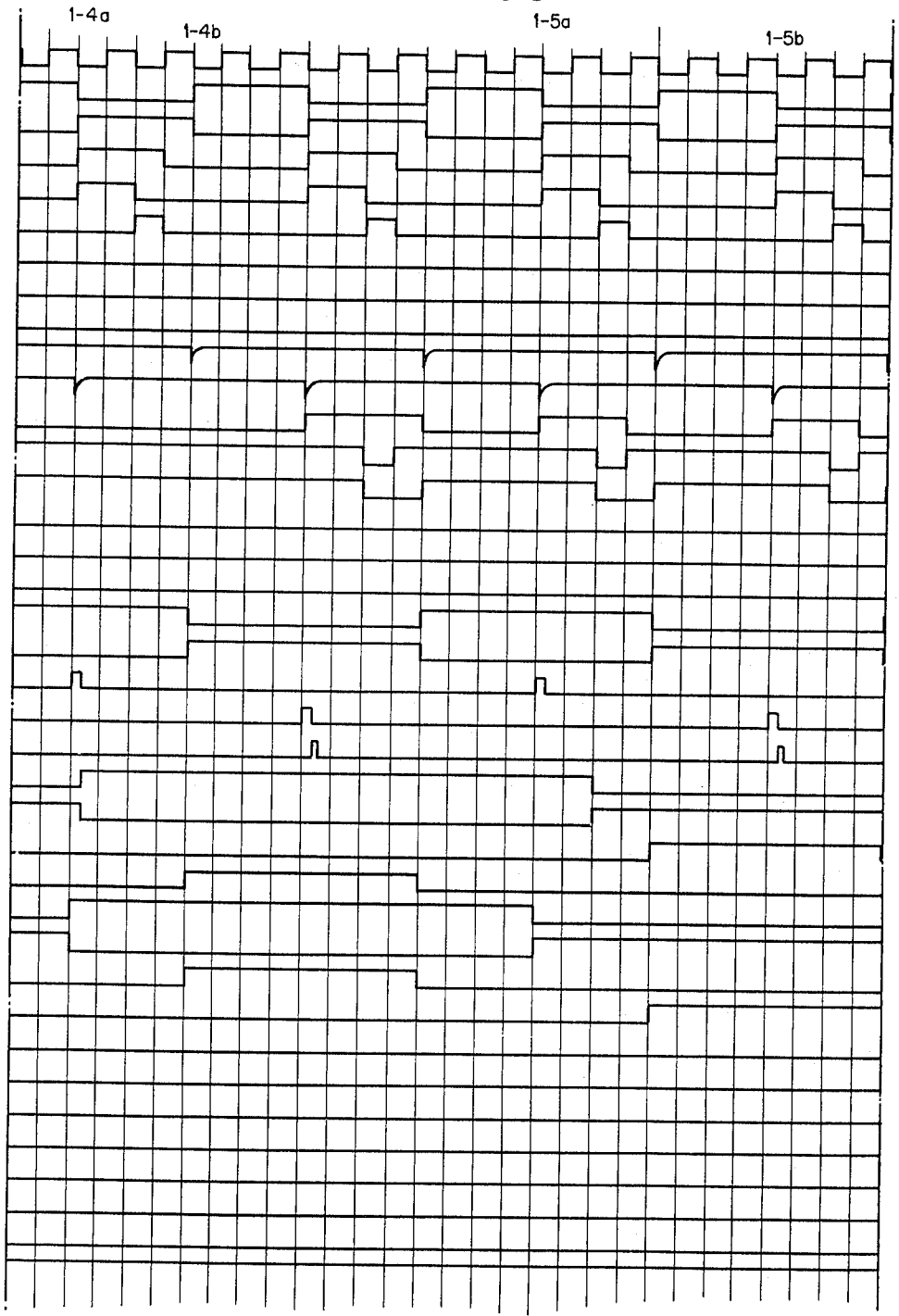
Figure 40D:
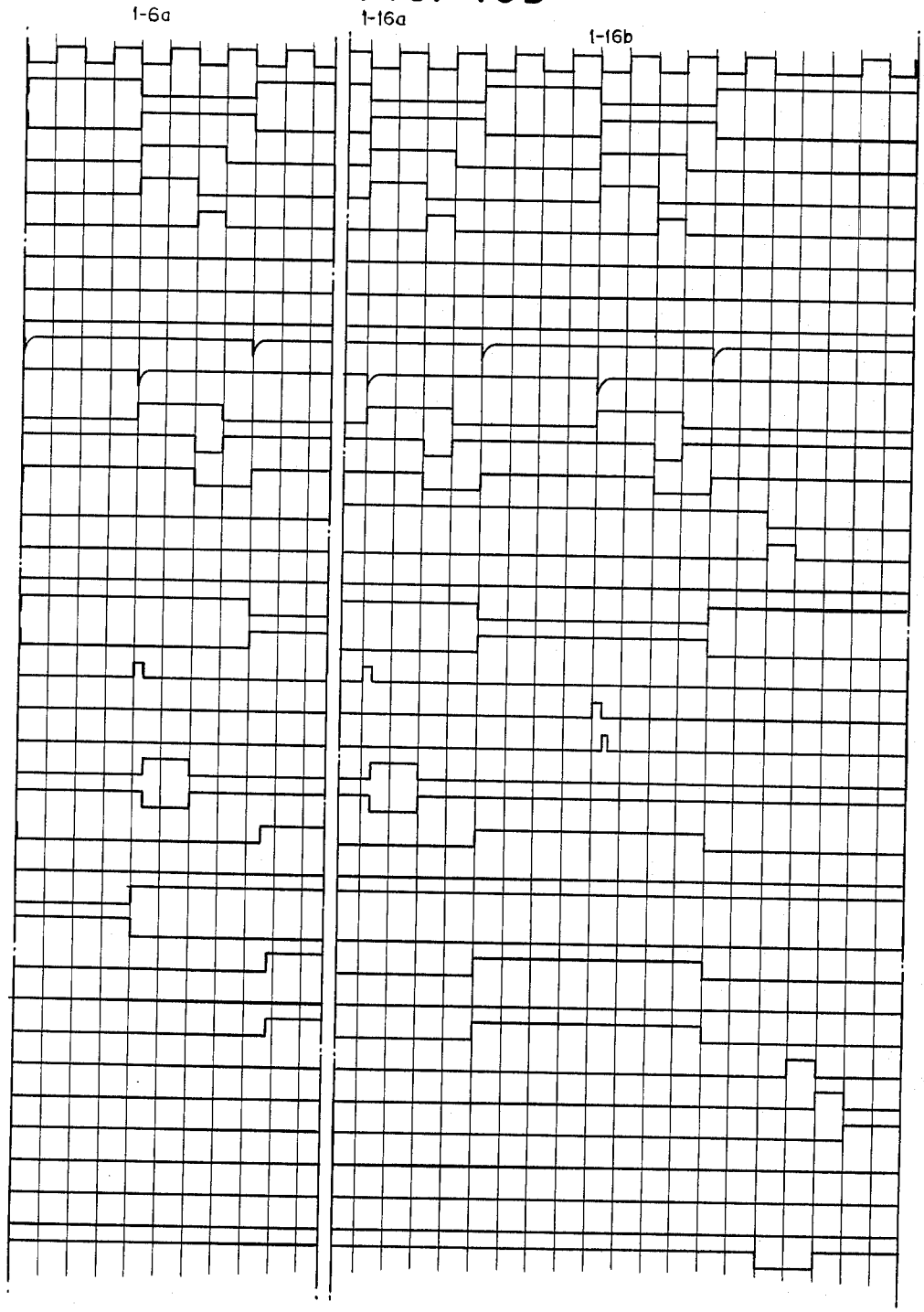
Figure 40E:
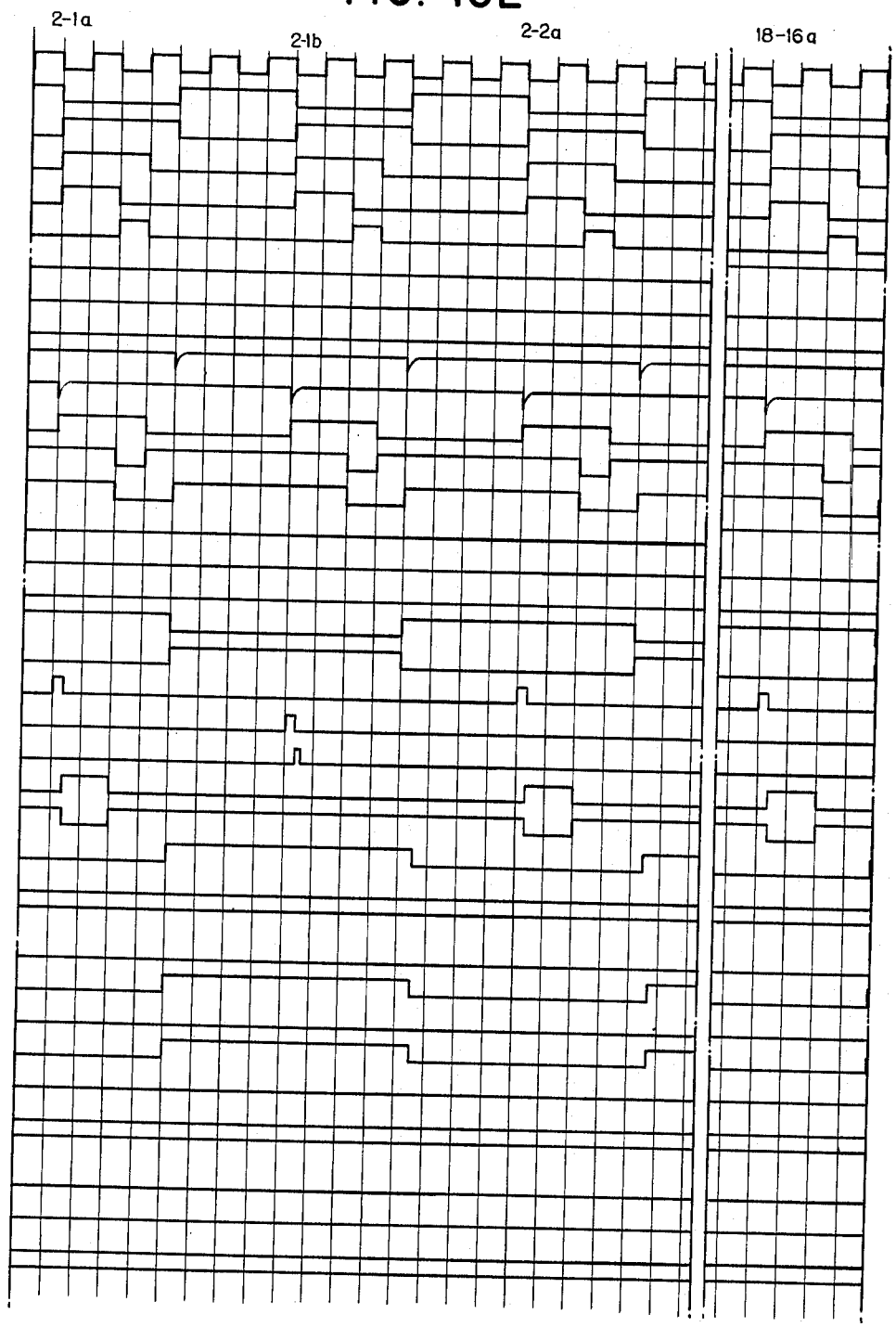
Figure 40F:
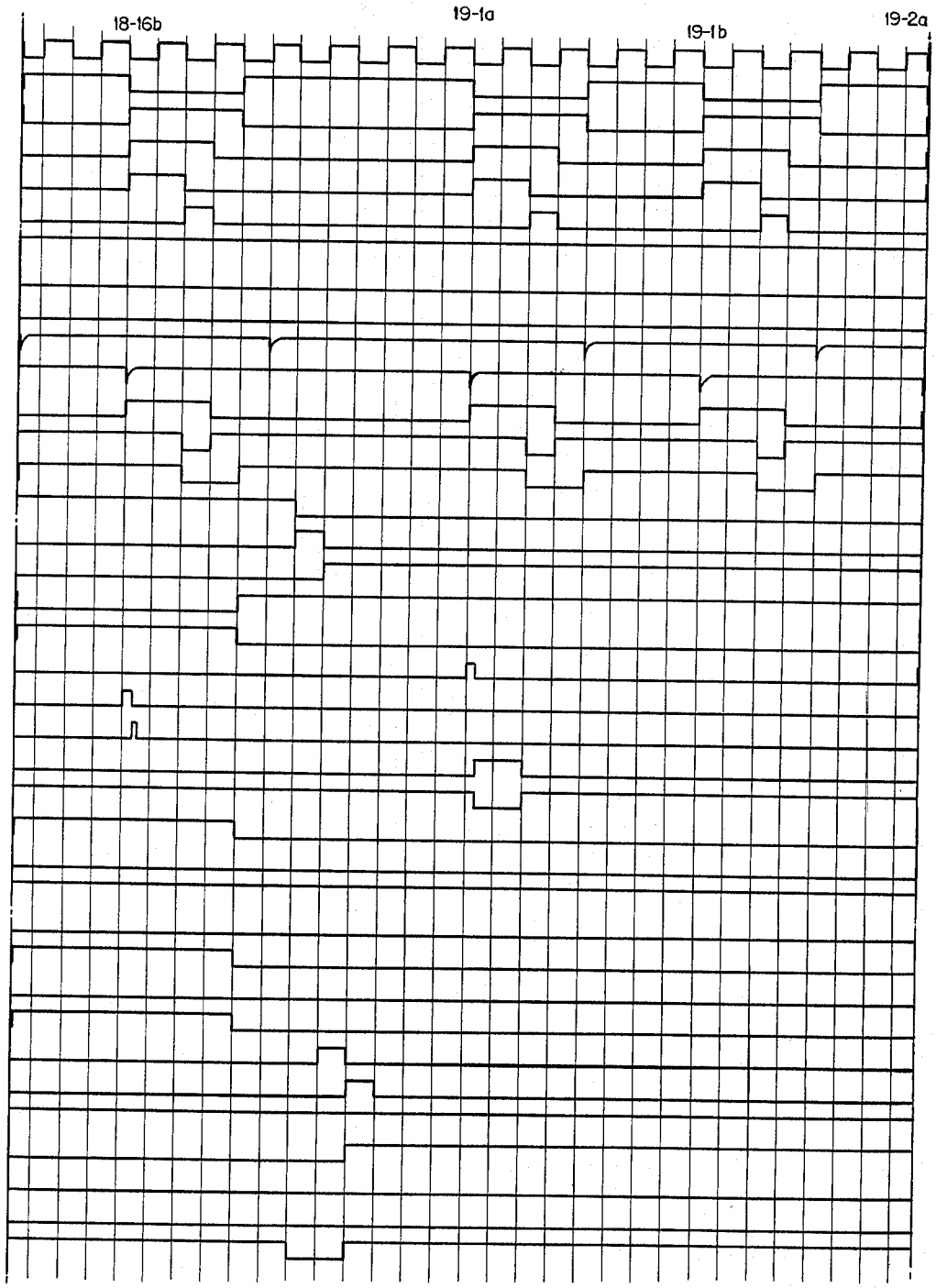

At the end of the thirty-second vertical sweep, a negative horizontal carry (waveform (g) of FIGS. 40A and 40I) from the horizontal sweep counter 230 (FIG. 12B) is applied via a lead 274 to a 30,000 microsecond (30 millisecond) single shot 276 (FIG. 12A). For 30 milliseconds a positive pulse (waveform h) is applied via a lead 278 to energize a relay driver 280 which causes current to flow through a lead 282 and SPACE relay 284 connected to 330 volts to actuate a standard space bar 286 to space the carriage 270 in any well known manner. Simultaneously, the negative shift on the lead 274 is applied to a half second single shot multivibrator 288 which goes ON to apply a positive shift (waveform i) via lead 290 to the SPACE multi-grid switch 202 via an OR circuit 292 and its output lead 294. The positive shift at the grid of the SPACE multi-grid switch, 202, prevents any multivibrator, 200, pulses from passing through, FIGS. 12A through 12II. FIGS. 40A through 40I (waveform i) indicate that at the end of the 32 vertical sweep there is a one half second delay to allow time for spacing during which time the multivibrator 288 pulses (waveform a) are not permitted to pass through to counter 206.

When the carriage has reached its extreme left position a member 296 (FIG. 12A) moving with the carriage, closes stationary contacts 298 to complete a circuit from +150 volts to the input of an inverter 300. The negative resulting output is applied via a lead 302 to a single shot multivibrator 304 which remains ON for 30 milliseconds to apply a positive potential via a lead 306 to a relay driver 308. Relay driver 308 conducts through lead 310 and relay 312 connected to 330 volts to energize said relay which actuates a carriage return key CR to move the carriage to the beginning of the next line in any well known manner. Simultaneously, the negative output voltage from inverter 300 is applied via lead 302 to a single shot multivibrator 314 which remains ON for one second to apply a positive potential to the positive OR circuit 292 which prevents the multivibrator pulses from passing through to counter 206 during a carriage return operation.

As has been previously described, it is necessary to shift the marking register, make a black-white determination, and then write the results of the determination into the first stage of the marking register. To get the proper timing to perform these three functions in sequence, the outputs of the second stage of the "4" counter 206 (FIG. 12B) is utilized. The output of terminal "2" of counter 206 (waveform (c) of FIGS. 40A through 40I) is fed via a lead 314 and a cathode follower 316 to a peaker 318. The positive shift, every forty microseconds, causes a negative peaked output every forty microseconds as shown in waveform (j) of FIGS. 40A through 40I. This negative peaked output is fed via a cathode follower 320 to a shift 1 line 322. The output of terminal "2̄" of counter 206 (waveform (b) of FIGS. 40A through 40I) is fed via a cathode follower 324 to a peaker 326 where its positive shift causes a negative peaked output every forty microseconds which is fed via a cathode follower 328 to a line 330 waveform (k), shift 2. Since every time the output of terminal "2" of counter 206 goes positive, the output of terminal "2̄" goes negative and vice versa, the pulses will appear on the shift 1 and shift 1 and shift 2 lines 322 and 330 alternately.

The light spot reflected off the document 268 (FIG. 12A) is collected by a pair of photomultiplier tubes 332 and 334 where it is converted to an electrical video pulse and fed via lead 336 to an amplifier 338. The amplified video signal is fed to an LI–1 type limiter 340 which, as previously described, will only allow signals of magnitude of greater than +45 volts to pass through as a negative pulse. Since a white area will reflect more light than a black area, only white indications will cause a signal of over +45 volts to be applied to the limiter 340. The discrimination level need not be fixed at +45 volts but may be adjusted by means of a potentiometer dependent upon the particular document's black to white ratio. The negative pulse representing a white area is then applied via a negative clamp 342 and a cathode follower 344 to an inverter 346, the output of which is a positive video pulse which is applied via a cathode follower 348 and a lead 350 to a multigrid switch 352. The positive video pulse representing white on lead 350 is shown in waveform (l) FIGS. 40A to 40I as a pulse of 15 microseconds which is the length of the unblank pulse. The other input to multi-grid switch 352 is the sample lead 265 carrying the 5 microsecond positive sample pulse (waveform (f), from 262 FIG. 12B), starting 10 microseconds after the start of the video pulse on lead 350. The resulting output of multi-grid switch 352 is a negative pulse, shown in waveform (m), which is fed to the left-hand input of a trigger 354, turning it OFF. Trigger 354 is turned ON by the shift 1 pulse on the shift 1 lead 322 which is connected to the right-hand input of trigger 354. Since the shift 1 pulse appears 10 microseconds after the turning OFF of the trigger 354, a 10 microsecond negative pulse appears at the right-hand output of trigger 354 (waveform $n$) and this negative pulse representation of white is fed via a cathode follower 356 to sampled video lead 358.

The negative shift of the vertical carry on lead 229 (FIG. 12B and waveform $o$), previously described, is fed to a single shot multivibrator 360, the output of which is then a negative end of vertical scan pulse of 5 microseconds (waveform $p$) which is fed via a cathode follower 362 to an end of vertical scan lead 364.

*Control circuits*

The control circuit, shown in FIG. 12C, includes marking register control, reset, and black-white determination circuits. The marking register control circuits include circuits for developing a register shift signal, a register write signal, and register read out triggers reset signal.

To develop the register shift signal, the shift 1 lead 322 (FIG. 12B) is fed to a negative AND circuit 366 (FIG. 12C), the other input of which is an OK to Punch lead 368. The OK to Punch lead 368 is negative at all times except at the end of character when the result of the recognition process is fed to a punch output unit, as will be more fully described hereinafter (see waveform $q$, FIGS. 40A to 40I). This negative output is fed to a "2" counter 370 which acts as a frequency divider. The output wave of terminal "1" of counter 370, which is shown in waveform ($s$), is fed via a lead 372, cathode follower 374 and a lead 376 to one input of a negative AND circuit 378. The other input of negative AND circuit 378 is the shift 2 lead 330. Since lead 376 from the terminal "1" of the "2" counter 370 will be negative only during every other negative shift 2 pulse, a negative output will be obtained from negative AND circuit 378 every 80 microseconds which is half the frequency of the shift 2 pulses. The output of the negative AND circuit 378 is fed to a single shot multivibrator 380 which then feeds a 2 microsecond positive pulse via a cathode follower 382 to a register shift lead 384 (waveform $t$). Since only every other shift 2 pulse causes a pulse on the register shift lead 384, only 16 register shift pulses will occur for every 32 shift of the beam in a vertical scan.

The register write signal is designated to occur between the register shift signals. The output pulse from terminal "1" of the "2" counter 370 (waveform $r$) is fed via a lead 386, the cathode follower 388 and a lead 390 to a negative AND circuit 392. The other input of the negative AND circuit 392 is the shift 2 lead 330. A negative output will be obtained from negative AND circuit 392 every 80 microseconds which is at half the frequency of the shift 2 pulses and will occur between the register shift pulses because the terminal "1" output of "2" counter 370 is negative when the terminal "1" output is positive. This negative pulse is fed to a single shot multivibrator 394 which emits a two microsecond positive pulse that is fed via a cathode follower 396 to a register write lead 398 (waveform $u$).

The register writer lead 398 is connected to the input of a single shot multivibrator 404. The output of single shot multivibrator 404 is a one microsecond positive pulse (waveform $v$) which is fed via a cathode follower 406 to a register read out trigger reset lead TP, and is utilized to reset the register read out triggers immediately following a write pulse, and to initiate the operation of the recognition criteria rules circuit.

As has been previously described, the bit sensed by the photocells is considered the "next" black-white determination. Thus, a pulse will appear on sampled video lead 358 when a white bit is sensed by the photocells. Once again, in order to utilize only every other sampled video bit, lead 376, upon which appears waveforms from the "2" counter 370, is fed to one input of a negative AND circuit 410, the other input of which is the sampled video lead 358. A negative pulse on the sampled video lead 358 will be passed through the output of negative AND circuit 410 to indicate a white bit and the pulse is fed via a lead 412 to the left-hand terminal of a negative black-white "next" trigger 414. Thus, a white bit sensed will cause the black-white "next" trigger 414 to turn OFF. This trigger is cam reset OFF before the start of operation and in the OFF position it indicates a white "next" bit. The register shift lead 384 is connected to the right-hand input of black-white "next" trigger 414, and the negative trailing edge of the register shift pulse (waveform $t$) thereon causes the black-white "next" trigger 414 to be set ON. If the sampled video pulse (waveform $n$) indicates white, the black-white "next" trigger will be turned OFF to signify white when interrogated by a timing pulse, but if there is no white sampled video pulse, the black-white "next trigger will remain black when interrogated by the timing pulse. The output terminal "1" of black-white "next" trigger 414 (waveform $w$) connected via a cathode follower 416 and a lead 418 to one input of a positive AND circuit 420. The output terminal "1" of trigger 414 (waveform $x$) is connected via a cathode follower 422 and a lead 424 to one input of a positive AND circuit 428. The other inputs of AND circuits 420 and 428 are connected to lead 376 which carries waveform ($s$). When the lead 376 goes positive it acts as a timing pulse to transmit a positive shift through only one of the two AND circuits 420 or 428. If the black-white "next" trigger 414 is OFF, the lead 418 is positive, and a positive shift is transmitted via AND circuit 420 and a cathode follower 430 to a white "next" lead $\overline{B_N}$ (waveform $y$). However, if the black-white "next" trigger 414 is ON, the lead 424 is positive, and a positive shift is fed via AND circuit 428 and a cathode follower 434 to a black "next" lead $B_N$ (waveform $z$). The black "next" lead $B_N$ is fed to a black-white determination cable 438 which feeds to the recognition criterial rules circuits in a manner to be more fully described hereinafter.

Since it is obvious that the black-white "next" determination becomes the black-white "now" determination when a new determination is made, means for shifting the "next" determination from the black-white "next" trigger 414 to a black-white "now" trigger will now be described. The output terminal "1" of black-white "next" trigger 414, which is positive when black-white "next" trigger 414 is in the white condition, is connected via the cathode follower 416 and the lead 418 to one input of a positive AND circuit 440. The output terminal "1" of black-white "next" trigger 414 which is positive when black-white "next" trigger 414 has sensed black, is connected via the cathode follower 422, and the lead 424 to one input of a positive AND circuit 442. The other inputs of AND circuits 440 and 442 are connected to the register shift lead 384. When register shift lead 384 goes positive, it will transmit a positive shift through only one of the two AND circuits 440 and 442. If the black-white "next" trigger 414 is in the white "next" condition, the lead 418 is positive and a positive shift is transmitted via AND circuit 440 to the right-hand input of a black-white "now" trigger 444. Thus, a white "next" bit will be transmitted by the positive shift of the register shift pulse to cause the black-white "now" trigger 444 to turn OFF. This trigger is cam reset off before the start of operation and in the OFF position it indicates a white "now" bit. When the black-white "next" trigger 414 is in the black "next" condition, the register, shift pulse on lead 384 will pass through AND circuit 442 to the left-hand input of black-white "now" trigger 444 turning it ON if it is OFF. The output terminal "1" of black-white "now" trigger 444 (waveform bb) is connected via a cathode follower 446 to one input of an AND circuit 448. The output terminal "1" of black-white "now" trigger 444 (waveform aa) is connected via a cathode follower 450 to one input of an AND circuit 452. The other inputs of AND circuits 448 and 452 are connected to lead 376 which carries waveform (s). When lead 376 goes positive, it will transmit a positive shift through only one of the two AND circuits 448 and 452. If the black-white "now" trigger 444 is OFF, the output of cathode follower 446 is positive, and a positive shift is transmitted via AND circuit 448 and a cathode follower 454 to a white "now" lead $\overline{B}$ (waveform cc). However, if the black-white "now" trigger 444 is OFF, the output of cathode follower 450 is positive and a positive shift is fed via AND circuit 452 and a cathode follower 456 to a black-white "now" lead B (waveform dd). Both black "now" lead B and white "now" lead $\overline{B}$ are fed to the black-white determination cable 438 to feed the recognition criteria rule circuits. Leads $\overline{B}$ and $\overline{B_N}$ are also connected to the inputs of and AND circuit 458, where they are "anded" and the output is connected via cathode follower 459 to a lead $\overline{B}$ and $\overline{B_N}$ (waveform ee) which is also connected into the black-white determination cable 438. This lead $\overline{B}$ and $\overline{B_N}$ is fed to the recognition criteria rule circuits for convenience in detecting a minimum white area, as will be described hereinafter.

It is to be noted that in FIG. 40A at the beginning of operation the black-white "next" trigger 414 and the black-white "now" trigger 444 are reset off so that each of their terminals "1" are positive. When the register shift lead 384 (waveform t) goes positive, the white condition in the black-white "next" trigger 414 is shifted to the black-white "now" trigger 444, but since trigger 444 is in the white condition, it is not effected. Then, when the register shift lead 384 goes negative, the black-white "next" trigger 414 is turned ON, making its terminal "1" positive.

It is to be noted in FIG. 40A that a 1–1a and 1–1b time, waveform (l) on video lead 350 goes positive indicating a white area was sensed by the photocells. The white "next" indication of 1–1a time will cause the white "next" lead $\overline{B_N}$ (waveform y) to go positive while the white "next" indication of 1–1b time is ignored. This can be more readily observed by noting that at 1–3a time, waveform (l) on video lead 350 (FIG. 12A) goes positive while at 1–3b time, waveform (l) remains negative indicating a black area was sensed by the photocells. The white indication of 1–3a time causes the white "next" lead $\overline{B_N}$ to go positive and the black indication at 1–3b time is ignored. At 1–4a time, waveform (l) (FIG. 40A) indicates a black area and at 1–4b time, a white area. This time the black "next" indication of 1–4a time causes the black "next" lead $B_N$ to go positive and the white "next" indication of 1–4b time is ignored. Black-white "next" trigger 414 may also be turned ON by the register shift pulse on the register shift lead 384 and OFF by a pulse on the end of vertical scan lead 364. Thus, at the beginning of each 80 microsecond bit period, the register shift pulse turns ON the black-white "next" trigger 414. The trigger 414 will then indicate black "next" unless turned OFF by a white sampled video pulse on lead 358.

At the end of the vertical scan, certain triggers in the recognition criteria rule circuits must be reset. To develop the reset pulses, the end of vertical scan lead 364 (FIG. 12C) is connected to one input of a negative AND circuit 460, the other input of which is the OK to Punch lead 368. As previously described, the OK to Punch lead 368 is negative at all times except at the end of character. The negative shift on lead 364 (waveform p) at the end of vertical scan is fed via negative AND circuit 460 to turn on single shot multivibrator 462 for five microseconds. The output of single shot multivibrator 462 is a five microsecond positive pulse which is fed via a cathode follower 464 to a reset lead $X_S$ of a reset cable 465 where it appears as waveform (ff).

At the end of five microseconds, the lead $X_S$ goes negative and this negative pulse is fed to a single shot multivibrator 468 which is turned ON for five microseconds. The resulting five microsecond positive pulse is fed from the output of single shot multivibrator 468 via a cathode follower 470 to a reset lead $X_{SD}$ (waveform gg). Both leads $X_S$ and $X_{SD}$ are fed via a reset cable, 465, which is fed to the program rule circuits.

To determine an end of character, there must be one complete vertical scan without the presence of a black bit. A positive trigger 474 is reset OFF at the end of every vertical scan by the $X_{SD}$ reset pulse on reset lead $X_{SD}$ which is connected to its right-hand input. The left-hand input is connected to black "next" lead $B_N$. When $B_N$ goes positive, trigger 474 will be set ON. The left-hand output of trigger 474 is connected via a lead 475 to one input of a positive AND circuit 476, the other input of which is reset lead $X_{SD}$. The output of positive AND circuit 476 is connected to the left-hand input of an END of CHARACTER trigger 478. In order for a positive $X_{SD}$ pulse to pass through AND circuit 476 and to turn ON the END of CHARACTER trigger 478, trigger 474 must be in the OFF condition so that lead 475 is positive. Thus, if during a vertical scan a black "next" bit is sensed, trigger 474 will be turned ON and prevent the $X_{SD}$ pulse from turning ON the END of CHARACTER trigger 478. After an all white bit vertical, END of CHARACTER trigger 478 is turned ON, and a positive shift is fed from its output via a cathode follower 480 to the OK to Punch lead 368. The positive OK to Punch shift on lead 368 (FIGS. 12V and 12C) is fed to a relay driver 482 (FIG. 12FF) causing it to conduct through an OK to Punch relay R30 to +150 volts. This energizes OK to Punch relay R30 closing its contact R30–1 to complete a circuit from a punch line terminal 484 (FIG. 12II) of a PUNCH 486, a lead 487 (FIG. 12FF), closed contact R30–1, the selected Christmas tree shape decoder contacts to one of the alphabetic or numeric character terminals of the PUNCH (FIG. 12II). This PUNCH may be of the type shown in the patent of Gardinor No. 2,647,581 or of any well known type where the completion of the circuit to one of the terminals causes the characters selected to be punched and/or printed on a card. Any other output medium may be used. When the punching operation is over, a positive PUNCH DONE pulse if fed via a PUNCH DONE lead 488 (waveform jj) to the right-hand input of END of CHARACTER trigger 478 (FIG. 12C), waveform ii, turning it OFF. The PUNCH DONE pulse may be obtained by the closing of contacts by a cam in a well known manner. A negative shift appears on the output of END of CHARACTER trigger 478 and is transmitted via the cathode follower 480, causing the OK to Punch positive pulse on lead 368 to end. The lead 368 is also connected to the input of single shot multivibrator 490 which is turned ON transmitting a positive pulse via a cathode follower 492 to an END of CHARACTER reset lead $X_C$. The $X_C$ (waveform kk) is connected to the Reset cable 465.

The vertical carry lead, 229 (FIG. 12B) is connected to the right-hand input of a PUNCH negative trigger 496, Lead $X_{SD}$ is connected to the input of an inverter 498 (FIG. 12B), the output of which is connected to the left-hand input of PUNCH trigger 496. At the end of each vertical scan, PUNCH trigger 496 is turned on by the negative shift of the vertical carry (See FIGS. 40A to 40I waveform o) and turned OFF 10 microseconds later by the reset pulse $X_{SD}$ which causes a negative shift (waveform gg) at the output of inverter 498 and left-hand input of punch trigger 496 (waveform ll). After the first all white vertical scan, further reset pulses are blocked by the OK to Punch pulse on lead 368 (FIG. 12C). This is accomplished because OK to Punch lead 368 is connected to the input of negative AND circuit 460 (FIG. 12C) and remains positive to block the end of vertical scan pulse on leads 364 from creating reset pulses. The OK to Punch lead 368 is also connected to negative AND circuit 366 where it prevents negative shift 1 pulse on lead 322 stepping the "2" counter 370. Counter 370 thus remains in the condition where its terminal "1" output is negative until a PUNCH DONE pulse is received. This permits normal register shift pulses on lead 384 as previously described. However, the terminal "$\bar{1}$" remains positive and prevents the shift 2 pulses on lead 330 from generating register write pulses on lead 398 and register read out trigger reset pulses on lead TP. This has the effect of shifting the marking register through a complete vertical scan cycle without writing therein which effectively causes the marking register to be reset during the vertical scan following the all white bit scan.

Marking register, code and decode circuits

The marking register 500 (FIG. 12D) comprises three 16 position shift registers 502, 504 and 506. The shift terminal of each of the shift registers is connected to the register shift lead 384 and each shift register is thus shifted in synchronism by the register shift pulse (waveform $t$). Each of the shift registers is given a weighted value; shift registers 502, 504 and 506 having the weighted values 1, 2 and 4 respectively. The same numbered stage of each of the three shift registers, taken together, may thus represent any number from zero to seven according to a binary 1–2–4 code. In order to illustrate the binary code, numbers from zero to seven are shown with their binary coded representations in Table 1 below. The binary coded representations for each number is shown in terms of the presence or absence of the three weighted digits 1, 2 and 4, and X indicating the presence and no X indicating the absence of the weighted digit.

TABLE 1

|  | Binary Coded | | |
| --- | --- | --- | --- |
|  | 1 | 2 | 4 |
| Zero |   |   |   |
| One | X |   |   |
| Two |   | X |   |
| Three | X | X |   |
| Four |   |   | X |
| Five | X |   | X |
| Six |   | X | X |
| Seven | X | X | X |

The One state of a core in each shifting register may indicate the presence of the weighted digit and the Zero state may indicate the absence thereof.

For example, in the sixteenth stage of the marking register, a five may be represented by the One state in the sixteenth stage of the 1 weighted shift register 502, a Zero state in the sixteenth stage of the 2 weighted shift register 504, and a One state in the sixteenth stage of the 4 weighted shift register 506. In order to utilize the information in the sixteenth stage, the sixteenth stage outputs of shift registers 502, 504 and 506 are connected respectively to the left-hand inputs of the sixteenth stage register read out triggers 508, 510 and 512, weighted 1, 2 and 4 in that order.

To utilize the information in the fifteenth stage, the fifteenth stage outputs of shift registers 502, 504 and 506 are connected respectively to the left-hand inputs of the fifteenth stage register read out triggers 514, 516 and 518. The right-hand inputs of the triggers in both the fifteenth and sixteenth register stage read out triggers are commonly connected to the register read out trigger reset lead TP. A register read out trigger reset pulse on lead TP resets all the register read out triggers OFF. Thirty-eight microseconds later (see FIG. 12D) the register shift pulse on lead 384 causes a shift of the bits to the next stage. Assuming again that there is a five being shifted to the sixteenth stage, the sixteenth stage of the weighted 1 and the weighted 4 shift registers 502 and 506, respectively are placed in the One state turning the weighted 1 and weighted 4 sixteenth stage register triggers 508 and 512 ON, and leaving the 2 weighted trigger 510 OFF.

The output of the sixteenth stage register read out triggers 508, 510 and 512 are leads which represent the presence or absence of a weighted one, two and four. The right-hand output lead of sixteenth stage register read out triggers 508, 510 and 512 represent the presence of 1, 2 and 4 respectively, and are labelled leads Read 1, 2 and 4 respectively. The left-hand output leads represent the absence of 1, 2 and 4 respectively and are labelled leads Read $\bar{1}$, $\bar{2}$, and $\bar{4}$ respectively. These six register trigger output leads are fed into a "now" Read cable 524 and thence to a "now" Decode circuit 526. The "now" Decode circuit 526 is provided to convert the binary coded output on the Read leads into the one out of eight code. The one out of eight code, used in the recognition criteria rule circuits, is just the use of one lead for each of the eight numbers; the presence of the number being represented by a positive potential on that lead. The "now" Decode circuit 526 comprises a plurality of AND circuits 527 to 534 inclusive, each of which has three inputs, one from each of the sixteenth stage register read out triggers 508, 510 and 512. AND circuits 527 to 534 inclusive are respectively connected via cathode follower 535 to 542 inclusive to one out of eight coded leads IN7 to IN0 inclusive. The one out of eight coded leads IN7 to IN0 inclusive, are fed into a rule circuit "now" input cable 550. Only one of the AND circuits 527 to 534 will have all its inputs positive at any one time and therefore, only one of the one out of eight coded leads IN0 to IN7 will be positive. For example, a five in the sixteenth stage register read out triggers causes the read 1, $\bar{2}$ and 4 output leads to go positive. AND circuit 529 is the only one which has all three inputs positive. A positive shift results at the output of AND circuit 529 which is applied via cathode follower 537 to the IN5 lead in the rule circuit "now" input cable 550.

The output of the fifteenth stage register read out triggers 514, 516 and 518 have their right-hand leads representing the presence of 1, 2 and 4 respectively and are labelled leads Read $1_N$, $2_N$, and $4_N$, respectively. The left-hand output leads represent the absence of the $\bar{1}$, $\bar{2}$ and $\bar{4}$, respectively, and are labelled leads Read $1_N$, $2_N$ and $4_N$, respectively. The six fifteenth stage register trigger output leads are fed into a "next" read cable 552 and thence to a "next" decode circuit 554 (FIG. 12E). The next decode circuit 554 is provided to convert the binary coded outputs in the next read cable 552 into a one out of eight code, and operates in a manner similar to that described for the "now" decode circuit 526 (FIG. 12D). The one out of eight coded leads $IN0_N$ through $IN7_N$ inclusive are fed into a rule circuit "next" input cable 556.

A rule circuit output cable 558 (FIG. 12E) coming from the recognition criteria rule circuits contains seven leads OUT 1 to OUT 7, inclusive, which are connected to the different inputs of an Encode circuit 564. The leads OUT 1 to OUT 7, inclusive, in the Rule circuit Output Cable 558 contain one out of eight coded information which is converted by the Encode circuit 564 (FIG. 12E) into binary coded information which is to be fed into the first stage of the marking register 500 (FIG. 12D) via cable 572. Coming out of the right-hand side of the Encode circuit 564 (FIG. 12E) are three leads 565, 566 and 567, weighted 1, 2 and 4, respectively, which are respectively fed to one of the input terminals of AND circuits 568, 569 and 570, respectively.

The three leads 565, 566 and 567 can contain binary coded information because the presence of a positive potential on any lead of the leads 565, 566 and 567 indicate the presence of its weighted value, while presence of a negative potential indicates the absence of the weighted value. A five would thus be represented by a positive voltage on weighted 1 lead 565, a negative voltage on weighted 2 lead 566, and a positive voltage on weighted 4 lead 567. The other inputs of AND circuits 568, 569 and 570 are commonly connected to the register write lead 398. The outputs of AND circuits 568, 569 and 570 are leads Write 1, 2 and 4, respectively, which are connected via write cable 572 to the write inputs of shift registers 502, 504 and 506, respectively. Forty microseconds after the register shift pulse (FIG. 12D), a register write pulse is applied to register write lead 398 (FIG. 12E) and if any of the leads 565 to 567 inclusive are positive, a positive pulse will appear on the respective output lead Write 1, Write 2 and Write 4 and causing the writing of a 1, 2, and 4, respectively, into the first stage of the respective shift registers. Thus, in the case of the coded five, a positive on the 1 and 4 weighted leads 565 and 567 and a negative on 2 weighted lead 566 would put the first stage of shifting registers 502 and 506 (FIG. 12D) in a One state, and leave the first stage of shifting register 504 in a Zero state.

In the Encode circuit 564, OUT 1 lead in the Rule Circuit Output Cable 558 (FIG. 12E) is connected via an OR circuit 574 a lead 576, a cathode follower 578, an OR circuit 580, and a cathode follower 582 to the 1 weighted lead 565. The OUT 2 lead in the Rule Circuit Output Cable 558 is connected via an OR circuit 584, a lead 586, a cathode follower 588, an OR circuit 590, and a cathode follower 592 to the 2 weighted lead 566. The OUT lead 4 in the Rule Circuit Output Cable 558 is connected via an OR circuit 594, a lead 596, a cathode follower 598, an OR circuit 600, and a cathode follower 602 to the 4 weighted lead 567. Since the OUT 1 lead from the Rule Circuit Output Cable 558 is connected only to OR circuit 574 of the three OR circuits 574, 584 and 594, a positive potential on the OUT 1 lead from the Rule Circuit Output Cable 558 will cause only the 1 weighted lead 565 to go positive. Similarly, the OUT 2 weighted lead 566 will be caused to go positive, and the OUT 4 lead from the Rule Circuit Output Cable 558 will cause only the 4 weighted lead 567 to go positive. The OUT 3 lead from the Rule Circuit Output Cable 558 is connected to both OR circuits 574 and 584 to cause positive outputs on both the 1 and 2 weighted leads 565 and 566 in accord with the code indicated in Table 1. The OUT 5 lead from the Rule Circuit Output Cable 558 is connected to OR circuits 574 and 594 to cause positive outputs on both the 1 and 4 weighted leads. The OUT 6 lead from the Rule Circuit Output Cable 558 is connected to OR circuits 584 and 594 to cause positive outputs on both the 2 and 4 weighted leads, and the OUT 7 lead is connected to OR circuits 574, 584 and 594 to cause positive outputs on the weighted 1, 2 and 4 weighted leads.

If none of the leads in the Rule Circuit Output Cable 558 are positive, then the number in the sixteenth stage of the marking register 500 (FIG. 12D) will be automatically written into the first stage. The leads 576, 586, and 596 (FIG. 12E) are all connected to the input of an OR circuit 604. If any of the leads OUT 1 to OUT 7, inclusive, from the Rule Circuit Output Cable 558 go positive, then at least one of the leads 576, 586 and 596 will be positive. Thus, if any of the leads OUT 1 to OUT 7, inclusive, from the Rule Circuit Output Cable 588 go positive, a positive shift will be applied to the inverter 606 and cause the lead 608 connected to the output of inverter 606 to go positive. Lead 608 is connected to one of the inputs of each of the AND circuits 610, 611 and 612. The other input of AND circuit 610 is connected to the lead Read 1 from the sixteenth stage register read out triggers and the output is connected via OR circuit 580 and cathode follower 582 to the 1 weighted lead 565. The other inputs of AND circuits 611 and 612 are connected to the leads Read 2 and Read 4, respectively, from the sixteenth stage register read out triggers and the respective outputs are connected to the 2 and 4 weighted leads 566 and 567, respectively. Thus, if any of the leads OUT 1 to OUT 7 from the Rule Circuit Output Cable 558 is positive, lead 608 is negative and all the AND circuits 610, 611 and 612 are deconditioned. If none of the leads OUT 1 to OUT 7 are positive, then lead 608 is positive and positive potential on leads Read 1, Read 2, and Read 4 representative of the "now" bits in the sixteenth stage triggers, are transmitted through the Encode circuit 564 to leads 565, 566 and 567, respectively, for application to the leads Write 1, Write 2, and Write 4 into the first stage of the marking register 500 (FIG. 12D).

*Recognition criteria rule circuits and examples*

FIGS. 15 through 34 show examples of the recognition of different imperfect alphabetic and numeric characters as performed by the subject machine. FIG. 15 represents the numeric character 0 within a rectangle 614, followed by the numeric characters 1 and 2 within rectangles 615 and 616, respectively. Each vertical scan is numbered, for ease of description, by numbers 1 through 32, placed above the rectangles 614, 615 and 616, and the horizontal bit positions of each scan is indicated by the numbers 1 through 16. Each cross, in the rectangle 614, making up the numeric character 0, being representative of a black bit sensed by the scanner at the indicated location of the vertical scan. The absence of a cross at a particular location indicates a white bit thereat. A rectangle 617 in FIG. 15 contains the indications of each coded number written into the different stages of the marking register during each vertical scan of the black-white indications of rectangle 614, each coded number being placed within rectangle 617 at the horizontal bit position, corresponding to the time at which it is written into the marking register. For example, on the first vertical scan of the character 0, black bits are detected at horizontal positions 5 through 11 in rectangle 614, and since coded number 1's are written into the marking register when the black bits become "now" bits, coded 1's are shown in rectangle 617 at the horizontal bit positions 5 through 11. Since, as hereinbefore described, the black-white "now" determination is always reset to white "now" at the beginning of each vertical scan, and since a coincidence of a 0 "now" and a white "now" always causes a coded 0 to be placed in the marking register (by just not writing any number into the marking register), a "phantom" horizontal bit position under the first horizontal bit position always appears with all coded 0's therein, as shown within rectangle 617. Similarly, it is to be noted that the top bit of each vertical scan in rectangle 617 is coded number written into the marking register at the time that the fifteenth bit of the rectangle 614 is the "now" bit and the sixteenth bit is the "next" bit. Since the machine never utilizes the sixteenth bit as the "now" bit, there is no sixteenth horizontal bit position shown in rectangle 617.

The recognition criteria rule circuits are shown in FIGS. 12F through 12EE. The inputs to the recognition criteria rule circuits are the black-white determination cable 438, the rule circuit "now" input cable 550, the rule circuit "next" input cable 556, the register read out trigger reset lead TP and the reset cable 465. The outputs from the recognition criteria rule circuits are the rule circuit output cable 558 and a cable from memory C triggers to be described hereinafter. The recognition criteria rule circuits recognize the black-white "now" determination and the black-white "next" determination from the black-white determination cable 438 and also the coded "now" bit and the coded "next" bit in the rule circuit input cables 550 and 556 respectively, and thereby operate both to assign the arbitrary coded numbers, previously described, to the first stage of the marking register, and to turn ON the memory triggers which act to set up relays in the Christmas tree circuit.

For ease of description, the recognition criteria rule circuits have been divided into ninety-one rule circuits, separated from each other in FIGS. 12F to 12U and 12BB to 12EE by dashed lines.

A cursory study of the recognition criteria rule circuits show that there are some triggers labelled with an S and another labelled with a C. The S triggers are those known as the temporary triggers and are reset at the end of each vertical scan by either the $X_S$ or $X_{SD}$ pulse from the reset cable 465. The triggers labelled with a C are known as the memory triggers and are reset at the end of character by an $X_C$ reset pulse from the reset cable 465. The resetting of the S and C labelled triggers will not be described any further in the description of the rule circuits unless they operate differently from the description just given.

Generally, the S and C triggers are turned ON, if there are a certain number of predetermined conditions. Since these predetermined conditions may be effected by the other S and C triggers being turned ON, it is necessary to have a timing pulse for testing the presence of all the predetermined conditions at one particular time. For this, the register read out trigger reset pulse on lead TP is utilized. The input circuitry for turning ON the S and C triggers usually include an AND circuit, one of the input leads of which may be the register read out trigger lead TP. Due to the nature of the trigger circuitry the trigger outputs will not rise sufficiently fast to effect the inputs during a single register read out trigger reset pulse. In the description of the AND circuits, which are the inputs to the S and C triggers and to certain counters in the rule circuits, the register read out trigger lead TP will not be further described because it will be henceforth understood that it is used only for timing reasons.

Rule circuits—vertical white zones

Before describing the write rule circuits which perform the assignment of the coded numbers into the marking register, a description will be given of other rule circuits which detect vertical white zones and other incidentals, preferably to be first understood, to facilitate the understanding of the write rule circuits. As has been previously described, the recognition criteria rule circuits are able to detect a first, second and third vertical white zone. Rule 1 (FIG. 12F) through rule 4 circuits are used for detecting the vertical white zones, the positions of which are shown in FIGS. 15 through 17. In rule 2 circuit (FIG. 12F), a trigger $S_1$ is turned ON to signify entrance into the first vertical white zone. The black lead B and the white "next" lead $\overline{B_N}$ from the black-white determination cable 438 (and the register read out trigger reset lead TP for timing) are connected in the rule 2 circuit to an AND circuit 620, the output of which is connected to the left-hand input of a first vertical white zone entrance trigger $S_1$. Trigger $S_1$ has its left-hand output connected to a lead "$\overline{S_1}$" and its right-hand output connected to a lead "$S_1$," both of which are connected into an S trigger cable 621. All of the leads from both outputs of all the S triggers are fed into and out of S trigger cable 621. A positive potential on both leads B and $B_N$ will turn ON trigger $S_1$, causing lead "$S_1$" to go positive and lead "$\overline{S_1}$" to go negative. The presence of both a $\overline{B}$ and a $\overline{B_N}$ indicates that in a particular vertical scan, there is a black "now" bit and a white "next" bit above it. Referring to FIG. 35, column (c) indicates a black fifth bit and a white sixth bit. At the time that the black fifth bit is looked at as the black "now" bit, and the white sixth bit is looked at as the white "next" bit, it is an indication that the scan is passing from a first black crossing into the first vertical white zone. When the register read out trigger reset pulse TP comes along, somewhere in time between the "now" and "next" bits, the trigger $S_1$ gets turned ON, to indicate the entrance into the first vertical white zone.

It will be shown that trigger $S_2$ of rule 3 circuit is turned ON, making its output lead "$S_2$" positive, in order to indicate an entrance into the second vertical white zone, and that trigger $S_3$ of rule 4 circuit is turned ON to indicate an entrance into the third vertical white zone. In the write rule circuits, the fact that the bits being examined are in the first vertical white zone is detected by the fact that not only is first vertical white zone entrance trigger $S_1$ ON, but that second vertical white zone entrance trigger $S_2$ is OFF, indicating the second vertical white zone has not been entered. Similarly, the second vertical white zone is detected by second vertical white zone entrance trigger $S_2$ being ON and third vertical white zone entrance trigger $S_3$ OFF. The fact that trigger $S_3$ is ON, without any other information, is enough to indicate that the bit being examined is in the third vertical white zone.

If any of the vertical white zones contain a minimum white height it is known as a bona fide vertical white zone. It is necessary that a vertical white zone be identified as a bona fide vertical white zone before the next vertical white zone can be indicated. A minimum white height zone (M.W.H. zone) trigger $S_0$ in rule 1 circuit is utilized to indicate if a vertical white zone is bona fide. In rule 1 circuit, the white "now" and white "next" lead $\overline{B}$ & $\overline{B_N}$ indicative of a minimum white height is connected to one input of an AND circuit 622, the other input of which is fed from an OR circuit 624. One of the inputs of OR circuit 624 is the first vertical white zone entrance lead "$S_1$" from S trigger cable 621. A simultaneous positive condition of the lead $\overline{B}$ & $\overline{B_N}$ and the lead "$S_1$" via OR circuit 624 and at TP time, it will turn ON the M.W.H. zone trigger $S_0$, making its lead "$S_0$" positive. Thus, in the first vertical white zone, the fact that both first vertical white zone entrance lead "$S_1$" and M.W.H. zone lead "$S_0$" are positive indicates a bona fide first vertical white zone.

M.W.H. zone trigger $S_0$ is used to indicate a bona fide zone for all three vertical zones, and therefore, it must be reset as soon as there is an indication of the entrance into a new zone. Then, if the succeeding "now" determination is white, the lead $\overline{B}$ & $\overline{B_N}$ will go positive, and since once first vertical white zone entrance trigger $S_1$ is turned ON, it remains ON until the end of the vertical scan, the positive condition of lead $\overline{B}$ & $\overline{B_N}$ will then permit the TP pulse to turn ON M.W.H. zone trigger $S_0$ via AND circuit 622.

As soon as a new vertical white zone is indicated it is desirable to reset M.W.H. zone trigger $S_0$ to again test the new zone for a minimum white height to insure a bona fide zone. The resetting of M.W.H. zone trigger $S_0$ is accomplished by connecting the three vertical white zone entrance leads "$S_1$," "$S_2$," and "$S_3$" to the input of an A.C. OR circuit 626, the output of which is connected to the right-hand A.C. input of M.W.H. zone trigger $S_0$. As soon as one of these three triggers goes ON, the pulse is transmitted via A.C. OR circuit 626 to reset M.W.H. zone trigger $S_0$.

It is to be noted that OR circuit 624 of rule 1 circuit has as its other input the lead $\overline{O_N}$, which is "anded" at AND circuit 622 with lead $\overline{B}$ & $\overline{B_N}$ for turning ON the M.W.H. zone trigger $S_0$ in a special case which is described in more detail hereinafter with the description of the assignment of coded 4's. The reset lead $X_S$ is connected via an OR circuit 628 and the lead 630 to the right-hand input of M.W.H. zone trigger $S_0$, for resetting it at the end of scan at $X_S$ time. The circuitry associated with the other input of OR circuit 628 will also be described hereinafter in conjunction with the assignment of coded 4's.

As a prerequisite to the turning ON of second vertical white zone entrance trigger $S_2$ (rule 3), in addition to the leads B and $\overline{B_N}$ being positive as an indication of the scan going from black into white, the first vertical white zone entrance lead "$S_1$" and M.W.H. zone lead "$S_0$" must be positive as an indication that the first vertical white zone was bona fide, and so leads B, $\overline{B_N}$, "$S_1$" and "$S_0$" are fed to the input of an AND circuit 632 in rule 3 circuit, the output of which goes positive at TP time upon a coincidence of positive conditions on the input leads to effect the turning ON of second vertical white zone entrance trigger $S_2$.

To indicate the entrance to the third vertical white zone (rule 4), in addition to the lead B and $\overline{B_N}$ being positive as an indication of the scan going from black into white, the leads "$S_2$" and "$S_0$" must be positive as an indication that the second vertical white zone was bona fide, and so leads B, $\overline{B_N}$, "$S_2$" and "$S_0$" are fed to the input of an AND circuit 634 in rule 4 circuit, the output of which goes positive at TP time upon a coincidence of positive conditions on the input leads to effect the turning ON of third vertical white zone entrance trigger $S_3$.

The vertical white zone entrance triggers $S_1$, $S_2$, and $S_3$ are all reset at the end of a vertical scan by an $X_{SD}$ pulse which comes later than the $X_S$ pulse, because the $X_S$ determination of the presence of a dropout to the north is made at $X_S$ time. Since the vertical white zone information is used for determining a north dropout, it would not be desirable to reset the vertical white zone triggers $S_1$, $S_2$, and $S_3$ until after this determination is made.

Rule circuits—dropouts

Rule 5 through rule 11 circuits, inclusive (FIGS. 12F and 12G) are used for detecting "dropouts" which signify that an included white region extends upward or downward out of a character. A south dropout, which is utilized in detecting a south bay or a southeast bay, extends downward out of the character and thus has the additional requirement of a history of black to the left of the dropout. A north dropout, which also requires a history of black to the left, extends upward out of a character and is utilized in detecting a north bay or a northeast bay.

Rule 5 circuit (FIG. 12F) is used for detecting a double south dropout which implies included white regions dropping out the bottom of the character in two successive vertical scans, and is indicated by turning on the double south dropout trigger $C_0$. A single south dropout is thus ignored to avoid an incorrect recognition of a poor printed character that has, for example, a one bit break in its lower horizontal line that might otherwise appear to be a south bay.

For example, FIG. 19 illustrates the alphabetic character A which contains a double south dropout. In the twenty-fifth labelled vertical scan of FIG. 19, the fourth and fifth bits 636 are white, and the marking register at this time indicates coded 1's, 638, for the fourth and fifth bits of the twenty-fourth vertical scan representative of a history of black to the left. Since there are no black bits below the fourth bit of the twenty-fifth vertical scan, the first vertical zone has not yet been entered and the first vertical white zone entrance trigger $S_1$ of rule 2 circuit is not yet ON, this is effectively a single south dropout. Coded 4's, 640, are also inserted in the marking register for this set of facts as will be more fully described hereinafter in the description of assignment of coded 4's.

In the twenty-sixth vertical scan, the fourth and fifth bits 642 are white and first vertical white zone entrance trigger $S_1$ is not yet ON, and this indicates a second south dropout. Thus, it is obvious that the requirements for a double south dropout are that the marking register indicates coded 4's as the "now" and "next" bit (leads IN4 and $IN4_N$ positive), rule 5 circuit that there be a minimum white height, and that the first vertical white zone entrance trigger $S_1$ be OFF. Thus, for a double south dropout, in addition to the leads IN4 and $IN4_N$ being positive as an indication of a single south dropout of a minimum white height, the leads B & $\overline{B_N}$ must be positive as an indication of a minimum white height, and the lead "$\overline{S_1}$" must be positive as an indication that the first vertical white zone has not been entered. Therefore, in rule 5 circuit, the leads IN4, $IN4_N$, B & $\overline{B_N}$ and "$S_1$" are fed to the input of an AND circuit 644 and a coincidence of these conditions at TP time causes the output of AND circuit 644 to go positive to turn on double south dropout trigger $C_0$. The right-hand and left-hand outputs of trigger $C_0$ are the lead "$C_0$" and "$\overline{C_0}$" which are connected to a C trigger cable 646, along with all other output leads from the C memory triggers, from which it may be connected to any other of the rule circuits as needed. Lead "$C_0$" goes positive to indicate that a south double dropout is present. As previously described, memory triggers labelled C are reset at the end of the character by an $X_C$ pulse because once a double south dropout is detected, that information is required until the end of the character. Trigger $C_0$ may also be reset by a lead from the output of an A.C. OR circuit 648, the inputs of which are leads "$C_{18}$" and "$C_{19}$" which, as will be hereinafter described, are positive after the detection of the presence of a south bay and after the detection of the presence of two south bays, for reasons to be more fully described hereinafter.

Rule 6 circuit, rule 7 circuit, and rule 8 circuit (FIG. 12G) cooperate to detect a double north dropout from the first vertical white zone and this condition is indicated by the turning ON of double north dropout from zone 1 trigger $C_1$ of rule 8 circuit. Rule 9 circuit, rule 10 circuit, and rule 11 circuit are utilized for detecting a double north dropout from the second vertical white zone, a condition indicated by the turning ON of double north dropout from zone 2 trigger $C_2$ of rule 11 circuit. The reason for distinguishing between a dropout from the first vertical white zone and the second vertical white zone is hereinafter described in the section describing the write rule circuit relating to the assignment of coded 5's, 6's, and 7's.

The numeric character 1 of FIG. 15 illustrates a double north dropout from the first vertical white zone. In the twenty-first vertical scan of FIG. 15, the marking register indicates coded 1's, 650, for the fourth and fifth bits representative of a history of black to the left, and the fourth and fifth bits 652 of the twenty-second vertical scan are white. It is obvious that the white bits 652 of the twenty-second vertical scan are in the first vertical white zone because there is only one black crossing of bits below them. This condition will turn ON the trigger $S_{23}$ (of FIG. 12G, rule 6) as an indication of a possible single north dropout of the white bits 652 (FIG. 15) from the first vertical white zone. Thus, for the trigger $S_{23}$ (FIG. 12G) to be turned ON as indicative of a possible single dropout to the north from the first vertical white zone, the leads "$S_1$" and "$\overline{S_2}$" must be positive as an indication of the first vertical white zone, the leads $\overline{B}$ & $\overline{B_N}$ must be positive as an indication of a minimum white height and the leads IN1 and $IN1_N$ must be positive as an indication of black to the left. Therefore, the leads "$S_1$", "$\overline{S_2}$", $\overline{B}$ & $\overline{B_N}$, IN1 and $IN1_N$ of rule 6 circuit FIG. 12G are fed to the input of an AND circuit 654, and a coincidence of these conditions at TP time causes the output of AND circuit 654 to go positive to turn ON trigger $S_{23}$ via an OR circuit 656. Any black bit in this twenty-second vertical scan will reset trigger $S_{23}$ as a sign of no dropout and so that lead B is connected via an AND circuit 657 for timing and an OR circuit 658 to the right-hand input of trigger $S_2$ to reset it on the sensing of a black bit. The actual single dropout to the north is detected at the end of the vertical scan as can be seen in rule 7 circuit where the leads $X_S$ and "$S_{23}$" are connected as the inputs of an AND circuit 658. If triggers $S_2$ is still ON at the end of the vertical scan, a true single dropout to the north has been sensed and a positive output from AND circuit 658 will turn ON single north dropout trigger C as an indication thereof. A little later at $X_{SD}$ time, trigger $S_{23}$ (rule 6) is reset so that a new possible dropout condition from vertical white zone 1 can be examined anew in each scan.

Referring again to FIG. 15, coded 5's, 662, will have been written at the fourth and fifth positions of the marking register indicative of a minimum white height in a first vertical white zone with a history of black to the left as will be hereinafter described. In the twenty-third vertical scan, the fourth and fifth bits 664 are again white and so there is another possible dropout to the north. Thus, for a second possible dropout to the north, the leads IN5 and $IN5_N$ (rule 6 of FIG. 12G) must be positive as an indication of a first vertical white zone in the previous scan and the lead $\bar{B}$ & $\overline{B_N}$ must be positive as an indication of a minimum white height. The leads IN5, $IN5_N$ and $\bar{B}$ & $\overline{B_N}$ are thus fed to an input of an AND circuit 666, the output of which goes positive at TP time on coincidence of the input conditions, and the positive pulse is fed via OR circuit 656 to turn ON trigger $S_{23}$. This time if both single north dropout trigger $C_3$ rule 7 and trigger $S_{23}$ rule 6 are ON at the end of the twenty-third vertical scan, it will be an indication of a double dropout to the north from vertical white zone 1. The leads "$S_{23}$" and "$C_3$" and $X_S$ in rule 8 circuit, are thus fed to the input of an AND circuit 668, the output of which goes positive to turn ON double north dropout from zone 1 trigger $C_1$. In rule 7 circuit the leads $X_S$ and "$\overline{S_{23}}$" are connected to the input of an AND circuit 670. If at the end of the vertical scan, trigger $S_{23}$ rule 6 is not ON because it was reset by a black bit above, a positive output will be produced to reset single north dropout trigger $C_3$ rule 7 via an OR circuit 672. Thus, a double dropout to the north can be indicated only if a single dropout to the north occurs in two successive vertical scans. Double north dropout from zone 1 trigger $C_1$ is ordinarily reset at the end of the character by lead $X_C$ connected to its right-hand input but may be reset in another manner as is described hereinafter in the description of the write rule circuits relating to the assignment of coded 5's, 6's, and 7's.

A possible north dropout from the first vertical white zone in the alphabetic character U in FIG. 31 is detected in a slightly different manner. This is due to the long serif 674, which blocks by black above, the minimum white height 676, in the seventh vertical scan, when the fact that the coded 1's, 687, in the marking register indicate a history of black to the left. In the ninth vertical scan, wherein the minimum white height 680 does dropout to the north, there is no condition of a coded 1 and $1_N$ in the marking register after the sixth bit, to allow AND circuit 654 of rule 6 circuit to turn ON trigger $S_{23}$. In this situation, however, AND circuit 666 of rule 6 circuit (FIG. 12G) actually turns ON trigger $S_{23}$ to detect the first single north dropout, because during the ninth vertical scan, when the fifth and sixth bits 680 (FIG. 31) are white ($\bar{B}$ & $\overline{B_N}$) the coded 5's, 682, in the marking register (IN5 and $IN5_N$) are representative of the fact that there was a history of black to the left and that they are in the first vertical white zone. In this case, AND circuit 666 (rule 6 circuit, FIG. 12G) also detects the second possible dropout to the north in the usual manner.

The operation of the rule 9, rule 10 and rule 11 circuits are similar to that of the rule 6, rule 7, and rule 8 circuits except that the leads "$S_2$" and "$\overline{S_3}$" are used instead of the leads "$S_1$" and "$\overline{S_2}$" and the lead IN6 and $IN6_N$ instead of IN5 and $IN5_N$ so that the former will apply to the second vertical white zone, and the latter to the first vertical white zone. Thus, the triggers $S_{24}$, C and $C_2$ for north dropouts from the second vertical white zone are exactly analogous to the triggers $S_{23}$, $C_4$ and $C_2$, respectively, for the first vertical white zone and therefore the operation of the rule 9, rule 10 and rule 11 circuits will not be further described.

*Rule circuits—assignment of coded 1's, 2's, 3's and 4's*

Rule 19 circuit to rule 25 circuit (shown in FIGS. 12I to 12L), inclusive, relate to the assignment of writing of numbers in the marking register and are therefor referred to occasionally in this specification as the write rule circuits. Rule 12 circuit to rule 18 circuit (shown in FIGS. 12H to 12I), inclusive, are write auxiliary rule circuits for modifying the write rule circuits, and will be described simultaneously therewith.

As previously described, there are no specific circuits for assigning coded 0's. Coded 0's are in the marking register only because when the marking register is shifted, no coded number is shifted into the first stage, and if no coded number is assigned to the first stage before the next shift, the coded 0 in the first stage will effectively be shifted to the second stage.

Rule 19 circuit of FIG. 12I, indicates that the lead B representative of the black "now" is connected directly to the lead OUT 1 which is the lead that is connected into the rule circuit output cable 558 and causes the writing of coded 1's into the marking register. Thus, every time a black "now" determination is made, a coded 1 is written into the marking register. It is not necessary to have a special timing pulse in the rule circuits for writing because the register write pulse on lead 398 of FIG. 12C acts as a timing pulse.

The assignment of the other coded numbers usually depends on the three general conditions previously described, the vertical white zone, the minimum white condition, and the past history of black. In addition, certain particular conditions may cause the assignment of the coded numbers. This may be illustrated in rule 20 circuit.

In rule 20 circuit, the leads "$S_1$" and "$\overline{S_2}$" from the S trigger cable 621 are connected to the input of an AND circuit 700, the output of which is the lead OUT 2 which is utilized for writing coded 2's. The leads "$S_1$" and "$\overline{S_2}$" signify the first vertical white zone as previously described. The M.W.H. lead $\bar{B}$ & $\overline{B_N}$ is connected to the input of an OR circuit 702, the other input of which is the output lead of an AND circuit 712, the input leads of which are the white "now" lead $\bar{B}$ and the M.W.H. zone lead "$S_0$." The lead B & $B_N$ going positive represents a minimum white height and causes a positive output from OR circuit 702, the output lead of which is labelled MWC representative of a minimum white condition. The minimum white condition means either a minimum white height or the top bit in any vertical white zone. For example, in FIG. 17 when the white bit 706 is a "now" determination, "next" determination is the black bit 708 and therefore there is no minimum white height associated with this white "now" bit. However, it is necessary to assign a coded 2 labelled element 710 for the white "now" determination because it is the top white of a definite included white region, and to take care of the fact that the top white bit of an included white region is a member of that white region, if the M.W.H. zone trigger $S_0$ is ON from a previous bit of that scan and there is a white "now" determination, a minimum white condition will be indicated which should be at least equivalent to a minimum white height.

This is accomplished by requiring that if a minimum white height has been determined (by the turning ON of M.W.H. zone trigger $S_0$) when a white "now" condition $\bar{B}$ exists lead MWC is made positive. The leads "$S_0$" and $\bar{B}$ of rule 20 circuit (FIG. 12I) produces an output from AND circuit 712 which is fed via OR circuit 702 to the minimum white condition lead MWC. The lead IN0 from "now" cable 550 goes positive to represent the fact that there was no history of black to the left. The leads IN0 and MWC are "anded" at an AND circuit 714, the output of which is fed via an OR circuit 716 to AND circuit 700. Thus, the output of AND circuit 700 will go positive to cause the OUT 2 lead to go positive and write coded 2's when these three general conditions are present; a first vertical white zone, a minimum white condition, and no past history of black to the left.

The rest of rule 20 circuit is utilized for the expanding of coded 2's both northward and southward. The importance of the expanding of the coded 2's can be observed in the character S of FIG. 28. Due to the upward curvature of the black 718 between the sixth to the ninth bit of the character, it would appear that the coded numbers assigned to the right of black bits 718 should be 5's representative of a history of black to the left. The machine would then mistakenly detect a lower lake, and recognize a character 6, instead of detecting a lower west bay in character S. If the coded 2, element 720, assigned for the tenth bit of the twenty-sixth vertical scan can be caused to effectively move southward along the inside black of the lower west bay 722, it will then be possible to recognize the pattern of the resulting coded 2's representative of no history of black to the left and therefore, as inside a lower west bay.

A southward expansion of 2's is accomplished by rule 20 circuit (FIG. 12I) by noting a simultaneous occurrence of a minimum white height and a coded 2 "next" condition, causing the writing of a coded 2. Thus, AND circuit 724 has as its inputs the M.W.H. lead $\overline{B}$ & $\overline{B_N}$ and the lead $IN2_N$ which produce an output that is fed via OR circuit 716 and AND circuit 700 to the OUT 2 lead. Since normally in this case the "now" bit is a coded 1 representative of black to the left of the "now" bit, the coded 5 would be written normally. However, it will be shown hereinafter that rule 23 circuit operates to inhibit the writing of coded 5's where coded 2's are expanded southward. Thus, in FIG. 28, in the twenty-seventh labelled vertical scan, when the bit 720 is a 2 "next" bit, the bits 726 are white "now" and white "next," and therefore, the coded 2 element 728 will be written into the marking register. The coded 2 element 728 is thus a southward expansion of the coded 2 element 720. The coded 2's, 730, are illustrations of a further southward expansion of coded 2's by rule 20 circuit of FIG. 12I, in a similar manner.

Rule 12 circuit FIG. 12H is used as a write auxiliary circuit which in conjunction with part of rule 20 circuit operates to produce a northward expansion of coded 2's. Rule 12 circuit indicates that wherever a coded 2 is examined as a "now" bit and a coded 5 as the "next" bit, if there is a minimum white height, a trigger $S_4$ in rule 12 circuit representative of this fact will be turned ON. Thus, the trigger $S_4$ ON indicates that a possible expansion of coded 2's to the northward replacing coded 5's should occur since there exists an opening to the west in this white region as signified by the 2 "now" bit.

Thus, in rule 12 circuit the leads IN2, $IN5_N$ and $\overline{B}$ & $\overline{B_N}$ are connected to the input of an AND circuit 732, which produces an output at TP time for turning ON trigger $S_4$. In rule 20 circuit AND circuit 700 is then utilized to write 2's in place of all the 5's in this scan. Thus, an AND circuit 734 has as inputs the lead "$S_4$" representative of this possible northward expansion and the lead IN5 and $\overline{B}$ indicative of a white to the right of a coded 5. An output from AND circuit 734 is fed through OR circuit 716 to AND circuit 700 to produce a signal on lead OUT 2, if the leads "$S_1$" and "$\overline{S_2}$" representative of the first vertical white zone are positive.

An illustration of this northward expansion of coded 2's is the character Z in FIG. 34. It is to be noted that the coded 5 element 736 and the coded 5 element 738 have been written on the twenty-ninth vertical scan as indications of a history of the black bits 740 to the left. On the thirtieth vertical scan, when the determinations 742 and 743 are white "now" and white "next" respectively, a coded 2 element 744 is the "now" bit and coded 5 element 736 is the "next" bit, the conditions are met for turning ON trigger $S_4$ of rule 12 circuit (FIG. 12H). Then when the next bit is examined, the coded 5 element 736 becomes the "now" bit, the determination 743 becomes the white "now" determination, and since trigger $S_4$ is ON, the input conditions of AND circuit 732 (rule 12) 734 are met and a coded 2 element 746 replaces the coded 5 element 736. Similarly, coded 2 element 748 replaces the coded 5 element 738 to complete the northward expansion of coded 2's.

Rule 12 circuit operates to write coded 3's in the marking register. Normally, the coded 3's are written in the marking register when there is a minimum white condition, and a coded 0 "now" bit in the second vertical white zone. Thus, the MWC lead representative of the minimum white condition from the rule 20 circuit is "anded" at AND circuit 750 with the IN0 lead and the output is fed via an OR circuit 752 to the input of an AND circuit 754, the other two inputs of which are leads "$S_2$" and "$\overline{S_3}$" representative of the second vertical white zone. The coincidence of these conditions produces a positive pulse at the output of AND circuit 754 on the lead OUT 3 to cause the writing of 3's in the marking register.

Where coded 2's have been written because of the detection of a first vertical white zone, and in a later vertical scan, it is determined that the bits being examined are in the second vertical white zone, coded 2's must be replaced by coded 3's as previously described. This is accomplished by rule 21 circuit where the lead IN2 is connected as an input of an OR circuit 756, the output of which is "anded" with lead $\overline{B}$ at AND circuit 758. Thus any time there is a coded 2 "now" and a white zone, an output is produced from AND circuit 758, which is fed via OR circuit 752 to AND circuit 754. AND circuit 754 will then have an output if the coded 2 and white zone are detected in a second vertical white zone because of the other leads "$S_2$" and "$\overline{S_3}$" at its input.

An illustration of 3's replacing 2's was first described hereinbefore in conjunction with the description of FIGS. 35 and 36.

Due to the nature of the characters to be read in the preferred embodiment, coded 3's may be expanded northward but it is not necessary to expand them southward for reliable recognition. Northward expansion of coded 3's is illustrated in the character 3 of FIG. 16 and is accomplished by rule 21 circuit and the rule 13 circuit (FIG. 12H). Basically, rule 13 circuit operates to recognize that whenever a coded 3 is a "now" bit and a coded 6 is the "next" bit, if there is also a minimum white height present, a trigger $S_5$ representative of this fact will be turned ON.

Thus, in the fifth vertical scan of FIG. 16, when determination 756 and 758 are white "now" and white "next," respectively, bit 760 and 762 are coded 3 "now" and coded 6 "next," respectively, and coincidence of these conditions produce the ON condition of trigger $S_5$ of rule 13 circuit. The lead $IN6_N$ of rule 13 circuit is connected via an OR circuit 764 to one of the inputs of an AND circuit 766, the other two inputs of which are the lead $\overline{B}$ & $\overline{B_N}$, and IN3, a coincidence of which at TP time produces a pulse for turning ON trigger $S_5$. It is understood that the coded 6's, 762 (FIG. 16) and 768 are written because of the history of black to the left. Then, when determination 758 is examined as the "now" determination the fact that trigger $S_5$ is ON will permit coded 3's to replace coded 6's. That is in FIG. 16, the coded 3's 770 and 772 will replace the coded 6's, 762 and 768, respectively. This is accomplished by rule 21 circuit wherein the AND circuit 758 has as its input the lead $\overline{B}$ and a lead from OR circuit 756, one of the inputs of which is an AND circuit 774. The inputs of AND circuit 774 are the lead "S$_5$" and the output of an OR circuit 776, one of the inputs of which is the lead IN6. A coincidence of a coded 6 and the possible northward expansion of coded 3's lead "S$_5$" produces an output from AND circuit 774 which is fed via OR circuit 756 to AND circuit 758 where it is "anded" with the lead $\overline{B}$ to produce a pulse which is fed via OR circuit 752 to AND circuit 754. There it is "anded" with the leads representative of the second vertical white zone to write a coded 3. Thus the white "now" determination 758 of FIG. 16 and the 6 "now" bit 762 will cause the writing of coded 3 element 770 when the trigger S$_5$ is ON. The coded 3 element 772 is an example of the further northward expansion up to the black above.

It may be possible that coded 5's are written because the area appears to be a first vertical white zone, and then in the succeeding vertical scan coded 3's are written because it is determined that this zone is actually a second vertical white zone. At that time, if it is necessary to expand 3's northward, the 3's will expand northward in place of the 5's. Therefore, in rule 13, the lead IN5$_N$ is also connected to the other input of OR circuit 764, the other input of which is lead IN6$_N$, and in rule 21 circuit lead IN5 is "or-ed" at OR circuit 776 with the lead IN6.

Normally, a coded 4 is written when a minimum white condition MWC is detected simultaneously with a coded 1 "now" before the first vertical white zone has been entered. Thus, in rule 22 circuit (FIG. 12J) the lead MWC from rule 20 circuit and the lead IN1 are "anded" at an AND circuit 778, the output of which is connected via an OR circuit 780 to one input of an AND circuit 782, the other input of which is the lead "$\overline{S_1}$" representative of the fact that the first vertical white zone has not yet been entered. A coincidence of the input signals produces an output from AND circuit 782 which is the lead OUT 4 to write a coded 4 into the marking register.

Figure 22:
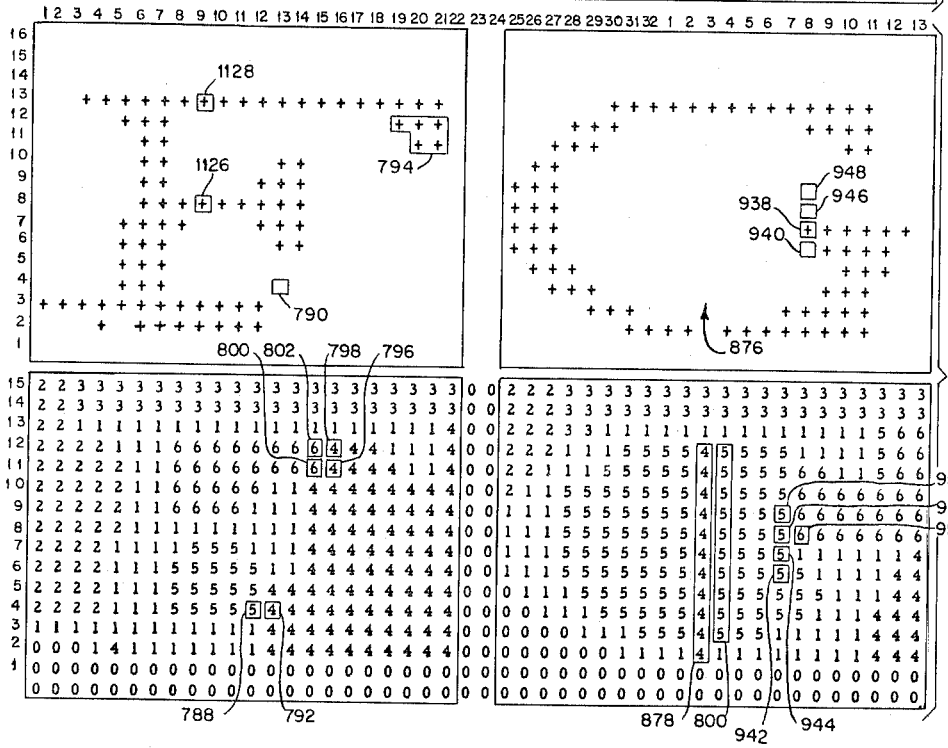

The character F of FIG. 22 will illustrate two conditions where 4's are written in place of other coded numbers. Due to the long lower serif in the character F of FIG. 22, a potential lower east bay is detected due to the coded 5's which are assigned to this area. In order to indicate that this is also a potential southeast bay so as to be able to distinguish the characters E from F, coded 4's must replace the coded 5's. Thus, in rule 22 circuit of FIG. 12J, the lead IN5 is fed via an OR circuit 784 to one input of an AND circuit 786, the other input of which is the white "now" lead $\overline{B}$. A coincidence of the two input signals produces an output which is fed via OR circuit 780 where it is "anded" with the lead "$\overline{S_1}$" to produce a coded 4. Thus, in FIG. 22 the presence of the coded 5 element 788 and the white "now" bit 790 will cause a coded 4 element 792 in the thirteenth vertical scan to be written because the lead "$\overline{S_1}$" (of rule 22) representative of entrance into the first vertical white zone has not yet been turned ON.

To prevent the coded 6's assigned to the upper east of the character F in FIG. 22 from appearing to be blocked to the right by the serif 794, and therefore appearing to be an upper lake, it has been found expedient to replace the coded 6's by coded 4's rather than expand the coded 6's downward. This is permissible, because if by the time the coded 6's are replaced by coded 4's, a potential upper east bay indication has been detected, the fact that the coded 6's themselves will not be blocked by coded 1's to the right will prevent this potential upper east bay indication from turning into an upper lake indication. The coded 4's elements 796 and 798 in the sixteenth vertical scan have replaced the coded 6's elements 800 and 802, as an illustration of this.

The operation for performing this is accomplished by the write auxiliary rule 16 circuit (FIG. 12H) in conjunction with rule 22 circuit. Rule 16 circuit indicates that if there is a 4 "now" and a 6 "next" when there is a minimum white height, and the south double dropout lead "C$_0$" and a potential upper east bay lead "C$_{10}$" are ON, an AND circuit 804 will have an output and turn ON trigger S$_7$. Then in rule 22 circuit the lead "S$_7$" is "anded" at AND circuit 806 with the lead IN6 to produce an output which is fed via OR circuit 784 to AND circuit 786 where it is in turn "anded" with the white "now" lead $\overline{B}$. If the trigger S$_7$ is ON when a 6 "now" bit is detected, and a white "now" bit is being examined an output is produced from AND circuit 786 which is fed via OR circuit 780 to AND circuit 782 where it is "anded" with a "$\overline{S_1}$" lead to write a coded 4.

*Rule circuits—Assignment of coded 5's, 6's and 7's*

The rule 23 circuit is utilized for assigning coded 5's into the marking register. Basically, coded 5's are written when a minimum white height exists within the first vertical white zone, coincidently with a coded 1. Rule 23 circuit is complicated, however, by the fact that the writing of coded 5's may be inhibited by certain other coded numbers expanding southward. As previously described, when coded 2's expand southward into areas of coded 5's, the writing of coded 5's is inhibited. Similarly, it will be shown that when coded 6's and coded 7's expand southward, the writing of coded 5's is also inhibited.

In the rule 23 circuit, lead MWC and IN1 are fed to an AND circuit 808 which has three other leads that are used for inhibiting the writing of coded 5's. If there is no inhibiting necessary, a coincidence of a minimum white condition and a coded 1 "now" bit produces an output from AND circuit 808, which is fed via OR circuit 810 to AND circuit 812. AND circuit 812 also has an inhibiting lead "$\overline{C_1}$," which will be described hereinafter. If this inhibitory lead "$\overline{C_1}$" is positive, the coincidence of pulses on the MWC and IN1 leads from OR circuits 810 and the leads "S$_1$" and "$\overline{S_2}$," representative of the first vertical white zone, produces an output from AND circuit 812 to cause the lead OUT 5 to go positive, to thereby assign a coded 5 to the marking register. The assignment of coded 5's has been illustrated and described hereinbefore in conjunction with the description of FIG. 38.

Thus coded 5's will normally be written where there is a coded 1 "now" bit and a white "now" and white "next" except where there is a coded 2 "next," or 6 "next" or 7 "next" bit, at which time the coded 2 or 6 or 7 will expand southward by being written into the marking register.

Coded 5's are written when a coded 1 "now" bit and coded 3 "next" bit are detected only because, due to the nature of the characters, it is not necessary to expand coded 3's southward. However, if it were necessary to expand coded 3's southward, it would be necessary to put an inhibitory $\overline{3_N}$ lead in rule 23 circuit to prevent the writing of coded 5's when it was desired to expand 3's southward.

It can be seen that the simultaneous condition of a minimum white height and a 1 "now" and a 5 "next" permits an effective southward expansion of coded 5's. Thus, in the character 6 of FIG. 17, when examining determinations 814 and 816 as the "now" and "next" determinations respectively, the presence of the 1 "now" bit 818 and the 5 "next" bit 820 in the marking register will cause a coded 5 to be assigned as an effective southward expansion of coded 5, 820.

The inhibiting of the writing of coded 5's when coded 2's must be expanded southward, will now be described. The lead IN2$_N$ of rule 23 circuit of FIG. 12J is fed to an inverter 824, the output of which is a lead $\overline{2_N}$ which is fed via an OR circuit 826 to AND circuit 808. As long as there is no $2_N$, lead $\overline{2_N}$ will be positive and therefore, the output of OR circuit 826 will be positive to condition AND circuit 808. However, if there is a 2 "next" bit present, the lead $\overline{2_N}$ will be negative deconditioning AND circuit 808 and inhibiting coded 5's from being written as has previously been described. However, at certain times it may be undesirable to expand coded 2's southward. This is illustrated in the character 4 of FIG. 16. In the nineteenth vertical scan, when the determination 828 is made as white "now," the "now" bit in the marking register is the coded 1 element 830 and the "next" bit is the coded 2 element 832, it is undesirable to have coded 2 element 832 expand southward through the black diagonal 834 of the character 4. In the writing of coded 2's in rule 20 circuit, it was necessary to have a white "next" input to AND circuit 724 to get an expansion of coded 2's to the south. If a black "next" bit 836 exists, the conditions of the character 4 of FIG. 16 are met as to the undesirability to expand coded 2 element 832 southward. To allow the coded 5 element 838 of FIG. 16 to be written, when the lead $\overline{2_N}$ of rule 23 circuit is negative, AND circuit 808 must be conditioned by the black "next" lead $B_N$ via OR circuit 826. Thus, if a $B_N$ exists when there is a $2_N$ in the marking register, coded 5's will not be inhibited. Any attempt by the lead $2_N$ to inhibit the writing of coded 5's will be overcome by the lead $B_N$ going positive and thereby conditioning AND circuit 808.

The lead $\overline{7_N}$ connected to AND circuit 808 will be discussed with the description of the southward expansion of coded 7's and the lead from an OR circuit 840 connected to AND circuit 808 will be described hereinafter with the description of the southward expansion of coded 6's.

Figure 21:
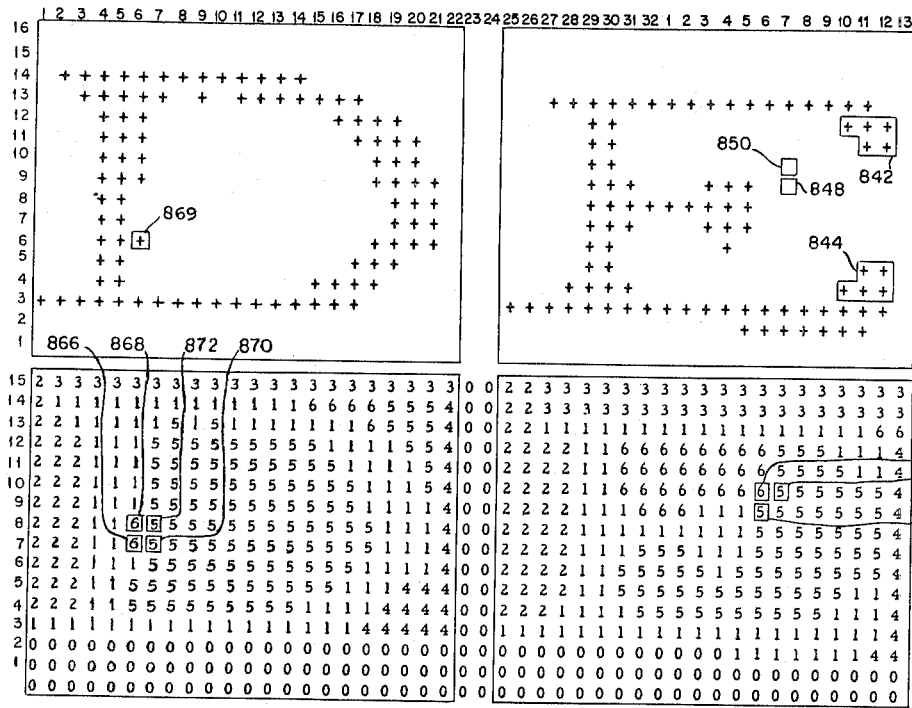

There is a special case, where coded 5's are written in place of coded 6's, that is best illustrated in the character E of FIG. 21.

Just as in the character F of FIG. 22 where the coded 6's would appear to be blocked by the serif 794 to the right to cause the detection of an upper lake which does not in fact exist, the serif 842 of the character E of FIG. 21 appears to block the coded 6's in the upper east bay. In addition, the coded 5's in the lower east bay of the E appear to be blocked to the right by the serif 844 to give the appearance of a lower lake. To avoid this, and insure that at least either the coded 5's, assigned in the lower east bay, or the coded 6's, assigned to the upper east bay, both do not appear to be blocked by black to the right, the coded 6's are replaced by coded 5's giving the coded 5's a better chance to appear not to be blocked to the right by either the upper serif 842 or lower serif 844. This is accomplished by the use of the rule 15 circuit (FIG. 12H) and the rule 23 circuit (FIG. 12J). In rule 15 circuit, a lead IN5 and $IN6_N$ being positive simultaneously with lead $\overline{B}$ & $\overline{B_N}$, representative of a minimum white height, and the potential upper east bay lead "$C_{10}$," and a potential lower east bay lead "$C_{11}$" are "anded" to an AND circuit 846 and a coincidence of these leads will turn ON the trigger $S_6$. Thus, when determinations 848 and 850 of the character E of FIG. 21 are examined as white "now" white "next" respectively, bit 852 is a coded 5 "now" and bit 854 is a coded 6 "next." It is obvious from the drawing that a potential upper east bay and lower east bay are present at that time, and so the trigger $S_6$ (rule 15) will be turned ON to signify the presence of all these conditions. In rule 23 circuit (FIG. 12J), the lead "$S_6$" is "anded" at AND circuit 856 with the lead IN6. Thus, if trigger $S_6$ (rule 15) is ON, all coded 6's examined as "now" bits thereafter in this vertical scan will cause coded 5's to replace the coded 6's. This is accomplished by having the output of AND circuit 856 (rule 23) fed through OR circuit 858 to an AND circuit 860 where it is "anded" with the lead $\overline{B}$ representative of a white "now" bit. An output from AND circuit 860 is fed via OR circuit 810 to AND circuit 812 to cause the writing of 5's if this occurs in the first vertical white zone. Thus, when determination 850, FIG. 21, is being examined as the white "now" determination, coded 6 bit 854 will be the "now" bit and coded 5 element 862 will be written into the marking register to replace coded 6 element 854. The other coded 6's in the sixth labelled vertical scan of character E will be replaced by coded 5's in the seventh labelled vertical scan.

It is possible that coded 6's may be erroneously found in the first vertical white zone due to imperfections in the black. This is illustrated best in the character D of FIG. 21.

The presence of the black bit 869 causes coded 6's, elements 866 and 868, to be written, even though it is later determined that the area is not a true second vertical white zone. In this next vertical scan, the coded 6's, elements 866 and 868, are replaced by coded 5's, elements 870 and 872, since there is no indication that these coded 6's are in a potential upper east bay. This replacement is accomplished by rule 23 circuit of FIG. 12J by having the lead IN6 and the no potential upper east bay lead "$\overline{C_{10}}$" "anded" at AND circuit 874. Thus, if there is a coded 6 when there is no potential upper east bay, the rule 23 circuit will operate to write 5's. AND circuit 874 will produce an output which is fed via OR circuit 858, the output of which is "anded" with the lead $\overline{B}$ at AND circuit 860 to write the coded 5 as previously described.

It is desirable to replace coded 4's by coded 5's in a condition which is best illustrated in the character G of FIG. 22. It is noted that there is a single south dropout 878 which causes the writing of coded 4's, element 878, in the third labelled vertical scan of the character G. In the fourth labelled vertical scan the coded 4's will be replaced by coded 5's element 800 because no double south dropout has been detected. Thus, in rule 23 circuit, the lead IN4 is "anded" at AND circuit 882 with the no double south dropout lead "$\overline{C_9}$" to produce an output from AND circuit 882 which is fed to OR circuit 858 which will eventually cause the writing of coded 5's if a lead $\overline{B}$ is present, and the coded 5's are in the first vertical white zone.

The rule 24 circuit is utilized for assigning coded 6's into the marking register. Basically, coded 6's are written when a minimum white condition exists within the second vertical white zone simultaneously with a coded 1. Just as in rule 23 circuit, when coded 7's expand southward the writing of coded 6's must be inhibited. In rule 24 circuit, lead MWC and IN1 are fed to an AND circuit 884 which has an output that is fed via an OR circuit 886 to an AND circuit 888. AND circuit 888 has as its other inputs the leads "$S_2$" and "$\overline{S_3}$" representative of the second vertical white zone. It also has is its input the leads "$C_2$" and $7_N$ which are inhibitory leads used during the southward expansion of coded 7's which will be described hereinafter. Where there is no inhibiting of coded 7's, the coincidence of the MWC and the coded 1 in the second vertical white zone will produce an output from AND circuit 888 that is fed via an OR circuit 890 to the OUT 6 lead for writing coded 6's into the marking register.

The presence of a 6 "next'" bit with a coded 7 "now" bit permits an effective southward expansion of coded 6's. Thus, in the character S of FIG. 28, when examining determinations 892 and 894 as the "now" and "next" determinations respectively, the presence of the 1 "now" bit 896 and the 6 "next" bit 898 in the marking register will cause a coded 6 element 900 to be assigned as an effective southward expansion of coded 6 element 898.

Now in a special case, it is possible that coded 5's may be erroneously found in the second vertical white zone due to imperfections in the black. This is illustrated best in the character B of FIG. 20 where, because of the white bit 902, coded 5's, 904 are written up into the zone which is later determined to be a second vertical white zone. In the next vertical scan, the coded 5's, 904, are replaced by coded 6's, 906, since they are in the second vertical white zone.

This is accomplished by having the lead IN5 (rule 24 of FIG. 12K) and the white "now" lead $\bar{B}$ "anded" at AND circuit 908, the output of which is connected via OR circuit 886 to AND circuit 888. At AND circuit 888, a coincidence with the leads representative of the second vertical white zone, if there is no inhibiting due to southward expansion of coded 7's, causes the coded 6, 906, (FIG. 20) to be written.

Similarly, it may be that coded 7's are erroneously found in a second vertical white zone due to imperfections in black. This condition is very much like the condition illustrated in the character D of FIG. 21 where the coded 5's replace coded 6's in the first vertical white zone. In a similar manner, coded 6's would replace coded 7's if this type of black imperfection were found in the vertical white zone. This is accomplished in rule 24 circuit by having the white "now" lead $\bar{B}$ "anded" with the lead IN7 and the not condition of the possible north bay lead "$\overline{C_{15}}$" at AND circuit 910. Thus, if there is no possible north bay present when the coded 7 and white "now" bit are found in the second vertical white zone, the coded 7's will be replaced by coded 6's because the output of AND circuit 910 is connected via OR circuit 886 to AND circuit 888 where it is "anded" with the lead "$S_2$" and "$\overline{S_3}$" representative of the second vertical white zone.

In the circuitry described for rule 24 circuit, where coded 6's expand southward, one of the necessary conditions was that these coded 6's be in the second vertical white zone. The character 5 of FIG. 17 illustrates a special case where it is desirable to expand coded 6's southward in other than the second vertical white zone. An examination of the ninth bit 912 of the tenth vertical scan indicates that this is the first vertical white zone but since there are coded 6's, 914, generally to the left which are representative of a potential upper east bay it is undesirable to write coded 5's which may give a lower east bay indication. Therefore, these coded 6's must be expanded southward even though they are in the first vertical white zone and coded 6, 916, is assigned for bit 912. Thus, if there is a 1 and 6 "next," a potential upper east bay, but not a potential lower east bay, and at least an entry into the first vertical white zone, coded 6's will be expanded southward, if there is "now" and white "next." In FIG. 12K, the leads IN1, IN6$_N$, "$C_{10}$," "$\overline{C_{11}}$" and "$S_1$" representing the required conditions are connected to the input of the AND circuit 918, as is the lead $\overline{B_N}$. The white "now" requirement is fulfilled by having the output of AND circuit 918 connected via an OR circuit 920 to the input of an AND circuit 922, the other input of which is the lead $\bar{B}$. The output of AND circuit 922 is connected via OR circuit 890 to the lead OUT 6 for the writing of coded 6's.

Because of imperfections in the black of vertical characters, coded 5's might be found above coded 6's in a particular vertical scan. This condition is indicated in FIG. 17 by a box 924 and in FIG. 28 by a box 926. Actually, what is desired is that coded 6's replace the coded 5's erroneously found in a previously determined second vertical white zone due to the imperfections in the black. This is accomplished by the rule 14 circuit (FIG. 12H) and rule 24 circuit (FIG. 12K). In rule 14 circuit leads, IN6; IN5$_N$ and $\bar{B}$ & $\bar{B_N}$, representative of a 6 and 5 "next," and a minimum white height will produce an output from AND circuit 928 to turn ON trigger $S_{25}$ at TP time. Thus, in the character S of FIG. 28 when the determinations 930 and 932 are being examined as the white "now" and "next" determinations respectively, the coded 6 and 5 of box 926 are the "now" and "next" bits, respectively, and the trigger $S_{25}$ will be ON to indicate this condition. Then, when determination 932 is being examined as the white "now" determination, the fact that trigger $S_{25}$ is ON will cause a coded 6, 934 to replace the coded 6 of box 926. This is accomplished by rule 24 circuit where lead "$S_{25}$" is connected to an AND circuit 936 (FIG. 12K) where it is "anded" with lead IN5. Thus, when what was the 5 "next" bit is examined, as the 5 "now" bit, if trigger $S_{25}$ is ON, an output will be produced from AND circuit 936 which is fed via OR circuit 920 to be "anded" with the white "now" lead $\bar{B}$ at AND circuit 922, the output of which is fed via OR circuit 890 to lead out 6 to write a coded 6 into marking register.

Referring to the character G of FIG. 22, the horizontal black line in the seventh horizontal row between the eighth vertical scan and the thirteenth vertical scan appears to divide the potential middle east bay of the character in half to produce both a potential lower east bay and a potential upper east bay. Then, if the potential lower east bay closes, an indication of a partial lower lake is produced, which will be fully described hereinafter. The seventh bit 938 of vertical scan labelled 8 is part of the horizontal black dividing line and when it is detected as a black "next" bit in a potential middle east bay, this is noted. When examining the determinations 940 and 938 as the white "now" and black "next" determinations respectively, 5 "now" and 5 "next" bit 942 and 944 respectively, are present, and so are the determinations of a middle east bay and a minimum white height zone. These conditions are met and a trigger $S_{7.1}$ in rule 17 circuit (FIG. 12H) is turned ON by the inputs IN5, IN5$_N$, $\bar{B}$, $B_N$, "$C_9$" (middle east bay) and "$S_0$" (minimum white height zone) at AND circuit 945. Lead "$S_{7.1}$" in a positive condition then represents the fact that the middle east bay might be divided and a determination must then be made as to whether there is white above the black to indicate that the black line does actually divide the middle east bay. Therefore, later in the vertical scan, if a minimum white height is examined in the form of white "now" determination 946 (FIG. 22) and white "next" determination 948, when 5 "now" and 5 "next" bits 950 and 952 respectively, are present, a possible partial lower lake indication is produced. A trigger $C_5$ of rule 18 circuit (FIG. 12I) is turned ON to signify the presence of all these conditions by an AND circuit 954 which has as input leads IN5, IN5$_N$, $\bar{B}$ & $\bar{B_N}$ and "$S_{7.1}$." To determine if the upper east bay closes, a coded 6, 956 must then be written to replace the coded 5, 950 because this is the second vertical white zone. This is accomplished by the AND circuit 908 of rule 24 circuit which requires a 5 "now" and white "now" indication to write a coded 6 in the second vertical white zone, as hereinbefore described. Further description of the partial lower lake will be described hereinafter.

Rule 25 circuit (FIG. 12L) is utilized for assigning coded 7's. Coded 7's are generally used for indicating north bays and they are generally written in the third vertical white zone if there is a history of black to the left. The only character of the generally utilized characters of FIG. 14 that has a third vertical white zone with black to the left is the character X958, which has a third vertical white zone 960 having black to the left. Since the zone 960 in the character X is a north bay, it is permissible to write coded 7's as soon as this zone is detected, so that coded 5's and 6's can be utilized for detecting other zones in the character. Thus, in rule 25 circuit a minimum white condition, MWC, and 1 "now" bit in the third vertical white zone represented by lead "$S_3$" will produce an output from an AND circuit 962 which is fed via an OR circuit 964 to the lead OUT 7 which causes coded 7's to be written into the marking register. As hereinbefore described, the more usual case in which coded 7's are written takes place when there is a double dropout to the north, in which case coded 7's would replace coded 5's or 6's. The coded 7's are an indication of this double dropout and are written so that other coded 5's and 6's can then be put into use for indications of such things as east bays. This is illustrated in the character X of FIG. 33, where the coded 7's, 966 are shown in the north bay replacing coded 5's, 968. In the sixteenth vertical scan when the north bay closes to the right, the fact that coded 5's, 970 exist would prevent an indication of the fact that the north bay is closing. Later, the coded 5's, 970 are used for detecting the middle east bay. To accomplish the replacing of coded 5's by coded 7's, the lead IN5 is fed (in rule 25 circuit) via an OR circuit 972 to one input of an AND circuit 974, the other input of which comes from an OR circuit 976. The inputs of OR circuit 976 are the double dropout to the north from the first vertical white zone lead "$C_1$" and a possible north bay lead "$C_{15}$," either of which produces an output from OR circuit 976. A coincidence at the input of AND circuit 974 produces a signal which is fed via an OR circuit 978, the output of which is "anded" with the white "now" lead $\overline{B}$ at AND circuit 980 to produce an output which is fed to OR circuit 964 to write a coded 7 in the marking register. An illustration of coded 7's replacing coded 5's was described hereinbefore in relation to the description of FIG. 38. The character H of FIG. 23 illustrates that there is a possibility that coded 6's may be in the first vertical white zone. The coded 6's, 982 in the first vertical white zone of tenth labelled vertical scan are shown being replaced by the coded 7's, 984 in the eleventh vertical scan. Thus, the lead IN6 (rule 25) is "or-ed" at OR circuit 972 with the lead IN5 to produce the writing of coded 7's as described.

To take care of the possibility of coded 7's replacing coded 6's in the second vertical white zone such as in the example of the character Y of FIG. 34, where the coded 7's, 986 replace the coded 6's, 988, the lead IN6 in rule 25 circuit is fed via an OR circuit 990 to an AND circuit 992 where it is "anded" with the condition of a double north dropout from the second vertical white zone lead $C_2$ or a possible north bay lead "$C_{15}$" from an OR circuit 994. The output of AND circuit 992 is fed via OR circuit 978 to the input of and circuit 980 where it is "anded" with the lead $\overline{B}$ to produce an output which will write coded 7's in the marking register.

As has been described hereinbefore, coded 7's may expand southward as illustrated by the coded 7's, 996 of FIG. 26. This southward expansion of coded 7's is performed in rule 25 circuit by the lead IN1 and lead $IN7_N$ being "anded" at an AND circuit 998 to be fed to OR circuit 972. Therefore, a coded 7 will be expanded southward if a white "now" bit ($\overline{B}$ at AND circuit 980) and a possibility of a double dropout to the north or possible north bay (leads "$C_1$" and "$C_{15}$" at OR circuit 976) has been detected, as previously described. The southward expansions of coded 7's in the second vertical white zone is accomplished by the leads IN1 and $IN7_N$ being "anded" at an AND circuit 1000 and being fed to OR circuit 990.

It is not necessary to expand coded 7's southward in the third vertical white zone because a minimum white height found in a third vertical white zone to the right of a coded 1 will automatically be written as a coded 7 by the circuitry at the top of rule 25 circuit as hereinbefore described.

*Rule circuits—West bays*

Rule 26 circuit to rule 35 circuit inclusive (FIGS. 12L to 12N), relate to the recognition of the three west bays, MWB, UWB and LWB. In detecting west bays, the rule circuits first look for west inlets. A west inlet differs from a west bay only in that a bay is definitely closed to the right by black. It is obvious, that in the characters of FIG. 14, if there is a west inlet indication, the west inlet will be closed by black to the right before the end of character due to the fact that there are no discontinuous characters, and therefore it is not actually necessary to look for the closing to the right. However, if the described teachings were applied to recognition of lower case letters and other discontinuous symbols such as $i$ and $=$, etc., an inlet might be considered as a recognition criteria distinct from a bay. In the rule circuits shown in the drawings, the west inlet indications are utilized only as a step in the detection of a west bay. Generally then, rule 26 circuit to rule 35 circuit, inclusive, first look for a 2 x 2 bit white area, in the first vertical white zone, and blocked above by black. This then becomes a possible middle west inlet indication, and when this inlet is closed to the right by black, a middle west bay is indicated. If during any vertical scan in which a possible middle west inlet is detected, an upper west inlet UWI or a potential upper east bay UEB is detected, the middle west inlet indication is reset, and a lower west inlet indication is also produced. If the upper west inlet or the lower west inlet is closed to the right, an upper west bay UWB or lower west bay LWB respectively, is indicated.

Rule 26 circuit contains a trigger $S_8$ which is utilized for indicating a 2 x 2 bit white area in the first vertical white zone and with no history of black to the left. Trigger $S_8$ is turned ON by a positive signal from an AND circuit 1002 produced by a coincidence of positive signals on its six input leads. The two input leads IN2 and $IN2_N$ are representative of the fact that there was a minimum white height in the previous vertical scan, and that this minimum white height had no history of black to the left and was in the first vertical white zone. Three other input leads $\overline{B}$ & $\overline{B_N}$, "$S_1$" and "$S_2$" are representative of a minimum white height in the first vertical white zone, and a coincidence of signals on the five input leads with the sixth TP lead input turns ON trigger $S_8$ to represent the 2 x 2 bit white area.

Rule 27 circuit is utilized for detecting a possible middle west inlet representative of the fact that the 2 x 2 white bit area of rule 26 circuit is blocked by black to the north. Thus, the lead "$S_8$" representative of the 2 x 2 bit white area of rule 26 circuit is connected to one of the inputs of an AND circuit 1004, another input of which is the lead "$C_8$" representative of no lower west inlet indication. The other two inputs of AND circuit 1004 will both be positive only if both the present scan and the previous scan are blocked by black to the north. Thus, one of these input leads is from an OR circuit 1006 having in turn as its inputs the leads IN1 and $IN1_N$, and the other input is connected to an OR circuit 1008 having as its input the leads B and $B_N$. Thus, if a coded $IN_1$ 1 and a B, or a coded $IN_1$ 1 and a $B_N$, or a coded $IN_1$ $1_N$ and a $B_N$, or a coded $IN_1$ $1_N$ and a B are present, it is an indication that the 2 x 2 bit of rule 26 circuit is blocked to the north. The different possible arrangements of blocking by black to the north are illustrated in the character 9 of FIG. 19. The detecting of the black bit 1010 in the fourth vertical scan produces a 1 bit 1012. In the fifth vertical scan, when examining black bit 1014 as the "now" bit (B), the marking register contains bit 1010 as the "next" bit, $IN1_N$ ($1_N$), and it is thus obvious that the coded 2's of the fourth and fifth vertical scan are blocked by black to the north by this arrangement of $IN1_N$ $1_N$ and B. Similarly, $IN1_N$, $1_N$ and $B_N$ produces in the illustration of FIG. 19 a blocking by black 1016, and the IN1 and $B_N$ produces a blocking by black 1018. At the coincidence of input signals, a positive signal will appear at the output of AND circuit 1004 of rule 27 circuit to turn ON triggers $S_{30}$ and $C_6$. Trigger $C_6$ in the ON condition is representative of a possible middle west inlet which will become a bona fide middle west bay if it is blocked to the right by black. The trigger $S_{30}$ which is reset at the end of each scan, is used as the indication of a potential middle west inlet determined during each vertical scan.

Rule 28 circuit and rule 29 circuit of FIG. 12M are utilized for indicating a closure of the middle west inlet to the right, to thus signify a middle west bay MWB. In rule 28 circuit, leads B and $B_N$ are fed via an OR circuit 1020 to an AND circuit 1022, the other two leads of which are IN2 and "$\overline{S_0}$." The $IN_2$ and (B or $B_N$) signifies that there is some black generally to the right of the coded 2, and the "$\overline{S_0}$" lead represents the fact that a minimum white height has not yet been detected in the vertical white zone containing the coded 2 in the present vertical scan. A coincidence of the three input signals on AND circuit 1022 at TP time will turn ON a trigger $S_{20}$ to signify a possible closure to the right. If a minimum white height is detected thereafter during the present vertical scan, the M.W.H. zone lead "$S_0$" going ON will cause the A.C. reset of trigger $S_{20}$ via A.C. input circuit 1024 and end the possibility of a closure to the right indication for this zone in this scan.

Thereafter, in this vertical scan, if coded $\overline{2}$ and $\overline{2_N}$ are detected, it is indicative of the scan closure by black to the north because in order to change from a coded 2 to a coded $\overline{2}$ and $\overline{2_N}$ are detected, the possible closure to the right trigger $S_{20}$ and the MWI trigger $C_6$ (rule 27) have not been reset, a trigger $C_{6.1}$ in rule 29 circuit will be turned ON to signify a bona fide middle west bay. This is accomplished by having the leads IN2 and $IN2_N$ fed via inverters 1026 and 1028, respectively, to leads $\overline{2}$ and $\overline{2_N}$, respectively, which are two of the input leads of an AND circuit 1030. Leads "$S_{20}$" and "$C_6$" are also connected as inputs to AND circuit 1030 which will produce a signal at a coincidence of its inputs at TP time to turn ON MWB trigger $C_{6.1}$.

The character J of FIG. 24 illustrates a closure to the right of a middle west inlet, to produce the middle west bay indication. In the twenty-first vertical scan, when the black bit 1032, is being examined as a "now" bit, a coded 2, 1034 will be the "now" bit and the lead "$S_0$" of rule 28 will be OFF to indicate no minimum white height zone. From the examination of the black bit 1032 until the examination of the thirteenth bit 1036, there is no minimum white height zone detected, and so M.W.H. zone lead "$S_0$" is not turned ON to reset trigger $S_{20}$ (rule 28). Also, there has been nothing detected to cause a change from the middle west inlet indication to a lower west inlet and so trigger $C_6$ (rule 27) is still ON. Then when the black bit 1038 (FIG. 24) is being examined as a "now" determination, the bits 1040 are $\overline{2}$ and $\overline{2_N}$ (actually 1 and $3_N$) and since triggers $C_6$ (rule 27) and $S_{20}$ (rule 28) are ON, rule circuit 29 acts to turn ON trigger $C_{6.1}$ to indicate a middle west bay.

The character X of FIG. 33 also illustrates the detection of a middle west bay. In the eighth vertical scan, the examination of the seventh black bit 1042 as a "now" bit when the coded 2, 1044 is detected turns ON the possible closure to the right trigger $S_{20}$ (rule 28). Since the eighth and ninth bits 1046 (FIG. 33) are white, M.W.H. zone lead "$S_0$" will go ON to reset possible closure to the right trigger $S_{20}$ (rule 28). Thus, when tenth and eleventh bits 1048 are examined, and the $\overline{2}$ $\overline{2_N}$ 1050, are MWB trigger $C_{6.1}$ (rule 29) will not be turned ON because possible closure to the right trigger $S_{20}$ (rule 28) is OFF. However, in the next vertical scan, when the ninth bit 1052 is being examined, the possible closure to the right trigger $S_{20}$ will turn ON because of the coded 2, 1054. Now when the tenth and eleventh bits 1056 are examined, bits 1058 are $\overline{2}$ and $\overline{2_N}$ since there was no minimum white height to turn ON lead "$S_0$" (rule 28), the MWB trigger $C_{6.1}$ will turn ON to indicate a middle west bay. Thus, it is evident, that a single bit like 1052 is not enough to prevent a closure to the right, and so imperfections in the character of one bit will be ignored. Rule 30 circuit and rule 31 circuit detect an upper west inlet UWI by recognizing a 2 x 2 bit white area of coded 3's blocked by black to the north by similar circuitry as that utilized by rule 26 circuit and rule 27 circuit for detecting a middle west inlet MWI. The upper west inlet UWI is therefore indicated by the turning ON of trigger $C_7$ of rule 31 circuit. It is to be noted that trigger $C_7$ is reset only by lead $X_C$ at the end of character. Rule 32 circuit then turns ON a trigger $S_{21}$ as an indication of black to the right of coded 3 in the same manner that rule 28 circuit detects black to the right of a coded 2.

The actual closure to the right by black of an UWI to indicate an UWB is performed in a slightly different manner by rule 33 circuit than that described for the indication of a MWB by rule 29 circuit. The difficulty is that coded 3's may exist in both the second and third vertical white zones, and therefore, if in the vertical scan before the closure by black to the right, the black to the north is only one bit high, there may never exist a $\overline{3}$ and $\overline{3_N}$, and therefore there would be no UWB indicated. This is illustrated in the character 3 of FIG. 16 where in the ninth vertical scan, during the examination of the thirteenth black bit 1058 as the "now" bit a $IN3_N$ $3_N$ bit 1060 exists. Therefore, rule 33 circuit (FIG. 12N) requires a 3 and $\overline{3_N}$ and $B_N$ in addition to "$S_{21}$" and "$C_7$" to turn ON a trigger $C_{7.1}$ as an indication of an UWB. The 3 and $\overline{3_N}$, 1062 of FIG. 7 plus the black bit 1058 as the "next" bit to insure that there is no sneaking of coded 3's diagonally upward, is enough to indicate the blocking to the right.

Rule 34 circuit detects a lower west inlet LWI by recognizing the presence of either an upper west inlet or a potential upper east bay during a vertical scan in which a middle west inlet has been found. This is an indication that the middle west inlet is actually a lower west inlet and so the middle west indication must be reset. Thus, in rule 34 circuit, either the lead "$C_7$" representative of an upper west inlet UWI, or the lead "$C_{10}$" representative of a potential upper east bay as will be described hereinafter, will produce an output sigal from an OR circuit 1064. This output signal is "anded" at AND circuit 1066 with the lead "$S_{30}$" representative of a middle west inlet during the present vertical scan to produce an output signal which turns ON a trigger $C_8$ as an indication of a lower west inlet. The lead "$C_8$" from trigger $C_8$ is utilized in rule 27 circuit (FIG. 12I) to A.C. reset (via A.C. input circuit 1068) the triggers $C_6$ and $S_{30}$ which are representative of the possible middle west inlet. Triggers $C_6$ and $S_{30}$ are also reset by other circuitry which is described hereinafter in the section on east bays and lakes.

If there is a closure to the right, the lower west inlet becomes a lower west bay. This is accomplished by rule 35 circuit which operates to turn ON a trigger $C_{8.1}$ indicative of a lower west bay. Trigger $C_{8.1}$ is turned ON by a coincidence of leads $\overline{2}$, $\overline{2_N}$, "$S_{20}$" and "$C_8$" to indicate the closure for the same reasons described in the closure of the middle west inlet in the rule 29 circuit and therefore needs no further explantion.

*Rule circuits—East bays and lakes*

Rule 36 circuit to rule 46 circuit, inclusive, (FIGS. 12N through 12P) relate to the recognition of the three east bays, MEB, UEB, and LEB, and the lakes ML, UL, LL and the partial lower lake PLL. The circuitry for recognizing the east bays and lakes are analogous to those for recognizing west inlets and west bays, in that first potential east bays are detected and if these east bays are blocked by black to the right, a lake is then indicated. However, after an indication of a lake is made, the particular east bay which closed to the right to produce the lake indication acts to remove the respective east bay indication. Rule 36 circuit is utilized to indicate a 2 x 2 bit white area in the first vertical white zone and with a history of black to the left. Rule 36 circuit ,therefore, looks for a coded IN5 5 and $IN5_N$ $5_N$ as an indication of a history of black to the left in the first vertical white zone, as hereinbefore described. It also takes into account the special case where a character A might have a long enough lower left serif to produce a coded IN6 6 and $6_N$ in the lake of the character A. Since the lake in the character A might be fairly small, if the next vertical scan examines the 6 & $6_N$ along with a $\overline{B}$ and $\overline{B_N}$ while in the first vertical white zone, a legitimate 2 x 2 bit white area is indicated by rule 36 circuit. A trigger $S_{11}$ of rule 36 circuit, indicative of this 2 x 2 bit white area, is turned ON by a positive signal from an AND circuit 1070 is duced by a coincidence of positive signals on its input leads. One of the input leads of AND circuit 1070 is from an OR circuit 1072. Leads IN5 and $IN5_N$ representative of the existence of a minimum white height in the previous vertical scan and that this minimum white height had a history of black to the left, are connected to an AND circuit 1074, the output of which feeds OR circuit 1072. Leads IN6 and $IN6_N$ for reasons just described are also connected to an AND circuit 1076, the output of which also feeds OR circuit 1072. The input leads, of AND circuit 1070, $\overline{B}$ & $\overline{B_N}$, "$S_1$" and "$\overline{S_2}$" are representative of a minimum white height in the first vertical white zone of the present vertical scan. The one other necessary condition to make AND circuit 1070 produce a positive signal is a lead "$\overline{C_{10}}$" representative of an absence of a potential upper east bay. The lead "$\overline{C_{10}}$" is necessary to prevent a possible middle east bay indication, especially in a character 6 where the upper east bay of the character extends out beyond the lake portion, a condition which might cause an erroneous middle east bay indication.

Rule 37 circuit is utilized for detecting a possible middle east bay, indicative of the fact that the 2 x 2 white bit area of rule 36 circuit is blocked by black to the north. The triggers $S_{32}$ and $C_9$ are turned ON to indicate a blocking to the north in a manner similar to that described for rule 27 circuit and need not be further described except to note that the lead "$S_{11}$" to an AND circuit 1078, which turns ON triggers $C_9$ and $S_{32}$ represents the 2 x 2 bit white area of rule 36 circuit, and lead "$\overline{C_{11}}$" represents an absence of a potential lower east bay.

The possible MEB triggers $C_9$ and $S_{32}$ are reset by a number of different conditions which will be described in detail after a description of the turning ON of the triggers that indicate the other east bays and lakes.

To detect a potential upper east bay, rule 38 circuit is utilized for indicating a 2 x 2 bit white area in the second vertical white zone having a history of black to the left. The leads "$S_2$", "$\overline{S_3}$", IN6, $IN6_N$, and $\overline{B}$ & $\overline{B_N}$ are thus connected via an AND circuit 1080 to turn ON a trigger $S_{26}$ indicative of this 2 x 2 white bit area. In rule 39 circuit, a closure to the north of this 2 x 2 white bit area of rule 38 circuit produces a potential UEB indication. This is accomplished by "anding" at an AND circuit 1082, the lead "$S_{26}$" with the output from a pair of OR circuits 1084 and 1086. OR circuit 1084 has as its inputs the leads IN1 and $IN1_N$ and OR circuit 1086 has as its inputs the leads B and $B_N$. This combination of circuitry indicates a closure to the north, in the same manner as the equivalent circuitry of rule 31 circuit, by producing an output from AND circuit 1082 which is fed via an OR circuit 1038 and an AND circuit 1090 for proper timing to the potential UEB triggers $C_{10}$ and $S_{33}$.

Similarly, rule 40 circuit operates to indicate a potential lower east bay in a manner similar to the lower west inlet indication of rule 34 circuit. It recognizes the presence of either an upper west inlet or a potential east bay during a vertical scan in which a possible middle east inlet has been found. Thus, in rule 40 circuit, either the lead "$C_7$" representative of an upper west inlet UWI, or the lead "$C_{10}$" representative of a potential upper east bay, will produce an output signal from an OR circuit 1092. This output signal is "anded" at AND circuit 1094 with the lead "$S_{32}$", representative of a middle east bay during the present vertical scan, to produce an output signal which feeds through an OR circuit 1096, the output of which is "anded" with timing lead TP at AND circuit 1098 to turn ON trigger $C_{11}$ as an indication of a potential lower east bay.

When a possible partial lower lake is detected, it is desirable to turn ON triggers indicative of a potential upper east bay and potential lower east bay, and if the lower east bay is closed by black to the right while the upper east bay remains open, a bona fide partial lower lake is indicated. Therefore, leads "$C_5$" and "$S_{7.1}$" from rule 18 circuit and rule 17 circuit respectively indicative of a possible partial lower lake are "anded" in rule 39 circuit at an AND circuit 1100, the output of which is applied through OR circuit 1038 and AND circuit 1090 to turn ON the trigger $C_{10}$, representative of a potential upper east bay. Leads "$C_5$" and "$S_{7.1}$" are also "anded" in rule 40 circuit at an AND circuit 1102, the output of which is applied through OR circuit 1096, and AND circuit 1098 to turn ON the trigger $C_{11}$, representative of a potential lower east bay.

Rule 41 circuit and rule 42 circuit are utilized for indicating a closure of the possible middle east bay to the right to thus signify a bona fide middle lake, ML. These two circuits operate to detect a blocking of coded 5's to the right in a manner similar to that described for a blocking to the right in rule 28 circuit and rule 29 circuit. In rule 41 circuit, leads B and $B_N$ are fed via an OR circuit 1104 to an AND circuit 1106, the other two leads of which are leads IN5 ad "$\overline{S_0}$." The coded IN5 5 and (B or $B_N$) signifies that there is some black to the right of the coded 5, and the "$\overline{S_0}$" lead represents the fact that a minimum white height has not yet been detected in the vertical white zone of the present vertical scan. A coincidence of the three input signals on AND circuit 1106, at TP time, will turn ON a trigger $S_{13}$ to signify a possible closure to the right. If a minimum white height is detected thereafter during the present vertical scan, the M.W.H. zone trigger lead "$S_0$" going ON will cause the A.C. reset of trigger $S_{13}$ via an A.C. reset circuit 1108. Thereafter, in this vertical scan if a $\overline{5}$ and $\overline{5_N}$ are detected representative of the scan closure by black to the north and the leads "$S_{13}$" and "$C_9$" (rule 42 representative of a possible MEB) have not yet been reset, a trigger $C_{12}$, in rule 42 circuit, will be turned ON to signify a closure to the right and therefore a bona fide middle lake. This is accomplished by feeding leads IN5 and $IN5_N$ via inverters 1110 and 1112, respectively, to an AND circuit 1114 where they are "anded" with the leads "$S_{13}$" and "$C_9$" for producing a signal at TP time for turning ON ML trigger $C_{12}$. The actual closure to the right by black of a potential upper east bay to indicate a bona fide upper lake is accomplished by rule 43 and rule 44 circuit, which operate in a manner similar to that of rule 41 circuit and rule 42 circuit except that a closure to the right of coded 6's instead of coded 5's is indicated. Rule 43 circuit operates to turn ON a trigger $S_{15}$ indicative of a possible closure by black, and rule 44 circuit is turned ON by a coincidence of signals on leads $\overline{6}$, $\overline{6_N}$, "$S_{15}$" and "$C_{10}$" applied to an AND circuit 1116 in rule 44 circuit for turning ON trigger $C_{13}$ indicative of the bona fide upper lake. Lead "$C_{10}$" is representative of a potential upper east bay. Thus, in the vertical scan in which lead "$S_{15}$" is turned ON, if a $\overline{6}$ and $\overline{6_N}$ are detected representative of the scan closure by black to the north, and the leads "$S_{15}$" and "$C_{10}$" (potential UEB) have not been reset, the trigger $C_{13}$ in rule 44 circuit will be turned ON to signify the bona fide upper lake.

If a potential lower east bay, as indicated by lead "$C_{11}$," (rule 45) is closed to the right and there is no potential partial lower lake indication lead "$(\overline{C_5})$," a bona fide lower lake indication is produced. This is accomplished by rule 45 circuit which operates to turn ON a trigger $C_{14}$, indicative of the bona fide lower lake. Lower lake trigger $C_{14}$ is turned ON by a coincidence of signals on leads $\overline{5}$, $\overline{5_N}$, "$S_{13}$" and "$C_{11}$" at an AND circuit 1118 (to indicate the closure for the same reasons described in the closure of the middle east bay in the rule 42 circuit) plus a signal on lear "$\overline{C_5}$" (no potential PLL). Where, however, there is a possible partial lower lake indication and all the other conditions of rule 45 circuit, a bona fide partial lower lake will be indicated. Therefore, AND circuit 1120 of rule 46 circuit has all the same input conditions as AND circuit 1118 of rule 45 circuit, except the lead "$C_5$" instead of the lead "$\overline{C_5}$," and a coincidence of all the input signals turns ON a trigger $C_{14.1}$ indicative of a bona fide partial lower lake.

In addition to the means for changing west inlets to west bays, and east bays to lakes, means are provided for changing "middle" criteria indications to "upper" and "lower." In the character 3 of FIG. 16, in the fifth vertical scan, an MWI indication will be produced when the eighth bit 1122 is being examined as the "next" bit. Then, when the thirteenth bit 1124 is being examined as the "next" bit, an UWI indication is produced. This means that the MWI indication must be changed to an LWI indication. This is accomplished by having the UWI indication turn ON the LWI trigger which in going ON causes the resetting of the MWI trigger. Thus, in rule 34 circuit of FIG. 12N, the UWI lead "$C_7$" and the MWI in that vertical scan lead "$S_{30}$" turn ON LWI trigger $C_8$. Lead "$C_8$" then is fed to rule 27 circuit for resetting the possible MWI triggers $C_6$ and $S_{30}$ via the A.C. input 1068.

Similarly, a possible MEB indication may be changed as illustrated in character F of FIG. 22. In the ninth vertical scan a possible MEB indication will be produced when the eighth bit 1126 is being examined as the "next" bit. Then when the thirteenth bit 1128 is being examined as the "next" bit, a potential UEB indication is produced. In this case, the potential MEB indication must be changed to a potential LEB indication, and this is accomplished by having the potential UEB indication turn ON the potential LEB trigger which, in going ON, causes the resetting of the possible MEB trigger. Thus, in rule 40 circuit of FIG. 12O, the UWI lead "$C_7$" and the "possible MEB in that vertical scan" lead "$S_{32}$" turn ON potential LEB trigger $C_{11}$. Potential LEB lead "$C_{11}$" then is fed to rule 37 circuit of FIG. 12N and via an A.C. OR circuit 1129, for resetting the possible MEB triggers $C_9$ and $S_{32}$.

In a character such as the character 5 of FIG. 14, it is possible to have a MWI indication followed by a UEB indication. In this case, the UEB indication must turn ON the LWI trigger which in turn resets the MWI trigger. Thus, in rule 34 circuit the UEB lead "$C_{10}$" and the "MWI in that vertical scan" lead "$S_{30}$" turn ON LWI trigger $C_8$ which effects the resetting of the possible MWI triggers $C_6$ and $S_{30}$ in rule 27 circuit. In the same way, in the character 2 of FIG. 14, it is possible to have an MEB indication followed by a UWI indication. The UWI indication must turn ON the LEB trigger which, in turn, must reset the MEB trigger. Thus, in rule 40 circuit the UWI lead "$C_7$" and the "MEB in this vertical scan" lead "$S_{32}$" turn ON the potential LEB trigger $C_{11}$. Lead "$C_{11}$" is then fed to rule 37 circuit for resetting the possible MEB triggers $C_9$ and $S_{32}$.

A character 2 of FIG. 15 illustrates a special case where a MWI is detected first followed by the detection in a later scan of a MEB. Thus, in the twenty-ninth vertical scan when the thirteenth bit 1130 is being examined as the "next" bit, a MWI indication is produced. In the thirtieth vertical scan when bit 1131 is being examined as the "now" determination of coded 2, 1132 is detected in the second vertical white zone before the MEB in that vertical scan lead "$S_{32}$" (rule 40) is turned ON. This indicates that there is a zone below the MWI and the detection of this condition will cause the resetting of the MWI. Thus, in rule 27 circuit of FIG. 12L, the 2 "now" lead IN2, the second vertical white zone leads "$S_2$" and "$\overline{S_3}$," and the no MWI in this vertical scan lead "$\overline{S_{30}}$" are "anded" at an AND circuit 1134. A coincidence of input signals at TP time produces an output signal from AND circuit 1134 which is fed via an OR circuit 1136 to reset the possible MWI trigger $C_6$. Then in the next vertical scan a MWB followed by an UWI are detected, the LEB trigger is turned ON and the MEB trigger is reset in the same manner in the character 2 in which an MEB is detected before a UWI as described hereinbefore.

Similarly, in the character 5 of FIG. 14, if the lower black border of the LWB is a short one, coded 5's will be written in the UEB and an MEB indication will be produced first. Some vertical scans later when the lower black border is detected during a vertical scan the coded 5's of the MEB will be in the second vertical white zone. This causes the reset of the possible MEB trigger $C_9$ of rule 37 circuit, by a coincidence of input signals and the 5 "now" lead IN5, the second vertical white zone leads "$S_2$" and "$\overline{S_3}$," and the no MEB in this vertical scan lead "$S_{32}$" at an AND circuit 1138. At TP time the output signal is fed via an OR circuit 1140 to reset the possible MEB trigger $C_9$. Then in the "next" vertical scan a MWI followed by a UEB are detected and the LWI trigger is turned ON and the MWI trigger is reset in the character 5 in which an MWI is detected before a UEB, as described hereinbefore in this section.

As previously described, it is not necessary to reset the west inlets when it is determined that they are closed by black to the right to form this respective west bay. However, in certain characters, it is important in distinguishing between these characteristics to determine whether they contain an east bay or a lake. Therefore, it is necessary to reset the east bay when its respective lake is detected. In rule 39 circuit, the upper lake lead "$C_{13}$" is fed via an A.C. OR circuit 1142 to the potential UEB trigger $C_{10}$ and $S_{33}$ to provide an A.C. reset. In rule 40 circuit the lower lake lead "$C_{14}$" and the partial lower lake lead "$C_{14.1}$" are fed via an A.C. OR circuit 1144 to the potential LEB trigger $C_{11}$ to accomplish the A.C. reset. The middle lake, lower lake and possible partial lower lake reset the possible MEB in rule 37 circuit by having the ML lead "$C_{12}$", the LL lead "$C_{14}$" and the possible PLL lead "$C_{14.1}$" fed via A.C. OR circuit 1129 to the MEB triggers $C_9$ and $S_{32}$.

Since a study of FIGS. 13A and 13B will show that east bays must be distinguished from south bays and north bays, it is necessary that wherever serifs in a character cause indications of east bays which are later determined to be north or south bays, that the east bay be reset. This condition is well illustrated in the character H of FIG. 23 where the white regions 1146 and 1148 produce indications of lower east bay and upper east bay, respectively. After a south bay 1150 is detected, the lower east bay 1146 indication must be reset, and after a north bay 1152 is detected, the upper east bay 1148 indication is reset. Actually, the LEB trigger $C_{11}$ of rule 40 circuit is reset by both a south bay lead "$C_{18}$" and a 2 south bay or peninsula in a south bay lead "$C_{19}$" fed via A.C. OR circuit 1144 to LEB trigger $C_{11}$. The UEB trigger $C_{10}$ of rule 39 circuit is reset by both a north bay lead "$C_{16}$"

and a 2 north bay or peninsula in a north bay lead "$C_{17}$" fed via A.C. OR circuit 1142 to UEB trigger $C_{10}$. Since it is possible that a middle east bay may drop out to the north or south, both leads "$C_{16}$" and "$C_{17}$" are fed via A.C. OR circuit 1129 of rule 37 circuit to reset MEB triggers $C_9$ and $S_{32}$. An illustration of a MEB becoming a south bay is in the character K of FIG. 25 where the MEB 1158 becomes a south bay 1160.

Since expanding coded 2's southward is relatively slow compared to a northward expansion, it might be possible in a character 3, for example, for a serif to protrude upward far enough so as to cause some coded 5's to be written in what should actually be a LWB, and yet not far enough upward to close the LWB to the left. Then, in the next vertical scan a minimum white area of coded 5's in the first vertical white zone will appear before the coded 5's can be replaced by the southward expansion of the coded 2's, and when black is detected blocking the 2 x 2 coded 5's, the possible MEB trigger $C_9$ would be turned ON. To prevent this, if a minimum white area of coded 2's is found in the first vertical white zone (turning ON lead "$S_8$"), it will reset the trigger $S_{11}$ representing the minimum white area of coded 5's in the first vertical white zone. Thus, trigger $S_{11}$ will not be ON when the black blocking the subject minimum white areas to the north is detected and no possible MEB indication is produced. This is accomplished in rule 36 circuit by feeding lead "$S_8$" via an A.C. input circuit 1161 to the A.C. reset input of trigger $S_{11}$.

*Rule circuits—North bays, south bays and peninsulas*

Rule 47 circuit to rule 55 circuit inclusive (FIGS. 12P through 12S), relate to the recognition of the recognition criteria, north bay, two north bays or a peninsula in a north bay, south bay, two south bays or a peninsula in a south bay.

There are a number of different methods for detecting a north bay, and these methods will now be described in conjunction with rule 47 circuit to rule 49 circuit, inclusive. Firstly, since coded 7's, of necessity, indicate an opening to the north, if a 2 x 2 bit area of coded 7's is closed to the right, it is an indication of a north bay. Thus, rule 47 circuit indicates a 2 x 2 white bit area of coded 7's by lead IN7 and $IN7_N$, and $\overline{B}$ & $\overline{B_N}$ connected to AND crcuit 1162. A coincidence of input signals at TP time produces an output signal at TP time which is fed via an OR circuit 1164 to turn ON a trigger $C_{15}$. Then, rule 48 circuit indicates a possible closure of coded 7's to the right by the leads B or $B_N$ from an OR circuit 1166, the output of which is "anded" at the input of AND circuit 1168 with the leads IN7 and "$\overline{S_0}$." This possible closure circuit operates in the same way as possible closures to the right circuits (such as rule 28 circuit and rule 32 circuit, etc.) previously described. The output of AND circuit 1168 therefore, turns ON trigger $S_{17}$ as an indication of the possible closure to the right. Thus, later in this same scan, when coded $\overline{7}$ "now" $\overline{7_N}$ "next" are detected, if the triggers $S_{17}$ (rule 48) and $C_{15}$ (rule 47) are still ON, this will indicate a closure to the right and therefore, a bona fide north bay. The leads $\overline{7}$ and $\overline{7_N}$ (rule 49) are connected to the input of an AND circuit 1170 and fed at TP time via an OR circuit 1172 to an AND circuit 1174 where they are "anded" with the leads "$S_{17}$" and "$C_{15}$". The output of AND circuit 1174 is connected via an OR circuit 1176 to the bona fide north bay trigger $C_{16}$. Since this indication of a north bay may be fairly high up in the vertical scan, it may be that the 2 x 2 bit white area of 7's will not have enough room at the top of the scan for both a $\overline{7}$ and $\overline{7_N}$. Therefore, if at the end of the vertical scan, both the triggers $S_{17}$ (rule 48) and $C_{15}$ (rule 47) are ON, that will also be an indication of a bona fide north bay. Thus, the end of vertical scan lead $\overline{X_S}$ is "or-ed" at OR circuit 1172 with the lead $\overline{7}$ and $\overline{7_N}$ in rule 49 circuit to provide this indication.

A north bay may also be indicated by 2 x 2 bits of coded 6's or 5's where there is a double dropout of these coded numbers to the north and a closure to the right. Thus, the lead "$S_{11}$" from rule 36 circuit which indicates 2 x 2 bit coded 5's or 2 x 2 bit coded 6's in a first vertical white zone, as previously described is "anded" at an AND circuit 1178 at rule 47 circuit with the leads $X_S$, "$S_{23}$" and "$C_3$". The three leads $X_S$, "$S_{23}$" and "$C_3$" are also shown "anded" in rule 8 circuit to indicate a double dropout to the north from zone 1. Thus, AND circuit 1178 will produce an output signal if there is a 2 x 2 bit coded 5's and a double dropout to the north from zone 1, or a 2 x 2 bit coded 6's and a double dropout to the north from zone 1. This output signal will turn ON trigger $C_{15}$ (rule 47). In this case to indicate closure to the right and therefore a north bay, somewhat different circuitry is utilized. To detect the closure of the coded 5's to the right, the possible closure to the right of coded 5's lead "$S_{13}$" from rule 41 circuit is utilized in rule 49 circuit. In rule 49 circuit, then, the leads "$C_{15}$" and "$S_{13}$" are "anded" at an AND circuit 1180 with the double north dropout from zone 1 lead "$C_1$" and the output of an OR circuit 1182. OR circuit 1182 has one of its inputs connected to an AND circuit 1184 which produces an output for $\overline{5}$ and $\overline{5_N}$. Therefore, when the $\overline{5}$ and $\overline{5_N}$ is detected, if the possible closure lead "$S_{13}$" is positive and the other conditions are met, an output signal will be produced from AND circuit 1180 which is fed via OR circuit 1176 to turn ON NB trigger $C_{16}$.

If at the end of a vertical scan lead "$S_{13}$" is still positive and all the other conditions at AND circuit 1180 are met, this is an indication of a closure to the right and therefore a north bay. Thus, the end of vertical scan lead $\overline{X_S}$ is "*or-ed*" at OR circuit 1182 with the lead $\overline{5}$ and $\overline{5_N}$ to provide this indication.

To detect the closure of the coded 6's to the right, a possible closure to the right of coded 6's lead "$S_{15}$" from rule 43 circuit is utilized in rule 49 circuit. For this, the leads "$C_{15}$" and "$S_{15}$" are "anded" at an AND circuit 1186 with a double north dropout from zone one lead "$C_1$" (via an OR circuit 1188), and the output of an OR circuit 1190. OR circuit 1190 has one of its inputs connected to an AND circuit 1192 which produces an output signal for $\overline{6}$ and $\overline{6_N}$. Therefore, when the $\overline{6}$ and $\overline{6_N}$ is detected, if the possible closure lead "$S_{15}$" is positive and the other conditions are met, an output signal will be produced from AND circuit 1186 which is fed via OR circuit 1176 to turn ON NB trigger $C_{16}$.

If at the end of a vertical scan, lead "$S_{15}$" is still positive and all the other conditions at AND circuit 1186 are met, this is an indication of a closure to the right and therefore a north bay. Thus, the end of vertical scan lead $\overline{X_S}$ is "*or-ed*" at OR circuit 1190 with the leads $\overline{6}$ and $\overline{6_N}$ to provide this indication.

A third method for indicating a north bay is by 2 x 2 bits of coded 6's in a second vertical white zone and a double dropout to the north from zone 2. The lead "$S_{26}$" from rule 38 circuit, which indicates 2 x 2 bit coded 6's in a second vertical white zone, as hereinbefore described, is "anded" at an AND circuit 1194 at rule 47 circuit with the leads $X_S$, "$S_{24}$" and "$C_4$." The three leads $X_S$, "$S_{24}$" and "$C_4$" are also shown "anded" in rule 11 circuit to indicate a double dropout to the north from zone 2. AND circuit 1194 rule 47 will produce an output signal if there is a 2 x 2 bit coded 6's and a double dropout to the north from zone 2, and turn ON trigger $C_{15}$.

In this case, to indicate closure to the right and therefore a north bay, the same circuitry just described for closure of coded 6's in the first vertical white zone is used except that in rule 49 circuit the double north dropout from zone 2 lead "$C_2$," which is connected to OR circuit 1188, is utilized to cause AND circuit 1186 to turn ON NB trigger $C_{16}$.

In certain characters like the W of FIG. 32, there is a north peninsula within the north bay. In these characters, the north bay is usually wide enough so that coded 7's are written. Then, if there is a slope by the black shore towards the northeast, at least three bits wide, followed by a slope to the southeast three bits wide, it is an indication of a north peninsula. If the north bay is then closed to the right by black, an indication of a peninsula in a north bay is produced. Rule 70 circuit and rule 71 circuit (FIG. 12BB) are utilized for detecting this short slope three bits wide, to the northeast. Thus, if a coded $IN_7$ and $IN7_N$ are detected at the same time that a black "now" bit and a white "next" bit are detected, an output signal will be produced from an AND circuit 1202 in rule 70 circuit to step a three counter $K_4$. Since the coded IN7 and $IN7_N$ "next" are indications of white in the previous vertical scan, the lead $B_N$ is an indication of a white "next" bit, the fact that the "now" bit is black, indicates a slope to the northeast. This is illustrated in the character W of FIG. 32. When black bit 1204 is being examined as the "now" determination, white bit 1206 is the "next" determination and coded 7's, 1208 and 1210 are the "now" and "next" bits, respectively. Since the coded 7's 1208 and 1210 were written for the white bits 1212 and 1219, respectively, the pattern of the four bits 1204, 1206, 1212 and 1219 is such that a line 1216 separating the white bits 1206, 1212 and 1219 from the black bit 1204 is sloped to the northeast. This condition will normally occur only once per vertical scan. If it occurs in three successive vertical scans, it is an indication of a slope to the northeast three vertical scans wide. Thus, each time AND circuit 1202 of rule 70 circuit has an output signal, the three counter $K_4$ is stepped. After the third step, an output signal will be fed from the OUT terminal to the trigger $C_{82}$ of rule 71 circuit, the output lead "$\overline{C_{82}}$" of which is fed back to decondition AND circuit 1202 and prevent further stepping of counter $K_4$.

To get an indication of a slope to the southeast, the black of the shore must be in the lower left-hand corner of a 2 x 2 bit area. This result may be obtained by looking for a coded one "now" bit in coincidence with a 7 "next" and a minimum white height. When white bit 1220 of FIG. 32 is being examined as the "now" determination and white bit 1222 as the "next" determination, a coded 1, 1224 is the "now" bit and a coded 7, 1226 is the "next" bit. Since the coded 1, 1224 and the coded 7, 1226 were assigned for a black bit 1228 and white bit 1230, respectively, the pattern of the four bits, 1220, 1222, 1228 and 1230 is such that a line 1232 separating the black bit 1228 from the white bits 1220, 1222 and 1230 is sloped to the southeast. In rule 72 circuit the leads IN7, $IN7_N$, B & $\overline{B_N}$ are fed to an AND circuit 1232 and a coincidence thereat produces an output at TP time which steps a 3 counter $K_5$. Three pulses to "3" counter $K_5$ produces an output indicative of this southeast slope over three vertical scans. This output signal is sent to rule 73 circuit to turn ON a trigger $C_{83}$. Thus, when both triggers $C_{82}$ (rule 71) and $C_{83}$ (rule 73) are ON, it is indicative of the fact that there has been a sloped shore to the northeast followed by a sloped shore to the southeast to produce an indication of a north peninsula. The leads "$C_{82}$" rule 71 and "$C_{83}$" rule 73 are fed to an AND circuit 1234 of rule 50 circuit, the output of which at TP time effects the turning ON of a peninsula trigger $C_{16.1}$, which is indicative of the north peninsula.

To insure that the slope to the southeast follows the slope to the northeast and not vice versa, the slope to the southeast trigger "$C_{83}$" is constantly reset during a northeast slope, so that it is not possible for both leads "$C_{82}$" and "$C_{83}$" to be positive unless the southeast slope is recognized after the northeast slope. Therefore, in rule 72 circuit, an AND circuit 1236 has as its inputs the leads $\overline{1}$, $\overline{1_N}$, B and $\overline{B_N}$, and its output is connected via an OR circuit 1238 to the reset terminal of "3" counter $K_5$. These inputs represent a northeast slope for the same reason described for the inputs to AND circuit 1202 of rule 70 circuit.

Rule 51 circuit illustrates means for indicating either two north bays or a north peninsula in a north bay. If the north bay lead "$C_{16}$" is ON and the same indications as produced north bay trigger $C_{16}$ of rule 49 circuit are again produced, it is an indication of a second north bay. Similarly, if north peninsula lead "$C_{16.1}$" (rule 50) is ON and there is then an indication of a north bay by circuitry similar to rule 49 circuit, it is an indication of a peninsula in a north bay. To indicate these two conditions, a trigger $C_{17}$ of rule 51 circuit is turned ON. A comparative study of rule 49 circuit and rule 51 circuit indicates that they are both alike except that AND circuits 1240, 1242 and 1244 of rule 51 circuit have one more input lead than the equivalent AND circuit 1174, 1186 and 1180, respectively, of rule 49 circuit. This one input lead to AND circuit 1240 is from an OR circuit 1246, the inputs of which are the north bay lead "$C_{16}$" and the north peninsula lead "$C_{16.1}$." The OR circuits 1248 and 1250 to AND circuits 1242 and 1244, respectively, are connected in the same manner. Thus, if either a north bay represented by lead "$C_{16}$" or a north peninsula represented by lead "$C_{16.1}$" are present at the respective OR circuits 1246, 1248 or 1250, and all the other necessary conditions of rule 51 circuit are met so as to produce a north bay such as was produced by rule 49 circuit, the trigger $C_{17}$ will be turned ON, and thus indicate either two north bays or a peninsula in a north bay. However, since lead "$C_{15}$" from rule 47 circuit is needed to indicate a new 2 x 2 bit area for a new north bay indication, the north bay lead "$C_{16}$" and the north peninsula lead "$C_{16.1}$" are connected via an A.C. OR circuit 1252 (rule 47 circuit) to reset trigger $C_{15}$ so that if the new 2 x 2 bit area of coded 5's, 6's or 7's is sensed with the proper north dropout requirements, trigger $C_{15}$ will again be turned ON, and the different possible closure to the right circuits plus the rule 51 circuit detect the actual new north bay to produce the 2NB's or peninsula in NB indication.

A south bay may be detected by a 2 x 2 bit area of coded 4's with a double dropout to the south and a closure to the right. Since the trigger $C_0$ of rule 5 circuit is turned ON when there is a 2 x 2 bit area of 4's as an inherent indication of a double drop-out to the south, it is only necessary that there be a simultaneous condition of the trigger $C_0$ being ON and a closure to the right in order to indicate a south bay. The possible closure to the right of coded 4's is indicated by the rule 52 circuit which has an AND circuit 1254, the inputs of which are the lead "$\overline{S_0}$" and IN4 and the lead (B or $B_N$) from an OR circuit 1256. Rule 52 circuit operates to indicate a possible closure to the right of the coded 4's, as previously described for other coded numbers to turn ON a trigger $S_{19}$ as an indication thereof. Then, when a coded $\overline{4}$ and $\overline{4_N}$ is indicated along with a double south dropout, a south bay trigger $C_{18}$ in rule 53 circuit will be turned ON. The double south dropout lead "$C_0$," the possible closure to the right lead "$S_{19}$" and leads $\overline{4}$ and $\overline{4_N}$ is indicated along with a double south dropout, a south bay trigger $C_{18}$ in rule 53 circuit will be turned ON. The double south dropout lead "$C_0$," the possible closure to the right lead "$S_{19}$" and leads $\overline{4}$ and $\overline{4_N}$ are connected to an AND circuit 1258, the output of which is connected to the bona fide south bay trigger $C_{18}$.

Rule 54 circuit, in conjunction with rule 66, 67, 68 and 69 circuits, are utilized for detecting a south peninsula. A south peninsula is one in which the shore of a south bay would first be sloped in a southeasterly direction followed by a slope in a northeasterly direction in a region of coded 4's.

Rule 66 and rule 67 circuits are utilized for detecting the short slope three bits wide, to the southeast. Thus, if a coded IN4 and $IN4_N$ are detected at the same time that a white "now" bit and a black "next" bit are detected, an output signal will be produced from an AND circuit 1260 in rule 66 circuit to step a "3" counter $K_2$. Since the coded IN4 and $IN4_N$ "next" are indications of white in the previous vertical scan and the lead $\overline{B}$ is an indication of a white "now" bit, the fact that the next bit is black indicates a slope to the southeast. This is illustrated in the character M of FIG. 26. When the white bit 1262 is being examined as the "now" determination, black bit 1264 is the "next" determination and coded 4's 1266 and 1268 are the "now" and "next" bits, respectively. Since the coded 4's, 1266 and 1268 were written for the white bits 1270 and 1272, respectively, a pattern of the four bits 1262, 1264, 1270 and 1272 is such that a line 1274 separating the white bits 1262, 1270 and 1272 from the black bits 1264 is sloped to the southeast. When this condition occurs in three vertical scans, a signal is produced from the counter $K_2$ (rule 66) and transmitted to turn ON the trigger $C_{80}$ of rule 67 circuit.

To indicate a slope to the northeast in a south bay, the black of the shore must be in the upper right-hand corner of a 2 x 2 bit area. These results may be obtained by looking for a coded 4 "now" bit in coincidence with a 1 "next" and a minimum white height. In FIG. 26 when white bit 1276 is being examined as a "now" determination, a white bit 1278 as the "next" determination, a coded 4, 1280 is the "now" bit and a coded 1, 1282 is the "next" bit. Since the coded 4, 1280 and the coded 1, 1282 were assigned for white bit 1284 and black bit 1286, respectively, a pattern of the 4 bits 1276, 1278, 1284 and 1286 is such that a line 1288 separating the black bit 1286 from the white bits 1276, 1278 and 1284 is sloped to the northeast. In rule 68 circuit, the leads IN4, $IN1_N$ and $\overline{B}$ & $\overline{B_N}$ are fed to an AND circuit 1290 and a coincidence thereat produces an output at TP time which steps a "3" counter $K_3$. Three pulses to "3" counter $K_3$ produces an output indicative of this northeast slope over three vertical scans. This output signal is sent to rule 69 circuit to turn ON a trigger $C_{81}$. Thus, when both triggers $C_{80}$ rule 67 and $C_{81}$ rule 69 are ON it is indicative of the fact that there has been a slope shore to the southeast followed by a slope shore to the northeast to produce an indication of a south peninsula. The leads "$C_{80}$" and "$C_{81}$" are fed to an AND circuit 1292 of rule 54 circuit, the output of which at TP time effects the turning ON of a south peninsula trigger $C_{18.1}$. To insure that the slope to the northeast follows the slope to the southeast and not vice versa, the slope to the northeast trigger $C_{81}$ rule 69 is constantly reset during a southeast slope so that it is not possible for both leads "$C_{80}$" and "$C_{81}$" to be positive unless the northeast slope is recognized after the southeast slope. Therefore, in rule 68 circuit, an AND circuit 1294 has as its inputs the leads $\overline{1}$, $\overline{1_N}$, $\overline{B}$ and $\overline{B_N}$, and its output is connected via an OR circuit 1296 to the reset terminal of "3" counter $K_3$. These inputs represent a southeast slope for the same reasons described for the inputs to AND circuit 1260 of rule 66 circuit.

*Rule circuits—northwest, southwest, northeast and southeast bays*

Rule 56 circuit, rule 57 circuit, and rule 62 circuit through rule 65 circuit, inclusive (FIGS. 12T and 12U) are utilized in the recognition of Northwest and Southwest Bays.

A southwest bay has been described as a region of coded 0's, 2 high x 4 wide, blocked above and to the right by black. The southwest bay is recognized by counting four vertical scans from the extreme left of the character and then looking for a minimum white height of coded 0's blocked by black to the right.

Thus, in rule 56 circuit, a "4" counter $K_0$ operates to detect the first four vertical scans of a character, and produces an output on the lead $K_0=4$ to turn on the trigger $C_{20}$ of rule 57 circuit as indicative of this condition. At the end of each vertical scan when an $X_S$ pulse comes along, if the lead "$S_1$" (indicative of an entrance into the first vertical white zone) is ON and trigger $C_{20}$ rule 57 has not yet been turned ON, the AND circuit 1300 of rule 56 circuit goes positive to step the "4" counter $K_0$. The significance of the lead "$S_1$" is that it gets turned ON for the first time in the first vertical scan in which black is sensed at the extreme left of the character and also gets turned ON anew in each vertical scan thereafter in which a black is sensed. When trigger $C_{20}$ rule 57 goes ON, the lead "$\overline{C_{20}}$" goes negative to prevent any further stepping of the "4" counter $K_0$.

In rule 62 circuit, when coded IN0 and $IN0_N$ are detected after the fourth vertical scan lead "$C_{20}$" is ON, since no coded IN0 would be written to the right of any other coded number, it is indicative of a 2 high x 4 wide area of coded 0's. If a black and black "next" determination is also made at this time, it indicates that the 2 x 4 white area is blocked by black to the right. Thus, the leads B and $B_N$ are "anded" at AND circuit 1302, the output signal of which passes via an OR circuit 1304 to a fifth input of an AND circuit 1306, the other inputs of which are leads "$C_{20}$," IN0 and $IN0_N$. The fact that there is black above the 2 x 4 white area is implied by the fact that lead "$S_1$" was ON at the end of the four vertical scans.

If one single black bit (i.e., not a simultaneous black "now" and black "next" bit) is sensed, it is sufficient to produce an indication of a first vertical white zone which will disturb the coded 0's and prevent the detection of a SWB. This is indicated in the character T of FIG. 30, where the coded 0's are shown as being assigned for the white bits of the first four vertical scans into the character. In the thirtieth vertical scan (vertical scan of FIG. 30) the black bit 1308 is sensed. In this thirtieth vertical scan, there does not exist a condition of a simultaneous occurrence of a black ("now") and black ("next") bit to indicate a closing of the 2 high x 4 wide white area to the right. However, if the lead "$S_1$" rule 62 goes positive, it is an indication that the scanning is into the character, that is, that there is black of the character somewhere to the right of the 2 high x 4 wide white area, and if the leads IN0, $IN0_N$ and "$C_{20}$" are also positive, SWB trigger $C_{23}$ will be turned ON. This is accomplished by connecting the lead "$S_1$" to the OR circuit 1304, the other input of which represents B and $B_N$.

A northwest bay has been described as a region of coded 2's or 3's, 2 high x 4 wide, open to the north and blocked to the right by black. The northwest bay may be recognized by counting four vertical scans from the extreme left of the character and then looking for a minimum white height of coded 2's or coded 3's blocked by black to the right.

In rule 63 circuit, when coded IN2 and $IN2_N$ are detected, and the fourth vertical scan count trigger $C_{20}$ rule 57 is ON, it means that there is a 2 high x 4 wide area of coded 2's. To insure that the 2 x 4 bit area is not closed to the north by black, there is a requirement that there be no middle west inlet indication, i.e., the lead "$\overline{C_6}$" be positive. If a black and black "next" determination is also made at this time, it indicates that the 2 x 4 bit area of 2's is closed by black to the right. Thus, in rule 63 circuit the leads IN2 and $IN2_N$ are "anded" with no middle west inlet lead "$\overline{C_6}$" at an AND circuit 1310, the output of which is fed via an OR circuit 1312 to the input of an AND circuit 1314, the other inputs of which are the leads B and $B_N$ and the fourth vertical scan count lead "$C_{20}$." A simultaneous occurrence of positive signals at the input of AND circuit 1314 produces an output signal which is fed via OR circuit 1316 to turn ON a northwest bay (NWB) trigger $C_{24}$.

The 2 x 4 bit area of coded 3's will also effect a turning ON of the NWB trigger $C_{24}$ in much tthe same manner as described for the 2 x 4 bit area of coded 2's, except that to insure no closure by black to the north there is a requirement of no upper west inlet rather than no middle west inlet. Thus, the leads IN3, $IN3_N$ and the $\overline{UWI}$ lead "$\overline{C_7}$" are "anded" at an AND circuit 1318, the output of which is also fed via OR circuit 1312 to the input of the AND circuit 1314.

The rest of rule 63 circuit functions to produce a NWB indication in the two cases where due to a serif the 2 x 4 bit area of coded white is not blocked to the right by a black "now" and black "next" until there is an indication of a MWI, even though there is a legitimate NWB. One of these cases is illustrated in the character J of FIG. 24. In the character J the black bit 1320 is in the eighteenth vertical scan into the character and there is no simultaneous black "now" and black "next" determination at the time 2 "now" and 2 "next" bits are produced by the marking register output. If the white region of coded 2's in the character J are not determined at that time to be a NWB, then during the following vertical scan when a MWI indication is produced, it will be too late for a NWB indication. Therefore, if in any scan after the fourth vertical scan into the character (trigger $C_{20}$ ON), a minimum white region of coded 2's is found in the first vertical white zone (turning ON trigger $S_8$), and then a black bit is detected which when white is later detected in the scan produces an indication of a second vertical white zone (trigger $S_2$ ON), then at the end of vertical scan, an $X_S$ pulse will produce a NWB indication, if there is a $\overline{MWI}$ indication along with these indications triggers $C_{20}$, $S_8$ and $S_2$ ON. The black bit 1320 which resulted in the turning ON of trigger $S_2$, then indicates that there is a black in the character somewhere to the right of the 2 high x 4 wide white area of coded 2's. An AND circuit 1322 has as its input, the leads "$S_2$," "$S_3$" and "$\overline{C_6}$" and feeds via an OR circuit 1324 to an AND circuit 1326 where it is "anded" with the leads "$C_{20}$" and $X_S$. The output of AND circuit 1326 feeds via OR circuit 1316 to turn ON NWB trigger $C_{24}$.

An AND circuit 1328 in rule 63 circuit is provided having as inputs the leads "$S_3$," "$S_{10}$" and "$\overline{C_7}$" to provide for the indication of a NWB when a 2 high x 4 wide area of coded 3's is blocked to the right by a single black bit. The operation of AND circuit 1328 in rule 63 circuit proceeds in much the same manner as that described for the AND circuit 1322, except that it relates to a NWB one vertical white zone higher in the character.

A southeast bay is a region of coded 4's 2 wide x 4 high. Rule 58 circuit and rule 59 circuit operate to recognize the potential southeast bay and indicate this condition by the turning ON of the potential SEB trigger $C_{21}$ in rule 59 circuit. Each time there is a simultaneous appearance of a coded 4 and a white "now" the TP pulse will cause a "4" counter $K_9$ to step one, if the lead "$\overline{C_{21}}$" is still positive. This is accomplished by having the leads TP, IN4, $\overline{B}$ and "$\overline{C_{21}}$" "anded" at an AND circuit 1330, the output of which steps counter $K_9$. At the end of four pulses, an output is produced on the lead $K_9=4$, which is fed to potential SEB trigger $C_{21}$ of rule 59 circuit. Since the coded IN4 and $\overline{B}$ conditions must be four bits high, if a black bit is sensed before this condition is detected four times it is desirable to reset the counter $K_9$. This is accomplished by having the leads B and TP connected via an AND circuit 1332 and an OR circuit 1334 to the reset terminal of counter $K_9$. Similarly, at the end of each vertical scan the counter $K_9$ is reset by feeding the $X_S$ pulse via OR circuit 1334 to the reset terminal of counter $K_9$. If now either a south bay or the two south bay condition is detected, the potential SEB trigger $C_{21}$ is reset, because the detecting of a south bay implies a closure of this white area by black to the right. Thus, the SB lead "$C_{18}$" and the 2 SB's lead "$C_{19}$" are fed via an A.C. OR circuit 1336 to the A.C. reset side of trigger $C_{21}$.

A northeast bay which is detected by rule 60 and rule 61 circuits, is a region of coded 5's in the first vertical white zone at least 2 wide x 4 high and open to the north and east; or of coded 6's in the second vertical white zone at least 2 wide x 4 high and open to the north and east; or of coded 7's in the third vertical white zone 2 wide x 4 high and open to the north and east. If a double dropout to the north is present when a coded 5 "now" and white "now" is detected, the "4" counter $K_{10}$ of rule 60 circuit will be stepped. At the end of four steps, to indicate the "4" high, the lead $K_{10}=4$ goes positive to turn N a potential NEB trigger $C_{22}$ of rule 61 circuit. In rule 60 circuit, the lead IN5 is "anded" with the double dropout to the north from the first vertical white zone lead "$C_1$" at AND circuit 1338, the output of which is connected via an OR circuit 1340 to an input of an AND circuit 1342, the other inputs of which are leads TP, "$\overline{C_{22}}$" and $\overline{B}$. If lead "$\overline{C_{22}}$" is positive, each TP pulse steps the counter $K_{10}$. After four pulses, potential NEB trigger $C_{22}$ rule 61 goes ON. If there is a black bit sensed before this condition is detected four times, the counter $K_{10}$ is reset. This is accomplished by "anding" lead TP and B at an AND circuit 1344, the output of which is fed via an OR circuit 1346 to the reset terminal of counter $K_{10}$. Similarly, at the end of each vertical scan, the counter $K_{10}$ is reset by the lead $X_S$ fed via OR circuit 1346 to counter $K_{10}$. If north bay is thereafter detected, it is an indication of a closure to the right and so the potential northeast bay indication must be reset. This is accomplished in rule 61 circuit by the lead "$C_{16}$" being connected via A.C. OR circuit 1348 to the A.C. input of trigger $C_{22}$.

In rule 60 circuit, the lead IN6 and the double dropout to the north from the second vertical white zone lead "$C_2$" are "anded" at an AND circuit 1350, the output of which is connected to OR circuit 1340. Thus, AND circuit 1350 is connected via OR circuit 1340 to AND circuit 1342 for producing a NEB indication for coded 6's in the second vertical white zone, in a manner similar to that described for AND circuit 1338 for coded 5's in the first vertical white zone.

Lead IN7, in rule 60 circuit, is also connected to OR circuit 1340 for producing a NWB indication for coded 7's. It is to be noted that since coded 7's are written in place of coded 5's and coded 6's only when the latter are 2 wide, the only time that the NWB indication is made effective by the lead IN7 is when the coded 7's are written in the third vertical white zone.

*Long black vertical lines and sloped shores*

The recognition of a long black vertical (LBVL) criteria is performed by the rule 64 circuit and rule 65 circuit which look for a black area 2 wide x 11 high. Since a coded 1 "now" and a black "now" represent black area two bits wide, it is only necessary to count eleven different times that this condition appears before the end of a vertical scan. At the count of eleven, an 11 counter $K_1$, in rule 64 circuit, produces an output on its lead $K_1=11$ to turn ON the LBVL trigger $C_{79}$ in rule 65 circuit. Counter $K_1$ is stepped by pulses from an AND circuit 1352, the input of which are the leads IN1 and B, and also the timing pulse lead TP and the LBVL lead "$\overline{C_{79}}$." At the end of the count of eleven, lead "$\overline{C_{79}}$" goes positive to prevent any further stepping. The "11" counter $K_1$ is reset if there is a break in the long black vertical line as indicated by a simultaneous $\overline{1}$ "now" bit and a white "now" determination. Thus, the lead IN1 is fed to an inverter 1354, the output of which is the lead $\overline{1}$ which is "anded" with the lead $\overline{B}$ and TP at an AND circuit 1356. The output of AND circuit 1356 is fed via an OR circuit 1358 to the reset terminal of counter $K_1$. In addition, at the end of each scan, the lead $X_S$ resets counter $K_1$ via OR circuit 1358.

In accordance with the invention the recognition parameter LBVL is an order of magnitude determination. The magnitude of the length of the line is the parameter "N" of FIG. 1. In the following description the use of context statistics will be employed as experience to provide recognition predictions and the members of the groups of letters to which the predictions apply will be modified as further recognition experience is gained.

As an example of experience in a particular field, it is known that some alphabetic characters are more likely to be followed by "D's" than "O's," some are more likely to be followed by "O's" than "D's" and some are indeterminate within a chosen ratio of occurrence. The ratio of occurrence chosen herein is 8, established from a Poisson distribution and where a ratio of occurrence meets this value, a change of prediction from experience occurs. The ratio requirement can be varied as indicated by the switches 1462a and 1462b on FIG. 12Y to be more fully described later.

Experience in the field of language handling has been compiled in the art of cryptography. One text on the subject is "Secret and Urgent," by Fletcher Pratt, Bobbs Merrill Co., New York, N.Y., 1939, page 259 thereof, Table VII describes the "Occurrence of Pairs of Letters in English," and hence sets forth a probability of one letter following another.

From Table VII of the above reference, those alphabetic characters more likely to be followed by "D's" than "O's" will be classified as belonging in a "d" group, those more likely to be followed by "O's" than "D's" will be placed in an "o" group, all others to be in an "x" group. It then follows that "A" and "E" will be in the "d" group, "T-S-H-F-C-M-P-W" will be assigned to the "o" group and others are indeterminate and assigned to the "x" group.

As previously described, trigger 1390, FIG. 12V, through its associated relay (R90-FIG. 12HH) determines whether a "D" or "O" will be punched when either a sans-serif "D" or "O" is read. The punching control of relay 90 will be fully described later in conjunction with FIG. 12HH.

For purposes of clarity the following definitions of terms to be used in the following pages are provided as follows:

1. "$n$"—output from the ON side of the "$n$" trigger 1428, FIG. 12W. This line, when up, indicates that the character just read, had a LBVL length sufficient to satisfy the decision criterion N. The original value of N is chosen as eleven, but can be varied either plus or minus automatically by the machine as it gains experience while reading a document.

2. "$\bar{n}$"—output from the OFF side of the "$n$" trigger. This line, when up, indicates that the character just read did not have a LBVL length sufficient to satisfy the decision criterion N.

3. "$d$"—output from OR 1616, FIG. 12Z. This line, when up, indicates that the previous character punched was in the "$d$" group class (i.e., more likely to be followed by an alphabetic "D" than an alphabetic "O").

4. "$o$"—output from OR 1618, FIG. 12Z. This line, when up, indicates that the previous character punched was in the "$o$" group class (i.e., more likely to be followed by an alphabetic "O" than an alphabetic "D").

5. "$no$"—output from AND 1432, FIG. 12V. This line, when up, indicates that the previous character punched was in the "$o$" group class, but that the present character read contained a LBVL of sufficient length to satisfy the quantity "$n$" (i.e., possible error condition).

6. "$\bar{n}d$"—output from AND 1434, FIG. 12V. This line, when up, indicates that the previous character punched was in the "$d$" group class, but that the present character read did not contain a LBVL of sufficient length to satisfy the quantity "$n$" (i.e., possible error condition).

7. $X_T$—output from SS 1672, FIG. 12II. This line is up for 5 $\mu$ sec. at the time of closure of the FIG. 105 R30–1N/O points are made if an alphabetic "D" or an alphabetic "O" is to be punched. The pulse is used to adjust the "$n$" control counter or group assignment control counters if machine experience finds it necessary. Timing shown on FIG. 105.

8. $X_{PR}$—output from SS 1614, FIG. 12II. This line is up for 5 $\mu$ sec. as shown on FIG. 105 and is used to reset any previous character punched trigger, 1580, FIG. 12Z, that may be ON.

9. $X_{PS}$—output from SS 1676, FIG. 12II. This line is up for 5 $\mu$ sec. as shown on FIG. 105 and is used with character punched information at AND 1582, FIG. 12Z to turn on the corresponding previous character punched trigger.

The circuit action involving "$d$" group characters will be described in the following discussion.

Assume that the word EDUCATE is to be read. At the time the first letter E is read, its associated "character punched" trigger 1580, FIG. 12Z, to be fully described later, will be turned on. Since the E is in the "$d$" group, the "$d$" line 1392 (FIG. 12V) will be positive. This will produce an up level on line 1393, 1395 through OR 1394 to the upper leg of AND 1396. Upon receipt of the punch done signal (lead 488, FIG. 12HH), OK to Punch line 368, will fall, producing a positive shift at the output of inverter 1398 where the lower terminal of AND 1396. The positive output of this AND will turn trigger 1390 to the ON condition indicating that a "D," in preference to an "O," is likely to follow. If, in scanning the following character, it is determined by the machine that it is neither a "D" nor an "O," the indication of trigger 1390 will not be utilized. During the scanning of the "D," it is expected that the quantity "$n$" (variable length count of a LBVL, starting point value of eleven) will be realized. Since this is not an error condition, the positive shift which will be available on the "$n$" line 1398 need not and will not be utilized for the control of trigger 1390 during the recognition of this character "D."

A maximum count of sixteen bits is available during any scan. A LBVL count of thirteen–sixteen during any one vertical scan is a "D" character in preference to an "O" and a count of 0–3 is an "O" character in preference to a "D." It will thus be seen that attention is focused on the critical four–twelve rather than the entire sixteen bits of the line.

These facts are utilized in the circuits on the left-hand side of FIG. 12V and are based on the count received by "3" CTR-3, $K_{16}$, during any one vertical scan of a character. An input to $K_{16}$ (line 1402) indicates that a black line at least two vertical scans wide is being read and decoded by AND 1400 of FIG. 12W. $K_{16}$ is reset to the quantity zero at the end of each vertical scan by the $X_S$ pulse to its Reset Terminal. The 0–3 count indicating trigger 1404, and the 13–16 indicating trigger 1406 are reset off between characters as indicated. If the count of $K_{16}$ does not exceed three during any vertical scan of a character, AND 1408 will be deconditioned (i.e., trigger 1404 will be turned ON). If the count of $K_{16}$ exceeds twelve on any vertical scan, an output from AND 1410 will turn on trigger 1406 to indicate this fact. Trigger 1406, being on, will produce an up level from its ON side output to the lower leg of AND 1412. A count of four–twelve in $K_{16}$ will result in both AND 1408 and 1412 being deconditioned. An OK to Punch pulse tests these two AND circuits just prior to punching time for further exacting control of trigger 1390. If neither the less than four nor greater than twelve conditions are satisfied at the end of scanning the character, the status of trigger 1390 to be utilized during the punching operation, will have been determined by the group assignment of the previous character. In the example of the word EDUCATE, the trigger 1390 will be set so as to cause a "D" to be punched.

As a second example, consider the word POT. Since the P is assigned to the "o" group, the turning on of the associated P character punched trigger will result in a positive shift on the "o" line 1414 (FIG. 12V). This will be coupled through line 1417, line 1419 to "OR" 1416 to the upper input of "AND" 1418. As previously described, when the OK to Punch level 368 at the END of CHARACTER indication will interrogate the AND's 1408 and 1412 to further control trigger 1390, and if the condition of trigger 1406 or 1408 so warrants, an "O" will be punched.

As a third example, consider the word IDIOM. An "I" is an unassigned character. Therefore, the turning on of the "I" character punched trigger as the first "I" is punched will result in neither the "$d$" 1392 nor the "$o$" 1414 line being up. Inverters 1420 and 1422 will then have a positive output labelled "$\bar{o}$" and "$\bar{d}$" respectively to AND's 1424 and 1426. $X_C$ reset OFF of the "$n$" trigger 1428 (FIG. 12W) will result in an up level on the "$\bar{n}$" line 1430 (FIG. 12V). This will result in an up level from AND 1426 through OR 1416 to AND 1418. This, coupled with an up level from "I" 1398 will turn trigger 1390 to the "O" condition. Now, during the scanning of the "D," when the value "$n$" is realized during a vertical scan, an up level from AND 1424, through OR 1394, AND 1396 will turn trigger 1390 to the "D" condition. Also, the OK to Punch 368, will sample the AND's 1408 and 1412 to further control trigger 1390 if the O–3 or 13–16 conditions are met.

Next, the circuit action for the event of reading the "O" in IDIOM will be described. As previous, the punching of an "I," the second one in this case, will result in the setting of trigger 1390 to the "O" condition. It is not expected that the value of "$n$" will be attained in reading an "O," so that trigger 1390 will be left in the "O" status during the scanning of this character. The OK to Punch signal will again interrogate AND's 1408 and 1412 and if the LBVL count from $K_{16}$ has been three or less in each and all vertical scans, trigger 1390 will receive another impulse to set it to the "O" condition. Since it is already in the "O" condition, no change will be evident.

Under these conditions the use of AND's 1432 and 1434 (FIG. 12V) will be employed. An output from either of these circuits indicates that an error condition exists between the machine logic and the character read. A "$no$" output from AND 1432 indicates that the character being read followed a character of the "$o$" group, but the line length "$n$" was attained. This means that the length of "$n$" was probably chosen too small and circuits will be established to increase the quantity of "$n$," as will be described in connection with FIG. 12Y, if the present character is either a "D" or an "O."

An "$\bar{n}d$" indication from AND 1434 indicates that the present character being read followed one of the "$d$" group, but did not satisfy the length "$n$." This means that "$n$" was probably chosen too large and circuits will be established to decrease the value "$n$," if the present character is either "D" or "O." These circuits are shown on FIG. 12Y and will be described later.

It should be noted that OK to Punch line 368 extends up to inverter 1399, where it is inverted and fed to one terminal each of AND's 1396 and 1418. Since OK to Punch is down during the scanning of a character, AND's 1396 and 1418 control the inputs to trigger 1390 during this time. During punching, when OK to Punch line is up, AND's 1396 and 1418 are deconditioned.

This control is necessary in the case of a word such as NEON being read, if the LBVL exceeds a value of three when reading the character "O." The character "O" would punch as a "D" because it followed a character of the "$d$" group and exceeded three in the LBVL count. Now, when the "E" character punched trigger is reset by the $X_{PR}$ pulse, (FIG. 12Z) the "$d$" line 1392, FIG. 12V, would drop, a positive shift from inverter 1422 would be fed to AND 1426, "anded" with "$\bar{n}$," through OR 1416, AND 1418, if not deconditioned, to turn OFF trigger 1390. This would drop R90 (FIG. 12HH) resulting, in a short pulse to the "D" punch magnet and a pulse to the "O" punch magnet. Such a situation would result in an error in which the completed word would be NEDON. Similarly, if the word FED were read, and as a result of a poorly printed "D," the quantity "$n$" was not satisfied during the scanning of the "D," the resetting of the "E" character punched trigger by $X_{PR}$, would result in the "$d$" line 1392 dropping and flipping of trigger 1390 to the "O" status as previously described. FED would punch as FEOD.

The control of AND's 1396 and 1418 during punching prevents the short pulse to the incorrect switch magnet.

The circuits on FIG. 12V enable the machine to render a positive decision on values of "N" less than four or greater than twelve. Less than four is an alphabetic "O," greater than twelve is an alphabetic "D." Determination of a character with a value of "N" from four through twelve is based upon the group assignment of the previous character punched, if that character was assigned to either the "$d$" or "$o$" group or upon the length of "$n$" of the character being read, if the previous character punched is one of the "$x$" or indeterminate group.

In comparing the value of "N" with experience, it is essential to retain the information for comparison; and, in adjusting the requirement for "N" to agree with experience, it is necessary to be able to add or subtract from the selected value.

The circuits of FIGS. 12W–12Y shows an "$n$" counter circuit coupled to an "$n$" trigger 1428, together with an "$n$" counter control circuit which can accumulate either plus or minus, the circuits for originating the "a." (add) or "b." (subtract) pulses along with the associated control logic.

FIG. 12Y shows the circuits utilized for originating either an "a." (add) pulse or a "b." (subtract) pulse to the "$n$" counter control circuit if a predetermined ratio of "$no$" to "$\bar{n}d$" to "$no$" conditions exist upon sensing that either a "D" or an "O" is to be punched. The origin of the $X_T$ pulse is shown on FIG. 12II and will be fully described later.

A "tune-up" switch, 1437, (FIG. 12Y) is provided so that a random length run of the machine (reading several paragraphs) with the switch 1437 in ON position, on the material to be reproduced could be used in order to let the machine determine the value of "$n$" to be utilized for this particular document. After the "tune-up" process is completed, the switch could be turned OFF, thus preventing any further adjustment of the value "$n$." This switch could be left in the ON position for all runs of the machine without impairing satisfactory performance of the equipment.

With the switch 1437 in the OFF position, −30 volts would be connected through the switch, line 1439 to one terminal each of AND's 1438 and 1440, preventing any inputs to counters K17 and K18, since both AND's would be deconditioned. With switch 1437 in the ON position, the outputs of AND's 1438 and 1440 would be under control of lines 1436 ($X_T$), 1435 ("$no$") and 1436 ($X_T$), 1433 ("$\bar{n}d$"), respectively, as per the following description.

If a character following one of the "$o$" group characters satisfies the requirements of "$n$," as might be the case of a poorly printed "O" in the word "POT," an up level on line "$no$" 1435 will be available as previously described from AND 1432, FIG. 12V. If the present character is a "D" or an "O," a 5 $\mu$sec. $X_T$ pulse, 1436, will be combined with the "$no$" line to AND 1438 and add one to counter K17 which may be reset to zero by application of power or manually. In the event "$\overline{nd}$," line 1433, occurs, as might be the case of a poorly printed "D" in the word "PAD"; and the present character to be punched is either a "D" or "O," a pulse will add into counter K18. With the switch 1462 set as shown in FIG. 12Y, a ratio of 32:16 or 2:1 is utilized. Different switch settings and utilization of various combinations of AND circuits to switch contacts makes possble the use of any ratio desired or indicated desirable by a Poisson distribution related to the conditions. These variations could be made in the circuits by those skilled in the art.

If counter K17 received 32 pulses before counter K18 receives 16 pulses (2:1), an output from AND 1442 will produce a 5 μsec. "a" (1466) pulse, (i.e., a positive shift from AND 1442 to inverter 1444 will produce a negative shift to single shot multivibrator 1446, resulting in a 5 μsec. positive "a" pulse, from single shot multivibrator 1466).

Conversely, if counter K18 receives thirty-two pulses before $K_{17}$ receives sixteen pulses, an up level from AND 1488 will produce a negative shift from inverter 1450 to single shot multivibrator 1452 and result in a 5 μsec. positive "b" (1468) pulse.

AND circuits 1454 and 1456 (FIG. 12Y), are used to indicate a value of K17 less than four and less than eight, respectively. AND circuits 1458 and 1460 are used to decode the values of less than four and less than eight respectively, for K18. The outputs of these AND circuits are tied to the variable ratio switch 1462 as shown to provide different ratios as previously described. A.C. OR 1464 is used to provide a reset to zero of both K17 and K18 when either reaches a value of thirty-two.

FIGS. 12W and 12X illustrate the "n" counter control circuits, which operate as follows.

Triggers 1472, 1474, 1476 and 1478 make up a four stage binary input counter which can be stepped either plus or minus and which will always indicate the number of counts necessary in the LBVL to satisfy the quantity "n" (i.e., the value "n"). These triggers are of the type that "Power ON" or Manual operations will reset to a value of eleven.

If machine experience finds that this value of "n" is too small, a 5 μsec. "a" pulse 1466 will produce the following action. The leading edge of the "a" pulse will turn trigger 1470 ON. The output of 1470 will then condition the upper terminal of AND's 1480, 1482 and 1484 positive and decondition AND's 1496, 1498 and 1500. This "a" pulse will also be fed through OR 1492 to flip trigger 1472 from the ON to OFF status. A positive shift from the not ($\overline{1}$) side of trigger 1472 is fed to A.C. input 1486, resulting in a positive pulse to the lower terminal of AND 1480. The positive output of 1480 is fed through OR 1488 to the binary input of trigger 1474 turning it from ON to OFF. The positive shift from the not ($\overline{2}$) side of 1474 is fed to A.C. input 1490, resulting in a positive pulse to the lower terminal of AND 1482. A positive pulse from 1482 is fed through OR 1494 to the binary input of trigger 1476 turning it from OFF to ON. No further circuit action occurs and the value indicated by the triggers is now twelve. In this manner the "n" control counter can be stepped plus one.

Circuit action for stepping a minus one is as follows: Assume a value of twelve in the control counter. The leading edge of the "b" pulse 1468 will turn trigger 1470 to the OFF status, conditioning the upper terminals of AND's 1496, 1498 and 1500, positive and deconditioning AND's 1480, 1482 and 1484. The "b" pulse will be fed through OR 1492 to the binary input of trigger 1472, turning it ON. A positive shift from the right side of trigger 1472 will be fed to the A.C. input 1502, resulting in a positive pulse to the lower leg of AND 1496. This will cause a plus pulse to be fed through OR 1488 to the binary input of trigger 1474, flipping it from OFF to ON.

A positive shift from the right side of trigger 1474 to A.C. input 1504 results in a positive pulse to the lower terminal of AND 1498. Since the upper terminal of 1498 is held positive by the output of trigger 1470, a positive pulse will be fed through OR 1494 to the binary input of trigger 1476, turning it from ON to OFF. No further circuit action will result and the counter will now indicate a value of eleven. Thus, this control counter has been stepped minus one.

A.C. IN's 1506, 1508, AND's 1484, 1500 and OR 1510 are used in a similar manner to control the binary input of trigger 1478 (i.e., status of counter changing from seven to eight). If a subtract one operation is being performed, and trigger 1476 is turned from the OFF to the ON condition, a positive output through A.C. IN 1508, AND 1500, OR 1510 will flip trigger 1478. This will result in the status of the counter changing from eight to seven.

The indicated value of this "n" control counter is decoded by AND's 1512, 1514, 1516, 1518, 1520, 1522, 1524, 1526, 1528, 1530, and 1532 (FIG. 12W), combined with an $X_{SD}$ pulse and fed through OR's 1534, 1536, 1538, 1540, 1542, 1544, 1546, and 1548, in order to set the "n" counter. The circuits are arranged so that the 16's complement of the "n" control counter is set into the "n" counter (i.e., a value of eleven in the "n" control counter will result in a value of five being set into the "n" counter). Note on FIG. 12W that the "n" trigger 1428 will be turned ON by the right-hand output of trigger 1558 going positive. This condition will occur when the value of the "n" counter reaches sixteen. The "n" trigger being ON signifies to the machine that the predetermined value of variable "n" has been attained during any vertical sweep of the present character being scanned. If the starting point value of the "n" counter is five, it will require eleven input pulses in order to reach a value of sixteen and turn ON the "n" trigger 1428. A detailed description of the circuit operation follows.

Assume that the "n" control counter (triggers 1472–1474 and 1478, FIG. 12X) contains a value of eleven (i.e., triggers 1472, 1474 and 1478 ON, trigger 1476 OFF). Leads 1560, 1562, 1564 and 1566 will be up and condition four terminals of AND 1524 (FIG. 12W) positive. At the end of a vertical sweep, a 5 μsec. plus $X_{SD}$ pulse to the fifth terminal of AND 1525 will result in a 5 μsec. pulse plus output on line 1568. This will effect a plus output through OR 1546 to turn trigger 1556 OFF, a plus output through OR 1544 to turn trigger 1554 ON, a plus output through OR 1538 to turn trigger 1552 OFF and a plus output through OR 1536 to turn trigger 1550 ON. Now, the "n" counter indicates a value of five. Note that an $X_S$ pulse is utilized to reset to the OFF condition, triggers 1550, 1552, 1554, 1556, and 1558 which make up the "n" counter circuit. If the variable value "n" reached sixteen, no triggers in the "n" counter circuit would be set by the $X_{SD}$ pulse, however, since they were reset by the $X_S$ pulse, sixteen input pulses would be required in order to turn ON the "n" trigger 1428.

The input to the "n" counter is from AND 1400, the inputs of which are IN1, B and TP. IN1, and B indicate that a black line at least two vertical scans wide is being read. TP occurs for each of the sixteen vertical positions of the scanning positions. Therefore, a maximum input of sixteen to the "n" counter would be possible for any one vertical scan of a character.

If the value indicated by the "n" control counter is fourteen, the "n" counter is set to two as follows: Lines 1570, 1562, 1574 and 1566 (FIG. 12X) will be positive to condition four terminals of AND 1530 (FIG. 12W). The $X_{SD}$ will then result in a positive output from 1530 on lead 1578. This, through OR 1546 to the OFF side of trigger 1556, through OR 1542 to the OFF side of trigger 1554, through OR 1540 to the ON side of trigger 1552, through OR 1534 to the OFF side of trigger 1550 will result in a value of two in the "n" counter. Hence, it will require fourteen input pulses to the "$n$" counter in order to turn on the "$n$" trigger 1428.

The "$n$" trigger is reset to the OFF condition by an $X_C$ pulse which occurs between each character punched. Thus, the "$n$" trigger indicates "$\bar{n}$" at the beginning of each character read and will be turned ON only if the predetermined value of variable "$n$" is reached or exceeded during any one vertical scan for each character.

The line 1402 from AND 1400 is used in the circuits shown on FIG. 12W as previously described.

While variable values of "$n$" from five-sixteen can be utilized with these circuits, it will be apparent that one skilled in the art could apply the required AND, OR circuitry required for a value less than five, if desired.

As experience is gained with the information being processed, it frequently becomes desirable to modify the predictions of the experience on hand. This is done by changing the group assignments of the letters.

FIGS. 12Z and 12AA show two pairs of counters, along with their control circuits. One pair is utilized if the alphabetic character is assigned to either the "$d$" or "$o$" group and the other pair is utilized if the character is assigned to neither group (i.e., the "$x$" or indeterminate group).

Each alphabetic character is provided with these two pairs of counters and control circuits. For simplicity of illustration, one such group of counters has been shown in detail surrounded by a dashed line in FIGS. 12Z and 12AA. The connections for the remainder may be readily made by one skilled in the art. There is a total of fifty-two pairs of counters the inputs and outputs of which are under control of the respective character punched trigger 1580 in FIG. 12Z. There are twenty-six of these triggers—one for the alphabetic character "A," one for the alphabetic character "B," etc. These triggers are turned on by the coincidence of an $X_{PS}$ pulse 1584 and the appropriate character punched information from FIG. 12II at AND 1582 (FIG. 12Z). The character punched triggers are reset by an $X_{PR}$ line 1586 pulse. The $X_{PR}$, $X_{PS}$ and character punched lines will be fully explained in connection with FIG. 12II.

These circuits indicate the group assignments of all alphabetic characters at all times and provide means for changing these group assignments if machine experience indicates that a change is desired.

First, assume that the counter pair shown on FIG. 12Z is representative of an alphabetic character assigned to the "$d$" group (i.e., A). This fact would be shown by trigger 1588 being ON. This indicates that the character following this one is more likely to be a "D" than an "O" as previously discussed in reference to FIGS. 12V and 12W. A variable ratio switch 1590a is provided to permit a plurality of event ratios to control the change of group assignments. Switch 1590a is shown in the 32:4 or 8:1 position since as previously discussed a Poisson distribution indicates an 8:1 ratio as a preferable coupling in this situation. Other ratios can be chosen (32:3– 32:2, etc.) by various positions of the switch or by the addition of other decoding circuits to feed various taps of the selector switch and could be supplied by anyone familiar with the art.

For purpose of description, let it be assumed also that experience gained by the machine in "tuning up" has adjusted the value of "N" (if it required adjusting) so that the magnitude "N" (FIG. 1) of the LBVL of a "D," when read, will indicate the event "$n$" that the value "N" was satisfied and that the magnitude "N" (FIG. 1) of the LBVL of an "O," when read, will result in the event "not $n$" ($\bar{n}$).

If an "A" is the previous character punched (i.e. the A in the word PAD), trigger 1580 will be ON to signify this event. Therefore, lead 1592 will be positive to condition one terminal each of AND circuits 1594 and 1596. Trigger 1588 being ON will produce a positive output from its right output through OR 1598 to condition one terminal each of AND's 1594 and 1596. If the character being read satisfies the value of "$n$" (i.e., the "D" in the word PAD), lead 1398 to AND 1594 will be up, "$\bar{n}$" lead 1430 to AND 1596 will be down. Now if the present character to be punched is either a "D" or an "O" ("D" in this example), an $X_T$ lead to lead 1436 will be fed to both AND 1594 and 1596. AND 1594 will produce a positive output to add one into $K_{19}$. Four pulses to $K_{19}$ will produce an output from AND 1600 where 4, $\bar{8}$ and $\overline{16}$ are "anded," through switch 1590a in the position shown to turn OFF trigger 1610. This trigger is already OFF, so no change will occur in the circuit. When $K_{19}$ reaches a value of 32 a positive shift from the $\overline{16}$ output through A.C. OR 1602 will effect a reset to zero of both $K_{19}$ and $K_{20}$.

If, during the reading of words such as NEON, where an "O" follows a character of the "$d$" group, for example, the "E," $K_{20}$ reaches a value of 4, a positive shift from AND 1606 where 4, $\bar{8}$ and $\overline{16}$ from $K_{20}$ are "anded," will be fed through switch 1590b in the position shown, to turn OFF trigger 1588 and assign this character to the "$x$" group. Note that either $K_{19}$ or $K_{20}$ reaching a value of 32 will cause a reset to both through A.C. OR 1602.

The event "$\bar{n}$," "$d$" or "$o$" assignment, the previous character punched (line 1592) and $X_T$ will add one to $K_{20}$ as a result of an output from AND 1596. This would indicate that the previous character punched was group assigned either a "$d$" or "$o$," that the present character was either a "D" or "O" ("O" in this example), $X_T$ and that the present character, the "O," did not satisfy the value of "N" in any vertical sweep.

AND circuit 1612, along with AND circuit 1614 in FIG. 12Z make available previous character punched group assignment information to the circuits shown on FIGS. 12V and 12W. If trigger 1588, "$d$" group is ON and trigger 1580 character punched is ON, both terminals of AND 1614 will be up, the output will feed through OR 1618 and indicate that the last character punched was of the "$o$" group assignment. Each OR, 1616 and 1618 will have twenty-six inputs (one from each alphabetic character) and be used to indicate to FIG. 12V the group assignment of the previous character punched. AND 1622 will produce an up output on lead 1624 to FIG. 12AA, if the character is neither "$d$" nor "$o$" group assigned.

The counter pair on FIG. 12AA, along with the control circuits shown, are utilized for possible assignment of alphabetic characters previously unassigned to a "$d$" or "$o$" group, in other words, the "$x$" or indeterminate group. If a predetermined variable ratio of events is attained, the ratio determined by the position of switch 1620a, the character can be assigned to either the "$d$" or "$o$" group. With the switch 1620a in the position shown, if $K_{21}$ counting the "$n$" events reaches a value of thirty-two before $K_{22}$ counting the "$\bar{n}$" events, reaches a value of four, the character will be assigned to the "$d$" group. If $K_{22}$ "$\bar{n}$" events, reaches a value of thirty-two before $K_{21}$ "$n$" events, reaches a value of four, the character will be assigned to the "$o$" group. If neither of these ratios is satisfied, the character will remain unassigned.

Assume that the present alphabetic character under consideration is one of the unassigned group (i.e., L). The group assignment triggers corresponding to 1588 and 1610 (FIG. 12Z) for this character will both be OFF. Their left output is "anded" at AND 1622 (FIG. 12Z) (both plus), so line 1624 into FIG. 12AA will be up to indicate that this character is unassigned. This will condition one leg of both AND's 1626 and 1628. If this character has just been punched, lead 1592 will be up to both AND circuits 1626 and 1628. If the character now being read satisfies the LBVL value ("D," as in the word OLD), the event "$n$" will appear and lead 1398 will be up to condition a terminal of AND 1626. If the present character to be punched is either a "D" or an "O" (a "D" here), the $X_T$ pulse, lead 1436, will be applied to both AND's 1626 and 1628 so that an output from 1626 will add one into counter $K_{21}$. If "$n$" was not satisfied, ("O" in the word LOT), the event "$\bar{n}$" occurs lead 1430 and an output from AND 1628 will add one into counter $K_{22}$. Thus it can be seen that $K_{21}$ is actually counting long line ("$n$") events and $K_{22}$ is counting not long line ("$\bar{n}$") events. It is necessary for one of these counters, either $K_{21}$ or $K_{22}$, to reach a count of thirty-two, before this previously unassigned character can be assigned to either a "$d$" or "$o$" group.

If $K_{21}$ reaches a count of thirty-two (32 "$n$" events), a positive shift will be fed from its output line 1641 to AND 1652. If $K_{22}$ has not yet reached a value of four (4 "$\bar{n}$" events), AND 1636, the inputs of which are $\bar{4}$, $\bar{8}$ and $\bar{16}$ from $K_{22}$ will have an up output fed through switch 1620a —4 point to the other terminal of AND 1652. This will result in a positive shift from AND 1652, lead 1654, to A.C. OR corresponding to 1604 on FIG. 12Z and turn ON the respective "$d$" group assignment trigger (corresponding to 1588, FIG. 12Z) for this previously unassigned alphabetic character. Note that the output of $K_{21}$ when it reaches a value of thirty-two also feeds the plus shift to A.C. OR 1642. The output of this OR circuit is coupled to the reset terminals of both $K_{21}$ and $K_{22}$, resetting them to zero. Therefore, the output pulse from AND 1652 will be a short one.

If $K_{22}$ reaches a count of thirty-two (32 "$\bar{n}$" events), a positive shift is delivered from its output lead 1643 to AND 1638. If $K_{21}$ has not yet reached a value of four, (4 "$n$" events), AND 1650, the inputs of which are $\bar{4}$, $\bar{8}$ and $\bar{16}$ from $K_{21}$ will have an up output fed through switch 1620b —4 point to the other leg of AND 1638. This will result in a positive shift from AND 1638, lead 1656, to A.C. OR corresponding to 1608, FIG. 12Z and turn ON the respective "$o$" group assignment trigger, corresponding to trigger 1610 (FIG. 12Z) for this previously unassigned alphabetic character. The plus output of $K_{22}$ reaching a value of thirty-two will also be fed to A.C. OR 1642 and effect a reset to zero of both $K_{21}$ and $K_{22}$, resulting in a short positive pulse from AND 1638.

Switches 1620a and b are multi-contact switches, only three positions of which for each are shown on FIG. 12AA. Additional positions, coupled to various decoding AND circuits of counters $K_{21}$ and $K_{22}$ could be supplied by anyone skilled in the art.

AND 1644 (FIG. 12AA), will have a positive output if the value of $K_{21}$ is zero or one and is tied through lead 1658 to the contact of switch 1620a —2 labelled <2. OR 1648 will have a positive output if the value of $K_{21}$ is zero, one or two. One input of OR 1648 is AND 1644, the output of which was previously described, the other input is AND 1646, up if $K_{21}$ is two. Lead 1660 is tied to switch 1620b —3, labelled <3. AND 1650, tied to switch 1620b –4 contacts will be up until the value of $K_{21}$ reaches 4. Hence, this switch contact (1620b —4) is labelled less than 4 (<4). Switch 1620a contacts are tied to the decoding circuits of $K_{22}$ in a similar manner.

Both $K_{21}$ and $K_{22}$ are initially reset to zero.

Switch 1401, FIG. 12Z is provided so that during the "tuning-up" process, with this switch set to the "Test" position AND's 1594 and 1596 of FIG. 12Z AND's 1626 and 1628 of FIG. 12AA will be deconditioned so as to prevent any modification of the previously determined group assignments until after the value of "$n$" has been determined by the experience of the machine for the document being read.

With switch 1401 in the Test position, —30 volts will be applied via lead 1399 to one terminal each of the above-mentioned four AND circuits to hold them nonconductive. With the switch in the Run position, control of the AND circuits is by their four remaining inputs to enable the machine to make any adjustments in the group assignment circuits dictated by machine experience while reading the document, after it has determined the correct value of "N" for the event "$n$."

Under certain conditions it may be desirable to assign definite initial predictions to certain information. In this machine, FIGS. 104 and 104A show alternate means by which alphabetic character group assignment triggers could be set to a predetermined status.

All group assignment triggers could be of the "Power ON" or Manual reset OFF types.

In FIG. 104 pushbutton 2000 is connected to a plus voltage as shown and to the correct input of the various group assignment triggers, as shown in FIG. 12Z, to cause setting of these triggers to the indications as illustrated.

Similarly, in FIG. 104A, each alphabetic character could be represented by a center OFF, spring return SPDT toggle switch in order to group assign the characters as desired.

It will be apparent to one skilled in the art that one may readily construct various pushbutton circuits along the bias shown in FIGS. 104 and 104A to give any combination of group assignments desired, further the "Power ON" or Manual reset line could be connected to cause a predetermined status of the group assignment triggers.

FIG. 12II illustrates the circuits used to generate the $X_T$, $X_{PR}$, $X_{PS}$ pulses.

The $X_T$ lead 1432, pulse is used to time any adjustments to the "$n$" control circuits or group assignment control circuits, if required. The $X_{PR}$ lead 1586, pulse is used to reset the "character punched" triggers, and the $X_{PS}$ lead 1584, pulse is "anded" with the corresponding character punched line to set the corresponding "character punched" trigger as shown by AND 1582 feeding trigger 1580, FIG. 12Z.

If any character other than "D" or "O" is punched, a plus shift will be fed through OR 1662, FIG. 12II inverted at inverter 1664, through OR 1666 to actuate single shot 1674. The $X_{PR}$, lead line 1586 will then be up for 5 μsec. The fall of the $X_{PR}$ lead will trigger single shot 1676 and produce a 5 μsec. $X_{PS}$ pulse on lead 1584.

If a "D" or an "O" is punched, a plus shift will feed through OR 1668, inverted at inverter 1670 to actuate single shot 1672 and produce a 5 μsec. $X_T$ pulse on lead 1432. The fall of $X_T$ is fed through OR 1666 to produce the $X_{PR}$ and $X_{PS}$ pulses as previously described. Thus, an $X_T$ pulse is generated only if a "D" or an "O" is punched, the $X_{PR}$, $X_{PS}$ are generated when any character is punched.

FIG. 105 illustrates timings used for various functions of the circuits pertaining to the use of context statistics as experience to reinforce decisions based on the order of magnitude determination of the LBVL.

The rise of the "OK to Punch," lead 368 (FIG. 12V), when the END of CHARACTER—E—, trigger 478 comes ON is used on FIG. 12V to test the status of AND's 1408 and 1412 for control of trigger 1390 as previously described.

If a "$d$" or "$o$" is to be punched, the closing of the R30–1 "normally open" point (FIG. 12FF) will result in the generation of $X_T$, $X_{PR}$, and $X_{PS}$ pulses shown in heavy lines in FIG. 105. If any character other than "$d$" or "$o$" is to be punched, an $X_T$ pulse is not generated, and the $X_{PR}$, $X_{PS}$ are shown timewise by the dashed portion of their respective lines on FIG. 105.

In order to efficiently handle a serif "D," equipment is provided for the recognition of such a "D" by the recognition of the combination of a MWB and a ML. This equipment is provided in FIG. 12HH where the points of relay R61–1 are utilized. Relay R61 (FIG. 12HH) is actuated from trigger "C61" which, when ON, indicates that a MWB event has occurred. Other criteria having been satisfied, this indicates that a serif "D" has been read. The relay R61–1 normally open points, when closed, direct the impulse to cause a "D" to be punched.

If relay R61 is not actuated, the relay R61–1 normally closed points direct the circuit to the common connection of relay R90-1 points. Relay R90 is under control of trigger 1390, FIG. 12V, the operation of which was previously described.

Assume that the points of R61 are in the normal position. Under these conditions a pulse from R44-2 normally closed (FIG. 12GG) will go through R61-1 normally closed points to R90-1 common. If R90 is not energized, the pulse will be directed through the R90-1 normally closed contact to R47-1 common connection and either an alphabetic "o" or a numeric zero will be punched. If R90 is energized, as will be the case, if trigger 1390 (FIG. 12V) is ON, the R90-1 normally open points will direct the circuit so that a "D" will be punched.

*Spacing*

Provision is made for spacing the receiving machine between words as read by the reading machine. In order to insure that the context statistics are applied between words and not from word to word, equipment is provided for resetting the group assignment circuits between words.

If, for instance, "the diagram . . ." is read as part of a sentence, "e" of "the" is assigned to the "*d*" group assignment and is, in fact, followed by an alphabetic "D." However, if "The opposing . . ." is read, "e" in "the" is assigned to the "*d*" group as before, but now followed by an alphabetic "O." This event would result in "$\overline{nd}$" error condition and cause an erroneous adjustment to the "*n*" trigger control circuits. ("$\overline{nd}$"–"X*t*") and also an erroneous adjustment to the group assignment control circuits ("$\overline{n}$"–"X*t*").

There would be no spaces between words on the received document and no indication on an indented paragraph.

Assume an average of 16 scan widths for a space between words. A "16" counter K25 (FIG. 12C) is set up to count consecutive all white scans as would occur between words and be reset to zero whenever a black bit of a character is read. When this counter reached 16 as an indication that a white area such as an indented paragraph or space between words was being read, $X_{PR}$, $X_{PS}$ pulses would be generated, the $X_{PR}$ would be used to reset any previous character punched trigger that might be ON. The $X_{PS}$ pulse would not be utilized since no character punched indication would be had from the receiving machine.

This will then treat the first letter of each word as though it follows an unassigned character in the operation of the T-4 control circuits of FIG. 12V.

Specifically, in FIG. 12C, there is shown a counter, $K_{25}$, the input of which is the $X_{SD}$ pulse, generated at the end of each vertical scan, except the one used for clearing the shift register to zero following the sensing of an end of character as recognized by an all white scan after a scan in which a black bit is read. This counter is reset to zero by sensing a black bit in a vertical scan. Thus, it can be seen that counter $K_{25}$ will reach a value of 16 only if sixteen consecutive all white vertical scans are sensed so as to indicate a space. The output of this counter would feed a plus pulse when K25=16, to A.C. OR 1662 to generate $X_{PR}$, $X_{PS}$ pulses as previously described in connection with FIG. 12II.

In order to enable one skilled in the art to more readily fabricate the principles of the invention into devices for their accomplishment an alternate structure for the modification of the experience with further experience is provided in FIGS. 12Z and 12AA, wherein group assignments are controlled.

These figures perform the same logic and achieve the same results as FIGS. $12Z_1$ and $12AA_1$. They are shown dotted in FIG. 12. A counter pair corresponding to $K_{23}$ and $K_{24}$ with their associated input and output control is used for each alphabetic character to gain a total of 52 or 26 pairs. These circuits indicate the "*d*," "*o*" or "*x*" group assignment of each alphabetic character along with input output control.

If trigger 1688 FIG. $12Z_1$, is ON, it indicates that the alphabetic character is assigned to the "*d*" group. If trigger 1690 FIG. $12AA_1$ is ON, it indicates that the alphabetic character is assigned to the "*o*" group. If neither 1688 nor 1690 is ON, it indicates that the character is unassigned (i.e., in the "*x*" or indeterminate group). This information is used as previously described with reference to FIG. 12V.

OR's 1696 and 1698 in FIG. $12AA_1$ are used in supply this group assignment information to the circuits in FIG. 12V. There is one OR 1696 and one OR 1698, each of which has 26 inputs used in the machine. There are 26 AND's corresponding to AND 1692 and 26 AND's corresponding to AND 1694 used in the machine, a pair being used for each alphabetic character. AND 1692 has as its inputs the ON side output of "*d*" trigger 1688 (FIG. $12Z_1$) along with the ON side output of trigger 1580, the previous character punched trigger. Therefore, if this character has just been punched and is one of the characters assigned to the "*d*" group, both inputs to AND 1692 will be positive or "up." The ON side output of trigger 1688 will bring up the upper terminal of AND 1692 and the ON side output of trigger 1580, FIG. $12AA_1$, will bring up the lower terminal of AND 1692. This will result in an up output to OR 1696 and give an up level on "*d*" line 1392 to FIG. 12V.

If this character was assigned to the "*o*" group and had just been punched, the following conditions would exist. An up level from the ON side of trigger 1690 would give an up level to the upper terminal of AND 1694. An up level from the ON side of trigger 1580 would give an up level to the lower terminal of AND 1694. This will result in an up output to OR 1698 and give an up level on "*o*" line 1414 to FIG. 12V.

If neither trigger 1688 (FIG. $12Z_1$) nor 1690 (FIG. $12AA_1$) is ON, neither AND 1692 nor AND 1694, FIG. $12AA_1$, will have an up output. Therefore, both lines 1392 and 1414 to FIG. 12V will be down.

Assume an alphabetic "A" that is "*d*" group assigned. Counters $K_{23}$ and $K_{24}$ count satisfaction of "N" (FIG. 1) of LBVL ("*n*" events) and not LBVL ("$\overline{n}$" events), respectively, if the alphabetic "A" has just been punched, an alphabetic "D" or an alphabetic "O" is the present character to be punched as will be indicated by an $X_T$ pulse if switch S$w$ 1401 is in the RUN position. If the present character read satisfies the quantity "N," an "*n*" event occurs, line 1398 to AND 1700 will be up. Line 1592 to AND 1700 from trigger 1580 will be up to signify that was the previous character punched. Switch S$w$ 1401 in the RUN position presents an up level to the third terminal of AND 1700. Now, if an alphabetic "D" or alphabetic "O" is to be punched, a 5 μsec. $X_T$ pulse will be received (via lead 1436). This will give an up output from AND 1700 to the input of counter $K_{23}$ where it will add one into this counter. If the present character read did not satisfy the quantity "N" (i.e., "$\overline{n}$"), lead 1430 would be up to AND 1702 (FIG. $12AA_1$). Lead 1398 (FIG. $12Z_1$) ("*n*") to AND 1700 would be down to decondition this circuit. Switch S$w$ 1401 in the RUN condition, "$\overline{n}$," $X_T$ and the previous character punched information will "and" at AND 1702 to give a plus output, resulting in adding one to counter $K_{24}$.

The status of $K_{23}$ is decoded as follows. AND's 1704, 1706 and 1708, when up, indicate a value of 2, 3 and 4, respectively, and are connected to switch S$w$ 1710*a* contacts as shown. AND 1712 is up if the value of $K_{23}$ is less than 2 (<2), or 1716 is up if the value of $K_{23}$ is less than 3 (<3), AND 1718 is up if the value of $K_{23}$ is less than 4 (<4). These outputs are connected to the contacts of switch S$w$ 1720*a*.

The status of counter $K_{24}$ is decoded in a similar manner by additional AND, OR circuits the outputs of which feed contacts on switch S$w$ 1710b and switch S$w$ 1720b.

Now when counter K$_{23}$ reaches a value of 4, an up output from its "4" terminal will be fed to the upper terminal of AND 1708, the other two terminals of which are $\bar{8}$ and $\overline{16}$. This will give an up output on line 1722 to S$w$ 1710a 4, through this switch to line 1724, to the OFF side of trigger 1690 (FIG. 12AA$_1$). Since trigger 1690 is already OFF, no change will occur in the circuit. When K$_{23}$ (FIG. 12Z$_1$) reaches a value of 32, a plus output from its "Out" terminal to lead 1726 will be fed to A.C. OR 1728, the output of which is used to reset to zero both counters K$_{23}$ and K$_{24}$. S$w$ 1710a and S$w$ 1710b, in the positions shown in FIGS. 12Z$_1$ and 12AA$_1$, respectively, indicate that it is expected that a ratio of "D's" to "O's" following this alphabetic "A" is 32:4 (8:1). In other words, since we assigned the alphabetic "A" to the "$d$" group, we expect to read thirty-two alphabetic "D's" following the alphabetic "A" before we read four alphabetic "O's" following the "A." If we read four alphabetic "O's" before thirty-two alphabetic "D's" following this "A," it indicates that we should not have assigned the alphabetic "A" to the "$d$" group for this document, that the alphabetic "A" should be in the "$x$" or indeterminate group. Note that switches S$w$ 1710a and S$w$ 1710b allow us to select a ratio of 32:4, 32:3 or 32:2. If other ratios are desired, anyone familiar with the art could readily supply other or additional decoding circuits and switch contact positions to accomplish this.

Now, if K$_{24}$ (FIG. 12AA$_1$) reaches a value of 4, this fact will be decoded at AND 1730 where 4, $\bar{8}$ and $\overline{16}$ from K$_{24}$ are inputs and an up level will be had on lead 1732, through S$w$ 1710b 4 with the switch in the position shown, on lead 1734 (FIG. 12Z$_1$) to turn OFF trigger 1688, the "$d$" group assignment trigger. Neither trigger 1688 ("$d$" group) nor trigger 1690 (FIG. 12AA$_1$) ("$o$" group) is now ON, so that the "A" is now in the "$x$" or indeterminate group. Note that when 1688 is turned OFF, an up level from the left side of 1688 will be fed on lead 1736 to A.C. OR 1728 to reset both K$_{23}$ and K$_{24}$ to zero. Now counters K$_{23}$ and K$_{24}$ through the machine's experience will determine if this alphabetic character "A" should be assigned to a group for the document being read.

If this character is unassigned it will require that K$_{23}$ reaches a value of thirty-two before K$_{24}$ reaches a value of four in order to assign it to the "$d$" group, or that K$_{24}$ reaches a value of thirty-two before K$_{23}$ reaches a value of four in order to assign it to the "$o$" group. This is controlled by the position of switch S$w$ 1720a and S$w$ 1720b.

To assign a previously unassigned character to the "$d$" group the following steps are taken. When K$_{23}$ (FIG. 12Z$_1$) reaches a value of thirty-two, lead 1726 from its out terminal is up to AND 1738. If K$_{24}$ has not yet reached a value of 4 (i.e., 4), AND 1740 will have an up output to switch S$w$ 1720b <4, lead 1742 is connected to the lower terminal of AND 1738 (FIG. 12Z$_1$). A plus output from AND 1738, through A.C. OR 1744 to lead 1746 to the ON side of trigger 1688 will turn it ON and thus indicate an assignment to the "$d$" group. Thus, with switch S$w$ 1720b in the position shown, a ratio of 32:4 is used for group assigning a previously unassigned character. S$w$ 1720a–b or both provides a means of selecting a ratio of 32:4, 32:3 or 32:2. Again, anyone familiar with the art could supply AND circuits and switch positions to select any ratio desired. The counter K$_{23}$ reaching a value of thirty-two will cause a reset to zero of both K$_{23}$ and K$_{24}$.

It will be apparent that changing a previously "$o$" group assigned character to the unassigned group, and assigning a previously unassigned character to the "$o$" group are similar to the above descriptions and will not be further described.

It should be noted that A.C. OR's 1744 and 1748 have an input from the manual assignment circuits on FIGS. 104 and 104A. A circuit completed from the switch on FIGS. 104 and 104A to A.C. OR 1744 will result in the "$d$" assignment trigger, 1688, being turned ON. Similarly, a circuit completed from the switch on FIGS. 104 and 104A to A.C. OR 1748 will result in the "$o$" assignment trigger, 1690, being turned ON.

In order to more clearly set forth the application of the principles of the invention in the circuits of FIGS. 12A to 12II and particularly in FIGS. 12V to 12AA and alternates, the following correlation is provided between FIG. 1 and these circuits. The same reference numerals are used for elements of comparable functions.

The block diagram, FIG. 103, illustrates a specific application of a decision process as applied to the character recognition field, namely, the selection of whether a "D" or an "O" is to be punched based on an order of magnitude determination of a vertical line for the present character read.

Input information, from a sensing medium 2 in the form of a black bit count from each vertical scan of a character being read, is fed into an evaluation medium, 3, the medium 3 of the FIG. 1 is composed of a trigger T$_4$ of FIG. 12V and its associated control circuits. This count is compared with the decision criterion value which is set up in the portion labelled 3A and which has been adjusted by the machine experience on the particular document being read during a "tuning-up" process. It then further compares this signal with the information contained in portion labelled 3B. This is information based on the machine's experience as to whether the previous character in the word being read is usually followed by a "D" or "O" in the particular information being handled. Based upon a comparison involving these two criteria, a decision is rendered and delivered to a utilization medium 4, herein shown as a punch.

Feedback paths, shown as 5 and 6 are provided, giving the machine the ability to reinforce its own decisions and to revise its own criteria as a result of the information being handled. Channel 7 provides information to comparison stage 8. A "no" signal on channel 7 would indicate that "N" had been satisfied resulting in the event "$n$" and that the previous character read in the word should probably be followed by an "O" (the "$o$" of "$no$"). Where the prediction from experience and the measured value of "N" are in conflict this would indicate that the value of "N" had been chosen too small and this fact would be remembered by the machine. A "$\overline{nd}$" signal on channel 7 would indicate that the previous character of the word should probably be followed by a "D," but that the present character did not contain a vertical black line of suffiicent length to satisfy the criteria "$n$". This signal would indicate that the value of "$n$" had been chosen too large. The logic for these events is shown in FIG. 2. The comparison stage 8, studies the frequency of these "erroneous" events, as set forth in FIG. 3, and upon a proper set of conditions causes "$n$" in 3A to be increased by one increment or decreased by one increment as the machine's experience dictates. Path 9 presents information to stage 8 as to whether the present character is a "D" or "O," since it is desired to possibly adjust the "D" or "O" recognition criteria only if a "D" or "O" were indeed the character presently being processed.

The group assignment trigger control section 11 is provided with information as to which character of the alphabet was previously processed by line 13. Line 12 provides section 11 with informaton as to the length of the black vertical line, "$n$" or "$\overline{n}$" contained in the character currently being processed. Section 11 compares this information to determine if the "D" or "O" group assignment of these "previously processed" character is commensurate with the machine's experience in processing the current information. Line 14 provides modification of this experience probability section 3B, if required. If the character was previously assigned to the "D" group (one which would probably be followed by a "D" in preference to an "O"), but machine experience on a particular document shows that this group assignment is incorrect for the current document, the machine will modify its experience probability. The logic for these events is set forth in FIGS. 4 and 5 and specific circuits are set forth in FIGS. 12Z and 12AA and alternately in FIGS. 12$Z_1$ and 12$AA_1$.

Sloped Shores

The sloped east shore of a south bay is used in the detection of the character "N" and is recognized in the same manner as the sloped shore of rule 66 circuit and rule 67 circuit except that there is a requirement for the shore to be six vertical scans wide. Thus, in rule 75 circuit (FIG. 12CC) the trigger $C_{87}$ is turned ON to indicate a sloped shore after a count of six by the counter $K_{12}$ of rule 74 circuit. The counter $K_{12}$ is stepped by the same indications as that used for stepping the hereinbefore described counter $K_2$ of rule 66 circuit and will therefore not be further described.

Deep and tall bays and inlets

A deep west inlet is an inlet 6 white bits wide and is detected by rule 76 circuit and rule 77 circuit. The deep west inlet designation (D–WI) is utilized mainly to distinguish between a character K with a west bay formed by serifs and a character X having a deep west bay. It has been deemed unnecessary to detect the closure to the right by black which causes an inlet to become a bay. It has just been assumed that the inlet, of necessity, for the type of character being identified, is actually a bay. The D–WI may be recognized by the ON condition of the MWI trigger $S_{30}$ at the end of vertical scan in five different vertical scans. Since the MWI trigger $S_{30}$ goes ON, for the first time, upon recognition of a 2 x 2 bit white area, at the end of the fifth turning ON of MWI trigger $S_{30}$, the white region inlet is 6 bits wide. Thus, in rule 76 circuit, the lead "$S_{30}$" is connected via an OR circuit 1360 to the input of an AND circuit 1362, the other inputs of which are leads $X_S$ and "$\overline{C_{84}}$". The lead "$\overline{C_{84}}$" comes from a D–WI indicating trigger $C_{84}$ in rule 77 circuit and is positive until a D–WI indicaton. At the end of each vertical scan, therefore, until the D–WI indication, if there is a MWI indication (lead "$S_{30}$" positive), a pulse from AND circuit 1362 will step a five counter $K_6$, FIG. 12CC, until at the end of five pulses, the D–WI trigger $C_{84}$ of rule 77 circuit goes ON. Since it is also possible to have an upper west inlet in the character X if the lower left serif of the character X extends for a considerable distance to the right, the UWI lead "$S_{31}$" will also cause the 5 counter $K_6$ to step. However, to insure that there be no stepping of two during any one vertical scan, the UWI lead "$S_{31}$" will cause the stepping only if the no $\overline{MWI}$ lead "$S_{30}$" is positive, as indicated in rule 76 circuit by the leads "$S_{30}$" being "anded" at an AND circuit 1364, the output of which is connected to OR circuit 1360.

The potential D–EB which is also 6 white bits wide is detected in rule 78 circuit and rule 79 circuit by the use of the potential MEB lead "$S_{32}$," the potential UEB lead "$S_{23}$" and the no potential MEB lead "$\overline{S_{32}}$," in the same manner described for the detection of the D–WI of rule 76 circuit and rule 77 circuit. Thus, after a count of five, a five counter $K_7$ of rule 78 circuit produces an output on lead "$K_7=5$," which turns ON a potential DEB trigger $C_{85}$. Since, however, the potential D–EB trigger may be later closed to the right, both the counter $K_7$ and the trigger $C_{85}$ are reset by the detection of recognition criteria that indicate a closing to the right such as the detection of lakes, north bays and south bays. Thus, the ML lead "$C_{12}$," the UL lead "$C_{13}$," the LL lead "$C_{14}$," the NB lead "$C_{16}$," the 2NB's lead "$C_{17}$," the SB lead "$C_{18}$," and the 2SB's lead "$C_{19}$" cause the reset of counter $K_7$ and trigger $C_{85}$ via an A.C. OR circuit 1366 (FIG. 12DD).

A tall southwest bay (T–SWB) is a 4 x 4 white region of coded 0's blocked by black to the right, and its recognition is accomplished by rule 80 circuit and rule 81 circuit. A trigger $C_{86}$, in rule 81 circuit, indicatve of the tall southwest bay is turned ON by a lead "$K_8=4$" from a four counter $K_8$ in rule 80 circuit. After the trigger $C_{20}$ is ON to indicate the end of the fourth vertical scan of the character, if a coded 0 is in the marking register, it is an indication of coded 0's four wide, because there can be no other coded number to the west of a coded 0. If the coded 0 is sensed four times, it is an indication of coded 0's at lead four bits high, and if for each coded 0 a black "now" bit is sensed, it is an indication of black blocking, to the right, the 4 x 4 white region of coded 0's. Thus, the lead B is fed via an OR circuit 1368 to the input of an AND circuit 1370 where it is "anded" with the lead IN0 and the end of fourth vertical scan lead "$C_{20}$" to produce an output for stepping the four counter $K_8$. Four steps of counter $K_8$ turns ON trigger $C_{86}$ to indicate a tall southwest bay, and makes lead "$\overline{C_{86}}$" positive to prevent any further stepping of the counter $K_8$.

In case there is a serif, there would be no blocking by black to the right, and so if the "entering first vertical white zone" lead "$S_1$" is ON, it indicates a serif has been sensed and the lead "$S_1$" and IN0 at four different times in a vertical scan will then produce a T–SWB indication. This is accomplished by connecting lead "$S_1$" to the input of the OR circuit 1368, the other input of which is the lead B.

Miscellaneous recognition criteria and Christmas tree shape decoder

The miscellaneous recognition criteria (LL:UL) (lower lake followed by upper lake) is detected in rule 82 circuit to rule 84 circuit, inclusive (FIG. 12EE). Since the vertical scanning is from bottom to top, if the lower lake LL and upper lake UL were detected in the same vertical scan, the lower lake would be followed by the upper lake. However, the miscellaneous recognition criteria (LL:UL) requires that the UL be detected at least two vertical scans after the LL. Thus, in rule 82 circuit, a two counter $K_{14}$ will be stepped at the end of vertical scan, if a LL is detected, but only if there is no UL present. At the end of two vertical scans, with this condition, counter $K_{14}$ will produce on output signal on its "$K_{14}=2$" lead to turn ON trigger $C_{48}$ of rule 83 circuit. To step the two counter $K_{14}$, the LL lead "$C_{14}$" and the $\overline{UL}$ lead "$\overline{C_{13}}$" are "anded" at an AND circuit 1372 with lead $X_S$. The lead "$C_{48}$" is then "anded" at AND circuit 1374 of rule 84 circuit with the UL lead "$C_{13}$" and timing lead TP to produce a pulse for turning ON the LL:UL trigger $C_{46}$.

The manner in which most of the C triggers are turned ON to signify the numerous recognition criteria has been described. There will now be described the manner in which the states of the C triggers control the Christmas tree netsworks of FIGS. 12FF, 12GG, 12HH and 12II. Each C trigger has its "C" lead connected to the input of relay drivers 1375 the outputs of which in turn are connected via each relay to +150 volts. Each of the relays is labelled with the letter R follower by a number that is the same as the subscript of the "C" lead which is connected to its respective relay driver. Thus, the positive condition on a "C" lead causes its respective relay driver 1375 to conduct through its respective R relay causing the energization thereof. The energization of the relays the closing of their respective contacts to set up a path of the type discussed hereinbefore in conjunction with FIGS. 13A and 13B, i.e., the closing of the contacts of the relays are the same as the yes condition of the blocks of FIGS. 13A and 13B. At the end of character, an OK to Punch signal on lead 368 energizes relay R30 (FIG. 12FF), as previously described, and causes a path to be completed from the punch lead 487 through closed contacts R30–1 through the closed contacts of the different relays to one of the terminals of the punch 486, to cause the punch to punch and/or print the character recognized. It is obvious that devices other than a punch may be utilized as an output unit. Incidentally, the relay R30 is made slower acting than the other relays, to insure that the latter operate their contacts before the contacts R30–1 close to complete the circuit to the punch.

It is to be noted that the Christmas tree requires an "OR-ing" of certain of the recognition criteria. Thus, rule 85 circuit through rule 90 circuit, inclusive (FIG. 12EE), each consist of an A.C. OR circuit and a trigger which is turned ON if one or more of the particular recognition criteria exists. Thus, in rule 85 circuit the ML lead "$C_{12}$," the UL lead "$C_{13}$" and the LL lead "$C_{14}$" are connected to the input of an A.C. OR circuit 1376, which provides an output signal for turning ON a (ML or UL or LL) trigger $C_{40}$. The (UEB or LEB) trigger $C_{41}$, the (LWB or SWB) trigger $C_{42}$, the (MWB or LBVL) trigger $C_{43}$, the (MEB or LEB) trigger $C_{44}$ and the (NWB or MWB) trigger $C_{45}$ are turned ON in a similar manner by A.C. OR circuits in rule 86 circuit through rule 90 circuit and it is not necessary to further describe them.

The last rule circuit, rule 91 circuit, is the circuit for detecting context. This is used for distingiushing, for example, a numeral 1 form a leter I by determining whether the previous character was a number or a letter and assuming that the character being studied is probably the same. Thus, if the previous character recognized was a letter L, then a context trigger $C_{47}$ will be turned ON and the next character studied will be assumed to be the letter I rather than the number 1. Thus, all letters should turn ON the trigger $C_{47}$ and all numbers turn it OFF, except that, if one of the four cases where context is necessary, is recognized, that recognition will have no effect on the context trigger. Thus, all letters except I, Z, S and O turn ON context trigger $C_{47}$ and all numbers except 1, 2, 5 and 0 turn OFF trigger $C_{47}$. The letter terminals of punch 486 are connected in FIG. 12II to a letters cable 1378, which is then fed to an A.C. OR circuit 1380 (FIG. 12EE), the output of which turns ON context trigger $C_{47}$. The number terminals of the punch 486 is similarly connected via a figures cable 1382 to an A.C. OR circuit 1387, the output of which turns OFF context trigger $C_{47}$.

Figure 40H:
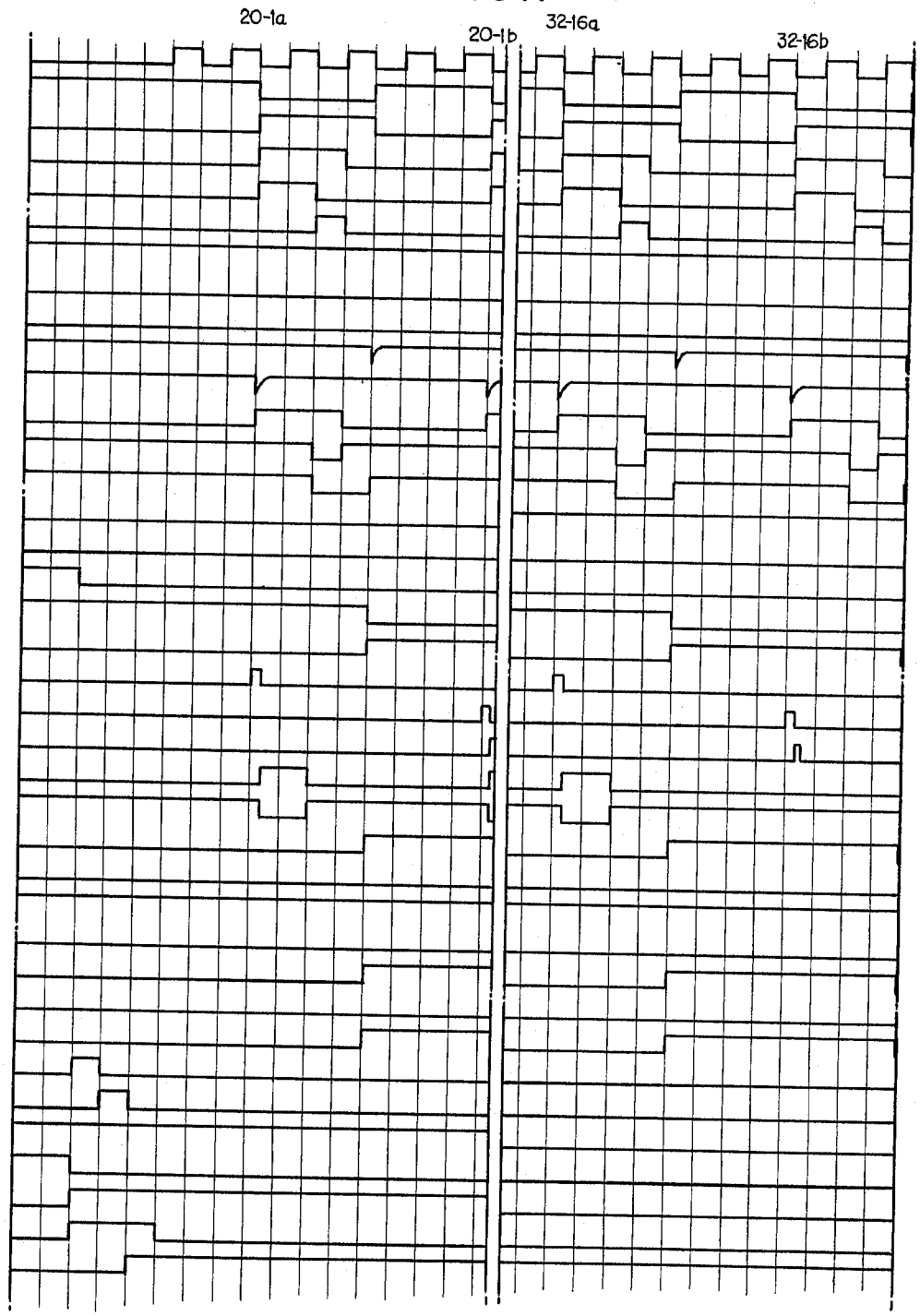
Figure 40:
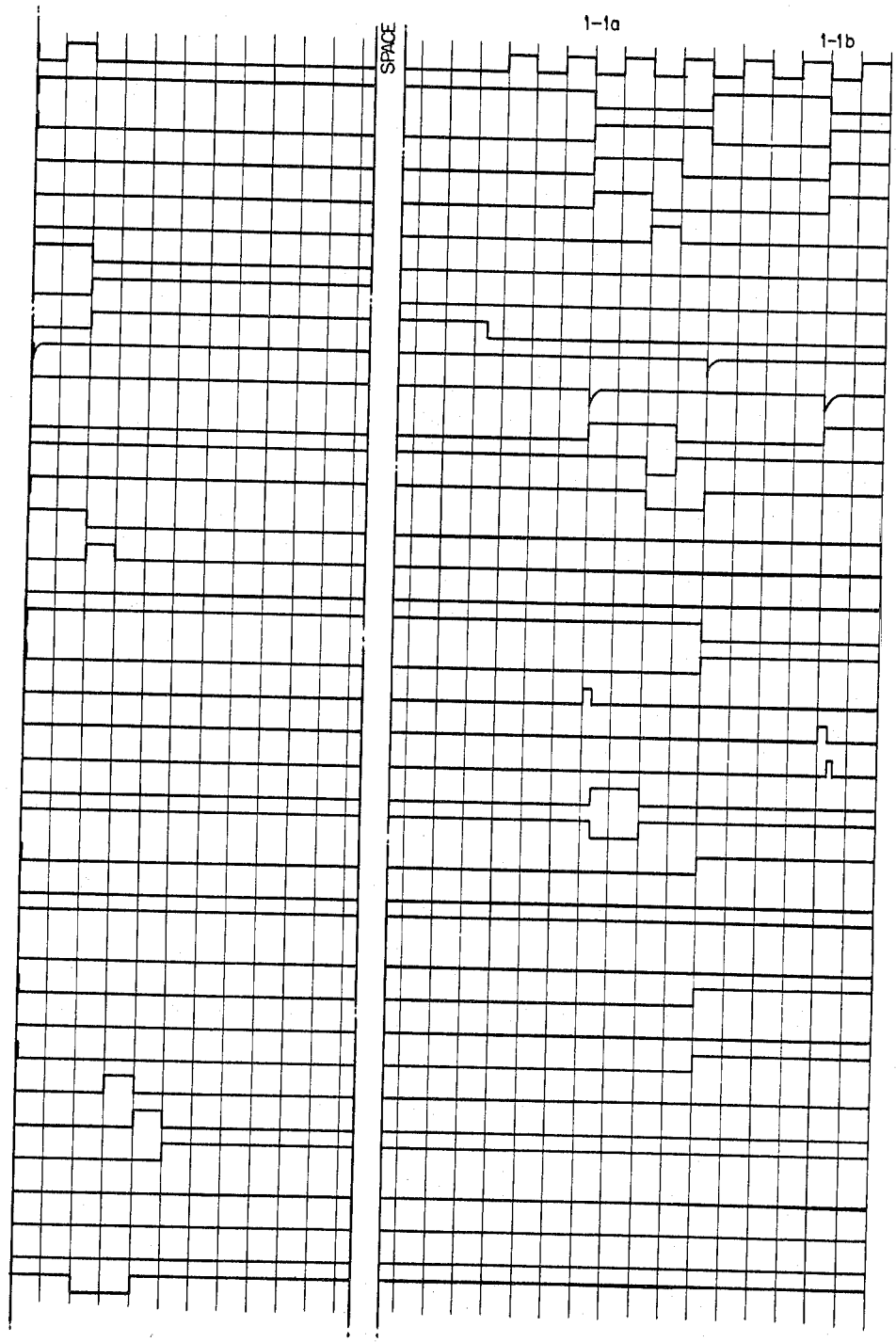
Figure 44:
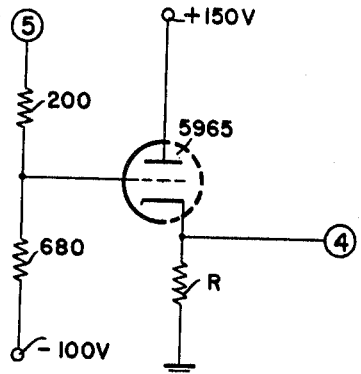
Figure 42:
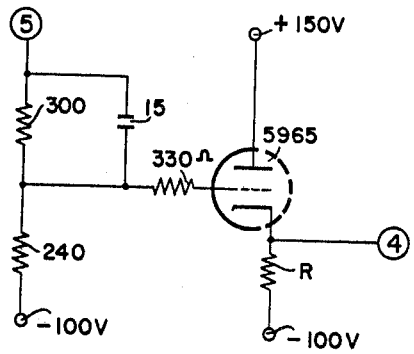
Figure 43:
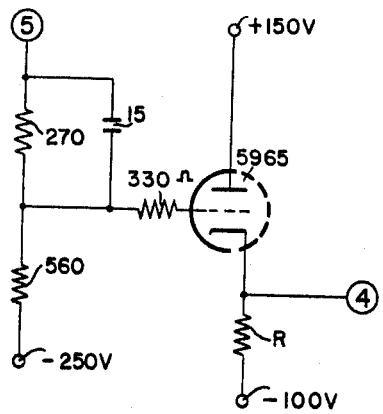

In FIG. 15, the numeric character 0 is thirteen vertical scans wide, i.e., no black bits appear during the fourteenth vertical scan and an end of character is indicated after the fourteenth scan. At the end of this fourteenth vertical scan, the OK to Punch signal starts the punch, but one more cycle of the marking register is permitted in order to reset it. This resetting takes place automatically during the "next" or fifteenth scan by shifting the marking register without writing anything into it, as previously described. After the fifteenth vertical scan, the marking register is not stepped again until the punching is over, at which time the punch will send a punch done signal which may be generated in a punch of the type shown in Gardinor in U.S. Patent No. 2,647,581 by the closing of contacts by a cam therein to complete a circuit to a positive potential. This punch done signal starts the sixteenth vertical scan by turning OFF the end of character trigger 478 (FIG. 12C), which ends the positive OK to Punch signal on lead 368. The OK to Punch signal going negative, causes an output from AND circuit 460 to turn ON single shot multivibrator 462 and create the reset pulse $X_S$, which in turn creates reset pulse $X_{SD}$, which is applied via inverter 498 (FIG. 12B) to turn OFF the punch trigger 496 and allow for the multivibrator pulses to pass through punch switch 204 and start the sixteenth vertical scan as illustrated in FIG. 40H.

In FIG. 15, the sixteenth vertical scan is all white but during the seventeenth vertical scan, black bits of a numeric character 1 are detected and the vertical scans continue. At the end of the thirty-second vertical scan, the typewriter must be spaced in a manner previously described. The horizontal carry on lead 274 (FIG. 12B) causes single shot multivibrator 288 (FIG. 12A) to go ON for one half second during which time the carriage is spaced. None of the circuits is affected during the time for carriage spacing because the marking register is not shifted and all temporary and memory triggers S and C in the rule circuits remain in status quo. Single shot multivibrator 288 goes negative to end the one-half second space time and start thirty-two more vertical scans.

It is apparent at this point, that additional marking registers could be utilized and also that more than two stages of each marking register can have outputs, so that a plurality of slices and bits in the slices could be sensed, to produce a minimum white region of a different size.

There has, therefore, been described in detail improved means for recognizing characters printed on a document.

What has been described is an improved technique of decision making and information processing machinery wherein experience previously acquired concerning the information being handled is employed to influence and to reinforce the decision and along therewith provision is made to improve the general store of knowledge concerning the subject matter being handled as experience in processing the information is required. This is accomplished through the use of logical or information feed-back loops wherein the results of earlier decisions are employed in the decision making process as a facet of the process. The application of the principles of the invention have been discussed with respect to typical decisions that may be encountered in widely diversified arts and can enable one skilled in the art to having a starting place in which to begin embodying the principles of the invention, the details of a superior character recognition machine have been illustrated along with an alternate detailed structure for achieving the modification of the experience which is a part of the invention.

While the invention has been particularly shown and described with reference to preferred embodiments thereof, it will be understood by those skilled in the art that the various changes in form and details may be made therein without departing from the spirit and scope of the invention.

What is claimed is:

1. In an information processing machine wherein a decision is based on a comparison of an order of magnitude determination with a criterion value, the improvement comprising decision means including augmentation means employing a decision probability based on experience, further means for modifying said decision probability based on experience with the number of times said probability governed the decision made by said decision means and still further means for modifying said criterion value employed in said decision means based on experience with the number of times said probability governed the decision made in said decision means.

2. In an information processing machine wherein a decision is based on a comparison of an order of magnitude determination with a criterian value the improvement comprising decision augmentation means employing a decision probability based on experience and further means involving information feedback paths for interdependently altering said criterion value and said decision probability.

3. In an information processing machine wherein a decision is based on a comparison of an order of magnitude determination with a criterion value the improvement comprising decision augmentation means employing a decision probability based on experience, interdependently governed by means for modifying said probability based on further experience and means for modifying said criterion value based on further experience.

4. In an information processing machine wherein a decision is based on a comparison of an order of magnitude determination with a criterion value, the improvement comprising decision augmentation means employing a decision probability based on experience to govern a decision wherein said comparison of said order of magnitude with said criterion value is within a certain range, augmentation means for modifying said decision probability based on experience with the number of times said comparison of said order of magnitude with said criterion value indicated a first decision and said probability indicated an alternate decision and further augmentation means for modifying said criterion value based on a relationship with the number of times that said probability indicated a first decision and said comparison of an order of magnitude determination of said criterion value indicated an alternate decision.

5. Decision making apparatus comprising in combination first comparison means for conducting a comparison of the value of an order of magnitude signal with a decision criterion value, said first comparison means being capable of indicating a close, an intermediate and a distant degree of comparison, means for making a decision prediction established by experience, decision means rendering a first alternative decision governed primarily by said close comparison of said order of magnitude value with said criterion value and secondarily by the combination of said intermediate comparison of said order of magnitude value with said criterion value and a first alternative prediction based on experience, said decision means being capable of rendering a second alternative decision governed primarily by said distant comparison of said order of magnitude signal with said criterion value and secondarily by the combination of said intermediate comparison of said order of magnitude value with said criterion value and a second alternative prediction based on experience, and at least one feedback means from said decision means to said comparison means capable of conveying decision information operable to modify at least one of said decision criterion value and said decision prediction.

6. The decision making apparatus of claim 5 wherein said feedback means include coupling control means for controlling the regulation of said feedback.

7. Decision making apparatus comprising in combination, first comparison means for conducting a comparison of the value of an order of magnitude signal with a decision criterion value, said first comparison means being capable of indicating a close, an intermediate and a distant degree of comparison, means for making a decision prediction established by experience, decision means rendering a first alternative decision governed primarily by said close comparison of said order of magnitude value with said criterion value and secondarily by the comparison of said intermediate comparison of said order of magnitude value with said criterion value and a first alternative prediction based on experience, said decision means being capable of rendering a second alternative decision governed primarily by said distant comparison of said order of magnitude value with said criterion value and secondarily by the comparison of said intermediate comparison of said order of magnitude value with said criterion value and a second alternative prediction based on experience, first feedback means from said decision means to said decision prediction means capable of conveying information indicating the number of times said decision prediction means indicated a first alternative decision and said first comparison indicated a second alternative decision, means responsive to said first feedback means and operable to modify said decision prediction established by experience, said feedback means from said decision means to said first comparison means capable of conveying information of the number of times a first alternative decision was indicated by said first comparison means and a second alternative decision was indicated by said decision prediction, and means for modifying said decision criterion value in response to information from said second feedback means.

8. The decision making apparatus of claim 7 wherein said first and second feedback means include coupling control means for controlling the regulation of said feedback.

9. Decision making apparatus comprising in combination comparison means for conducting a comparison of an order of magnitude signal value with a decision criterion value, said first comparison means being capable of indicating a close, an intermediate and a distant degree of comparison, first storage means containing an alternative decision prediction established by experience, second storage means containing a decision criterion value, means coupling said first storage means and said second storage means to said first comparison means, decision means rendering a first alternative decision determined by said close comparison signal and in the absence of said close comparison signal by the combination of said intermediate signal and a first alternative prediction from said first storage means, said decision means being capable of rendering a second alternative decision determined by said distant comparison signal and in the absence of said distant comparison signal by the combination of said intermediate comparison signal and said second alternative prediction from said first storage means, first feedback means capable of modifying the prediction in said first storage means based on a relationship of the number of times a decision is made wherein a conflict was present between the predicted value in said first storage means and the comparison signal from said first comparison means and second feedback means from said decision means capable of modifying said criterion value in said second storage means based on the number of times a decision was made where a conflict was present between said prediction, in said first storage means and said degree of comparison signal in said first comparison means.

10. The decision making apparatus of claim 9 wherein said first and second feedback means include coupling control means for controlling the regulation of said feedback.

11. Decision making apparatus comprising in combination comparison means for conducting a comparison of the value of an order of magnitude signal with an established standard value, said comparison means being capable of rendering a close, an intermediate, and a distant degree of comparison signal, a first storage means capable of retaining a selectable standard value, means for conveying said standard value to said comparison means, second storage means capable of retaining a first and a second alternative decision prediction selectable in response to experience, information means delivering said first and second alternative predictions from said second storage means to said comparison means, decision means capable of rendering a first alternative decision comprising an alternational member responsive to said close comparison signal and the combination of said intermediate signal and said first alternative prediction, said decision means including further means for rendering a second alternative decision comprising an alternational member responsive to said distant degree of comparison signal and said second alternative decision prediction, means tabulating the number of decisions wherein the signal from said comparison means was indicative of a first alternative decision and said prediction was indicative of a second alternative decision, and feedback means operable to selectably modify at least one of said standard value and said alternative decision prediction based on experience information established in said tabulation means.

12. The decision making apparatus of claim 11 wherein said tabulating means include coupling control means involving a mathematical ratio of events tabulated.

13. Decision making apparatus comprising in combination comparison means for conducting a comparison of the value of an order of magnitude signal with an established standard value, said comparison means being capable of rendering a close, an intermediate and a distant degree of comparison signal, a first storage means capable of retaining a selectable standard value, means for conveying said standard value to said comparison means, second storage means capable of retaining an alternative decision prediction selectable in response to experience, means delivering said first and second alternative predictions from said second storage means to said comparison means, decision means capable of rendering a first alternative decision comprising an alternational member responsive to said close comparison signal and the combination of said intermediate signal and said first alternative prediction, said decision means including further means for rendering an alternate decision comprising an alternational member responsive to said distant degree of comparison signal and the combination of said intermediate comparison signal and said second alternative decision prediction from said second storage means, tabulating means capable of counting the number of times a decision has been made where a conflict existed between said decision indicated by said comparison means and said decision prediction, first feedback means conveying selection information from said tabulating means to said first storage means and operable to modify said standard value in response to a predetermined relationship of conflicting decisions made with the total number of decisions and second feedback means conveying experience selection information from said tabulating means to said second storage means operable to modify said decision prediction in response to a predetermined ratio of conflicting decisions made with the total number of decisions.

14. Apparatus for identifying characters where each character is a line trace on a background material, comprising means for scanning adjacent slices of the background material, means for detecting background regions of a predetermined minimum size within each of said characters during the scanning, means for indicating the presence and positions of zones of background at different levels of the characters in the slice, each zone being separated from its adjacent zone by a line in trace in the slice, means for determining the presence of different predetermined character recognition criteria during said scanning under control of said detecting and indicating means and independent upon the zone indicated at the time a minimum size background region is detected, analyzing means including the utilization of at least one decision for recognizing each character by decisions based on satisfaction of the different recognition criteria determined during the scanning of said character and interdependent decision reinforcement means coupled to said analyzing means comprising information feedback loops employing a decision prediction based upon the context statistics and means for numerical computation of decision controlling parameters operable to influence and modify a recognition requirement required for a decision and a decision prediction given by experience.

15. The apparatus of claim 14 wherein said feedback loops contain coupling control means for controlling the amount of feedback employed in said decision reinforcement means.

16. Apparatus for interpreting information where each element of information is a line trace on a background material, comprising means for scanning adjacent slices of the background material, means for detecting background regions of a predetermined minimum size within each of said elements of information during the scanning, means for indicating the presence and positions of zones of background at different levels of the elements of information in the slice, each zone being separated from its adjacent zone by a line trace in the slice, means for determining the presence of different predetermined element of information recognition criteria during said scanning under control of said detecting and indicating means and independent upon the zone indicated at the time a minimum size background region is detected, analyzing means including the utilization of at least one decision for recognizing each element of information by decisions based on satisfaction of the different recognition criteria determined during the scanning of said element of information and decision reinforcement means coupled to said analyzing means comprising information feedback loops employing a decision prediction based upon experience statistic and means for numerical computation of decision controlling parameters operable to influence and modify a recognition requirement required for a decision and a decision prediction given by experience.

17. The apparatus of claim 16 wherein said feedback loops contain coupling control means for controlling the amount of feedback employed in said decision reinforcement means.

18. Alternative decision making apparatus in an information processing machine comprising means for sensing information reducible to a single order of magnitude variable signal, evaluating means comparing said order of magnitude variable signal with a selectable criterion value signal and capable of generating each of a first alternative decision signal for a comparison within a first order of magnitude, a second alternative decision signal for a comparison within a second order of magnitude and an indeterminate signal for a comparison between said first and said second orders of magnitude, said evaluating means being further capable of generating in response to said indeterminate signal a decision signal indicative of at least one alternative decision based on an experience governed selectable probability of occurrence of a particular alternative decision, first control means capable of delivering a signal operable to select a particular criterion value upon tabulation of a selectable ratio of said indeterminate signal to a particular alternative decision signal, second control means capable of delivering to said evaluating means a signal operable to select an alternative probability assignment upon tabulation of a selectable ratio of a comparison signal to a particular alternative decision signal.

19. In an information processing machine the improvement comprising decision making apparatus involving a sensing medium for a single order of magnitude determination, an evaluation medium capable of rendering a decision based on a comparison of said single order of magnitude determination, means connecting said sensing medium to said evaluation medium with a selectable decision criterion value, said evaluation medium including a first station for comparing and delivering an alternative decision in response to a clear comparison and a clear non-comparison and delivering an indeterminate signal in response to a comparison between said clear compare and clear non-compare conditions and a second station for delivering an alternative decision in response to said indeterminate signal based on a selectable probability established by experience, criterion modification means capable of adjusting said selectable decision criterion value in response to a plurality of decisions made independently of said criterion value and experience probability modification means capable of adjusting the selectable probability of a decision in response to a plurality of decisions made on said criterion value in conflict with said probability indication.

20. The improvement of claim 19 wherein each said modification means includes coupling control means controlling the quantity of decisions necessary to indicate a modification.

21. Decision making apparatus for information processing machinery comprising means for reducing a decision parameter to a single order of magnitude determination, means for comparing the order of magnitude value with a decision criterion value, means for employing experience available concerning the particular information being processed in cases where the satisfaction of the decision criterion value is marginal, means for monitoring the occurrence of events where the experience governed the decision, said monitoring including further means for adjusting said criterion value to conform with experience and means for adjusting the store of experience knowledge as further information is processed.

22. Decision making apparatus comprising, in combination, first comparison means for conducting a comparison of the value of an order of magnitude signal with a selectable decision criterion value, said first comparison means being capable of delivering a close, an intermediate, and a distant degree of comparison signal, experience storage means comprising first storage means containing a group of experience information and capable of delivering a first alternative decision prediction signal and a first alternative decision predicting group signal, second storage means containing a second group of experience information capable of delivering a second alternative decision prediction signal, and a second alternative decision prediction group signal, third storage means containing a group of indeterminate prediction experience information and capable of delivering an indeterminate experience group prediction signal, decision means rendering a first alternative decision based on at least one of said close comparison signal and the combination of said intermediate comparison signal and a said first alternative prediction signal, said decision means being capable of rendering a second alternative decision based on at least one of said distant comparison signal and the combination of said indeterminate signal and said second alternative prediction signal, said decision means including further means for delivering a positive conflict signal where a first alternative decision is made in conflict with said second alternative decision prediction signal and delivering a negative conflict signal where a second alternative decision is made in conflict with said first alternative decision prediction signal, first feedback means operable in response to a predetermined quantity of combinations of said comparison signals and said conflict signals to modify said selectable criterion value, and second feedback means operable in response to a predetermined quantity of combinations of said comparison signals and said experience group prediction signals to deliver a group assignment change signal to said experience storage means.

23. In an information processing machine wherein a prediction of a decision based on experience is employed to reinforce a decision prediction, conflict signal generating means indicating a conflict in a decision made with a decision prediction comprising a first storage element, a second storage element, a third storage element, a first coincidence element and a second coincidence element, means introducing into said first storage element an information signal indicating coincidence of a single order of magnitude determination with a decision criterion, means introducing into said second storage element an information signal indicative of the fact that a previous decision was in agreement with said decision prediction and means introducing into said third storage element an information signal indicative of the fact that a previous decision was made in conflict with said decision prediction, means delivering a signal indicating the presence of information in said first storage element to a first input of said first coincidence element, means delivering a signal indicating the absence of information in said first storage element to a first input of said second coincidence element, means delivering a signal indicative of the presence of information in said second storage element to said second input of said second coincidence element, means delivering a signal indicative of information present in said third storage element to a second input of said first coincidence element and reset means for each of said first, second and third storage elements.

24. The conflict signal generating means of claim 23 wherein said storage elements are binary triggers and said coincidence elements are AND circuits.

25. In an information processing system wherein information is conveyed on information channels to a decision location in which a decision is made on a combination of decision influencing factors, the improvement comprising: decision augmentation means including means for monitoring the frequency of occurrence of events related to previously made decisions and conveying decision influencing information based on said frequency of occurrence of events back to said decision location.

26. In an information system, a plurality of channels each including serially a plurality of decision locations wherein in each decision location a decision is made on a combination of factors, and means for monitoring the frequency of occurrence related to previously made decisions in at least one said decision location, and means for conveying decision influencing information based on said frequency of occurrence of events back to said decision location.

27. In a system for handling information involving a plurality of decision locations, decision reinforcement means including means for monitoring the frequency of occurrence of decision influencing events made in at least one said decision location and means conveying decision influencing information based on said frequency of occurrence of events to said decision location.

References Cited by the Examiner

UNITED STATES PATENTS

| | | | |
|---|---|---|---|
| 2,932,006 | 4/1960 | Glauberman | 340—149.1 |
| 3,007,362 | 11/1961 | Olson et al. | 84—1.03 |
| 3,044,701 | 7/1962 | Kerstukos et al. | 235—151 |
| 3,058,655 | 10/1962 | Arneth | 340—146.1 X |

FOREIGN PATENTS 749,836   6/1956   Great Britain.

OTHER REFERENCES

Pages 430, 437, 446, September 1960, Publication WADD Technical Report 60–600, Bionics Symposium.

Pages 153–187, 1960 copyright, Publication I: "Self Organizing Systems," by Yovits and Cameron; Pergamon Press. Article: "A Variety of Intelligent Learning in a General Problem Solver," by Newell, Shaw and Simon.

ROBERT C. BAILEY, *Primary Examiner.*

STEPHEN W. CAPELLI, MALCOLM A. MORRISON,
*Examiners.*